US010770733B2

(12) United States Patent
Lockett et al.

(10) Patent No.: US 10,770,733 B2
(45) Date of Patent: Sep. 8, 2020

(54) DIATOMACEOUS ENERGY STORAGE DEVICES

(71) Applicant: Printed Energy Pty Ltd, Brisbane, Queensland (AU)

(72) Inventors: Vera N. Lockett, Phoenix, AZ (US); John G. Gustafson, Chandler, AZ (US); William J. Ray, Fountain Hills, AZ (US); Yasser Salah, Tempe, AZ (US)

(73) Assignee: Printed Energy Pty Ltd, Brisbane, Queensland (AU)

( * ) Notice: Subject to any disclaimer, the term of this patent is extended or adjusted under 35 U.S.C. 154(b) by 0 days.

(21) Appl. No.: 16/165,171

(22) Filed: Oct. 19, 2018

(65) Prior Publication Data

US 2019/0051909 A1    Feb. 14, 2019

Related U.S. Application Data

(63) Continuation of application No. 15/808,757, filed on Nov. 9, 2017, now Pat. No. 10,109,864, which is a
(Continued)

(51) Int. Cl.
*H01M 4/00* (2006.01)
*H01M 4/90* (2006.01)
(Continued)

(52) U.S. Cl.
CPC ............ *H01M 4/9016* (2013.01); *C09D 5/00* (2013.01); *H01G 11/24* (2013.01); *H01G 11/36* (2013.01);
(Continued)

(58) Field of Classification Search
CPC ....... Y02E 60/13; H01M 8/16; H01M 2/1646; H01M 6/40; H01M 4/48; H01M 4/50; H01G 11/24; H01G 11/38; H01G 11/46
See application file for complete search history.

(56) References Cited

U.S. PATENT DOCUMENTS

| 2,912,479 | A | | 11/1959 | Poole | |
| 4,312,931 | A | * | 1/1982 | Witherspoon | H01M 4/62 429/229 |

(Continued)

FOREIGN PATENT DOCUMENTS

| CN | 1391705 | 1/2003 |
| CN | 1427494 | 7/2003 |

(Continued)

OTHER PUBLICATIONS

Augustyn et al., "Pseudocapacitive oxide materials for high-rate electrochemical energy storage", Energy Environ. Sci., 2014, vol. 7, pp. 1597-1614.
(Continued)

*Primary Examiner* — Cynthia H Kelly
*Assistant Examiner* — Monique M Wills
(74) *Attorney, Agent, or Firm* — Knobbe Martens Olson & Bear, LLP

(57) ABSTRACT

An energy storage device can include a cathode having a first plurality of frustules, where the first plurality of frustules can include nanostructures having an oxide of manganese. The energy storage device can include an anode comprising a second plurality of frustules, where the second plurality of frustules can include nanostructures having zinc oxide. A frustule can have a plurality of nanostructures on at least one surface, where the plurality of nanostructures can include an oxide of manganese. A frustule can have a plurality of nanostructures on at least one surface, where the plurality of nanostructures can include zinc oxide. An electrode for an energy storage device includes a plurality of frustules, where each of the plurality of frustules can have a plurality of nanostructures formed on at least one surface.

18 Claims, 36 Drawing Sheets

Related U.S. Application Data continuation of application No. 15/406,407, filed on Jan. 13, 2017, now Pat. No. 9,825,305, which is a continuation of application No. 14/745,709, filed on Jun. 22, 2015, now Pat. No. 9,548,511, which is a continuation-in-part of application No. 14/161,658, filed on Jan. 22, 2014, now Pat. No. 9,083,010, which is a continuation-in-part of application No. 13/944,211, filed on Jul. 17, 2013, now Pat. No. 9,136,065.

(60) Provisional application No. 61/862,469, filed on Aug. 5, 2013, provisional application No. 61/750,757, filed on Jan. 9, 2013, provisional application No. 61/673,149, filed on Jul. 18, 2012.

(51) Int. Cl.

| | | |
|---|---|---|
| *H01G 11/24* | (2013.01) | |
| *H01G 11/36* | (2013.01) | |
| *H01G 11/38* | (2013.01) | |
| *H01G 11/46* | (2013.01) | |
| *H01G 11/52* | (2013.01) | |
| *H01M 2/16* | (2006.01) | |
| *H01M 6/40* | (2006.01) | |
| *H01M 4/48* | (2010.01) | |
| *H01M 4/50* | (2010.01) | |
| *H01M 10/36* | (2010.01) | |
| *C09D 5/00* | (2006.01) | |
| *H01M 10/05* | (2010.01) | |
| *H01M 8/16* | (2006.01) | |
| *H01M 4/62* | (2006.01) | |

(52) U.S. Cl.
CPC ............. *H01G 11/38* (2013.01); *H01G 11/46* (2013.01); *H01G 11/52* (2013.01); *H01M 2/1646* (2013.01); *H01M 4/48* (2013.01); *H01M 4/50* (2013.01); *H01M 4/502* (2013.01); *H01M 6/40* (2013.01); *H01M 8/16* (2013.01); *H01M 10/05* (2013.01); *H01M 10/36* (2013.01); *H01M 4/625* (2013.01); *Y02E 60/13* (2013.01)

(56) References Cited

U.S. PATENT DOCUMENTS

| | | | |
|---|---|---|---|
| 4,760,494 | A | 7/1988 | Crum |
| 5,116,701 | A | 5/1992 | Kalisz |
| 5,573,868 | A | 11/1996 | Umemoto et al. |
| 5,627,269 | A | 5/1997 | Herak et al. |
| 5,948,464 | A | 9/1999 | Delnick |
| 6,080,283 | A | 6/2000 | Ray |
| 6,124,059 | A | 9/2000 | Bohnstedt et al. |
| 6,242,129 | B1 | 6/2001 | Johnson |
| 6,379,835 | B1 | 4/2002 | Kucherovsky et al. |
| 6,475,670 | B1 | 11/2002 | Ito |
| 6,527,955 | B1 | 3/2003 | Sun |
| 6,641,908 | B1 | 11/2003 | Clough |
| 6,728,096 | B1 | 4/2004 | Smith et al. |
| 6,828,062 | B2 | 12/2004 | Lu et al. |
| 7,067,104 | B2 | 6/2006 | Sandhage |
| 7,112,389 | B1 | 9/2006 | Arora et al. |
| 7,348,096 | B2 | 3/2008 | Schubert et al. |
| 7,615,206 | B2 | 11/2009 | Sandhage et al. |
| 7,727,290 | B2 | 6/2010 | Zhang et al. |
| 8,029,927 | B2 | 10/2011 | Tucholski |
| 8,119,273 | B1 | 2/2012 | Gerald, II et al. |
| 8,119,278 | B2 | 2/2012 | Bailey et al. |
| 8,460,823 | B1 * | 6/2013 | Delnick ............ H01M 4/13 429/209 |
| 8,809,126 | B2 | 8/2014 | Lowenthal et al. |
| 9,083,010 | B2 | 7/2015 | Lockett et al. |
| 9,136,065 | B2 | 9/2015 | Lockett et al. |
| 9,397,341 | B2 | 7/2016 | Lockett et al. |
| 9,520,598 | B2 | 12/2016 | Lockett et al. |
| 9,548,511 | B2 | 1/2017 | Lockett et al. |
| 9,786,926 | B2 | 10/2017 | Lockett et al. |
| 9,825,305 | B2 | 11/2017 | Lockett et al. |
| 9,834,447 | B2 | 12/2017 | Lockett et al. |
| 9,917,309 | B2 | 3/2018 | Lockett et al. |
| 10,020,516 | B2 | 7/2018 | Lockett et al. |
| 10,109,864 | B2 | 10/2018 | Lockett et al. |
| 10,221,071 | B2 | 3/2019 | Lockett et al. |
| 10,396,365 | B2 | 8/2019 | Lockett et al. |
| 2001/0009734 | A1 | 7/2001 | Clough |
| 2002/0071915 | A1 | 6/2002 | Schubert et al. |
| 2002/0102465 | A1 | 8/2002 | Chen et al. |
| 2002/0164530 | A1 | 11/2002 | Iwakura et al. |
| 2003/0027051 | A1 | 2/2003 | Kejha et al. |
| 2003/0099884 | A1 | 5/2003 | Chiang et al. |
| 2003/0113624 | A1 | 6/2003 | Kim et al. |
| 2003/0165744 | A1 | 9/2003 | Schubert et al. |
| 2004/0023110 | A1 | 2/2004 | Parent et al. |
| 2004/0151837 | A1 | 8/2004 | Morita et al. |
| 2004/0191617 | A1 | 9/2004 | Visco et al. |
| 2004/0221446 | A1 | 11/2004 | Ohhara et al. |
| 2005/0058875 | A1 | 3/2005 | Jerome |
| 2005/0175894 | A1 | 8/2005 | Visco et al. |
| 2006/0177739 | A1 | 8/2006 | Endo et al. |
| 2006/0216584 | A1 | 9/2006 | Cheiky |
| 2006/0246355 | A1 | 11/2006 | Min et al. |
| 2007/0048604 | A1 * | 3/2007 | Gaillard ............ H01M 2/0275 429/175 |
| 2007/0128707 | A1 | 6/2007 | Rorrer et al. |
| 2007/0212615 | A1 | 9/2007 | Jost et al. |
| 2007/0281854 | A1 | 12/2007 | Harbour et al. |
| 2008/0020284 | A1 | 1/2008 | Michot et al. |
| 2008/0038170 | A1 | 2/2008 | Sandhage et al. |
| 2008/0063931 | A1 | 3/2008 | Zucker |
| 2008/0209876 | A1 | 9/2008 | Miller |
| 2009/0075167 | A1 | 3/2009 | Traulsen et al. |
| 2009/0130565 | A1 | 5/2009 | Matsui et al. |
| 2009/0191460 | A1 | 7/2009 | Fujiwara et al. |
| 2009/0246625 | A1 | 10/2009 | Lu |
| 2009/0272946 | A1 | 11/2009 | Le |
| 2010/0000441 | A1 | 1/2010 | Jang et al. |
| 2010/0009255 | A1 | 1/2010 | Hawkins et al. |
| 2010/0075222 | A1 | 3/2010 | Watanabe |
| 2010/0183523 | A1 | 7/2010 | Wagner |
| 2010/0203362 | A1 | 8/2010 | Lam et al. |
| 2010/0233569 | A1 | 9/2010 | Ono et al. |
| 2010/0284123 | A1 | 11/2010 | Pulugurtha et al. |
| 2010/0285375 | A1 | 11/2010 | Friesen et al. |
| 2011/0043037 | A1 | 2/2011 | McIlroy et al. |
| 2011/0043968 | A1 | 2/2011 | Kim et al. |
| 2011/0045337 | A1 | 2/2011 | Lee et al. |
| 2011/0058309 | A1 | 3/2011 | Eguchi et al. |
| 2011/0059361 | A1 | 3/2011 | Wilkening et al. |
| 2011/0068296 | A1 | 3/2011 | Huang et al. |
| 2011/0111283 | A1 * | 5/2011 | Rust, III ............ H01M 4/0428 429/163 |
| 2011/0134585 | A1 | 6/2011 | Shen et al. |
| 2011/0261502 | A1 | 10/2011 | Gruner |
| 2011/0281184 | A1 | 11/2011 | Friesen et al. |
| 2011/0311857 | A1 | 12/2011 | Tucholski |
| 2012/0014037 | A1 | 1/2012 | Mastro et al. |
| 2012/0021457 | A1 | 1/2012 | Tang |
| 2012/0028134 | A1 | 2/2012 | Kim et al. |
| 2012/0100402 | A1 | 4/2012 | Nesper et al. |
| 2012/0107666 | A1 | 5/2012 | Bailey et al. |
| 2012/0161195 | A1 | 6/2012 | Lowenthal et al. |
| 2012/0187906 | A1 | 7/2012 | Martienssen et al. |
| 2012/0241073 | A1 | 9/2012 | Wiest et al. |
| 2012/0250225 | A1 | 10/2012 | Aria et al. |
| 2012/0264034 | A1 | 10/2012 | Waki et al. |
| 2013/0052509 | A1 | 2/2013 | Halalay et al. |
| 2013/0089769 | A1 | 4/2013 | Proctor et al. |
| 2013/0280579 | A1 | 10/2013 | Wright et al. |
| 2013/0308248 | A1 | 11/2013 | Leddy et al. |
| 2014/0002788 | A1 | 1/2014 | Otts et al. |
| 2014/0014403 | A1 | 1/2014 | Miller et al. |

(56) References Cited

U.S. PATENT DOCUMENTS

| | | |
|---|---|---|
| 2014/0017557 A1 | 1/2014 | Lockett et al. |
| 2014/0017558 A1 | 1/2014 | Lockett et al. |
| 2014/0017571 A1 | 1/2014 | Lockett et al. |
| 2014/0023907 A1 | 1/2014 | Lockett et al. |
| 2014/0029161 A1 | 1/2014 | Beidaghi et al. |
| 2014/0072886 A1 | 3/2014 | Urban et al. |
| 2014/0134503 A1 | 5/2014 | Lockett et al. |
| 2015/0024247 A1 | 1/2015 | Lockett et al. |
| 2015/0338403 A1 | 11/2015 | Wang |
| 2016/0031843 A1 | 2/2016 | Socha et al. |
| 2016/0322648 A1 | 11/2016 | Lockett et al. |
| 2017/0222232 A1 | 8/2017 | Lockett et al. |
| 2017/0309411 A1 | 10/2017 | Qian et al. |
| 2018/0034067 A1 | 2/2018 | Lockett et al. |
| 2018/0057363 A1 | 3/2018 | Lockett et al. |
| 2018/0198136 A1 | 7/2018 | Lockett et al. |
| 2018/0212253 A1 | 7/2018 | Lockett et al. |
| 2018/0269494 A1 | 9/2018 | Lockett et al. |
| 2019/0185329 A1 | 6/2019 | Lockett et al. |
| 2019/0363370 A1 | 11/2019 | Lockett et al. |

FOREIGN PATENT DOCUMENTS

| | | |
|---|---|---|
| CN | 1973397 | 5/2007 |
| CN | 101960546 | 1/2011 |
| CN | 102007070 | 4/2011 |
| CN | 102070151 | 5/2011 |
| CN | 102198946 | 9/2011 |
| CN | 102208611 | 10/2011 |
| CN | 102208640 | 10/2011 |
| CN | 102290245 | 12/2011 |
| CN | 102306767 | 1/2012 |
| CN | 102558979 | 7/2012 |
| CN | 103178283 | 6/2013 |
| CN | 103227321 | 7/2013 |
| CN | 104584160 | 4/2015 |
| DE | 10157272 | 6/2003 |
| EP | 0 618 629 | 10/1994 |
| EP | 0 875 950 | 11/1998 |
| EP | 1 630 891 | 12/2010 |
| JP | 59139574 | 8/1984 |
| JP | 06-260208 | 9/1994 |
| JP | 06251759 | 9/1994 |
| JP | 07-304984 | 11/1995 |
| JP | 2000-003713 | 1/2000 |
| JP | 3121137 | 12/2000 |
| JP | 2001-176554 | 6/2001 |
| JP | 2003-077445 | 3/2003 |
| JP | 2006-108047 | 4/2006 |
| JP | 2010-155761 | 7/2010 |
| JP | 2012-033366 | 2/2012 |
| KR | 10-2012-0061932 | 6/2012 |
| KR | 10-2012-0125385 | 11/2012 |
| TW | 200740011 | 10/2007 |
| TW | 201016715 | 5/2010 |
| TW | I608647 | 12/2017 |
| WO | WO 2000/055930 | 9/2000 |
| WO | WO 2007/116649 | 10/2007 |
| WO | WO 2012/037171 | 3/2012 |
| WO | WO 2014/014758 | 1/2014 |
| WO | WO 2014/015074 | 1/2014 |
| WO | WO 2014/106088 | 3/2014 |
| WO | WO 2014/059127 | 4/2014 |
| WO | WO 2015/009867 | 1/2015 |
| WO | WO 2016/209655 | 12/2016 |
| WO | WO 2019/182874 | 9/2019 |

OTHER PUBLICATIONS

Bao, Z. et al., "Synthesis of porous self-supporting metal-nanoparticle assemblies with 3D Morphologies inherited from biosilica templates (diatom frustules)" Advanced materials, 2009, v. 21, p. 474.

Baruah, S. et al., "Hydrothermal growth of ZnO nanostructures" Sci. Technol. Adv. Mater., 2009, 10, 013001.

Cai, Y. et al., "Manganese-doped zinc orthosilicate-bearing phosphor microparticles with controlled three-dimentional shapes derived from diatom frustules" Journal of the American Ceramic Society, 2007, 90(4), 1304.

Choma, J. et al., "Deposition of silver nanoparticles on silica spheres and rods" Colloids and Surfaces A: Physicochem. Eng. Aspects, 2012, doi: 10.1016/j.colsurfa.2012.07.004.

Drum, R.W. et al, "Star Trek replicators and diatom nanotechnology" Trends in Biotechnology, 2003, 21(8), 325.

Fang, Y. et al., "Protein-mediated layer-by-layer synthesis of free-standing microscale titania structures with biologically assembled 3-D morphologies" Chemistry of materials, 2009, 21(24), 5704.

Fang, Y. et al., "Synthesis of nanostrcutured Cu- and Ni-based micro-asseblies with selectable 3-D hierarchical biogenic morphologies" Journal of Materials Chemistry, 2012, 22(4), 1305.

Flores, J.C. et al., "Variations in morphologies of silver nanoshells on silica spheres" Colloids and Surfaces A: Physicochem. Eng. Aspects, 2008, 330, 86.

Flores, J.C. et al., "Preparation of core-shell nanospheres of silica-silver: SiO2@Ag" Journal of Non-Crystalline Solids, 2008, 354, 5435.

Forsyth et al., "Ionic Liquids—An Overview," Aust. J. Chem., vol. 57, No. 2, Jan. 1, 2004, pp. 113-119.

Franks, G.V. et al., "Zeta potentials and yield stresses of silica suspensions in concentrated monovalent electrolytes: isoelectric point shift and additional attraction" Journal of Colloid and Interfacial Science, 2002, 249, 44.

Gonzalez E. et al., "Surface Analysis of Polymers Treated by Remote Atmospheric Pressure Plasma," Langmuir, 2010, vol. 26(5), pp. 3710-3719.

Gordon, R. et al., "The Glass Menagerie: diatoms for novel application in nanotechnology" Trends Biotechnol., 2009, v.27, p. 116.

Guo et al., "Engineering of three dimensional (3-D) diatom@TiO2@MnO2 composites with enhanced supercapacitor performance", Electrochimica acta, 2016, vol. 190, pp. 159-167.

Greene, L.E. et al., "General route to vertical ZnO nanowire arrays using textured ZnO seeds" Nano Lett., 2005, 5, 1231.

Gutu, T. et al., "Electron microscopy and optical characterization of cadmium sulphide nanocrystals deposited on the patterned surface of diatom biosilica" Journal of Nanomaterials, vol. 2009, Article ID 860536, 7 pages, Feb. 19, 2009.

He et al., "Morphology engineering of ZnO nanostructures for high performancce supercapacitors: enhanced electrochemistry of ZnO nanocones compared to ZnO nanowires", Nanotechnology, 2017, vol. 28, in 11 pages.

Ho et al. "Direct write dispenser printing of a zinc microbattery with an ionic liquid gel electrolyte" Journal of Micromechanics and Microengineering 20 (2010) 104009 (9pp).

Huang et al. "Graphene-based conducting inks for direct inkjet printing of flexible conductive patterns and their applications in electric circuits and chemical sensors" Nano Research (2011), 4(7), 675-684.

Huang et al., "MnO2-based nanostructures for high-performance supercapacitors", J. Mater. Chem. A, 2015, vol. 3, pp. 21380-21423.

International Search Report and Written Opinion in PCT Application No. PCT/US2013/064309, dated Jan. 24, 2014, in 13 pages.

Jeffryes, C. et al., "Peptide mediated deposition of nanostructured TiO2 into the periodic structure of diatom biosilica. Journal of material research" 2008, 23(12), 3255.

Jeffryes, C. et al., "The potential of diatom nanobiotechnology for applications in solar cells, batteries, and electroluminescent devices" Energy & Enviromental Science, 2011, v. 4, p. 3930.

Kalmychkov, G. V. et al., "Method of separation of diatom frustules from bottom sediments for oxygen isotopic analysis and paleoclimatic reconstruction" Geokhimiya, 2005, 12, 1358.

Kim, J. et al., "Direct synthesis and integration of functional nanostructures in microfluidic devices" Lab on Chip, 11, p. 1946-1951, 2011.

Kumar, M. et al., "Chemical vapor deposition of carbon nanotubes: a review on growth mechanism and mass production" Journal of Nanoscience and Nanotechnology, 2010, 10, 3739.

(56) References Cited

OTHER PUBLICATIONS

Le et al., Morphology-controlled MnO2 modified silicon diatoms for high performance asymmetric supercapacitors., J. Mater. Chem. A, 2017, vol. 5, No. 22, pp. 10856-10865.

Lebeau T. et al., "Diatom cultivation and biotechnologically relevant products. Part I: cultivation at various scales" Appl. Microbiol. Biotechnol., 2003, 60, 612.

Lee, Seung-Jin et al., "Rapid Hydrolysis of Organophosphorous Esters Induced by Nanostructured, Flourine-Doped Titania Replicas of Diatom Frustules" J. Am. Ceram. Soc., 90 [5], p. 1632-1636, 2007.

Li, F et al., "MnO2 nanostructures with three-dimensional (3D) morphology replicated from diatoms for high-performance supercapacitors", J. Mater., Cham. A, 2015, vol. 3, pp. 7855-7861.

Li, H. et al., "Peptide-mediated deposition of nanostructured TiO2 into the periodic structure of diatom biosilica and its integration into the fabrication of a dye-sensitized solar cell device" Materials Research Society Symposium Proceedings, 2009, 1189E.

Mirkin, C.A. et al., AFOSR Final report. "Diatomeceous, fungal, and bacterial building blocks for material synthesis" 2008.

Nassif, N. et al., "From Fiatoms to silica-based biohybrids" Chem Soc Rev, 2011, v.40, p. 849-859.

Parkinson, J. et al., "Beyond micromashinning: the potential of diatoms" Nanotechnology. 1999, v. 17, p. 190.

Payne, E. K. et al., "Sacrificial Biolofical Templates for the Formation of Nanostructured Metallic Microshells" Chem.,Int. Ed., 2005, v. 44, p. 5064.

Pinkert A. et al., "Ionic Liquids and Their Interaction with Cellulose," Chemical Reviews, 2009, vol. 109, pp. 6712-6728.

Pol, V.G. et al., "Sonochemical Deposition of Silver Nanoparticles on Silica Spheres" Langmuir, 2002, 18, 3352.

Prout, "Aspects of lead/acid battery technology. 7. Separators" Journal of Power Sources (1993), 46(1), 117-38.

Renberg, I. et al., "A procedure for preparing large sets of diatom slides from sediment cores" Journal of Paleolimnology, 1990, 4, 87.

Rings, A. et al., "A new method for the quantitative separation of diatom frustules from lake sediments" Limnology and Oceanography: Methods, 2004, 2, 25.

Round, F. E. et al., "The Diatoms: biology & morphology of the genera" 1990.

Sandhage, K. H. et al., "Novel, Bioclastic Route to Self-Assembled, 3D, Chemically Tailored Meso/Nanostructures: Shape-Preserving Reactive Conversion of Biosilica (Diatom) Microshells" Adv. Mater., 2002, v. 14, No. 6, p. 429-433.

Sandhage, K.H. et al., "Merging biological self-assembly with synthetic chemical tailoring: The potential for 3-D genetically engineered micro/nano-devices (3-D GEMS)" International Journal of Applied Ceramic Technology (2005), 2(4), 317.

Sandhage, K. et al., "Bio-enabled synthesis of functional 3-D nanostructured materials via layer-by-layer deposition" International Chemical Congress of Pacific Basin Societies, Honolulu. 2010.

Serieyssol, K. et al., "Diatom fossils in mires: a protocol for extraction, preparation and analysis in palaeoenvironmental studies" Mires and Peat, 2010, 7, 1.

Shen, Lanyao et al., "Magnesiothermically reduced diatomaceous earth as a porous silicon anode material for lithium ion batteries" Journal of Power Sources (2012), 213, 229-232.

Shian, S. et al., "Three-Dimensional Assemblies of Zirconia Nanocrystals via Shape-Preserving Reactive Conversion of Diatom Microshells" J. Am. Ceram. Soc., 2006, v. 89, p. 694-698.

Skipp, G.L. et al., "Improved density gradient techniques using sodium poltungstate and a comparison to the use of other heavy liquids" U.S. department of the Interior. U.S. Geological survey, 1993, OF 92-038.

Sterrenburg, F.A.S., "How to prepare diatom samples" micrap.selfip.com:81/micrapp/cleandiatoms.pdf, 13 pages, undated.

Sun et al., "Diatom silica, an emerging biomaterial for energy conversion and storage", J. Mater. Chem. A, 2017, vol. 5, pp. 8847-8859.

Sutto et al., "Ionic liquid batteries: Chemistry to replace alkaline/acid energy storage devices", Electrochimica Acta, 2011, vol. 56, pp. 3375-3379.

Tang, S. et al., "Ultrasonic electrodeposition of silver nanoparticles on dielectric silica spheres" Nanotechnology, 2007, 18, 295607.

Torrisi, F. et al. "Ink-jet printed graphene electronics" Condensed Matter (2011), 1-12, arXiv:1111.4970v1.

Toster, J. et al., "Controlling anatase coating of diatom frustules by varying the binding layer" Cryst. Eng. Comm. 2012, 14(2), 3446.

Tuval, T. et al., "A microwave-assisted polyol method for the deposition of silver nanoparticles on silica spheres" Nanotechnology, 2007, 18, 255601.

Umemura, K. et al., "Preparation of photocatalyst using diatom frustules by liquid phase deposition method" Journal of Nanoscience and Nanotechnology, 2010, 10(8), 4883.

Unalan, H.E. et al., "Rapid synthesis of aligned zinc oxide nanowires" Nanotechnology, 2008, 19, 255608.

Wang, Z. et al., "Facile fabrication method and characterization of hollow Ag/SiO2 double-shelled spheres" Langmuir, 2009, 25(13), 7646.

Weatherspoon, M.R. et al., "Thin, conformal, and continues SnO2 coatings on three-dimensional biosilica templates through hydroxyl-group amplification and layer-by-layer alkoxide deposition" Angewandte Chemie, 2007, 46(30), 5724.

Wen et al., Morphology-controlled MnO2-graphene oxide-diatomaceous earth 3-dimentional (3D) composites for high-performance supercapacitors, Dalton Trans., 2016, vol. 45, pp. 936-942.

Wikipedia, "Supercapacitor", https://en.wikipedia.org/wiki/Supercapacitor, downloaded Feb. 8, 2018 in 35 pages.

Xia, H. et al., "Surface synthesis of zinc oxide nanoparticles on silica spheres: preparation and characterization" J. Phys. Chem. B, 2003, 107, 9175.

Xu, S. et al., "One-dimensional ZnO nanostructures: solution growth and functional properties" NanoRes, 2011, doi 10.1007/s12274-011-0160-7.

Ye, X. et al., "Deposition of silver nanoparticles on silica spheres via ultrasound irradiation" Applied Surface Science, 2007, 253, 6264.

Yu, Y. et al., "Surface modification of diatomaceous earth silica microparticles with functional silanes for metal ions sorption" CHEMECA. Sep. 26-29, 2010, Adelaide, Australia.

Zhang et al., "Hierarchical NiO moss decorated diatomites via facile and templated method for high performance supercapacitors", Materials Letters, 2014, vol. 120, pp. 263-266.

Zhang et al. "One-pot synthesis of hierarchical MnO2-modified diatomites for electromechanical capacitor electrodes" Journal of Power Sources, vol. 246, Aug. 6, 2013, pp. 449-456.

Zhang, Y. et al., "Synthesis, characterization, and applications of ZnO nanowires" Journal of Nanomaterials, 2012, doi: 10.1155/2012/624520.

Zheng, S. et al., "Preparation and Photocatalytic Property of TiO2/Diatomite-Based Porous Ceramics Composite Materials" International Journal of Photoenergy, vol. 2012, Article ID 264186, p. 1-4, 2011.

Zhuravlev, "The surface chemistry of amorphous silica. Zhuravlev model" Colloids and Surfaces A: Physicochemical and Engineering Aspects, 2000, 173, 1.

International Search Report and Written Opinion in PCT Application No. PCT/US2013/050949, dated Nov. 12, 2013, in 13 pages.

Shuilin, Zheng, "Studies of Purifying of Clayey Diatomite", Journal of Wuhan University of Technology—Materials Science, 1994, No. 01, pp. 125-133.

Huai-Zhi, Cai et al., "Experimental Study on Purification of Sichuan Miyi Diatomite", Comprehensive Utilization of Minerals, 1992, pp. 1-8.

Peng, Yuan, "Purification of Diatomaceous Earth and its Surface Hydroxyl and Acid Sites", Guangzhou Institute of Geochemistry, Chinese Academy of Sciences, 2001, pp. 9.

Shuilin, Zheng, "Studies of Purifying of Clayey Diatomite", Journal of Wuhan University of Technology—Materials Science, 1994, No. 01, 1 page.

(56) References Cited

OTHER PUBLICATIONS

International Search Report and Written Opinion received in PCT Application No. PCT/US2014/046910 dated Nov. 18, 2014 in 18 pages.
International Search Report and Written Opinion received in PCT Application No. PCT/US2019/022344 dated Jul. 2, 2019 in 10 pages.
Jian et al., "An Effective Cleaning Method for Producing Pure Diatom Samples from Lake Sediments", Earth and Environment, 2007, vol. 35, No. 1, pp. 91-96.

* cited by examiner

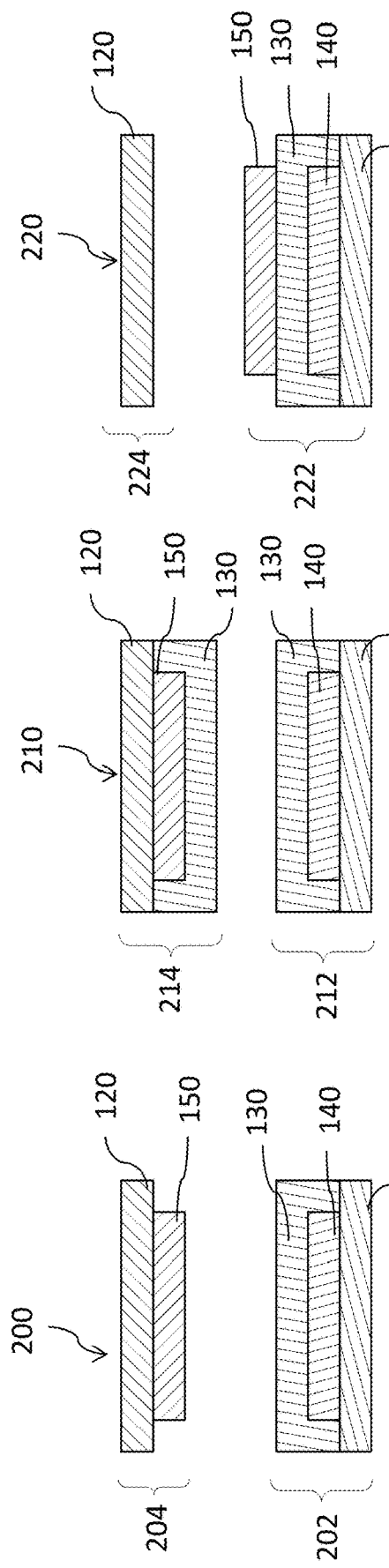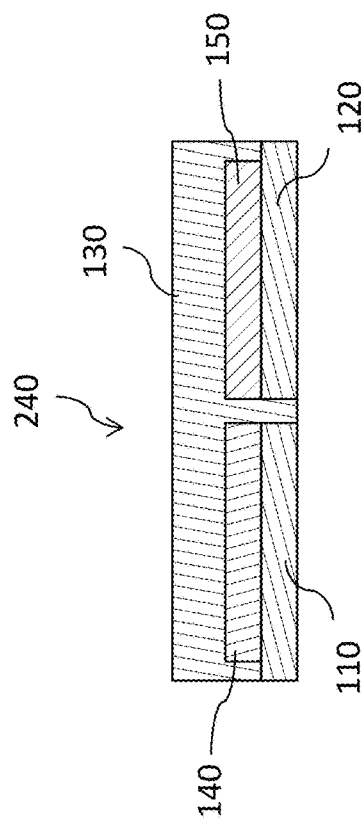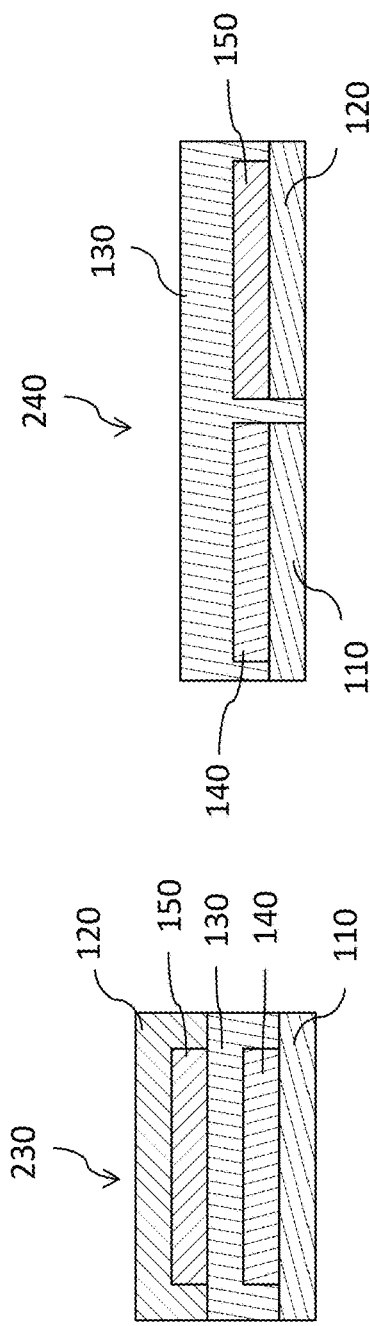

DIATOMACEOUS ENERGY STORAGE DEVICES

CROSS REFERENCE TO RELATED APPLICATIONS

This application is a continuation of U.S. patent application Ser. No. 15/808,757, filed Nov. 9, 2017, entitled "Diatomaceous Energy Storage Devices," which is a continuation of U.S. patent application Ser. No. 15/406,407, filed Jan. 13, 2017, entitled "Diatomaceous Energy Storage Devices," which is a continuation of U.S. patent application Ser. No. 14/745,709, filed Jun. 22, 2015, entitled "Diatomaceous Energy Storage Devices," which is continuation-in-part of U.S. patent application Ser. No. 14/161,658, filed Jan. 22, 2014, entitled "Diatomaceous Energy Storage Devices," which claims the benefit of U.S. Provisional Patent Application Ser. No. 61/862,469, filed Aug. 5, 2013, entitled "High Surface Area Nanoporous Energy Storage Devices," and which is a continuation-in-part of U.S. patent application Ser. No. 13/944,211, filed Jul. 17, 2013, entitled "Diatomaceous Energy Storage Devices," which claims the benefit of U.S. Provisional Patent Application Ser. No. 61/750,757, filed Jan. 9, 2013, entitled "Diatomaceous Energy Storage Devices," and U.S. Provisional Patent Application Ser. No. 61/673,149, filed Jul. 18, 2012, entitled "Diatomaceous Energy Storage Devices," each of which is incorporated herein by reference in its entirety.

BACKGROUND

Field

The present application relates to energy storage devices, and particularly to energy storage devices comprising frustules of diatoms.

Description of the Related Art

Diatoms typically include unicellular eukaryotes, such as single-celled algae. Diatoms are abundant in nature and can be found in both fresh water and marine environments. Generally, diatoms are enclosed by a frustule having two valves fitted together through a connective zone comprising girdle elements. Diatomaceous earth, sometimes known as diatomite, can be a source of frustules. Diatomaceous earth comprises fossilized frustules and can be used in a diverse range of applications, including as a filtering agent, a filling agent for paints or plastics, an adsorbent, cat litter, or an abrasive material.

Frustules often comprise a significant amount of silica ($SiO_2$), along with alumina, iron oxide, titanium oxide, phosphate, lime, sodium, and/or potassium. Frustules are typically electrically insulating. Frustules may comprise a wide variety of dimensions, surface features, shapes, and other attributes. For example, frustules may comprise diverse shapes, including but not limited to cylinders, spheres, discs, or prisms. Frustules comprise a symmetrical shape or a non-symmetrical shape. Diatoms may be categorized according to the shape and/or symmetry of the frustules, for example grouping the diatoms based on existence or lack of radial symmetry. Frustules may comprise dimensions within a range from less than about one micron to about hundreds of microns. Frustules may also comprise varying porosity, having numerous pores or slits. Pores or slits of frustules may vary in shape, size, and/or density. For example, frustules may comprise pores having dimensions from about 5 nm to about 1000 nm.

Frustules may comprise significant mechanical strength or resistance to shear stress, for example due to the dimensions of the frustule, frustule shape, porosity, and/or material composition.

SUMMARY

An energy storage device such as a battery (e.g., rechargeable battery), fuel cell, capacitor, and/or supercapacitor (e.g., electric double-layer capacitor (EDLC), pseudocapacitor, symmetric capacitor), may be fabricated using frustules embedded in at least one layer of the energy storage device. The frustules can be sorted to have a selected shape, dimension, porosity, material, surface feature, and/or another suitable frustule attribute, which may be uniform or substantially uniform or which may vary. The frustules may include a frustule surface modifying structure and/or material. The energy storage device may include layers such as electrodes, separators, and/or current collectors. For example, a separator may be positioned between a first electrode and a second electrode, a first current collector may be coupled to the first electrode, and a second current collector may be coupled to the second electrode. At least one of the separator, the first electrode, and the second electrode may include the frustules. Inclusion of frustules in at least a portion of an energy storage device can help to fabricate the energy storage device using printing technology, including screen printing, roll-to-roll printing, ink-jet printing, and/or another suitable printing process. The frustules can provide structural support for an energy storage device layer and help the energy storage device layer to maintain a uniform or substantially uniform thickness during manufacturing and/or use. Porous frustules can allow unimpeded or substantially unimpeded flow of electrons or ionic species. Frustules including surface structures or material can increase conductivity of a layer.

In some embodiments, a printed energy storage device comprises a first electrode, a second electrode, and a separator between the first electrode and the second electrode. At least one of the first electrode, the second electrode, and the separator includes frustules.

In some embodiments, the separator includes the frustules. In some embodiments, the first electrode includes the frustules. In some embodiments, the separator and the first electrode include the frustules. In some embodiments, the second electrode includes the frustules. In some embodiments, the separator and the second electrode include the frustules. In some embodiments, the first electrode and the second electrode include the frustules. In some embodiments, the separator, the first electrode, and the second electrode include the frustules.

In some embodiments, the frustules have a substantially uniform property. In some embodiments, the property comprises shape, for example including a cylinder, a sphere, a disc, or a prism. In some embodiments, the property comprises a dimension, for example including diameter, length, or a longest axis. In some embodiments, the property comprises porosity. In some embodiments, the property comprises mechanical strength.

In some embodiments, the frustules comprise a surface modifying structure. In some embodiments, the surface modifying structure includes a conductive material. In some embodiments, the conductive material includes at least one of silver, aluminum, tantalum, copper, lithium, magnesium, and brass. In some embodiments, the surface modifying structure includes zinc oxide (ZnO). In some embodiments, the surface modifying structure comprises a semiconductor. In some embodiments, the semiconductor includes at least one of silicon, germanium, silicon germanium, and gallium arsenide. In some embodiments, the surface modifying structure comprises at least one of a nanowire, a nanoparticle, and a structure having a rosette shape. In some embodiments, the surface modifying structure is on an exterior surface of the frustules. In some embodiments, the surface modifying structure is on an interior surface of the frustules. In some embodiments, the surface modifying structure is on an interior surface and an exterior surface of the frustules.

In some embodiments, the frustules comprise a surface modifying material. In some embodiments, the surface modifying material comprises a conductive material. In some embodiments, the surface modifying material includes at least one of silver, aluminum, tantalum, copper, lithium, magnesium, and brass. In some embodiments, the surface modifying material includes ZnO. In some embodiments, the surface modifying material includes a semiconductor. In some embodiments, the semiconductor includes at least one of silicon, germanium, silicon germanium, and gallium arsenide. In some embodiments, the surface modifying material is on an exterior surface of the frustules. In some embodiments, the surface modifying material is on an interior surface of the frustules. In some embodiments, the surface modifying material is on an exterior surface and an interior surface of the frustules.

In some embodiments, the first electrode comprises a conductive filler. In some embodiments, the second electrode comprises a conductive filler. In some embodiments, the first electrode and the second electrode comprise a conductive filler. In some embodiments, the conductive filler comprises graphitic carbon. In some embodiments, the conductive filler comprises graphene. In some embodiments, the conductive filler comprises carbon nanotubes.

In some embodiments, the first electrode comprises an adherence material. In some embodiments, the second electrode comprises an adherence material. In some embodiments, the first electrode and the second electrode comprise an adherence material. In some embodiments, the separator comprises an adherence material. In some embodiments, the first electrode and the separator comprise an adherence material. In some embodiments, the second electrode and the separator comprise an adherence material. In some embodiments, the first electrode, the second electrode, and the separator comprise an adherence material. In some embodiments, the adherence material comprises a polymer.

In some embodiments, the separator comprises an electrolyte. In some embodiments, the electrolyte comprises at least one of an ionic liquid, an acid, a base, and a salt. In some embodiments, the electrolyte comprises an electrolytic gel.

In some embodiments, the device comprises a first current collector in electrical communication with the first electrode. In some embodiments, the device comprises a second current collector in electrical communication with the second electrode. In some embodiments, the device comprises a first current collector in electrical communication with the first electrode and a second current collector in electrical communication with the second electrode.

In some embodiments, the printed energy storage device comprises a capacitor. In some embodiments, the printed energy storage device comprises a supercapacitor. In some embodiments, the printed energy storage device comprises a battery.

In some embodiments, a system comprises a plurality of the printed energy storage devices as described herein stacked on top of each other. In some embodiments, an electrical device comprises the printed energy storage devices described herein or the system.

In some embodiments, a membrane for a printed energy storage device comprises frustules.

In some embodiments, the frustules have a substantially uniform property. In some embodiments, the property comprises shape, for example including a cylinder, a sphere, a disc, or a prism. In some embodiments, the property comprises a dimension, for example including diameter, length, or a longest axis. In some embodiments, the property comprises porosity. In some embodiments, the property comprises mechanical strength.

In some embodiments, the frustules comprise a surface modifying structure. In some embodiments, the surface modifying structure includes a conductive material. In some embodiments, the conductive material includes at least one of silver, aluminum, tantalum, copper, lithium, magnesium, and brass. In some embodiments, the surface modifying structure includes zinc oxide (ZnO). In some embodiments, the surface modifying structure comprises a semiconductor. In some embodiments, the semiconductor includes at least one of silicon, germanium, silicon germanium, and gallium arsenide. In some embodiments, the surface modifying structure comprises at least one of a nanowire, a nanoparticle, and a structure having a rosette shape. In some embodiments, the surface modifying structure is on an exterior surface of the frustules. In some embodiments, the surface modifying structure is on an interior surface of the frustules. In some embodiments, the surface modifying structure is on an interior surface and an exterior surface of the frustules.

In some embodiments, the frustules comprise a surface modifying material. In some embodiments, the surface modifying material comprises a conductive material. In some embodiments, the surface modifying material includes at least one of silver, aluminum, tantalum, copper, lithium, magnesium, and brass. In some embodiments, the surface modifying material includes ZnO. In some embodiments, the surface modifying material includes a semiconductor. In some embodiments, the semiconductor includes at least one of silicon, germanium, silicon germanium, and gallium arsenide. In some embodiments, the surface modifying material is on an exterior surface of the frustules. In some embodiments, the surface modifying material is on an interior surface of the frustules. In some embodiments, the surface modifying material is on an exterior surface and an interior surface of the frustules.

In some embodiments, the membrane further comprises a conductive filler. In some embodiments, the conductive filler comprises graphitic carbon. In some embodiments, the conductive filler comprises graphene.

In some embodiments, the membrane further comprises an adherence material. In some embodiments, the adherence material comprises a polymer.

In some embodiments, the membrane further comprises an electrolyte. In some embodiments, the electrolyte comprises at least one of an ionic liquid, an acid, a base, and a salt. In some embodiments, the electrolyte comprises an electrolytic gel.

In some embodiments, an energy storage device comprises the membrane as described herein. In some embodiments, the printed energy storage device comprises a capacitor. In some embodiments, the printed energy storage device comprises a supercapacitor. In some embodiments, the printed energy storage device comprises a battery. In some embodiments, a system comprises a plurality of energy storage devices as described herein stacked on top of each other. In some embodiments, an electrical device comprises the printed energy storage devices described herein or the system.

In some embodiments, a method of manufacturing a printed energy storage device comprises forming a first electrode, forming a second electrode, and forming a separator between the first electrode and the second electrode. At least one of the first electrode, the second electrode, and the separator includes frustules.

In some embodiments, the separator includes the frustules. In some embodiments, forming the separator includes forming a dispersion of the frustules. In some embodiments, forming the separator includes screen printing the separator. In some embodiments, forming the separator includes forming a membrane of the frustules. In some embodiments, forming the separator includes roll-to-roll printing the membrane including the separator.

In some embodiments, the first electrode includes the frustules. In some embodiments, forming the first electrode includes forming a dispersion of the frustules. In some embodiments, forming the first electrode includes screen printing the first electrode. In some embodiments, forming the first electrode includes forming a membrane of the frustules. In some embodiments, forming the first electrode includes roll-to-roll printing the membrane including the first electrode.

In some embodiments, the second electrode includes the frustules. In some embodiments, forming the second electrode includes forming a dispersion of the frustules. In some embodiments, forming the second electrode includes screen printing the second electrode. In some embodiments, forming the second electrode includes forming a membrane of the frustules. In some embodiments, forming the second electrode includes roll-to-roll printing the membrane including the second electrode.

In some embodiments, the method further comprises sorting the frustules according to a property. In some embodiments, the property comprises at least one of shape, dimension, material, and porosity.

In some embodiments, an ink comprises a solution and frustules dispersed in the solution.

In some embodiments, the frustules have a substantially uniform property. In some embodiments, the property comprises shape, for example including a cylinder, a sphere, a disc, or a prism. In some embodiments, the property comprises a dimension, for example including diameter, length, or a longest axis. In some embodiments, the property comprises porosity. In some embodiments, the property comprises mechanical strength.

In some embodiments, the frustules comprise a surface modifying structure. In some embodiments, the surface modifying structure includes a conductive material. In some embodiments, the conductive material includes at least one of silver, aluminum, tantalum, copper, lithium, magnesium, and brass. In some embodiments, the surface modifying structure includes zinc oxide (ZnO). In some embodiments, the surface modifying structure comprises a semiconductor. In some embodiments, the semiconductor includes at least one of silicon, germanium, silicon germanium, and gallium arsenide. In some embodiments, the surface modifying structure comprises at least one of a nanowire, a nanoparticle, and a structure having a rosette shape. In some embodiments, the surface modifying structure is on an exterior surface of the frustules. In some embodiments, the surface modifying structure is on an interior surface of the frustules. In some embodiments, the surface modifying structure is on an interior surface and an exterior surface of the frustules.

In some embodiments, the frustules comprise a surface modifying material. In some embodiments, the surface modifying material comprises a conductive material. In some embodiments, the surface modifying material includes at least one of silver, aluminum, tantalum, copper, lithium, magnesium, and brass. In some embodiments, the surface modifying material includes ZnO. In some embodiments, the surface modifying material includes a semiconductor. In some embodiments, the semiconductor includes at least one of silicon, germanium, silicon germanium, and gallium arsenide. In some embodiments, the surface modifying material is on an exterior surface of the frustules. In some embodiments, the surface modifying material is on an interior surface of the frustules. In some embodiments, the surface modifying material is on an exterior surface and an interior surface of the frustules.

In some embodiments, the ink further comprises a conductive filler. In some embodiments, the conductive filler comprises graphitic carbon. In some embodiments, the conductive filler comprises graphene.

In some embodiments, the ink further comprises an adherence material. In some embodiments, the adherence material comprises a polymer.

In some embodiments, the ink further comprises an electrolyte. In some embodiments, the electrolyte comprises at least one of an ionic liquid, an acid, a base, and a salt. In some embodiments, the electrolyte comprises an electrolytic gel.

In some embodiments, a device comprises at least one of the inks described herein. In some embodiments, the device comprises a printed energy storage device. In some embodiments, the printed energy storage device comprises a capacitor. In some embodiments, the printed energy storage device comprises a supercapacitor. In some embodiments, the printed energy storage device comprises a battery.

A method of extracting a diatom frustule portion may comprise dispersing a plurality of diatom frustule portions in a dispersing solvent. At least one of an organic contaminant and an inorganic contaminant may be removed. The method of extracting a diatom frustule portion may comprise dispersing the plurality of diatom frustule portions in a surfactant, the surfactant reducing an agglomeration of the plurality of diatom frustule portions. The method may comprise extracting a plurality of diatom frustule portions having at least one common characteristic using a disc stack centrifuge.

In some embodiments, the at least one common characteristic can include at least one of a dimension, a shape, a material, and a degree of brokenness. The dimension may include at least one of a length and a diameter.

In some embodiments, a solid mixture can comprise the plurality of diatom frustule portions. The method of extracting a diatom frustule portion may comprise reducing a particle dimension of the solid mixture. Reducing the particle dimension of the solid mixture may be before dispersing the plurality of diatom frustule portions in the dispersing solvent. In some embodiments, reducing the particle dimension can comprise grinding the solid mixture. Grinding the solid mixture may include applying to the solid mixture at least one of a mortar and a pestle, a jar mill, and a rock crusher.

In some embodiments, a component of the solid mixture having a longest component dimension that is greater than a longest frustule portion dimension of the plurality of diatom frustule portions can be extracted. Extracting the component of the solid mixture may comprise sieving the solid mixture. Sieving the solid mixture may comprise processing the solid mixture with a sieve having a mesh size from about 15 microns to about 25 microns. Sieving the solid mixture may comprise processing the solid mixture with a sieve having a mesh size from about 10 microns to about 25 microns.

In some embodiments, the method of extracting a diatom frustule portion can comprise sorting the plurality of diatom frustule portions to separate a first diatom frustule portion from a second diatom frustule portion, the first diatom frustule portion having a greater longest dimension. For example, the first diatom frustule portion may comprise a plurality of unbroken diatom frustule portions. The second diatom frustule portion may comprise a plurality of broken diatom frustule portions.

In some embodiments, sorting the plurality of diatom frustule portions can comprise filtering the plurality of diatom frustule portions. Filtering may comprise disturbing agglomeration of the plurality of diatom frustule portions. In some embodiments, disturbing agglomeration of the plurality of diatom frustule portions can comprise stirring. In some embodiments, disturbing agglomeration of the plurality of diatom frustule portions can comprise shaking. In some embodiments, disturbing agglomeration of the plurality of diatom frustule portions can comprise bubbling.

Filtering may include applying a sieve to the plurality of diatom frustule portions. For example, the sieve may have a mesh size from about 5 microns to about 10 microns, including about 7 microns.

In some embodiments, the method of extracting a diatom frustule portion can include obtaining a washed diatom frustule portion. Obtaining the washed diatom frustule portion may comprise washing the plurality of diatom frustule portions with a cleaning solvent after removing the at least one of the organic contaminant and the inorganic contaminant. In some embodiments, obtaining the washed diatom frustule portion can comprise washing the diatom frustule portion having the at least one common characteristic with a cleaning solvent.

The cleaning solvent may be removed. For example, removing the cleaning solvent may comprise sedimenting the plurality of diatom frustule portions after removing at least one of the organic contaminant and the inorganic contaminant. For example, removing the cleaning solvent may comprise sedimenting the plurality of diatom frustule portions having the at least one common characteristic. Sedimenting the plurality of diatom frustule portions may comprise centrifuging. In some embodiments, centrifuging can comprise applying a centrifuge suitable for large scale processing. In some embodiments, centrifuging can comprise applying at least one of a disc stack centrifuge, a decanter centrifuge, and a tubular bowl centrifuge.

In some embodiments, at least one of the dispersing solvent and the cleaning solvent can comprise water.

In some embodiments, at least one of dispersing the plurality of diatom frustule portions in the dispersing solvent and dispersing the plurality of diatom frustule portions in the surfactant can comprise sonicating the plurality of diatom frustules.

The surfactant may comprise a cationic surfactant. For example, the cationic surfactant may comprise at least one of a benzalkonium chloride, a cetrimonium bromide, a lauryl methyl gluceth-10 hydroxypropyl dimonium chloride, a benzethonium chloride, a benzethonium chloride, a bronidox, a dmethyldioctadecylammonium chloride, and a tetramethylammonium hydroxide.

The surfactant may comprise a non-ionic surfactant. For example, the non-ionic surfactant may comprise at least one of a cetyl alcohol, a stearyl alcohol, a cetostearyl alcohol, an oleyl alcohol, a polyoxyethylene glycol alkyl ether, an octaethylene glycol monododecyl ether, a glucoside alkyl ethers, a decyl glucoside, a polyoxyethylene glycol octylphenol ethers, an octylphenol ethoxylate (Triton X-100™), a nonoxynol-9, a glyceryl laurate, a polysorbate, and a poloxamer.

In some embodiments, the method of extracting a diatom frustule portion can comprise dispersing the plurality of diatom frustules in an additive component. Dispersing the plurality of diatom frustules in an additive component may be before dispersing the plurality of diatom frustules in the surfactant. Dispersing the plurality of diatom frustules in an additive component may be after dispersing the plurality of diatom frustules in the surfactant. Dispersing the plurality of diatom frustules in an additive component may be at least partially simultaneous with dispersing the plurality of diatom frustules in the surfactant. The additive component may include at least one of a potassium chloride, an ammonium chloride, an ammonium hydroxide, and a sodium hydroxide.

In some embodiments, dispersing the plurality of diatom frustule portions can comprise obtaining a dispersion comprising about 1 weight percent to about 5 weight percent of the plurality of diatom frustule portions.

In some embodiments, removing the organic contaminant can comprise heating the plurality of diatom frustule portions in the presence of a bleach. The bleach may include at least one of a hydrogen peroxide and a nitric acid. Heating the plurality of diatom frustule portions may comprise heating the plurality of diatom frustule portions in a solution comprising an amount of hydrogen peroxide in a range from about 10 volume percent to about 20 volume percent. Heating the plurality of diatom frustule portions may comprise heating the plurality of diatom frustule portions for a duration of about 5 minutes to about 15 minutes.

In some embodiments, removing the organic contaminant can comprise annealing the plurality of diatom frustule portions. In some embodiments, removing the inorganic contaminant can comprise combining the plurality of diatom frustule portions with at least one of a hydrochloric acid and a sulfuric acid. Combining the plurality of diatom frustule portions with at least one of a hydrochloric acid and a sulfuric acid may include mixing the plurality of diatom frustule portions in a solution comprising about 15 volume percent to about 25 volume percent of hydrochloric acid. For example, the mixing may be for a duration of about 20 minutes to about 40 minutes.

A method of extracting a diatom frustule portion may include extracting a plurality of diatom frustule portions having at least one common characteristic using a disc stack centrifuge.

In some embodiments, the method of extracting a diatom frustule portion can comprise dispersing the plurality of diatom frustule portions in a dispersing solvent. In some embodiments, the method can comprise removing at least one of an organic contaminant and an inorganic contaminant. In some embodiments, the method can comprise dispersing the plurality of diatom frustule portions in a surfactant, the surfactant reducing an agglomeration of the plurality of diatom frustule portions.

The at least one common characteristic may include at least one of a dimension, a shape, a material, and a degree of brokenness. The dimension may include at least one of a length and a diameter.

In some embodiments, a solid mixture can comprise the plurality of diatom frustule portions. The method of extracting a diatom frustule portion may comprise reducing a particle dimension of the solid mixture. Reducing the particle dimension of the solid mixture may be before dispersing the plurality of diatom frustule portions in the dispersing solvent. In some embodiments, reducing the particle dimension can comprise grinding the solid mixture. Grinding the solid mixture may include applying to the solid mixture at least one of a mortar and a pestle, a jar mill, and a rock crusher.

In some embodiments, a component of the solid mixture having a longest component dimension that is greater than a longest frustule portion dimension of the plurality of diatom frustule portions can be extracted. Extracting the component of the solid mixture may comprise sieving the solid mixture. Sieving the solid mixture may comprise processing the solid mixture with a sieve having a mesh size from about 15 microns to about 25 microns. Sieving the solid mixture may comprise processing the solid mixture with a sieve having a mesh size from about 10 microns to about 25 microns.

In some embodiments, the method of extracting a diatom frustule portion can comprise sorting the plurality of diatom frustule portions to separate a first diatom frustule portion from a second diatom frustule portion, the first diatom frustule portion having a greater longest dimension. For example, the first diatom frustule portion may comprise a plurality of unbroken diatom frustule portions. The second diatom frustule portion may comprise a plurality of broken diatom frustule portions.

In some embodiments, sorting the plurality of diatom frustule portions can comprise filtering the plurality of diatom frustule portions. Filtering may comprise disturbing agglomeration of the plurality of diatom frustule portions. In some embodiments, disturbing agglomeration of the plurality of diatom frustule portions can comprise stirring. In some embodiments, disturbing agglomeration of the plurality of diatom frustule portions can comprise shaking. In some embodiments, disturbing agglomeration of the plurality of diatom frustule portions can comprise bubbling.

Filtering may include applying a sieve to the plurality of diatom frustule portions. For example, the sieve may have a mesh size from about 5 microns to about 10 microns, including about 7 microns.

In some embodiments, the method of extracting a diatom frustule portion can include obtaining a washed diatom frustule portion. Obtaining the washed diatom frustule portion may comprise washing the plurality of diatom frustule portions with a cleaning solvent after removing the at least one of the organic contaminant and the inorganic contaminant. In some embodiments, obtaining the washed diatom frustule portion can comprise washing the diatom frustule portion having the at least one common characteristic with a cleaning solvent.

The cleaning solvent may be removed. For example, removing the cleaning solvent may comprise sedimenting the plurality of diatom frustule portions after removing at least one of the organic contaminant and the inorganic contaminant. For example, removing the cleaning solvent may comprise sedimenting the plurality of diatom frustule portions having the at least one common characteristic. Sedimenting the plurality of diatom frustule portions may comprise centrifuging. In some embodiments, centrifuging can comprise applying a centrifuge suitable for large scale processing. In some embodiments, centrifuging can comprise applying at least one of a disc stack centrifuge, a decanter centrifuge, and a tubular bowl centrifuge.

In some embodiments, at least one of the dispersing solvent and the cleaning solvent can comprise water.

In some embodiments, at least one of dispersing the plurality of diatom frustule portions in the dispersing solvent and dispersing the plurality of diatom frustule portions in the surfactant can comprise sonicating the plurality of diatom frustules.

The surfactant may comprise a cationic surfactant. For example, the cationic surfactant may comprise at least one of a benzalkonium chloride, a cetrimonium bromide, a lauryl methyl gluceth-10 hydroxypropyl dimonium chloride, a benzethonium chloride, a benzethonium chloride, a bronidox, a dmethyldioctadecylammonium chloride, and a tetramethylammonium hydroxide.

The surfactant may comprise a non-ionic surfactant. For example, the non-ionic surfactant may comprise at least one of a cetyl alcohol, a stearyl alcohol, a cetostearyl alcohol, an oleyl alcohol, a polyoxyethylene glycol alkyl ether, an octaethylene glycol monododecyl ether, a glucoside alkyl ethers, a decyl glucoside, a polyoxyethylene glycol octylphenol ethers, an octylphenol ethoxylate (Triton X-100™), a nonoxynol-9, a glyceryl laurate, a polysorbate, and a poloxamer.

In some embodiments, the method of extracting a diatom frustule portion can comprise dispersing the plurality of diatom frustules in an additive component. Dispersing the plurality of diatom frustules in an additive component may be before dispersing the plurality of diatom frustules in the surfactant. Dispersing the plurality of diatom frustules in an additive component may be after dispersing the plurality of diatom frustules in the surfactant. Dispersing the plurality of diatom frustules in an additive component may be at least partially simultaneous with dispersing the plurality of diatom frustules in the surfactant. The additive component may include at least one of a potassium chloride, an ammonium chloride, an ammonium hydroxide, and a sodium hydroxide.

In some embodiments, dispersing the plurality of diatom frustule portions can comprise obtaining a dispersion comprising about 1 weight percent to about 5 weight percent of the plurality of diatom frustule portions.

In some embodiments, removing the organic contaminant can comprise heating the plurality of diatom frustule portions in the presence of a bleach. The bleach may include at least one of a hydrogen peroxide and a nitric acid. Heating the plurality of diatom frustule portions may comprise heating the plurality of diatom frustule portions in a solution comprising an amount of hydrogen peroxide in a range from about 10 volume percent to about 20 volume percent. Heating the plurality of diatom frustule portions may comprise heating the plurality of diatom frustule portions for a duration of about 5 minutes to about 15 minutes.

In some embodiments, removing the organic contaminant can comprise annealing the plurality of diatom frustule portions. In some embodiments, removing the inorganic contaminant can comprise combining the plurality of diatom frustule portions with at least one of a hydrochloric acid and a sulfuric acid. Combining the plurality of diatom frustule portions with at least one of a hydrochloric acid and a sulfuric acid may include mixing the plurality of diatom frustule portions in a solution comprising about 15 volume percent to about 25 volume percent of hydrochloric acid. For example, the mixing may be for a duration of about 20 minutes to about 40 minutes.

A method of extracting a diatom frustule portion may include dispersing a plurality of diatom frustule portions with a surfactant, the surfactant reducing an agglomeration of the plurality of diatom frustule portions.

The method of extracting a diatom frustule portion may include extracting a plurality of diatom frustule portions having at least one common characteristic using a disc stack centrifuge. In some embodiments, the method of extracting a diatom frustule portion can comprise dispersing a plurality of diatom frustule portions in a dispersing solvent. In some embodiments, at least one of an organic contaminant and an inorganic contaminant may be removed.

In some embodiments, the at least one common characteristic can include at least one of a dimension, a shape, a material, and a degree of brokenness. The dimension may include at least one of a length and a diameter.

In some embodiments, a solid mixture can comprise the plurality of diatom frustule portions. The method of extracting a diatom frustule portion may comprise reducing a particle dimension of the solid mixture. Reducing the particle dimension of the solid mixture may be before dispersing the plurality of diatom frustule portions in the dispersing solvent. In some embodiments, reducing the particle dimension can comprise grinding the solid mixture. Grinding the solid mixture may include applying to the solid mixture at least one of a mortar and a pestle, a jar mill, and a rock crusher.

In some embodiments, a component of the solid mixture having a longest component dimension that is greater than a longest frustule portion dimension of the plurality of diatom frustule portions can be extracted. Extracting the component of the solid mixture may comprise sieving the solid mixture. Sieving the solid mixture may comprise processing the solid mixture with a sieve having a mesh size from about 15 microns to about 25 microns. Sieving the solid mixture may comprise processing the solid mixture with a sieve having a mesh size from about 10 microns to about 25 microns.

In some embodiments, the method of extracting a diatom frustule portion can comprise sorting the plurality of diatom frustule portions to separate a first diatom frustule portion from a second diatom frustule portion, the first diatom frustule portion having a greater longest dimension. For example, the first diatom frustule portion may comprise a plurality of unbroken diatom frustule portions. The second diatom frustule portion may comprise a plurality of broken diatom frustule portions.

In some embodiments, sorting the plurality of diatom frustule portions can comprise filtering the plurality of diatom frustule portions. Filtering may comprise disturbing agglomeration of the plurality of diatom frustule portions. In some embodiments, disturbing agglomeration of the plurality of diatom frustule portions can comprise stirring. In some embodiments, disturbing agglomeration of the plurality of diatom frustule portions can comprise shaking. In some embodiments, disturbing agglomeration of the plurality of diatom frustule portions can comprise bubbling.

Filtering may include applying a sieve to the plurality of diatom frustule portions. For example, the sieve may have a mesh size from about 5 microns to about 10 microns, including about 7 microns.

In some embodiments, the method of extracting a diatom frustule portion can include obtaining a washed diatom frustule portion. Obtaining the washed diatom frustule portion may comprise washing the plurality of diatom frustule portions with a cleaning solvent after removing the at least one of the organic contaminant and the inorganic contaminant. In some embodiments, obtaining the washed diatom frustule portion can comprise washing the diatom frustule portion having the at least one common characteristic with a cleaning solvent.

The cleaning solvent may be removed. For example, removing the cleaning solvent may comprise sedimenting the plurality of diatom frustule portions after removing at least one of the organic contaminant and the inorganic contaminant. For example, removing the cleaning solvent may comprise sedimenting the plurality of diatom frustule portions having the at least one common characteristic. Sedimenting the plurality of diatom frustule portions may comprise centrifuging. In some embodiments, centrifuging can comprise applying a centrifuge suitable for large scale processing. In some embodiments, centrifuging can comprise applying at least one of a disc stack centrifuge, a decanter centrifuge, and a tubular bowl centrifuge.

In some embodiments, at least one of the dispersing solvent and the cleaning solvent can comprise water.

In some embodiments, at least one of dispersing the plurality of diatom frustule portions in the dispersing solvent and dispersing the plurality of diatom frustule portions in the surfactant can comprise sonicating the plurality of diatom frustules.

The surfactant may comprise a cationic surfactant. For example, the cationic surfactant may comprise at least one of a benzalkonium chloride, a cetrimonium bromide, a lauryl methyl gluceth-10 hydroxypropyl dimonium chloride, a benzethonium chloride, a benzethonium chloride, a bronidox, a dmethyldioctadecylammonium chloride, and a tetramethylammonium hydroxide.

The surfactant may comprise a non-ionic surfactant. For example, the non-ionic surfactant may comprise at least one of a cetyl alcohol, a stearyl alcohol, a cetostearyl alcohol, an oleyl alcohol, a polyoxyethylene glycol alkyl ether, an octaethylene glycol monododecyl ether, a glucoside alkyl ethers, a decyl glucoside, a polyoxyethylene glycol octylphenol ethers, an octylphenol ethoxylate (Triton X-100™), a nonoxynol-9, a glyceryl laurate, a polysorbate, and a poloxamer.

In some embodiments, the method of extracting a diatom frustule portion can comprise dispersing the plurality of diatom frustules in an additive component. Dispersing the plurality of diatom frustules in an additive component may be before dispersing the plurality of diatom frustules in the surfactant. Dispersing the plurality of diatom frustules in an additive component may be after dispersing the plurality of diatom frustules in the surfactant. Dispersing the plurality of diatom frustules in an additive component may be at least partially simultaneous with dispersing the plurality of diatom frustules in the surfactant. The additive component may include at least one of a potassium chloride, an ammonium chloride, an ammonium hydroxide, and a sodium hydroxide.

In some embodiments, dispersing the plurality of diatom frustule portions can comprise obtaining a dispersion comprising about 1 weight percent to about 5 weight percent of the plurality of diatom frustule portions.

In some embodiments, removing the organic contaminant can comprise heating the plurality of diatom frustule portions in the presence of a bleach. The bleach may include at least one of a hydrogen peroxide and a nitric acid. Heating the plurality of diatom frustule portions may comprise heating the plurality of diatom frustule portions in a solution comprising an amount of hydrogen peroxide in a range from about 10 volume percent to about 20 volume percent. Heating the plurality of diatom frustule portions may comprise heating the plurality of diatom frustule portions for a duration of about 5 minutes to about 15 minutes.

In some embodiments, removing the organic contaminant can comprise annealing the plurality of diatom frustule portions. In some embodiments, removing the inorganic contaminant can comprise combining the plurality of diatom frustule portions with at least one of a hydrochloric acid and a sulfuric acid. Combining the plurality of diatom frustule portions with at least one of a hydrochloric acid and a sulfuric acid may include mixing the plurality of diatom frustule portions in a solution comprising about 15 volume percent to about 25 volume percent of hydrochloric acid. For example, the mixing may be for a duration of about 20 minutes to about 40 minutes.

A method of forming silver nanostructures on a diatom frustule portion may include forming a silver seed layer on a surface of the diatom frustule portion. The method may include forming a nanostructure on the seed layer.

In some embodiments, the nanostructures can comprise at least one of a coating, a nanowire, a nanoplate, a dense array of nanoparticles, a nanobelt, and a nanodisk. In some embodiments, the nanostructures can comprise silver.

Forming the silver seed layer may comprise applying a cyclic heating regimen to a first silver contributing component and the diatom frustule portion. In some embodiments, applying the cyclic heating regimen can comprise applying a cyclic microwave power. Applying the cyclic microwave power may comprise alternating a microwave power between about 100 Watt and 500 Watt. For example, alternating may comprise alternating the microwave power every minute. In some embodiments, alternating can comprise alternating the microwave power for a duration of about 30 minutes. In some embodiments, alternating can comprise alternating the microwave power for a duration of about 20 minutes to about 40 minutes.

In some embodiments, forming the silver seed layer can comprise combining the diatom frustule portion with a seed layer solution. The seed layer solution may include the first silver contributing component and a seed layer reducing agent. For example, the seed layer reducing agent may be a seed layer solvent. In some embodiments, the seed layer reducing agent and the seed layer solvent can comprise a polyethylene glycol.

In some embodiments, the seed layer solution can comprise the first silver contributing component, a seed layer reducing agent and a seed layer solvent.

Forming the silver seed layer may comprise mixing the diatom frustule portion with the seed layer solution. In some embodiments, the mixing can comprise ultrasonicating.

In some embodiments, the seed layer reducing agent can comprise a N,N-Dimethylformamide, the first silver contributing component can comprise a silver nitrate, and the seed layer solvent can comprise at least one of a water and a polyvinylpyrrolidone.

Forming the nanostructure may comprise combining the diatom frustule portion with a nanostructure forming reducing agent. In some embodiments, forming the nanostructure further may include heating the diatom frustule portion after combining the diatom frustule portion with the nanostructure forming reducing agent. For example, the heating may comprise heating to a temperature of about 120° C. to about 160° C.

In some embodiments, forming the nanostructure can include titrating the diatom frustule portion with a titration solution comprising a nanostructure forming solvent and a second silver contributing component. In some embodiments, forming the nanostructure can comprise mixing after titrating the diatom frustule portion with the titration solution.

In some embodiments, at least one of the seed layer reducing agent and the nanostructure forming reducing agent can comprise at least one of a hydrazine, a formaldehyde, a glucose, sodium tartrate, an oxalic acid, a formic acid, an ascorbic acid, and an ethylene glycol.

In some embodiments, at least one of the first silver contributing component and the second silver contributing component can comprise at least one of a silver salt and a silver oxide. For example, the silver salt may include at least one of a silver nitrate and an ammoniacal silver nitrate, a silver chloride (AgCl), a silver cyanide (AgCN), a silver tetrafluoroborate, a silver hexafluorophosphate, and a silver ethylsulphate.

Forming the nanostructure may be in an ambient to reduce oxide formation. For example, the ambient may comprise an argon atmosphere.

In some embodiments, at least one of the seed layer solvent and the nanostructure forming solvent can comprise at least one of a proplyene glycol, a water, a methanol, an ethanol, a 1-propanol, a 2-propanol a 1-methoxy-2-propanol, a 1-butanol, a 2-butanol a 1-pentanol, a 2-pentanol, a 3-pentanol, a 1-hexanol, a 2-hexanol, a 3-hexanol, an octanol, a 1-octanol, a 2-octanol, a 3-octanol, a tetrahydrofurfuryl alcohol (THFA), a cyclohexanol, a cyclopentanol, a terpineol, a butyl lactone; a methyl ethyl ether, a diethyl ether, an ethyl propyl ether, a polyethers, a diketones, a cyclohexanone, a cyclopentanone, a cycloheptanone, a cyclooctanone, an acetone, a benzophenone, an acetylacetone, an acetophenone, a cyclopropanone, an isophorone, a methyl ethyl ketone, an ethyl acetate, a dimethyl adipate, a proplyene glycol monomethyl ether acetate, a dimethyl glutarate, a dimethyl succinate, a glycerin acetate, a carboxylates, a propylene carbonate, a glycerin, a diol, a triol, a tetraol, a pentaol, an ethylene glycol, a diethylene glycol, a polyethylene glycol, a propylene glycol, a dipropylene glycol, a glycol ether, a glycol ether acetate, a 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, a 2-methyl-2,4-pentanediol, a tetramethyl urea, a n-methylpyrrolidone, an acetonitrile, a tetrahydrofuran (THF), a dimethyl formamide (DMF), a N-methyl formamide (NMF), a dimethyl sulfoxide (DMSO), a thionyl chloride and a sulfuryl chloride.

The diatom frustule portion may comprise a broken diatom frustule portion. The diatom frustule portion may comprise an unbroken diatom frustule portion. In some embodiments, the diatom frustule portion can be obtained through a diatom frustule portion separation process. For example, the process may comprise at least one of using a surfactant to reduce an agglomeration of a plurality of diatom frustule portions and using a disc stack centrifuge.

A method of forming zinc-oxide nanostructures on a diatom frustule portion may include forming a zinc-oxide seed layer on a surface of the diatom frustule portion. The method may comprise forming a nanostructure on the zinc-oxide seed layer.

In some embodiments, the nanostructure can comprise at least one of a nanowire, a nanoplate, a dense array of nanoparticles, a nanobelt, and a nanodisk. In some embodiments, the nanostructures can comprise zinc-oxide.

Forming the zinc-oxide seed layer may comprise heating a first zinc contributing component and the diatom frustule portion. In some embodiments, heating the first zinc contributing component and the diatom frustule portion can comprise heating to a temperature in a range from about 175° C. to about 225° C.

In some embodiments, forming the nanostructure can comprise applying a heating regimen to the diatom frustule portion having the zinc-oxide seed layer in the presence of a nanostructure forming solution comprising a second zinc contributing component. The heating regimen may comprise heating to a nanostructure forming temperature. For example, the nanostructure forming temperature may be from about 80° C. to about 100° C. In some embodiments, the heating may be for a duration of about one to about three hours. In some embodiments, the heating regimen can comprise applying a cyclic heating routine. For example, the cyclic heating routine may include applying a microwave heating to the diatom frustule portion having the zinc-oxide seed layer for a heating duration and then turning the microwaving heating off for a cooling duration, for a total cyclic heating duration. In some embodiments, the heating duration can be about 1 minute to about 5 minutes. In some embodiments, the cooling duration can be about 30 seconds to about 5 minutes. The total cyclic heating duration may be about 5 minutes to about 20 minutes. Applying the microwave heating may include applying about 480 Watt to about 520 Watt of microwave power, including about 80 Watt to about 120 Watt of microwave power.

In some embodiments, at least one of the first zinc contributing component and the second zinc contributing component can comprise at least one of a zinc acetate, a zinc acetate hydrate, a zinc nitrate, a zinc nitrate hexahydrate, a zinc chloride, a zinc sulfate, and a sodium zincate.

In some embodiments, the nanostructure forming solution may include a base. For example, the base may comprise at least one of a sodium hydroxide, an ammonium hydroxide, potassium hydroxide, a teramethylammonium hydroxide, a lithium hydroxide, a hexamethylenetetramine, an ammonia solution, a sodium carbonate, and a ethylenediamine.

In some embodiments, forming the nanostructure can comprise adding an additive component. The additive component may include at least one of a tributylamine, a triethylamine, a triethanolamine, a diisopropylamine, an ammonium phosphate, a 1,6-hexadianol, a triethyldiethylnol, an isopropylamine, a cyclohexylamine, a n-butylamine, an ammonium chloride, a hexamethylenetetramine, an ethylene glycol, an ethanoamine, a polyvinylalcohol, a polyethylene glycol, a sodium dodecyl sulphate, a cetyltrimethyl ammonium bromide, and a carbamide.

In some embodiments, at least one of the nanostructure forming solution and a zinc-oxide seed layer forming solution can comprise a solvent, the solvent comprising at least one of a proplyene glycol, a water, a methanol, an ethanol, a 1-propanol, a 2-propanol a 1-methoxy-2-propanol, a 1-butanol, a 2-butanol a 1-pentanol, a 2-pentanol, a 3-pentanol, a 1-hexanol, a 2-hexanol, a 3-hexanol, an octanol, a 1-octanol, a 2-octanol, a 3-octanol, a tetrahydrofurfuryl alcohol (THFA), a cyclohexanol, a cyclopentanol, a terpineol, a butyl lactone; a methyl ethyl ether, a diethyl ether, an ethyl propyl ether, a polyethers, a diketones, a cyclohexanone, a cyclopentanone, a cycloheptanone, a cyclooctanone, an acetone, a benzophenone, an acetylacetone, an acetophenone, a cyclopropanone, an isophorone, a methyl ethyl ketone, an ethyl acetate, a dimethyl adipate, a proplyene glycol monomethyl ether acetate, a dimethyl glutarate, a dimethyl succinate, a glycerin acetate, a carboxylates, a propylene carbonate, a glycerin, a diol, a triol, a tetraol, a pentaol, an ethylene glycol, a diethylene glycol, a polyethylene glycol, a propylene glycol, a dipropylene glycol, a glycol ether, a glycol ether acetate, a 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, a 2-methyl-2,4-pentanediol, a tetramethyl urea, a n-methylpyrrolidone, an acetonitrile, a tetrahydrofuran (THF), a dimethyl formamide (DMF), a N-methyl formamide (NMF), a dimethyl sulfoxide (DMSO), a thionyl chloride and a sulfuryl chloride.

The diatom frustule portion may comprise a broken diatom frustule portion. The diatom frustule portion may comprise an unbroken diatom frustule portion. In some embodiments, the diatom frustule portion can be obtained through a diatom frustule portion separation process. For example, the process may comprise at least one of using a surfactant to reduce an agglomeration of a plurality of diatom frustule portions and using a disc stack centrifuge.

A method of forming carbon nanostructures on a diatom frustule portion may include forming a metal seed layer on a surface of the diatom frustule portion. The method may include forming a carbon nanostructure on the seed layer.

In some embodiments, the carbon nanostructure can comprise a carbon nanotube. The carbon nanotube may comprise at least one of a single-walled carbon nanotube and a multi-walled carbon nanotube.

In some embodiments, forming the metal seed layer can comprise spray coating the surface of the diatom frustule portion. In some embodiments, forming the metal seed layer can comprise introducing the surface of the diatom frustule portion to at least one of a liquid comprising the metal, a gas comprising the metal and the solid comprising a metal.

In some embodiments, forming the carbon nanostructure can comprise using chemical vapor deposition (CVD). Forming the carbon nanostructure can comprise exposing the diatom frustule portion to a nanostructure forming reducing gas after exposing the diatom frustule portion to a nanostructure forming carbon gas. Forming the carbon nanostructure may comprise exposing the diatom frustule portion to a nanostructure forming reducing gas before exposing the diatom frustule portion to a nanostructure forming carbon gas. In some embodiments, forming the carbon nanostructure comprises exposing the diatom frustule portion to a nanostructure forming gas mixture comprising a nanostructure forming reducing gas and a nanostructure forming carbon gas. The nanostructure forming gas mixture may include a neutral gas. For example, the neutral gas may be argon.

In some embodiments, the metal can comprise at least one of a nickel, an iron, a cobalt, a cobalt-molibdenium bimetallic, a copper, a gold, a silver, a platinum, a palladium, a manganese, an aluminum, a magnesium, a chromium, an antimony, an aluminum-iron-molybdenum (Al/Fe/Mo), an iron pentacarbonyl ($Fe(CO)_5$)), an iron (III) nitrate hexahydrate (($Fe(NO_3)_3.6H_2O$), a colbalt (II) chloride hexahydrate ($CoCl_2.6H_2O$), an ammonium molybdate tetrahydrate (($NH_4)_6Mo_7O_{24}.4H_2O$), a molybdenum (VI) dichloride dioxide $MoO_2Cl_2$, and an alumina nanopowder.

In some embodiments, the nanostructure forming reducing gas can comprise at least one of an ammonia, a nitrogen, and a hydrogen. The nanostructure forming carbon gas may comprise at least one of an acetylene, an ethylene, an ethanol, a methane, a carbon oxide, and a benzene.

In some embodiments, forming the metal seed layer can comprise forming a silver seed layer. Forming the silver seed layer may comprise forming a silver nanostructure on the surface of the diatom frustule portion.

The diatom frustule portion may comprise a broken diatom frustule portion. The diatom frustule portion may comprise an unbroken diatom frustule portion. In some embodiments, the diatom frustule portion can be obtained through a diatom frustule portion separation process. For example, the process may comprise at least one of using a surfactant to reduce an agglomeration of a plurality of diatom frustule portions and using a disc stack centrifuge.

A method of fabricating a silver ink may include combining an ultraviolet light sensitive component and a plurality of diatom frustule portions having a silver nanostructure on a surface of the plurality of diatom frustule portions, the surface comprising a plurality of perforations.

In some embodiments, the method of fabricating the silver ink can comprise forming a silver seed layer on the surface of the plurality of diatom frustule portions. In some embodiments, the method can include forming the silver nanostructure on the seed layer.

The plurality of diatom frustule portions may include a plurality of broken diatom frustule portions. The plurality of diatom frustule portions may include a plurality of diatom frustule flakes.

In some embodiments, the silver ink is depositable in a layer having a thickness of about 5 microns to about 15 microns after curing. In some embodiments, at least one of the plurality of perforations has a diameter of about 250 nanometers to about 350 nanometers. In some embodiments, the silver nanostructure can comprise a thickness of about 10 nanometers to about 500 nanometers. The silver ink may comprise an amount of diatom frustules within a range of about 50 weight percent to about 80 weight percent.

Forming the silver seed layer may include forming the silver seed layer on a surface within the plurality of perforations to form a plurality of silver seed plated perforations. Forming the silver seed layer may include forming the silver seed layer on substantially all surfaces of the plurality of diatom frustule portions.

In some embodiments, forming the silver nanostructure may comprise forming the silver nanostructure on a surface within the plurality of perforations to form a plurality of silver nanostructure plated perforations. Forming the silver nanostructure may comprise forming the silver nanostructure on substantially all surfaces of the plurality of diatom frustule portions.

In some embodiments, the ultraviolet light sensitive component can be sensitive to an optical radiation having a wavelength shorter than a dimension of the plurality of perforations. The ultraviolet light sensitive component may be sensitive to an optical radiation having a wavelength shorter than a dimension of at least one of the plurality of silver seed plated perforations and the plurality of silver nanostructure plated perforations.

In some embodiments, combining the plurality of diatom frustule portions with the ultraviolet light sensitive component can include combining the plurality of diatom frustule portions with a photoinitiation synergist agent. For example, the photoinitiation synergist agent may comprise at least one of an ethoxylated hexanediol acrylate, a propoxylated hexanediol acrylate, an ethoxylated trimethylpropane triacrylate, a triallyl cyanurate and an acrylated amine.

In some embodiments, combining the plurality of diatom frustule portions with the ultraviolet light sensitive component can include combining the plurality of diatom frustule portions with a photoinitiator agent. The photoinitiator agent may include at least one of a 2-methyl-1-(4-methylthio) phenyl-2-morpholinyl-1-propanon and an isopropyl thioxothanone.

In some embodiments, combining the plurality of diatom frustule portions with the ultraviolet light sensitive component can include combining the plurality of diatom frustule portions with a polar vinyl monomer. For example, the polar vinyl monomer may include at least one of a n-vinylpyrrolidone and a n-vinylcaprolactam.

The method of fabricating the silver ink may comprise combining the plurality of diatom frustule portions with a rheology modifying agent. In some embodiments, the method of fabricating the silver ink can comprise combining the plurality of diatom frustule portions with a crosslinking agent. In some embodiments, the method can include combining the plurality of diatom frustule portions with a flow and level agent. In some embodiments, the method can include combining the plurality of diatom frustule portions with at least one of an adhesion promoting agent, a wetting agent, and a viscosity reducing agent.

The silver nanostructure may include at least one of a coating, a nanowire, a nanoplate, a dense array of nanoparticles, a nanobelt, and a nanodisk.

In some embodiments, forming the silver seed layer can comprise applying a cyclic heating regimen to a first silver contributing component and the plurality of diatom frustule portions.

Forming the silver seed layer may comprise combining the diatom frustule portion with a seed layer solution. For example, the seed layer solution may comprise the first silver contributing component and a seed layer reducing agent.

Forming the silver nanostructure may comprise combining the diatom frustule portion with a nanostructure forming reducing agent. In some embodiments, forming the silver nanostructure can comprise heating the diatom frustule portion after combining the diatom frustule portion with the nanostructure forming reducing agent. In some embodiments, forming the silver nanostructure can comprise titrating the diatom frustule portion with a titration solution comprising a nanostructure forming solvent and a second silver contributing component.

In some embodiments, the plurality of diatom frustule portions can be obtained through a diatom frustule portion separation process. For example, the process may include at least one of using a surfactant to reduce an agglomeration of a plurality of diatom frustule portions and using a disc stack centrifuge.

A conductive silver ink may include an ultraviolet light sensitive component. The conductive ink may include a plurality of diatom frustule portions having a silver nanostructure on a surface of the plurality of diatom frustule portions, the surface comprising a plurality of perforations.

The plurality of diatom frustule portions may include a plurality of broken diatom frustule portions. The plurality of diatom frustule portions may include a plurality of diatom frustule flakes.

In some embodiments, the silver ink is depositable in a layer having a thickness of about 5 microns to about 15 microns (e.g., after curing). In some embodiments, at least one of the plurality of perforations has a diameter of about 250 nanometers to about 350 nanometers. In some embodiments, the silver nanostructure can comprise a thickness of about 10 nanometers to about 500 nanometers. The silver ink may comprise an amount of diatom frustules within a range of about 50 weight percent to about 80 weight percent.

In some embodiments, at least one of the plurality of perforations can comprise a surface having a silver nanostructure.

In some embodiments, at least one of the plurality of perforations comprises a surface having a silver seed layer. In some embodiments, substantially all surfaces of the plurality of diatom frustule portions can comprise a silver nanostructure.

In some embodiments, the ultraviolet light sensitive component can be sensitive to an optical radiation having a wavelength shorter than a dimension of the plurality of perforations.

In some embodiments, the conductive silver ink can be curable by an ultraviolet radiation. In some embodiments, the plurality of perforations can have a dimension sufficient to allow the ultraviolet radiation to pass through. The conductive silver ink may be depositable in a layer having a thickness of about 5 microns to about 15 microns (e.g., after curing).

In some embodiments, the conductive silver ink can be thermally curable.

The ultraviolet light sensitive component may include a photoinitiation synergist agent. For example, the photoinitiation synergist agent may comprise at least one of an ethoxylated hexanediol acrylate, a propoxylated hexanediol acrylate, an ethoxylated trimethylpropane triacrylate, a tri-allyl cyanurate and an acrylated amine.

The ultraviolet light sensitive component may include a photoinitiator agent. The photoinitiator agent may include at least one of a 2-methyl-1-(4-methylthio)phenyl-2-morpholinyl-1-propanon and an isopropyl thioxothanone.

In some embodiments, the ultraviolet light sensitive component can include a polar vinyl monomer. For example, the polar vinyl monomer may include at least one of a n-vinyl-pyrrolidone and a n-vinylcaprolactam.

The conductive silver ink may include at least one of a rheology modifying agent, a crosslinking agent, a flow and level agent, a adhesion promoting agent, a wetting agent, and a viscosity reducing agent. In some embodiments, the silver nanostructure can comprise at least one of a coating, a nanowire, a nanoplate, a dense array of nanoparticles, a nanobelt, and a nanodisk.

A method of fabricating a silver film may include curing a mixture comprising an ultraviolet light sensitive component and a plurality of diatom frustule portions having a silver nanostructure on a surface of the plurality of diatom frustule portions, the surface comprising a plurality of perforations.

In some embodiments, the method of fabricating the silver film can comprise forming a silver seed layer on the surface of the plurality of diatom frustule portions. In some embodiments, the method can comprise forming the silver nanostructure on the seed layer. In some embodiments, the method can include combining the plurality of diatom frustule portions with the ultraviolet light sensitive component to form a silver ink.

The plurality of diatom frustule portions may comprise a plurality of broken diatom frustule portions. The plurality of diatom frustule portions may comprise a plurality of diatom frustule flakes.

In some embodiments, the silver ink is depositable in a layer having a thickness of about 5 microns to about 15 microns (e.g., after curing). In some embodiments, at least one of the plurality of perforations has a diameter of about 250 nanometers to about 350 nanometers. In some embodiments, the silver nanostructure can comprise a thickness of about 10 nanometers to about 500 nanometers. The silver ink may comprise an amount of diatom frustules within a range of about 50 weight percent to about 80 weight percent.

Forming the silver seed layer may comprise forming the silver seed layer on a surface within the plurality of perforations to form a plurality of silver seed plated perforations. Forming the silver seed layer may comprise forming the silver seed layer on substantially all surfaces of the plurality of diatom frustule portions.

Forming the silver nanostructure may comprise forming the silver nanostructure on a surface within the plurality of perforations to form a plurality of silver nanostructure plated perforations. Forming the silver nanostructure may comprise forming the silver nanostructure on substantially all surfaces of the plurality of diatom frustule portions.

In some embodiments, curing the mixture can comprise exposing the mixture to an ultraviolet light having a wavelength shorter than a dimension of the plurality of perforations. In some embodiments, curing the mixture can comprise exposing the mixture to an ultraviolet light having a wavelength shorter than a dimension of at least one of the plurality of silver seed plated perforations and the plurality of silver nanostructure plated perforations.

In some embodiments, curing the mixture can comprise thermally curing the mixture.

The ultraviolet light sensitive component may be sensitive to an optical radiation having a wavelength shorter than a dimension of the plurality of perforations. In some embodiments, the ultraviolet light sensitive component can be sensitive to an optical radiation having a wavelength shorter than a dimension of at least one of the plurality of silver seed plated perforations and the plurality of silver nanostructure plated perforations.

Combining the plurality of diatom frustule portions with the ultraviolet light sensitive component may comprise combining the plurality of diatom frustule portions with a photoinitiation synergist agent. For example, the photoinitiation synergist agent may include at least one of an ethoxylated hexanediol acrylate, a propoxylated hexanediol acrylate, an ethoxylated trimethylpropane triacrylate, a tri-allyl cyanurate and an acrylated amine.

In some embodiments, combining the plurality of diatom frustule portions with the ultraviolet light sensitive component can comprise combining the plurality of diatom frustule portions with a photoinitiator agent. The photoinitiator agent may include at least one of a 2-methyl-1-(4-methylthio) phenyl-2-morpholinyl-1-propanon and an isopropyl thioxothanone.

In some embodiments, combining the plurality of diatom frustule portions with the ultraviolet light sensitive component can comprise combining the plurality of diatom frustule portions with a polar vinyl monomer. The polar vinyl monomer may include at least one of a n-vinyl-pyrrolidone and a n-vinylcaprolactam.

The method of fabricating the conductive silver ink may include combining the plurality of diatom frustule portions with a rheology modifying agent. In some embodiments, the method of fabricating the conductive silver ink can include combining the plurality of diatom frustule portions with a crosslinking agent. In some embodiments, the method can comprise combining the plurality of diatom frustule portions with a flow and level agent. The method may include combining the plurality of diatom frustule portions with at least one of an adhesion promoting agent, a wetting agent, and a viscosity reducing agent.

In some embodiments, the silver nanostructure can comprise at least one of a coating, a nanowire, a nanoplate, a dense array of nanoparticles, a nanobelt, and a nanodisk.

In some embodiments, forming the silver seed layer can comprise applying a cyclic heating regimen to a first silver contributing component and the plurality of diatom frustule portions.

Forming the silver seed layer may comprise combining the diatom frustule portion with a seed layer solution. For example, the seed layer solution may comprise the first silver contributing component and a seed layer reducing agent.

Forming the silver nanostructure may comprise combining the diatom frustule portion with a nanostructure forming reducing agent. In some embodiments, forming the silver nanostructure can comprise heating the diatom frustule portion after combining the diatom frustule portion with the nanostructure forming reducing agent. In some embodiments, forming the silver nanostructure can comprise titrating the diatom frustule portion with a titration solution comprising a nanostructure forming solvent and a second silver contributing component.

In some embodiments, the plurality of diatom frustule portions can be obtained through a diatom frustule portion separation process. For example, the process may include at least one of using a surfactant to reduce an agglomeration of a plurality of diatom frustule portions and using a disc stack centrifuge.

A conductive silver film may include a plurality of diatom frustule portions having a silver nanostructure on a surface of each of the plurality of diatom frustule portions, the surface comprising a plurality of perforations.

In some embodiments, the plurality of diatom frustule portions can comprise a plurality of broken diatom frustule portion. The plurality of diatom frustule portions may include a plurality of diatom frustule flakes.

In some embodiments, at least one of the plurality of perforations has a diameter of about 250 nanometers to about 350 nanometers. In some embodiments, the silver nanostructure can comprise a thickness of about 10 nanometers to about 500 nanometers.

In some embodiments, at least one of the plurality of perforations can comprise a surface having a silver nanostructure. In some embodiments, at least one of the plurality of perforations can comprise a surface having a silver seed layer. Substantially all surfaces of the plurality of diatom frustule portions may comprise a silver nanostructure.

In some embodiments, the silver nanostructure can comprise at least one of a coating, a nanowire, a nanoplate, a dense array of nanoparticles, a nanobelt, and a nanodisk.

In some embodiments, the conductive silver film can comprise a binder resin.

A printed energy storage device can include a first electrode, a second electrode, and a separator between the first electrode and the second electrode, where at least one of the first electrode and the second electrode can include a plurality of frustules having manganese-containing nanostructures.

In some embodiments, the frustules have a substantially uniform property, the substantially uniform property including at least one of a frustule shape, a frustule dimension, a frustule porosity, a frustule mechanical strength, a frustule material, and a degree of brokenness of a frustule.

In some embodiments, the manganese-containing nanostructures can include an oxide of manganese. The oxide of manganese may include manganese(II,III) oxide. The oxide of manganese may include manganese oxyhydroxide.

In some embodiments, at least one of the first electrode and the second electrode can include frustules having zinc-oxide nanostructures. The zinc-oxide nanostructures can include at least one of a nano-wire and a nano-plate.

In some embodiments, the manganese-containing nanostructures cover substantially all surfaces of the frustules. In some embodiments, manganese-containing nanostructures cover some surfaces of the frustules and carbon-containing nanostructures cover other surfaces of the frustules, the manganese-containing nanostructures interspersed with the carbon-containing nanostructures.

A membrane of an energy storage device can include frustules having manganese-containing nanostructures.

In some embodiments, the manganese-containing nanostructures can include an oxide of manganese. The oxide of manganese may include manganese(II,III) oxide. The oxide of manganese may include manganese oxyhydroxide. In some embodiments, manganese-containing nanostructures cover some surfaces of the frustules and carbon-containing nanostructures cover other surfaces of the frustules, the manganese-containing nanostructures interspersed with the carbon-containing nanostructures.

In some embodiments, at least some of the manganese-containing nanostructures can be a nano-fiber. In some embodiments, at least some of the manganese-containing nanostructures have a tetrahedral shape.

In some embodiments, the energy storage device includes a zinc-manganese battery.

An ink for a printed film can include a solution, and frustules having manganese-containing nanostructures dispersed in the solution.

In some embodiments, the manganese-containing nanostructures can include an oxide of manganese. In some embodiments, the manganese-containing nanostructures can include at least one of $MnO_2$, $MnO$, $Mn_2O_3$, $MnOOH$, and $Mn_3O_4$.

In some embodiments, at least some of the manganese-containing nanostructures can include a nano-fiber. In some embodiments, at least some of the manganese-containing nanostructures have a tetrahedral shape.

In some embodiments, manganese-containing nanostructures cover some surfaces of the frustules and carbon-containing nanostructures cover other surfaces of the frustules, the manganese-containing nanostructures interspersed with the carbon-containing nano structures.

In some embodiments, an energy storage device can include a cathode having a first plurality of frustules, the first plurality of frustules having nanostructures including an oxide of manganese; and an anode having a second plurality of frustules, the second plurality of frustules having nanostructures including zinc oxide. In some embodiments, the device can be a rechargeable battery.

In some embodiments, the oxide of manganese includes $MnO$. In some embodiments, the oxide of manganese includes at least one of $Mn_3O_4$, $Mn_2O_3$, and $MnOOH$.

In some embodiments, at least one of the first plurality of frustules includes a ratio of a mass of the oxide of manganese to a mass of the at least one frustule of about 1:20 to about 20:1. In some embodiments, at least one of the second plurality of frustules includes a ratio of a mass of the zinc oxide to a mass of the at least one frustule of about 1:20 to about 20:1.

In some embodiments, the anode can include an electrolyte salt. The electrolyte salt may include a zinc salt.

In some embodiments, at least one of the cathode and the anode can include carbon nanotubes. In some embodiments, at least one of the cathode and the anode can include a conductive filler. The conductive filler may include graphite.

In some embodiments, the energy storage device can have a separator between the cathode and the anode, where the separator includes a third plurality of frustules. The third plurality of frustules may have substantially no surface modifications.

In some embodiments, at least one of the cathode, the anode, and the separator can include an ionic liquid.

In some embodiments, the first plurality of frustules having a first plurality of pores substantially not occluded by the nanostructures including the oxide of manganese, and where the second plurality of frustules has a second plurality of pores substantially not occluded by the nanostructures including the zinc oxide.

In some embodiments, a frustule can include a plurality of nanostructures on at least one surface, where the plurality of nanostructures includes zinc oxide, and where a ratio of a mass of the plurality of nanostructures to a mass of the frustule is about 1:1 to about 20:1. In some embodiments, the plurality of nanostructures includes at least one of nanowires, nanoplates, dense nanoparticles, nanobelts, and nanodisks. In some embodiments, the frustule includes a plurality of pores substantially not occluded by the plurality of nanostructures.

In some embodiments, a frustule can include a plurality of nanostructures on at least one surface, where the plurality of nanostructures includes an oxide of manganese, and where a ratio of a mass of the plurality of nanostructures to a mass of the frustule is about 1:1 to about 20:1. In some embodiments, the oxide of manganese includes MnO. In some embodiments, the oxide of manganese includes $Mn_3O_4$. In some embodiments, the oxide of manganese includes at least one of $Mn_2O_3$ and MnOOH. In some embodiments, the plurality of nanostructures includes at least one of nanowires, nanoplates, dense nanoparticles, nanobelts, and nanodisks. In some embodiments, the frustule includes a plurality of pores substantially not occluded by the plurality of nanostructures.

In some embodiments, an electrode of an energy storage device can include a plurality of frustules, where each of the plurality of frustules includes a plurality of nanostructures formed on at least one surface, where at least one of the plurality of frustules has a ratio of a mass of the plurality of nanostructures to a mass of the at least one frustule of about 1:20 to about 20:1.

In some embodiments, the electrode can include carbon nanotubes. In some embodiments, the electrode can include a conductive filler. The conductive filler may include graphite. In some embodiments, the electrode can include an ionic liquid.

In some embodiments, each of the plurality of frustules includes a plurality of pores substantially not occluded by the plurality of nanostructures.

The electrode may be an anode of the energy storage device. In some embodiments, the anode can include an electrolyte salt. In some embodiments, the electrolyte salt can include a zinc salt. In some embodiments, the plurality of nanostructures can include zinc oxide. In some embodiments, the plurality of nanostructures can include at least one of nanowires, nanoplates, dense nanoparticles, nanobelts, and nanodisks.

The electrode may be a cathode of the energy storage device. In some embodiments, the plurality of nanostructures can include an oxide of manganese. In some embodiments, the oxide of manganese can include MnO. In some embodiments, the oxide of manganese can include at least one of $Mn_3O_4$, $Mn_2O_3$ and MnOOH.

In some embodiments, an energy storage device can include a cathode having a first plurality of frustules, the first plurality of frustules having nanostructures including an oxide of manganese; and an anode having a second plurality of frustules, the second plurality of frustules having nanostructures including zinc oxide. In some embodiments, the device can be a rechargeable battery. In some embodiments, at least one of the first plurality of frustules includes a ratio of a mass of the oxide of manganese to a mass of the at least one frustule of about 1:20 to about 100:1. In some embodiments, at least one of the second plurality of frustules includes a ratio of a mass of the zinc oxide to a mass of the at least one frustule of about 1:20 to about 100:1.

In some embodiments, a frustule can include a plurality of nanostructures on at least one surface, where the plurality of nanostructures includes zinc oxide, and where a ratio of a mass of the plurality of nanostructures to a mass of the frustule is about 1:1 to about 100:1.

In some embodiments, a frustule can include a plurality of nanostructures on at least one surface, where the plurality of nanostructures includes an oxide of manganese, and where a ratio of a mass of the plurality of nanostructures to a mass of the frustule is about 1:1 to about 100:1.

In some embodiments, an electrode of an energy storage device can include a plurality of frustules, where each of the plurality of frustules includes a plurality of nanostructures formed on at least one surface, where at least one of the plurality of frustules has a ratio of a mass of the plurality of nanostructures to a mass of the at least one frustule of about 1:20 to about 100:1.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIG. 5I shows a SEM image, at 50 k× magnification, of a frustule surface having zinc-oxide nanowires formed thereon.

FIG. 5O shows a SEM image, at 500× magnification, of a plurality of frustules having zinc oxide nanostructures formed thereon.

FIGS. 7A through 7E schematically illustrate examples of energy storage devices during various steps of different fabrication processes.

DETAILED DESCRIPTION

Figure 1:
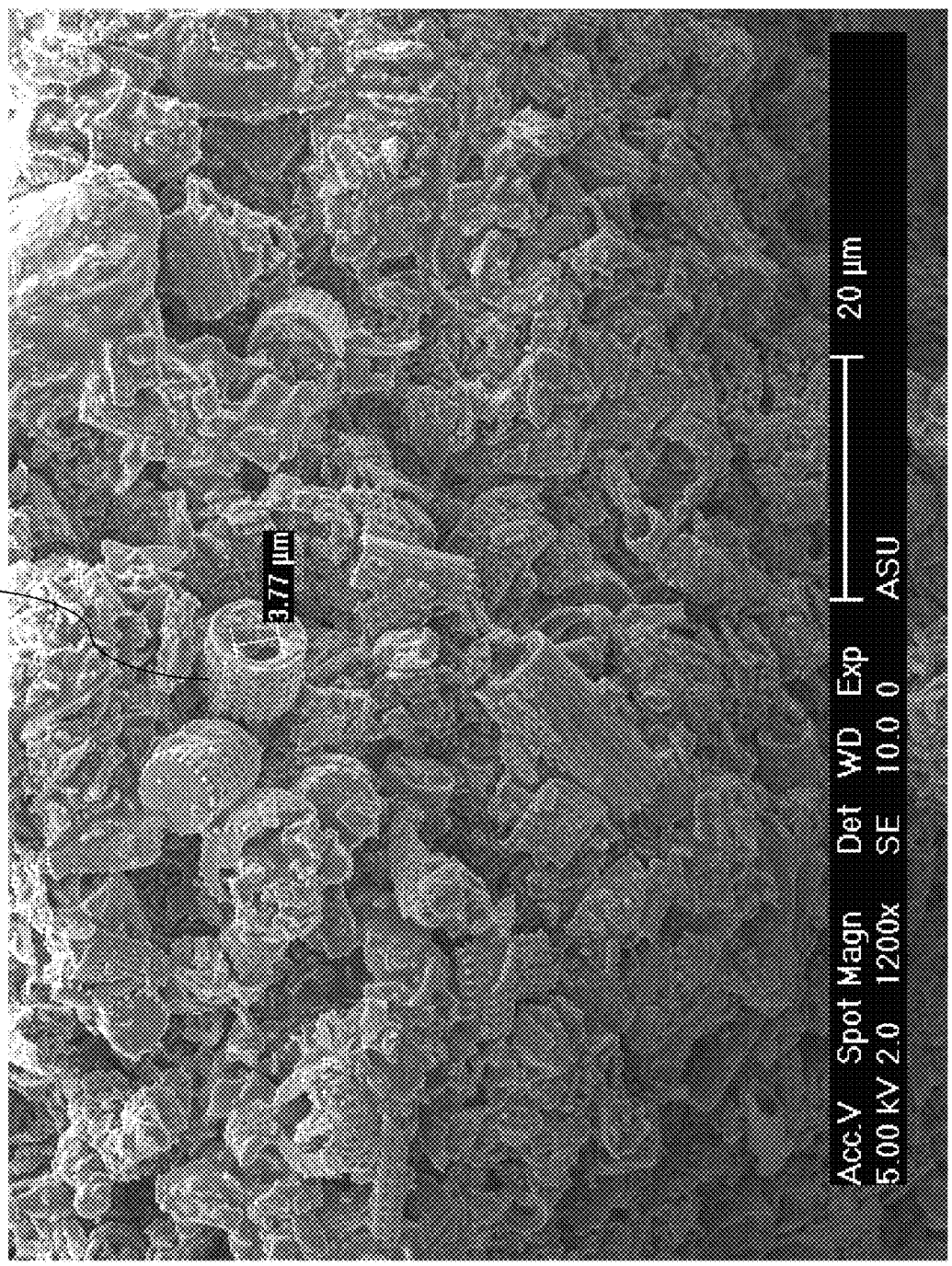
FIG. 1 is a scanning electron microscope (SEM) image of diatomaceous earth comprising frustules.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Energy storage devices used to power electronic devices generally include batteries (e.g., rechargeable batteries), capacitors, and super-capacitors (e.g., EDLC). Energy storage devices may comprise an asymmetric energy storage device, including, for example, a battery-capacitor hybrid. Energy storage devices can be manufactured using printing technologies such as screen printing, roll-to-roll printing, ink-jet printing, etc. Printed energy storage devices can facilitate reduced energy storage device thickness, enabling compact energy storage. Printed energy storage devices can enable increased energy storage density by facilitating, for example, stacking of the energy storage devices. Increased energy storage density may facilitate use of printed energy storage devices for applications having a large power requirement, such as solar energy storage. Unlike energy storage devices having a rigid outer casing, printed energy storage devices may be implemented on a flexible substrate, enabling a flexible energy storage device. A flexible energy storage device can facilitate fabrication of flexible electronic devices, such as flexible electronic display media. Due to reduced thickness and/or flexible structure, printed energy storage devices may power cosmetic patches, medical diagnostic products, remote sensor arrays, smartcards, smart packaging, smart clothing, greeting cards, etc.

Reliability and durability of a printed energy storage device may be a factor hindering increased adoption of printed batteries. Printed energy storage devices typically lack a rigid outer casing, so printed energy storage devices may not stand up well to compressive pressure or shape deforming manipulation in use or production. Variation of an energy storage device layer thickness in response to compressive pressure or shape deforming manipulation may adversely affect device reliability. For example, some printed energy storage devices include electrodes spaced by a separator. Deviations in separator thickness may cause a short between the electrodes, such as when a separator is compressible and fails to maintain a separation between the electrodes under compressive pressure or shape deforming manipulation.

Costs associated with fabricating a printed energy storage device may also be a factor hampering use of printed energy storage devices to power a wider range of applications. Reliable fabrication of energy storage devices using printing technologies may facilitate cost-effective energy storage device production. Printing of an energy storage device may enable integrating the device printing process into the production of electronic devices, including for example printed electronic devices powered by the printed energy storage device, possibly enabling further cost savings. However, inadequate device structural robustness may hinder device integrity throughout the fabrication process, decreasing the feasibility of some printing technologies and impeding cost-effective production of the printed energy storage devices.

Thickness of a printed energy storage device layer may also impede the use of certain printing technologies in the fabrication process, for example due to a device layer thickness that is greater than a film thickness at which the printing technology can effectively print.

As described herein, frustules may have significant mechanical strength or resistance to shear stress, for example due to dimensions, shape, porosity, and/or material. According to some implementations described herein, an energy storage device includes one or more components, for example one or more layers or membranes of a printed energy storage device, comprising frustules. An energy storage device comprising frustules may have mechanical strength and/or structural integrity such that the energy storage device is able to withstand compressive pressure and/or shape deforming manipulation, which can occur during manufacture or use, without failure, such that device reliability can increase. An energy storage device comprising frustules can resist variations in layer thicknesses, enabling maintenance of uniform or substantially uniform device layer thicknesses. For example, a separator comprising frustules may withstand compressive pressure or shape deforming manipulation to thereby facilitate improved energy storage device reliability by maintaining a uniform or substantially uniform separation distance between electrodes to inhibit or prevent a short in the device.

Increased mechanical strength in energy storage devices comprising frustules may facilitate reliable fabrication of the energy storage devices using various printing technologies, thereby enabling cost-effective device fabrication due to increased yield and/or integration of the fabrication process with the production process of applications powered by the devices.

Energy storage devices may be printed using an ink comprising frustules. For example, one or more membranes of a printed energy storage device may comprise frustules. One or more membranes of a printed energy storage device having frustules may be reliably printed onto a variety of substrates, including but not limited to, a flexible or inflexible substrate, a textile, a device, a plastic, any variety of films such as a metallic or semiconductor film, any variety of paper, combinations thereof, and/or the like. For example, suitable substrates may include graphite paper, graphene paper, polyester film (e.g., Mylar), polycarbonate film aluminum foil, copper foil, stainless steel foil, carbon foam, combinations thereof, and/or the like. Fabrication of printed energy storage devices on flexible substrates may allow for flexible printed energy storage devices that can be used in a wide array of devices and implementations due to increased reliability of certain such printed energy storage devices, for example due to increased robustness as a result of one or more layers comprising frustules.

Improved mechanical strength in printed energy storage devices comprising frustules may also enable a reduced printed device layer thickness. For example, frustules may provide structural support for an energy storage device layer, enabling thinner layers having sufficient structural robustness to withstand compressive pressure or shape deforming manipulation, which can then reduce an overall device thickness. Decreased thickness of printed energy storage devices can further facilitate energy storage density of the printed devices and/or enable wider use of the printed devices.

A printed energy storage device comprising frustules may have improved device performance, for example improved device efficiency. Reduced thickness of an energy storage device layer may enable improved device performance. Performance of an energy storage device may depend at least in part on the internal resistance of the energy storage device. For example, performance of an energy storage device may depend at least in part on a separation distance between a first and a second electrode. A decreased separator membrane thickness for a given measure of reliability reduces a distance between a first and a second electrode, which can reduce the internal resistance and improve an efficiency of the energy storage device. Internal resistance of an energy storage device may also depend at least in part on the mobility of ionic species between a first and a second electrode. Porosity of frustule surfaces may enable mobility of ionic species. For example, a separator comprising frustules may enable a more structurally robust separation between electrodes of an energy storage device while facilitating mobility of ionic species between the electrodes. Frustule surface porosity may facilitate a direct path for mobile ionic species between a first electrode and a second electrode, reducing a resistance and/or increasing efficiency. Reduced thickness of an electrode layer comprising frustules and porosity of the electrode frustules may also enable improved storage device performance. A reduced electrode thickness may provide increased access of ionic species to active materials within the electrode. Porosity and/or conductivity of frustules in an electrode may facilitate mobility of the ionic species within the electrode. Frustules in an electrode may also enable improved device performance by, for example, serving as a substrate on which active materials and/or structures comprising active materials may be applied or formed, enabling increased surface area for active materials and thereby facilitating access of ionic species to the active materials.

FIG. 1 is a SEM image of diatomaceous earth comprising frustules 10. The frustules 10 have a generally cylindrical shape, although some frustules are broken or differently shaped. In some embodiments, the cylindrical frustules 10 have a diameter between about 3 μm and about 5 μm. In some embodiments, the cylindrical frustules 10 have a length between about 10 μm and about 20 μm. Other diameters and/or lengths are also possible. The frustules 10 may have significant mechanical strength or resistance to shear stress, for example due to architecture (e.g., dimensions, shape), material, combinations thereof, and/or the like. For example, mechanical strength of a frustule 10 may be inversely related to the size of the frustule 10. In some embodiments, a frustule 10 having a longest axis in a range of from about 30 μm to about 130 μm can withstand compressive forces from about 90 μN to about 730 μN.

Figure 2:
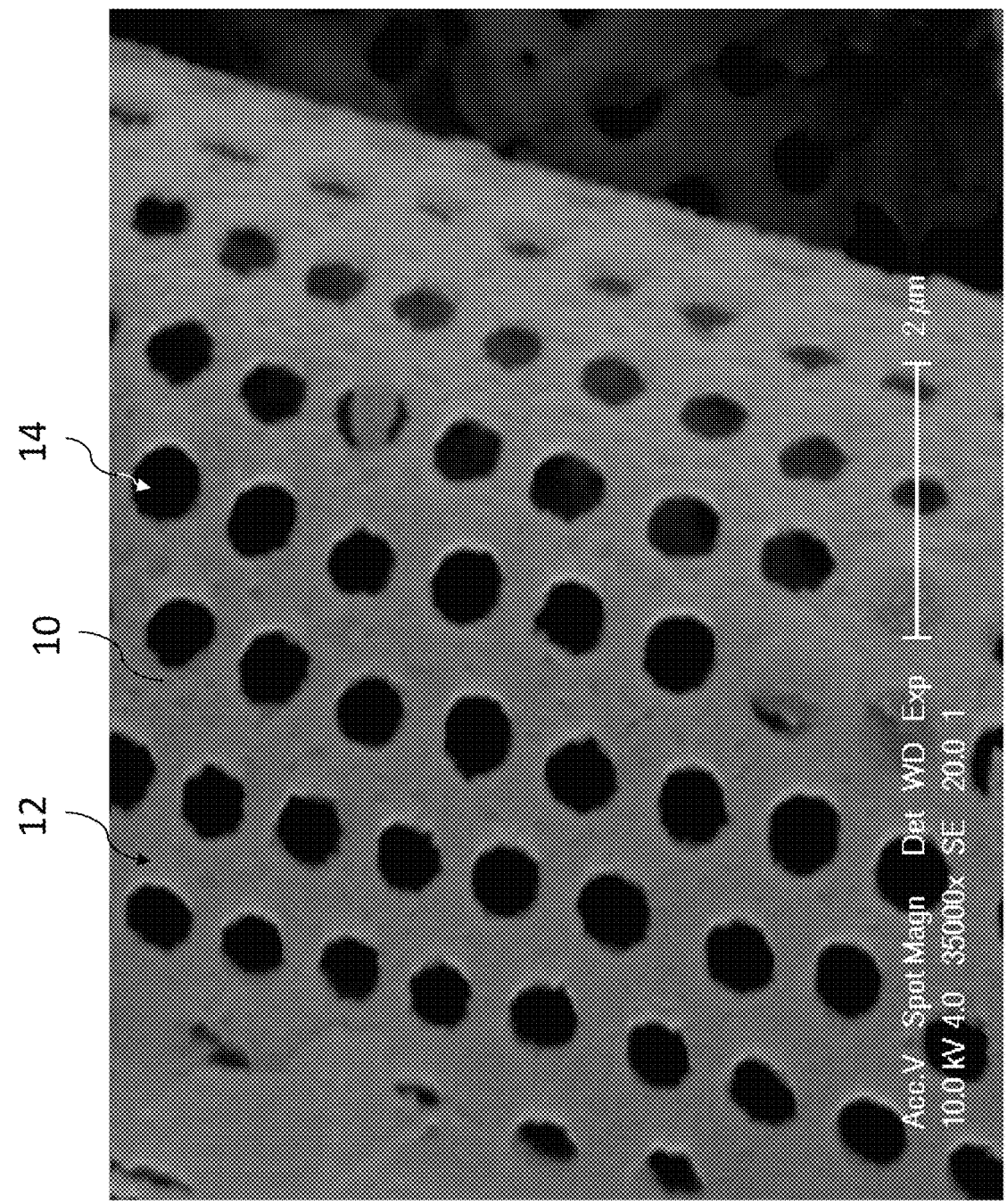
FIG. 2 is a SEM image of an example frustule including a porous surface.

FIG. 2 is a SEM image of an example frustule 10 including a porous surface 12. The porous surface 12 includes circular or substantially circular openings 14. Other shapes of the openings 14 are also possible (e.g., curved, polygonal, elongate, etc.). In some embodiments, the porous surface 12 of a frustule 10 has a uniform or substantially uniform porosity, for example including openings 14 having uniform or substantially uniform shape, dimensions, and/or spacing (e.g., as shown in FIG. 2). In some embodiments, the porous surface 12 of a frustule 10 has a varying porosity, for example including openings 14 having different shapes, dimensions, and/or spacing. The porous surfaces 12 of a plurality of frustules 10 can have uniform or substantially uniform porosities, or porosity of the porous surfaces 12 of different frustules 10 may vary. A porous surface 12 may comprise nanoporosity, including for example microporosity, mesoporosity, and/or macroporosity.

Figure 3:
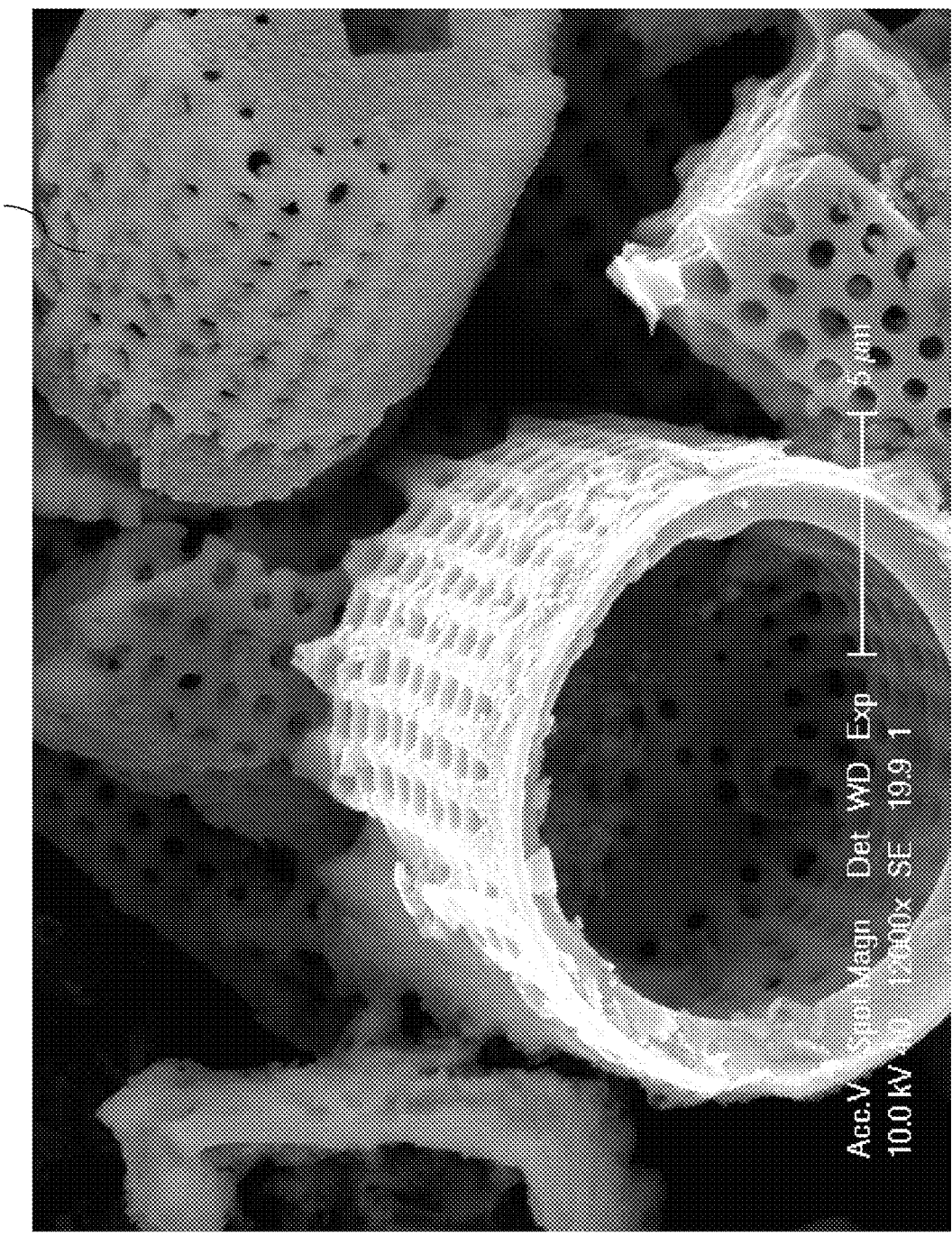
FIG. 3 is a SEM image of example frustules each having a substantially cylindrical shape.

FIG. 3 is a SEM image of example frustules 10 each having a cylindrical or substantially cylindrical shape. Frustule features may differ among different species of diatoms, each diatom species having frustules of a different shape, size, porosity, material, and/or another frustule attribute. Diatomaceous earth, which may be commercially available (e.g., from Mount Sylvia Diatomite Pty Ltd of Canberra, Australia, Continental Chemical USA of Fort Lauderdale, Fla., Lintech International LLC of Macon, Ga., etc.), can serve as a source of frustules. In some embodiments, diatomaceous earth is sorted according to a pre-determined frustule feature. For example, sorting may result in frustules each including a predetermined feature, such as shape, dimensions, material, porosity, combinations thereof, and/or the like. Sorting frustules may include one or a variety of separation processes such as, for example, filtering, screening (e.g., use of vibrating sieves for separation according to a frustule shape or size), a separation process involving voraxial or centrifugal technology (e.g., for separation according to frustule density), any other suitable solid-solid separation processes, combinations thereof, and/or the like. Frustules may also be available (e.g., from a commercial source) already sorted according to a frustule feature such that the frustules already comprise a uniform or substantially uniform shape, size, material, porosity, another pre-determined frustule attribute, combinations thereof, and/or the like. For example, frustules available from a geographic region (e.g., a region of a country such as the United States, Peru, Australia, etc.; a region of the globe; etc.) and/or a type of natural environment (e.g., freshwater environment, saltwater environment, etc.) may comprise frustules of a species typically found in that geographic region and/or environment, providing frustules having a uniform or substantially uniform shape, size, material, porosity, another pre-determined frustule attribute, combinations thereof, and/or the like.

In some embodiments, a separation process can be used to sort frustules such that only or substantially only unbroken frustules are retained. In some embodiments, the separation process can be used to remove broken or small frustules, resulting in only or substantially only cylindrically-shaped frustules 10 having certain lengths and/or diameters (e.g., as illustrated in FIG. 3). The separation process to remove broken frustules may include screening, such as with the use of a sieve having a mesh size selected to retain only or substantially only frustules having a pre-determined dimension. For example, the mesh size of the sieve may be selected to remove frustules having a dimension (e.g., a length or diameter) of no more than about 40 µm, no more than about 30 µm, no more than about 20 µm or no more than about 10 µm, and including ranges bordering and including the foregoing values. Other sieve mesh sizes may also be suitable.

In some embodiments, the separation process to remove broken frustules includes application of ultrasonic waves to frustules placed in a fluid dispersion, including for example ultrasonication during which frustules dispersed in a water bath are subjected to ultrasonic waves. Sonication parameters such as power, frequency, duration, and/or the like may be adjusted based at least in part on one or more attributes of the frustules. In some embodiments, ultrasonication includes use of sound waves having a frequency between about 20 kilohertz (kHz) and about 100 kHz, between about 30 kHz and about 80 kHz, and between about 40 kHz and about 60 kHz. In some embodiments, ultrasonication may use sound waves having a frequency of about 20 kHz, about 25 kHz, about 30 kHz, about 35 kHz, about 40 kHz, about 45 kHz, and ranges bordering and including the foregoing values. The ultrasonication step may have a duration between about 2 minutes and about 20 minutes, between about 2 minutes and about 15 minutes, and between about 5 minutes and about 10 minutes. In some embodiments, ultrasonication step may have a duration of about 2 minutes, about 5 minutes, about 10 minutes, and ranges bordering and including the foregoing values. For example, a frustule-fluid sample may be subjected to ultrasonic waves at a frequency of about 35 kHz for a duration of about 5 minutes.

In some embodiments, separation process includes sedimentation. For example, the separation process may include both ultrasonication and sedimentation such that heavier particles from the frustule-fluid sample may be allowed to settle out from the suspended phase of the frustule-fluid sample during ultrasonication. In some embodiments, the sedimentation process of heavier particles from the frustule-fluid sample has a duration between about 15 seconds and about 120 seconds, between about 20 seconds and about 80 seconds, and between about 30 seconds and about 60 seconds. In some embodiments, sedimentation has a duration of no more than about 120 seconds, no more than about 60 seconds, no more than about 45 seconds, no more than or about 30 seconds.

The separation process to remove broken frustules may include use of high-velocity centrifugal technology for physical separation based on density, including for example an ultracentrifugation step. For example, the separation process may include ultracentrifugation of the suspended phase of a frustule-fluid sample. Ultracentrifugation parameters such as angular velocity, duration, and/or the like may depend at least in part on the composition of the suspended phase (e.g., a density of the frustules) and/or characteristics of the equipment used. For example, the suspended phase may be ultracentrifuged at an angular velocity between about 10,000 rotations per minute (RPM) and about 40,000 RPM, between about 10,000 RPM and about 30,000 RPM, between about 10,000 RPM and about 20,000 RPM, and between about 10,000 RPM and about 15,000 RPM. The suspended phase may be ultracentrifuged for a duration between about 1 minute and about 5 minutes, between about 1 minute and about 3 minutes, and between about 1 minute and about 2 minutes. For example, the suspended phase of the frustule-fluid sample may be ultracentrifuged at an angular velocity of about 13,000 RPM for about 1 minute.

Figure 4A:
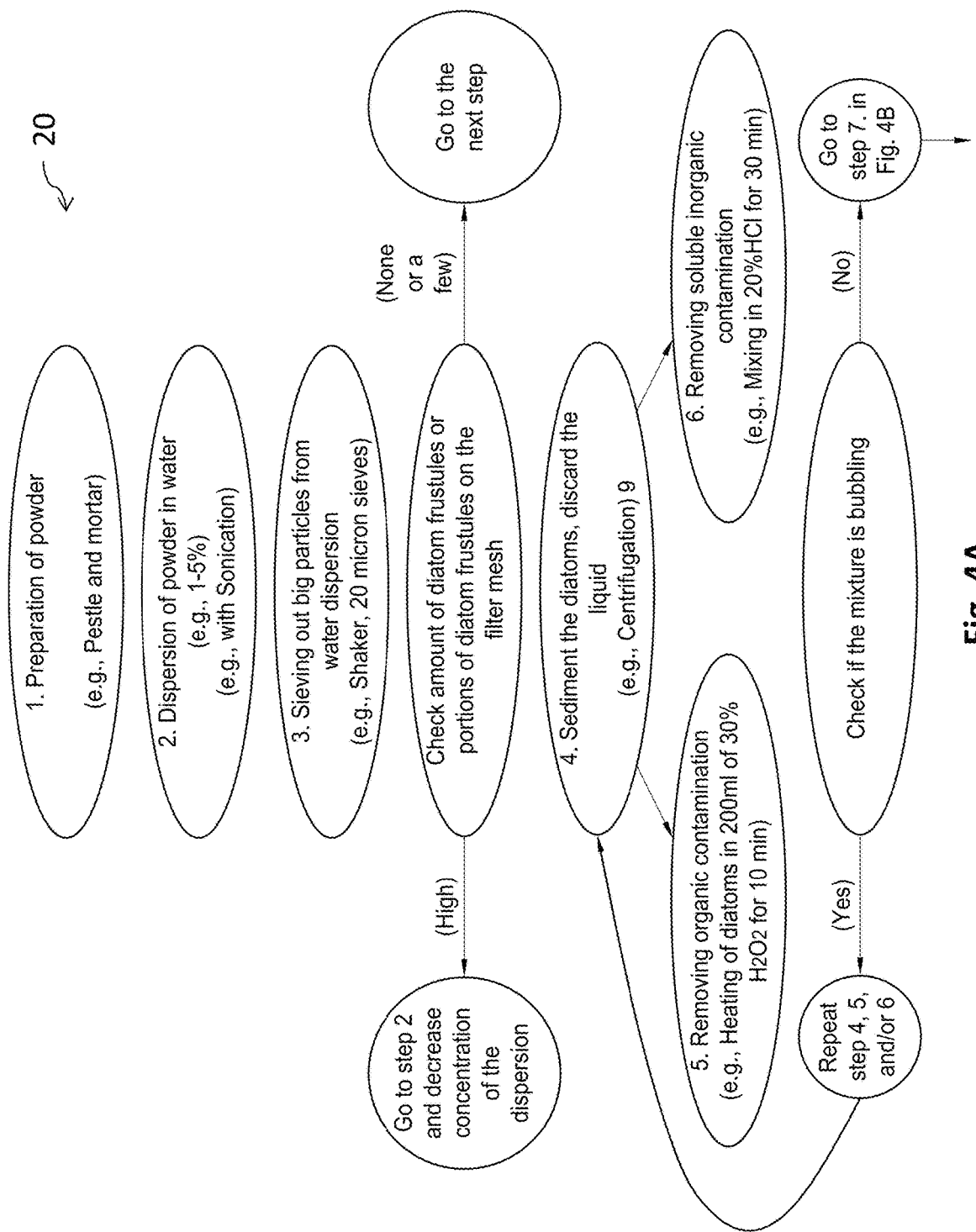
FIGS. 4A and 4B are a flow diagram of example steps of a frustule separation process.
Figure 4B:
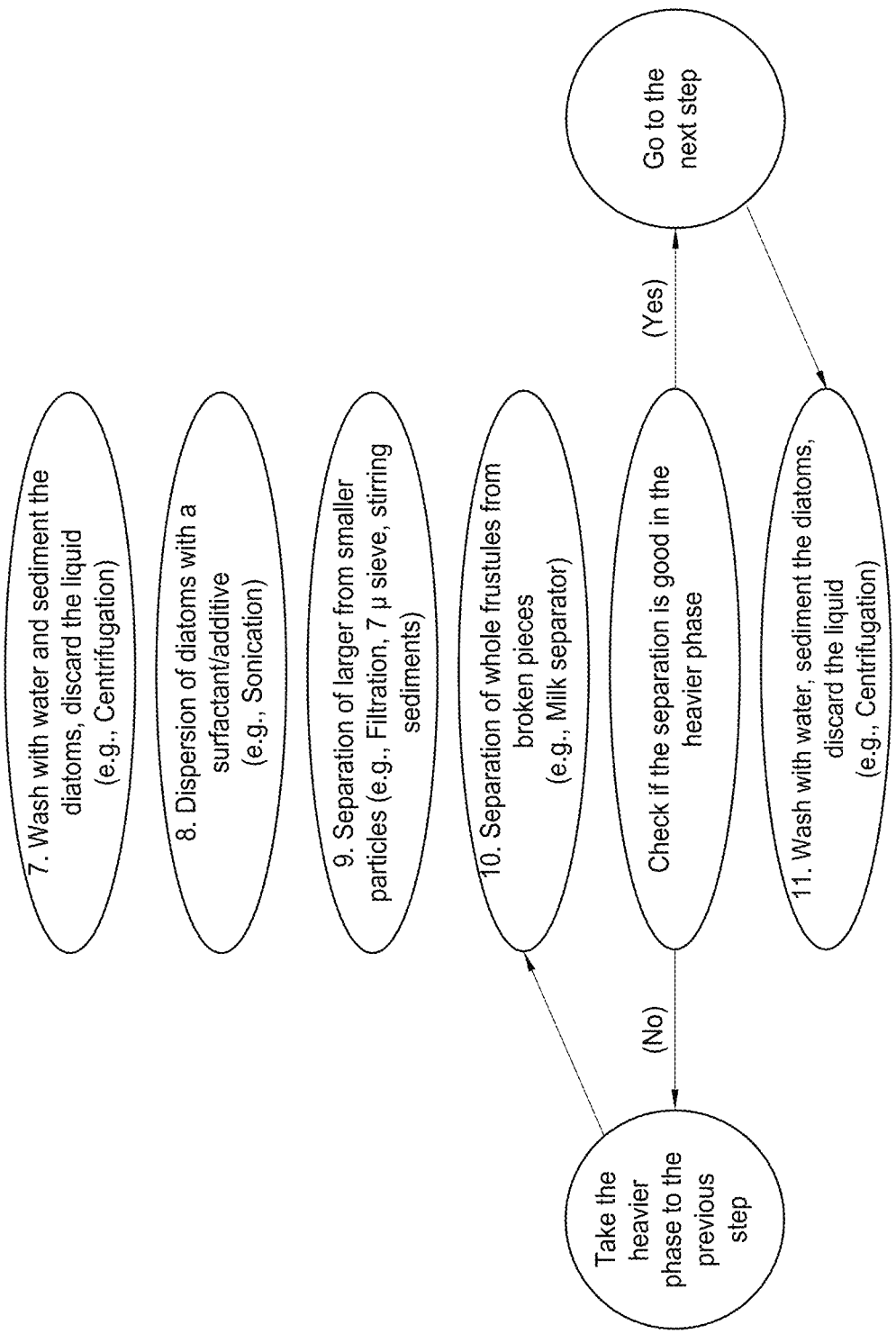

FIGS. 4A and 4B are a flow diagram of example steps of a frustule separation process 20. The process 20 may enable separation of broken and/or unbroken diatom frustules from a solid mixture comprising, for example, broken and unbroken diatom frustules. In some embodiments, the separation process 20 enables large scale frustule sorting.

As described herein, there can be two sources of diatom frustules for nanostructured materials and/or nanodevices: living diatoms and diatomaceous earth. Diatoms can be taken directly from nature or cultured. Artificially, a large number of identical silica frustules can be cultured within a few days. To use natural diatoms for nanostructured materials and/or nanodevices, a separation process can be performed to separate the diatoms from other organic materials and/or substances. Another approach is to use diatomaceous earth. The sediments are abundant and the material is of low cost.

Diatomaceous earth can have frustules ranging from mixtures of different diatom species to a single diatom species (e.g., including some freshwater sediments). Diatomaceous earth can comprise broken and/or whole diatom frustules plus contaminating materials of different origin. Depending on application, one may use only whole diatom frustules, only broken frustules, or a mixture of both. For example, when separating whole frustules, diatomaceous earth with one kind of frustules may be used.

In some embodiments, a method of separating comprises separating whole diatom frustules from broken pieces of diatom frustules. In some embodiments, the separation process comprises sorting whole diatom frustules according to a common frustule characteristic (e.g., a dimension including a length or diameter, a shape, and/or a material) and/or sorting portions of diatom frustules based on a common frustule characteristic (e.g., a dimension including a length or diameter, a shape, degree of brokenness, and/or a material). For example, the separation process may enable extracting a plurality of diatom frustules or portions of diatom frustules having at least one common characteristic. In some embodiments, the separation process comprises removing contaminative material having a different chemical origin from the diatom frustules and/or portions of diatom frustules.

Diatoms and diatom frustules that stay unchanged during long time periods are sometimes used in biological, ecological, and related earth science research. Many approaches have been developed to extract small samples of frustules from water or sediments. The sediments (diatomaceous earth) contain diatom frustules (broken and unbroken) alongside with carbonates, mica, clay, organics and other sedimentary particles. The separation of unbroken frustules may involve three main steps: removal of organic remains, removal of particles with different chemical origin, and removal of broken pieces. The removal of organic matter may be realized with heating of samples in a bleach (e.g., hydrogen peroxide and/or nitric acid), and/or annealing at higher temperatures. The carbonates, clay, and other soluble non-silica materials may be removed by hydrochloric and/or sulfuric acid. For the separation of broken and unbroken frustules, several techniques can be applied: sieving, sedimentation and centrifugation, centrifugation with a heavy liquid, and split-flow lateral-transport thin separation cells, and combinations thereof. A problem for all of these approaches may often be aggregation of broken and unbroken frustules, which can diminish the quality of the separation, and/or may render the separation process suitable only for laboratory size samples.

Scaling up separation procedures may enable diatom frustules to be used as industrial nanomaterials.

In some embodiments, a separation procedure that can be utilized for industrial scale separation of diatoms comprises separation of diatom frustule portions having at least one common characteristic. For example, the common characteristic could be unbroken diatom frustules or broken diatom frustules. The separation process 20, as shown in FIGS. 4A and 4B, is an example separation procedure enabling industrial scale separation of diatoms. In some embodiments, a separation procedure that enables large scale separation of diatoms enables a reduction in the agglomeration of frustules, such as by using a surfactant and/or a disc stack centrifuge. In some embodiments, use of the surfactant can enable the large scale separation. In some embodiments, using the disc stack centrifuge (e.g., a milk separator type centrifugation process) can enable large scale separation. For example, use of the surfactant to disperse diatom frustules together with a disc stack centrifuge to sort frustules based on a frustule characteristic may facilitate large scale separation of diatoms by enabling reduced agglomeration of the diatom frustules. A traditional, non-disk stack centrifuge process would cause sedimentation of the frustules. The supernatant fluid would be discarded, and the sedimented frustules would be redispersed in a solvent, after which the centrifuge would again cause sedimentation of the frustules. This process would be repeated until the desired separation is achieved. A disk stack centrifuge process can continuously redisperse and separate sedimented frustules. For example, a phase enriched with whole diatoms can be continuously circulated through the disk stack centrifuge, becoming more and more enriched. In some embodiments, the disc stack centrifuge can enable a separation of broken diatom frustules from unbroken diatom frustules. In some embodiments, the disc stack centrifuge can enable a sorting of the diatom frustules according to a diatom frustule characteristic. For example, the disc stack centrifuge may enable extraction of frustules having at least one common characteristic (e.g., a dimension, a shape, a degree of brokenness and/or a material).

A separation procedure enabling industrial scale separation of diatoms, such as the separation process 20 shown in FIGS. 4A and 4B, may include the following steps:

1. Particles of a solid mixture (e.g., diatomaceous earth) comprising the diatom frustules and/or portions of diatom frustules may be rocky and can be broken down into smaller particles. For example, a particle size of the solid mixture may be reduced to facilitate the separation process 20. In some embodiments, to obtain a powder, the diatomaceous earth can be mildly milled or ground, for example using a mortar and pestle, a jar mill, a rock crusher, combinations thereof, and/or the like.

2. In some embodiments, components of the diatomaceous earth that are larger than the diatom frustules or portions of diatom frustules may be removed through a sieving step. In some embodiments, the sieving step is performed after the diatomaceous earth has been milled. For example, diatomaceous earth powder may be sieved to remove the particles of the powder which are bigger than the frustules. In some embodiments, the sieving can be facilitated by dispersing the solid mixture (e.g., milled diatomaceous earth) in a liquid solvent. The solvent may be water, and/or other suitable liquid solvents. Dispersing the solid mixture in the solvent may be facilitated by sonicating the mixture comprising the solid mixture and the solvent. Other methods of aiding dispersion may also be suitable. In some embodiments, the dispersion comprises a weight percent of diatoms within a range of from about 1 weight percent to about 5 weight percent, about 1 weight percent to about 10 weight percent, about 1 weight percent to about 15 weight percent, or about 1 weight percent to about 20 weight percent. A concentration of the solid mixture in the dispersion may be reduced to facilitate the sieving step to remove particles of the dispersion that are larger than the diatoms. The sieve openings depend on the size of diatoms in the sample. For example, a suitable sieve may comprise a mesh size of about 20 microns, or any other mesh size that enables removal from the dispersion particles of the solid mixture that are larger than the diatoms (e.g., a sieve having a mesh size of about 15 microns to about 25 microns, or of about 10 microns to about 25 microns). A shaker sieve may be used for effectively increasing flow through the sieve.

3. In some embodiments, the separation process includes a purification step to remove organic contaminants from the diatoms (e.g., diatom frustules or portions of diatom frustules). A suitable process for removing organic contaminants may comprise immersing and/or heating the diatoms in a bleach (e.g., nitric acid and/or hydrogen peroxide), and/or annealing the diatoms at higher temperatures. For example, a sample of diatoms may be heated in a volume of a solution comprising about 10 volume percent to about 50 volume percent (e.g., 30 volume percent) hydrogen peroxide for about 1 minute to about 15 minutes (e.g., 10 minutes). Other compositions, concentrations and/or durations may be suitable. For example, the composition of the solution used, the concentration of the solution used, and/or the duration of the heating may depend on the composition of the sample to be purified (e.g., types of organic contaminants and/or diatoms). In some embodiments, the diatoms can be heated in a solution until the solution ceases or substantially ceases to bubble (e.g., indicating removal of organic contaminants is complete or substantially complete) to facilitate sufficient removal of the organic contaminants. Immersing and/or heating diatoms in a solution may be repeated until organic contaminants have been removed or substantially removed.

Purification of diatoms from organic contaminants may be followed by washing with water. In some embodiments, the diatoms may be washed with a liquid solvent (e.g., water). The diatoms may be separated from the solvent through a sedimentation process, including for example a centrifuge step. Suitable centrifuge technology may include, for example, a disc stack centrifuge, a decanter centrifuge, a tubular bowl centrifuge, combinations thereof, and/or the like.

4. In some embodiments, the separation process includes a purification step to remove inorganic contaminants. Inorganic contaminants may be removed by mixing the diatoms with hydrochloric and/or sulfuric acid. Inorganic contaminants may include carbonates, clay, and other soluble non-silica materials. For example, a sample of diatoms may be mixed with a volume of solution comprising about 15 volume percent to about 25 volume percent of hydrochloric acid (e.g., about 20 volume percent hydrochloric acid) for a duration of about 20 minutes to about 40 minutes (e.g., about 30 minutes). Other compositions, concentrations and/or durations may be suitable. For example, the composition of the solution used, the concentration of the solution used, and/or the duration of the mixing may depend on the composition of the sample to be purified (e.g., types of inorganic contaminants and/or diatoms). In some embodiments, the diatoms can be mixed in a solution until the solution ceases or substantially ceases to bubble (e.g., indicating removal of inorganic contaminants is complete or substantially complete) to facilitate sufficient removal of the inorganic contaminants. Mixing diatoms with a solution may be repeated until inorganic contaminants have been removed or substantially removed.

Purification of diatoms from soluble inorganic contaminants may be followed by washing with water. In some embodiments, the diatoms may be washed with a liquid solvent (e.g., water). The diatoms may be separated from the solvent through a sedimentation process, including for example a centrifuge step. Suitable centrifuge technology may include, for example, a disc stack centrifuge, a decanter centrifuge, a tubular bowl centrifuge, combinations thereof, and/or the like.

5. In some embodiments, the separation process comprises dispersing of frustules in a surfactant. The surfactant may facilitate separation of the frustules and/or portions of frustules from one another, reducing agglomeration of the frustules and/or portions of frustules. In some embodiments, an additive is used to reduce agglomeration of the diatoms. For example, diatoms may be dispersed in a surfactant and an additive. In some embodiments, dispersing of the diatoms in the surfactant and/or additive may be facilitated by sonicating the mixture comprising diatoms, the surfactant and/or the additive.

6. In some embodiments, broken frustule pieces may be extracted by a wet sieving process. For example, a filtering process may be used. In some embodiments, the filtering process comprises using a sieve for removing the smaller pieces of broken frustules. The sieve may comprise a mesh size suitable for removing the smaller pieces of broken frustules (e.g., a 7 micron sieve). The wet sieving process can inhibit or prevent small sediment from accumulating in the pores of the sieve and/or allow small particles to pass through the pores of the sieve, for example by disturbing agglomeration of the sediment. Disturbing agglomeration may include, for example, stirring, bubbling, shaking, combinations thereof, and the like of materials which sediment on the sieve mesh. In some embodiments, the filtering process can be continuous through a series of sieves (e.g., having increasingly smaller pores or mesh sizes) (e.g., multiple sieves in a machine having a single input and output).

7. In some embodiments, a continuous centrifugation (milk separator-type machine) of frustules in a liquid can be used. For example, a disc stack centrifuge may be used. This process may be used to separate the diatoms according to a common characteristic, including for example, further separating broken frustule pieces from the unbroken frustules. In some embodiments, disc stack centrifuge step can be repeated to achieve a desired separation (e.g., desired level of separation of the broken frustules from the unbroken frustules).

8. As described herein, frustules may be washed in solvent, followed by a sedimentation process (e.g. centrifugation) in order to extract the frustules from the solvent. For example, centrifugation can be used to sediment frustules or portions of frustules after each washing step and/or before final use. Suitable centrifuge technology for sedimenting frustules after a wash step may include continuous centrifuges, including but not limited to a disc stack centrifuge, a decanter centrifuge, and/or a tubular bowl centrifuge.

The example separation procedure has been tested with fresh water diatoms from Mount Silvia Pty, Ltd. Diatomite mining company, Queensland, Australia. The majority of frustules in the sample has one kind of diatoms Aulacoseira sp. The frustules have cylindrical shape with diameter of about 5 microns and length from 10 to 20 microns.

Flow-chart of an example separation procedure, separation process 20 presented in FIGS. 4A and 4B only serves as an example. The quantities of parameters in the flowchart are provided as illustrative examples (e.g., suited to the chosen sample only). For example, quantities may be different for different types of diatoms.

The surface of diatoms can include amorphous silica and can include silanol groups, which are negatively charged. Isoelectric point found from zeta potential measurements can often be around pH2 for diatoms (e.g., similar to that of amorphous silica).

In some embodiments, the surfactant can comprise a cationic surfactant. Suitable cationic surfactants can include benzalkonium chloride, cetrimonium bromide, lauryl methyl gluceth-10 hydroxypropyl dimonium chloride, benzethonium chloride, benzethonium chloride, bronidox, dmethyldioctadecylammonium chloride, tetramethylammonium hydroxide, mixtures thereof, and/or the like. The surfactant may be a nonionic surfactant. Suitable nonionic surfactants can include: cetyl alcohol, stearyl alcohol, and cetostearyl alcohol, oleyl alcohol, polyoxyethylene glycol alkyl ethers, octaethylene glycol monododecyl ether, glucoside alkyl ethers, decyl glucoside, polyoxyethylene glycol octylphenol ethers, Triton X-100, Nonoxynol-9, glyceryl laurate, polysorbate, poloxamers, mixtures thereof, and/or the like.

In some embodiments, one or more additives can be added to reduce agglomeration. Suitable additives may include: potassium chloride, ammonium chloride, ammonium hydroxide, sodium hydroxide, mixtures thereof, and/or the like.

Figure 5A:
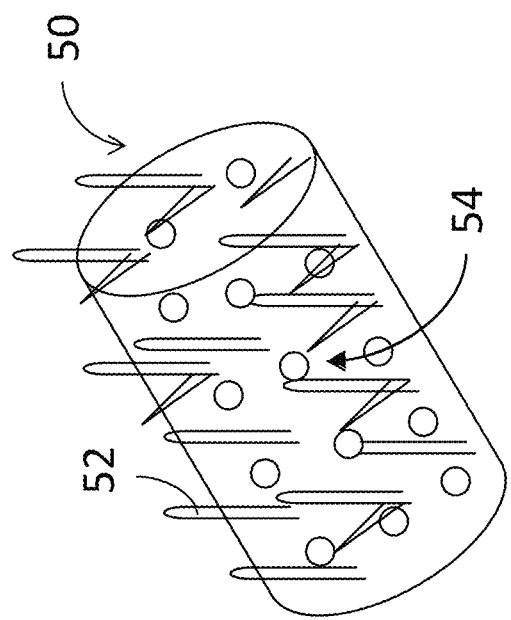
FIG. 5A shows an example embodiment of a frustule comprising structures on both an exterior surface and an interior surface.

Frustules may have one or more modifications applied to a surface of the frustules. In some embodiments, frustules may be used as a substrate to form one or more structures on one or more surfaces of the frustules. FIG. 5A shows an example frustule 50 comprising structures 52. For example, a frustule 50 may have a hollow cylindrical or substantially cylindrical shape, and may comprise structures 52 on both an exterior and interior surface of the cylinder. The structures 52 may modify or affect a characteristic or attribute of the frustule 50, including, for example, the conductivity of the frustule 50. For example, an electrically insulating frustule 50 may be made electrically conductive by forming electrically conductive structures 52 on one or more surfaces of the frustule 50. A frustule 50 may include structures 52 comprising silver, aluminum, tantalum, brass, copper, lithium, magnesium, combinations thereof, and/or the like. In some embodiments, a frustule 50 includes structures 52 comprising ZnO. In some embodiments, a frustule 50 includes structures 52 comprising an oxide of manganese, such as manganese dioxide ($MnO_2$), manganese(II, III) oxide ($Mn_3O_4$), manganese(II) oxide (MnO), manganese (III) oxide ($Mn_2O_3$), and/or manganese oxyhydroxide (MnOOH). In some embodiments, a frustule 50 includes structures 52 comprising other metal-containing compounds or oxides. In some embodiments, a frustule 50 includes structures 52 comprising a semiconductor material, including silicon, germanium, silicon germanium, gallium arsenide, combinations thereof, and/or the like. In some embodiments, frustules 50 comprise surface modifying structures 52 on all or substantially all of the surfaces of the frustules 50.

Structures 52 applied or formed on a surface of a frustule 50 may comprise various shapes, dimensions, and/or other attributes. A frustule 50 may comprise structures 52 having a uniform or substantially uniform shape, dimension, and/or another structure 52 attribute. In some embodiments, a frustule 50 may have structures 52 comprising nanowires, nanotubes, nanosheets, nanoflakes, nanospheres, nanoparticles, structures having a rosette shape, combinations thereof, and/or the like. In some embodiments, a nanostructure can have a dimension having a length of about 0.1 nanometers (nm) to about 1000 nm. In some embodiments, the dimension is a diameter of the nanostructure. In some embodiments, the dimension is a longest dimension of the nanostructure. In some embodiments, the dimension is a length and/or width of the nanostructure. Nanostructures on surfaces of frustules may facilitate materials having increased surface area, advantageously providing materials having increased surface area on which electrochemical reaction can occur. In some embodiments, diatom frustules can reduce, prevent, or substantially prevent agglomeration of nanostructures in manufacturing processes and/or in products fabricated by the manufacturing processes (e.g., in an electrode fabricated using diatom frustules, devices comprising such an electrode). Reduction in agglomeration of nanostructures may facilitate providing increased active surface area for electrolyte to access (e.g., increase active surface area of an electrode, better electrical performance of a device comprising such an electrode). In some embodiments, the porosity of surfaces of diatom frustules can facilitate electrolyte access to the active surface area, such as facilitating diffusion of electrolytic ions to active surfaces of an electrode (e.g., diatom frustules can have pore sizes of about 1 nanometers (nm) to about 500 nm).

In some embodiments, the frustule 50 can be thickly covered by the nanostructures 52. In some embodiments, a ratio of a mass of the nanostructures 52 to a mass of the frustule 50 is between about 1:1 and about 20:1, between about 5:1 and about 20:1, or between about 1:1 and about 10:1. The nanostructures 52 preferably have a mass greater than a mass of the frustule 50 prior to coating. The mass of the nanostructures 52 may be determined by weighing the frustules 50 before and after coating with the difference being the mass of the nanostructures 52.

Structures 52 can be formed or deposited onto a surface of a frustule 50 at least in part by combining a frustule 50 with a formulation comprising a desired material to allow coating or seeding of the structures 52 onto a surface of the frustule 50.

As described herein, structures 52 on a surface of the frustule 50 may comprise zinc oxide, such as zinc oxide nanowires. In some embodiments, zinc oxide nanowires can be formed on a surface of the frustule 50 by combining the frustule 50 with a solution comprising zinc acetate dihydrate ($Zn(CH_3CO_2)_2 \cdot 2H_2O$) and ethanol. For example, a solution having a concentration of 0.005 mol/L (M) zinc acetate dihydrate in ethanol may be combined with frustules 50 so as to coat a surface of the frustules 50. The coated frustules 50 may then be air dried and rinsed with ethanol. In some embodiments, the dried frustules 50 can then be annealed (e.g., at a temperature of about 350° C.). The zinc oxide nanowires may then be allowed to grow on the coated surface of the frustules 50. In some embodiments, the annealed frustules 50 are maintained at a temperature above room temperature (e.g., maintained at around a temperature of about 95° C.) to facilitate formation of the zinc oxide nanowires.

Frustules 50 may also comprise a material formed on or deposited onto a surface of the frustules 50 to modify a characteristic or attribute of the frustules 50. For example, an electrically insulating frustule 50 may be made electrically conductive by forming or applying an electrically conductive material on one or more surfaces of the frustule 50. A frustule 50 may include a material comprising silver, aluminum, tantalum, brass, copper, lithium, magnesium, combinations thereof, and/or the like. In some embodiments, a frustule 50 includes material comprising ZnO. In some embodiments, a frustule 50 includes material comprising an oxide of manganese. In some embodiments, a frustule 50 includes a material comprising a semiconductor material, including silicon, germanium, silicon germanium, gallium arsenide, combinations thereof, and/or the like. The surface modifying material may be on an exterior surface and/or an interior surface of the frustules 50. In some embodiments, frustules 50 comprise a surface modifying material on all or substantially all of the surfaces of the frustules 50.

A material can be formed or deposited onto a surface of a frustule 50 in part through combining a frustule 50 with a formulation including a desired material to allow coating or seeding of the material onto a surface of the frustule 50.

As described herein, a material may be deposited onto a surface of the frustule 50. In some embodiments, the material comprises a conductive metal such as silver, aluminum, tantalum, copper, lithium, magnesium, and brass. In some embodiments, coating a surface of the frustule 50 with a material comprising silver includes, at least in part, combining the frustule 50 with a solution comprising ammonia ($NH_3$) and silver nitrate ($AgNO_3$). In some embodiments, the solution can be prepared in a process similar to a process often used in preparing Tollens' reagent. For example, preparation of the solution may comprise addition of ammonia to aqueous silver nitrate to form a precipitate, followed by further addition of ammonia until the precipitate dissolves. The solution may then be combined with the frustule 50. As an example, 5 milliliters (mL) of ammonia may be added to 150 mL of aqueous silver nitrate while stirring such that a precipitate forms, followed by addition of another 5 mL of ammonia until the precipitate dissolves. A mixture may then be formed by combining the solution with 0.5 grams (g) of frustules 50 and an aqueous solution of glucose (e.g., 4 g of glucose dissolved in 10 mL of distilled water). The mixture may then be placed into a container immersed in a bath maintained at a temperature (e.g., a warm water bath maintained at a temperature of about 70° C.) so as to facilitate the coating of the frustules 50.

Growing Nanostructures on Diatom Frustules or Portions of Diatom Frustules

As described herein, diatomaceous earth is naturally occurring sediment from fossilized microscopic organisms called diatoms. The fossilized microorganisms comprise hard frustules made from highly structured silica with sizes often between about 1 micron and about 200 microns. Different species of diatoms have different 3D shapes and features, which vary from source to source.

Diatomaceous earth can include a highly porous, abrasive, and/or heat resistant material. Due to these properties, diatomaceous earth has found wide applications including filtering, liquid absorption, thermal isolation, as ceramic additive, mild abrasive, cleaning, food additive, cosmetics, etc.

Diatom frustules have attractive features for nanoscience and nanotechnology—they have naturally occurring nanostructures: nanopores, nanocavities and nanobumps (e.g., as shown in FIGS. 1 to 3). The abundance of frustule shapes depending on the diatom species (e.g., more than 105) is another attractive property. Silicon dioxide, from which the diatom frustules are made, can be coated or replaced by a useful substance while preserving the diatom nanostructures. Diatom nanostructures may serve as a useful nanomaterial for many processes and devices: dye-sensitized solar cells, drug delivery, electroluminescent displays, anode for Li-ion batteries, gas sensors, biosensors, etc. Formation of MgO, $ZrO_2$, $TiO_2$, $BaTiO_3$, SiC, SiN, and Si may be accomplished using high temperature gas displacement of $SiO_2$.

In some embodiments, diatom frustules can be coated with 3D nanostructures. The diatoms may be coated on inner and/or outer surfaces, including inside the nanopores of the diatoms. The coatings may not preserve the diatom structure precisely. However, coatings may themselves have nanopores and nanobumps. Such silica frustules/nanostructures composites use frustules as support. The nanostructured material may have small nanoparticles densely joined together: nanowires, nanospheres, nanoplates, dense array of nanoparticles, nanodisks, and/or nanobelts. Overall, the composites may have a very high surface area.

Nanostructures comprising various materials may be formed on surfaces of frustules. In some embodiments, nanostructures comprise a metallic material. For example, nanostructures formed on one or more surfaces of a frustule may comprise zinc (Zn), magnesium (Mg), aluminum (Al), mercury (Hg), cadmium (Cd), lithium (Li), sodium (Na), calcium (Ca), iron (Fe), lead (Pb), nickel (Ni), silver (Ag), combinations thereof, and/or the like. In some embodiments, nanostructures comprise metal oxides. For example, nanostructures formed on a frustule surface may comprise zinc oxide (ZnO), manganese dioxide ($MnO_2$), manganese(II, III) oxide ($Mn_3O_4$), manganese(II) oxide (MnO), manganese(III) oxide ($Mn_2O_3$), mercury oxide (HgO), cadmium oxide (CdO), silver(I,III) oxide (AgO), silver(I) oxide ($Ag_2O$), nickel oxide (NiO), lead(II) oxide (PbO), lead(II, IV) oxide ($Pb_2O_3$), lead dioxide ($PbO_2$), vanadium (V) oxide ($V_2O_5$), copper oxide (CuO), molybdenum trioxide ($MoO_3$), iron(III) oxide ($Fe_2O_3$), iron(II) oxide (FeO), iron(II, III) oxide ($Fe_3O_4$), rubidium(IV) oxide ($RuO_2$), titanium dioxide ($TiO_2$), iridium(IV) oxide ($IrO_2$), cobalt(II, III) oxide ($Co_3O_4$), tin dioxide ($SnO_2$), combinations thereof, and/or the like. In some embodiments, nanostructures comprise other metal-containing compounds, including for example, manganese(III) oxohydroxide (MnOOH), nickel oxyhydroxide (NiOOH), silver nickel oxide ($AgNiO_2$), lead(II) sulfide (PbS), silver lead oxide ($Ag_5Pb_2O_6$), bismuth(III) oxide ($Bi_2O_3$), silver bismuth oxide ($AgBiO_3$), silver vanadium oxide ($AgV_2O_5$), copper(I) sulfide (CuS), iron disulfide ($FeS_2$), iron sulfide (FeS), lead(II) iodide ($PbI_2$), nickel sulfide ($Ni_3S_2$), silver chloride (AgCl), silver chromium oxide or silver chromate ($Ag_2CrO_4$), copper(II) oxide phosphate ($Cu_4O(PO_4)_2$), lithium cobalt oxide ($LiCoO_2$), metal hydride alloys (e.g., LaCePrNdNiCoMnAl), lithium iron phosphate ($LiFePO_4$ or LFP), lithium permanganate ($LiMn_2O_4$), lithium manganese dioxide ($LiMnO_2$), Li(NiMnCo)$O_2$, Li(NiCoAl)$O_2$, cobalt oxyhydroxide (CoOOH), titanium nitride (TiN), combinations thereof, and/or the like.

In some embodiments, nanostructures formed on surfaces of frustules can comprise non-metallic or organic material. In some embodiments, the nanostructures can comprise carbon. For example, the nanostructures may comprise multi-wall and/or single-wall carbon nanotubes, graphene, graphite, carbon nano-onions, combinations thereof, and/or the like. In some embodiments, nanostructures may comprise fluorocarbons (e.g., $CF_x$), sulfur (S), conductive n/p-type doped polymers (e.g., conductive n/p-type doped poly (fluorene)s, polyphenylenes, polypyrenes, polyazulenes, polynaphthalenes, poly(pyrrole)s, polycarbazoles, polyindoles, polyazepines, polyanilines, poly(thiophene)s, poly(3, 4-ethylenedioxythiophene), and/or poly(p-phenylene sulfide)), combinations thereof, and/or the like.

Nanostructures formed on a surface of a diatom frustule may include: 1) silver (Ag) nanostructures; 2) zinc-oxide (ZnO) nanostructures; 3) carbon nanotubes "forest;" and/or 4) manganese-containing nanostructures. As described herein, the diatom frustules having nanostructures formed on one or more of their surfaces can be used for energy storage devices such as batteries and supercapacitors, solar cells, and/or gas sensors. Nanostructures may be formed on one or more surfaces of unbroken frustules and/or broken frustules. In some embodiments, frustules or portions of frustules used in the nanostructure formation process may have been extracted through a separation procedures comprising separation steps described herein (e.g., the separation process 20 shown in FIGS. 4A and 4B). In some embodiments, before the growth of nanostructured active materials, frustules can be pretreated with one or more functionalized chemicals (e.g., siloxanes, fluorosiloxanes, proteins, and/or surfactants). In some embodiments, before the growth of nanostructured active materials, frustules can be pre-coated with a conductive materials (e.g., metal, and/or a conductive carbon), and/or a semiconductor material. For example, frustules may be pre-coated with silver (Ag), gold (Au), copper (Cu), nickel (Ni), platinum (Pt), graphene, graphite, carbon nanotubes, silicon (Si), germanium (Ge)), a semiconductor-containing alloy (e.g., an aluminum-silicon (AlSi) alloy), combinations thereof, and/or the like.

In some embodiments, nanostructures are grown using two step approaches. The first step generally includes the growth of seeds on the surface of diatom frustules. Seeds are nanostructures that are directly bonded (e.g., chemically bonded) to the surfaces of the diatom frustules, and may have certain grain size and/or uniformity. Energy may be provided to create such bonds. The seeding process may be conducted under high temperatures and/or involve other techniques that can create heat or some other form of energy gain.

A second step of forming nanostructures generally includes growing the final nanostructures from the seeds. Frustules pre-coated with seeds may be immersed in environments of initial materials under certain conditions. The nanostructures may include one or more of nanowires, nanoplates, dense nanoparticles, nanobelts, nanodisks, combinations thereof, and/or the like. The form factor may depend on conditions of the growth of the nanostructures (e.g., morphology of the nanostructures can depend on one or more growth conditions during forming of the nanostructures on the seed layer, including for example a growth temperature, a pattern of heating, inclusion of a chemical additive during the nanostructure growth, and/or combinations thereof).

An Example Process of Forming Ag Nanostructures on Surfaces of Diatom Frustules

The initial coating of silica with silver (or seeding) can be realized by reduction of a $Ag^+$ salt using microwave, ultrasonication, surface modification, and/or reduction of silver nitrate ($AgNO_3$) with a reducing agent.

The seed growth step may include dissolution of a silver salt and a reducing agent in a solvent (e.g., the reducing agent and the solvent can be the same substance) and dispersing purified diatoms in the mixture. During and/or after the dissolution, a physical force like mixing, stirring, heating, ultrasonication, microwaves, combinations thereof, and/or the like may be applied. The seed layer growth process may occur for various amounts of time.

Examples of Growing Ag Seeds on Surfaces of Diatom Frustules

Example 1 includes the following steps: 0.234 g of purified diatoms, 0.1 g $AgNO_3$, and 50 mL of molten at 60° C. PEG 600 (polyethylene glycol) are mixed in a beaker. In some embodiments, a mixture comprising clean diatoms, a silver contributing component (e.g., silver nitrate), and a reducing agent may be heated by a cyclic heating regimen. In some embodiments, the reducing agent and the solvent can be the same substance. For example, a mixture may be heated for about 20 minutes to about 40, alternating the heat from about 100 Watt to about 500 Watt every minute. For example, the mixture comprising cleaned diatoms, silver nitrate, and molten PEG was heated by microwave for about 30 min. The microwave power was altered from 100 to 500 Watt every minute to prevent overheating the mixture. Some commercial microwaves allow the user to determine the temperature of the contents after a certain duration, and/or to determine multiple temperatures after various durations (e.g., to define a temperature ramp), during which the microwave controls the power in order to achieve that result. For example, the microwave may determine that a lower power is needed to heat 50 mL of water to 85° C. in 2 min than to heat 50 mL of water to 85° C. in 1 min, and this adjustment may be made during the heating process, for example based on temperature sensors. For another example, the microwave may determine that a lower power is needed to heat 50 mL of water to 85° C. in 2 min than to heat 100 mL of water to 85° C. in 2 min, and this adjustment may be made during the heating process, for example based on temperature sensors. The diatoms were centrifuged and washed with ethanol. The seeds are illustrated in FIGS. 5B and 5C.

Example 2 includes the following steps: Mix 45 mL of N,N-dimethylformamide, 0.194 g of 6,000 MW PVP (polyvinylpyrrolidone), 5 mL of 0.8 mM $AgNO_3$ in water, and 0.1 g of filtered and purified diatoms in a beaker. A tip of an ultrasonic processor (e.g., 13 mm diameter, 20 kHz, 500 Watt) is placed in the mixture and the beaker with the mixture placed in an ice bath. Tip amplitude is set at 100%. Sonication lasts 30 min. The diatoms are cleaned after the procedure in ethanol two times using bath sonication and centrifugation at 3,000 RPM for 5 min. Then the process is repeated two more times until seeds are seen on the diatoms.

Figure 5B:
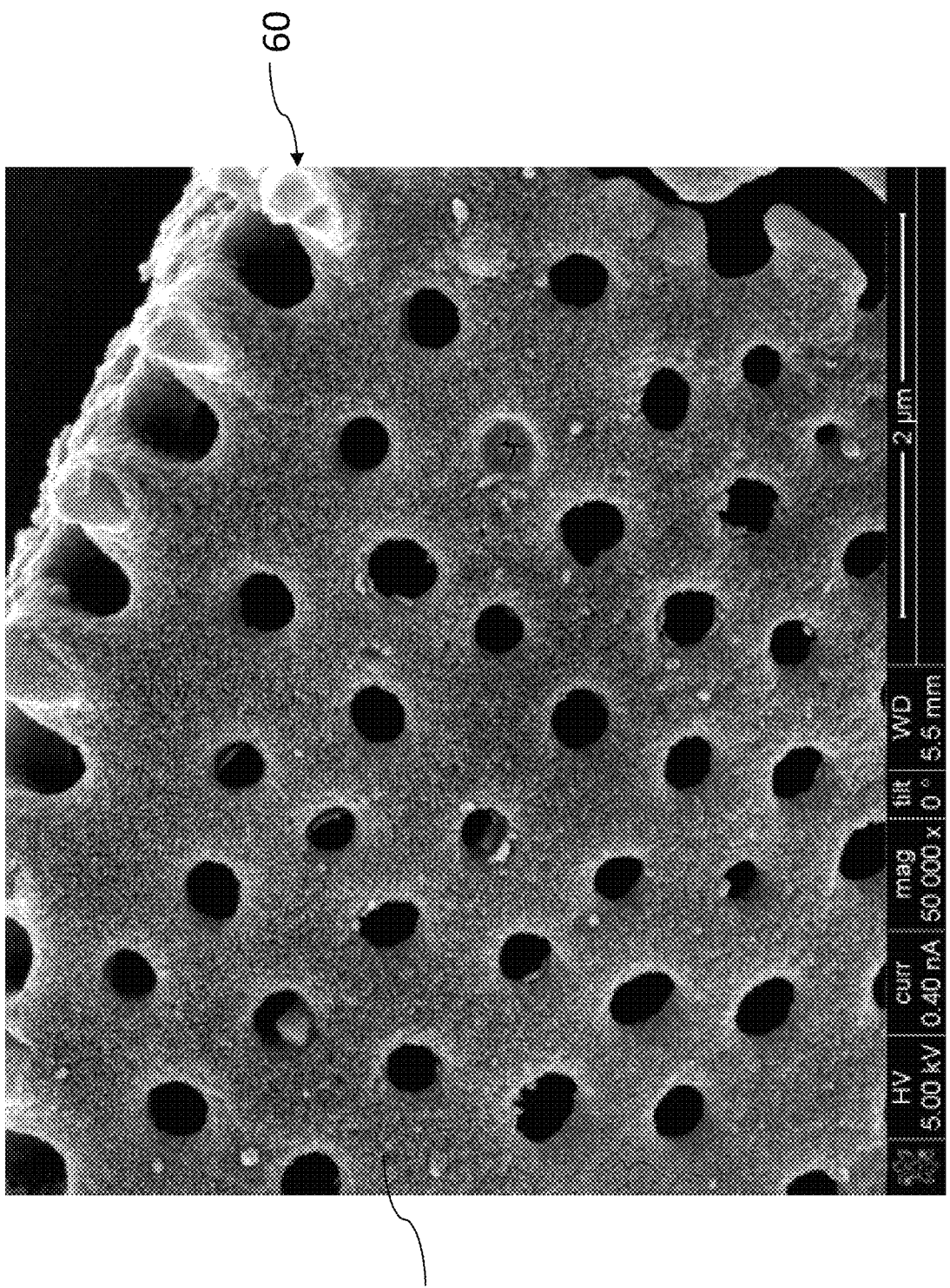
FIG. 5B shows a SEM image, at 50 k× magnification, of an example frustule surface seeded with silver.
Figure 5C:
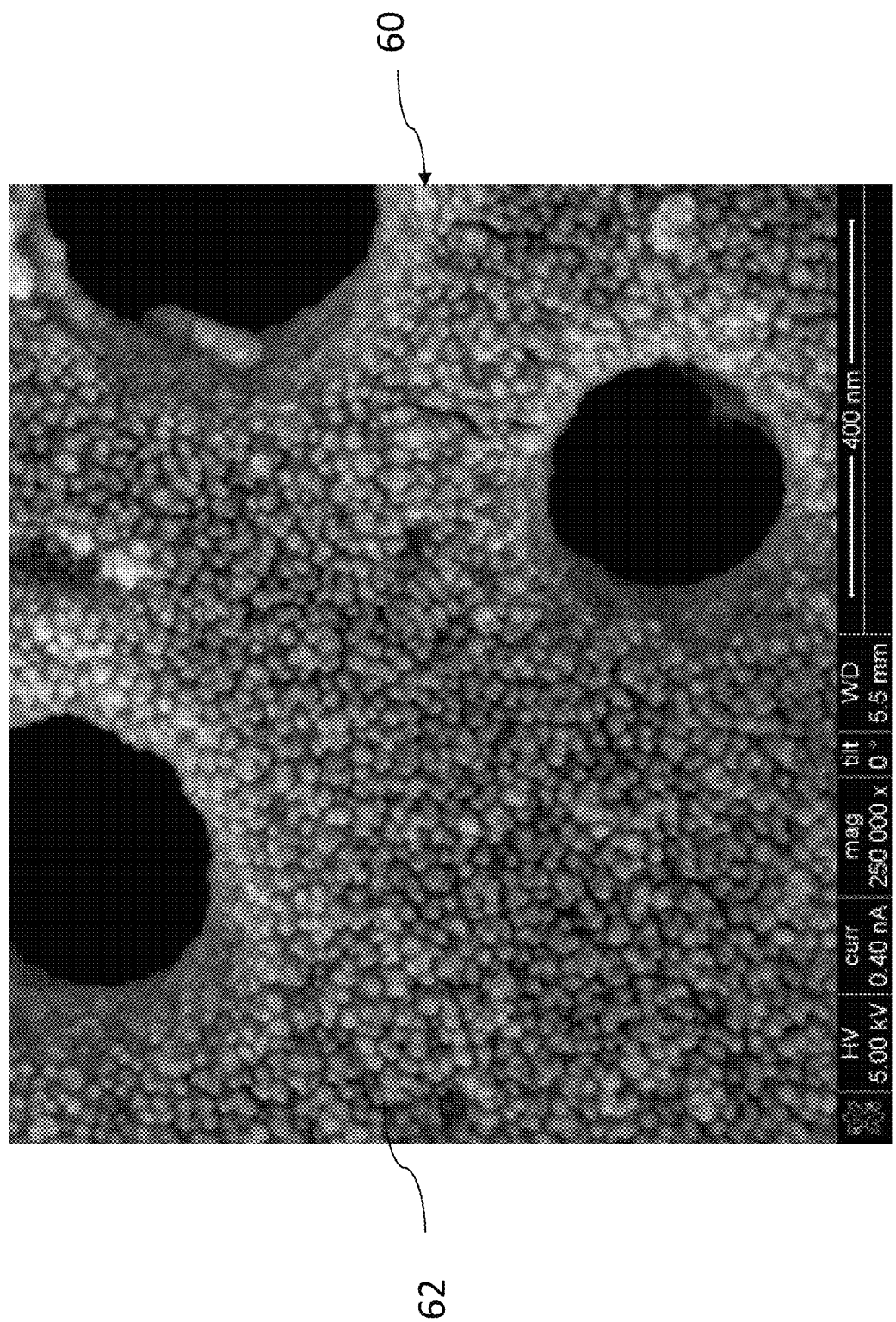
FIG. 5C shows a SEM image, at 250 k× magnification, of a frustule surface seeded with silver.

FIG. 5B shows a SEM image, at 50 k× magnification, of silver seeds 62 formed on a surface of a diatom frustule 60. FIG. 5C shows a SEM image, at 250 k× magnification, of the silver seeds 62 formed on the surface of the diatom frustule 60.

Example of Forming Silver Nanostructures on Silver Seeded Diatom Frustule Surfaces Further coating of the seeded frustules with silver may be conducted under argon (Ar) atmosphere to inhibit formation of silver oxides. In some embodiments, diatom frustule portions can be sintered (e.g., heated to a temperature of about 400° C. to about 500° C.) to obtain silver from silver oxides which may have formed on one or more surfaces of diatom frustule portions, including silver oxides formed during the process to further coat the seeded diatom frustule portions with silver. For example, sintering of diatom frustule portions may be performed on diatom frustule portions used in fabricating a conductive silver ink (e.g., a UV-curable conductive silver ink as described herein). In some embodiments, the sintering may be under an atmosphere configured to promote reduction of silver oxides to silver (e.g., hydrogen gas). Sintering the diatom frustule portions that the conductive silver ink comprises to obtain silver from silver oxides may improve conductivity of the conductive silver ink, for example because silver is more conductive than silver oxide and/or because silver-silver contact (e.g., as opposed to silver-silver oxide contact and/or silver oxide-silver oxide contact) may be increased. Other methods of obtaining silver from silver oxide may also be suitable in place of or in combination with sintering, including, for example, a process comprising a chemical reaction.

Formation of nanostructures on the seed layer may include a silver salt, a reducing agent, and a solvent. A mixing step, a heating step, and/or a titration step (e.g., to facilitate interaction of components of the nanostructure growth process) may be applied to form the nanostructures on the seed layer.

An example of process for forming the nanostructures on the seed layer (e.g., forming a thick silver coating) includes the following process:

5 mL of 0.0375 M PVP (6,000 MW) solution in water is placed in one syringe and 5 mL of 0.094 M $AgNO_3$ solution in water is placed in another syringe. 0.02 g of seeded washed and dried diatoms mixed with 5 mL of ethylene glycol heated to about 140° C. The diatoms are titrated with silver salt (e.g., $AgNO_3$) and PVP solutions at a rate of about 0.1 milliliter per minute (mL/min) using a syringe pump. After the titration is finished, the mixture is stirred for about 30 min. Then diatoms are washed (e.g., washed two times) using ethanol, bath sonication, and centrifugation.

Figure 5D:
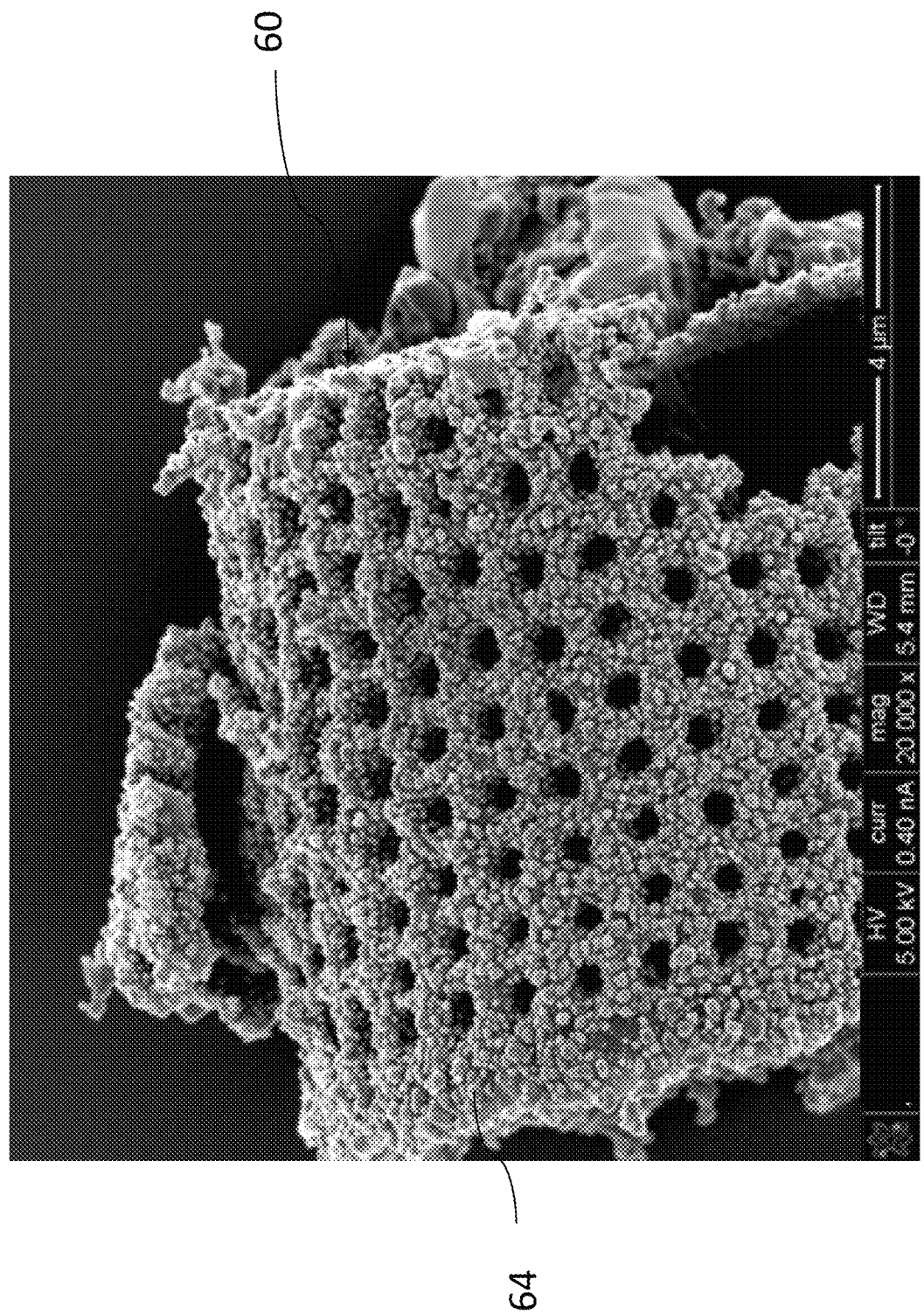
FIG. 5D shows a SEM image, at 20 k× magnification, of a frustule surface having silver nanostructures formed thereon.
Figure 5E:
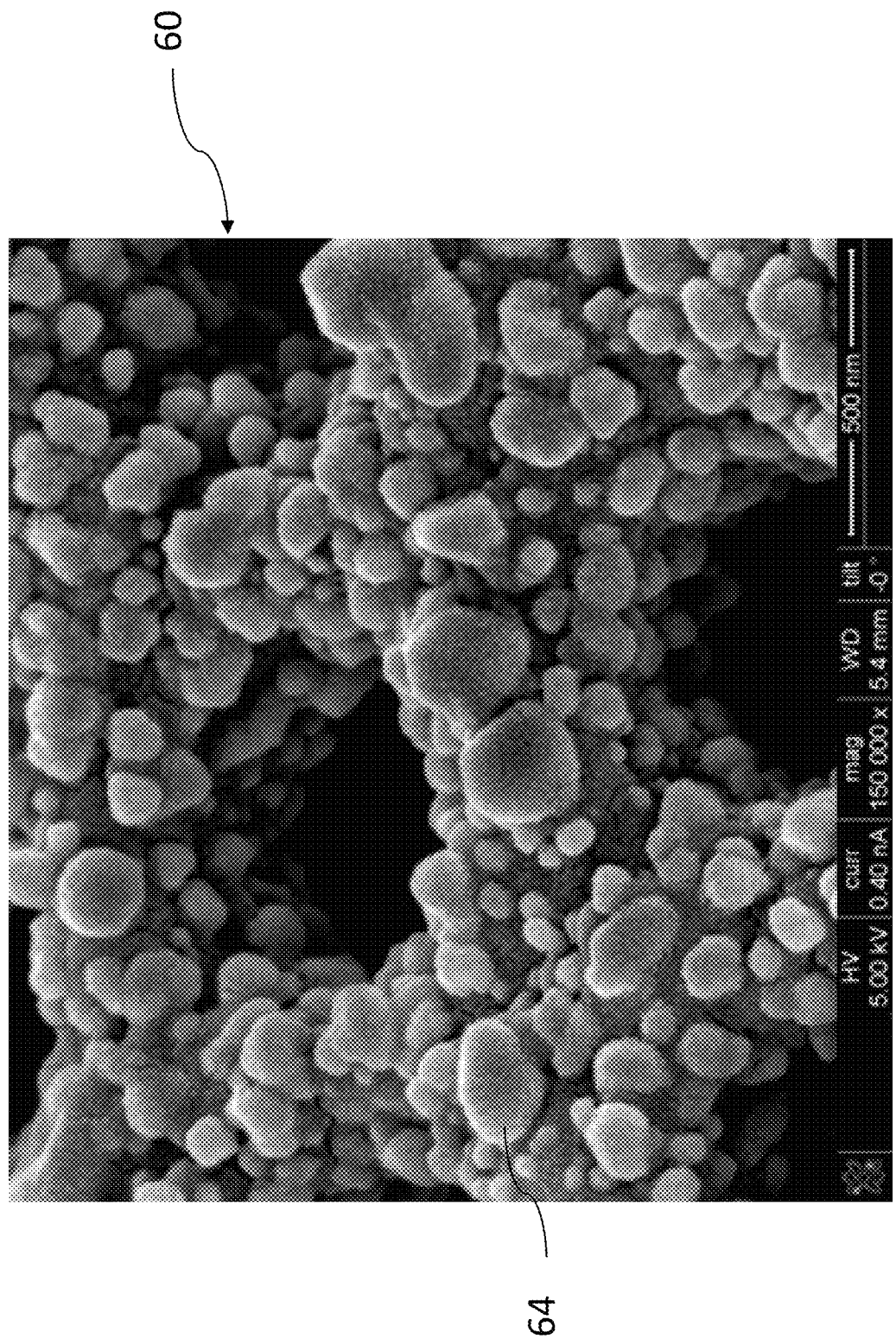
FIG. 5E shows a SEM image, at 150 k× magnification of a frustule surface having silver nanostructures formed thereon.
Figure 5F:
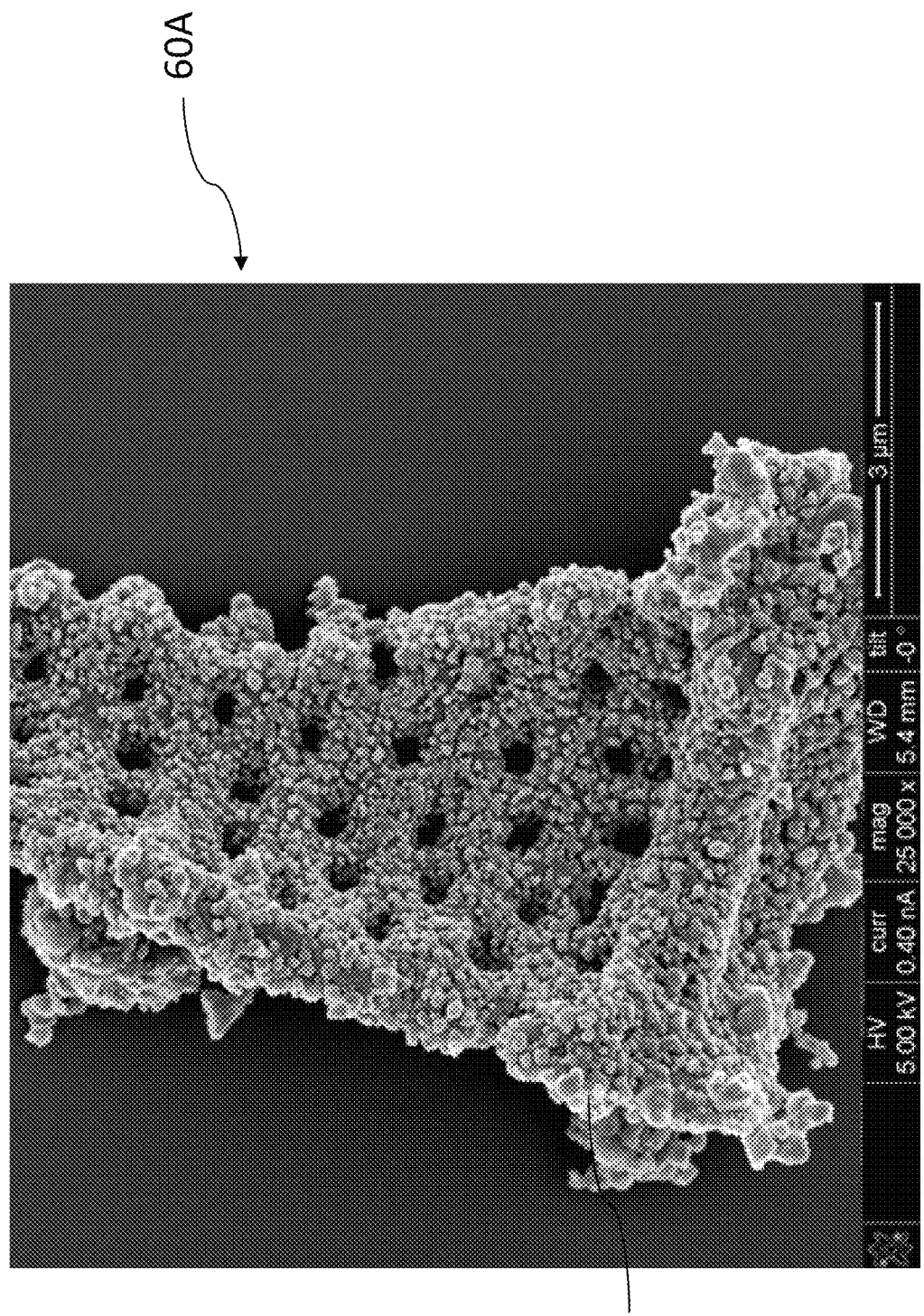
FIG. 5F shows a SEM image, at 25 k× magnification, of a diatom frustule flake having a surface coated by silver nanostructures.
Figure 5G:
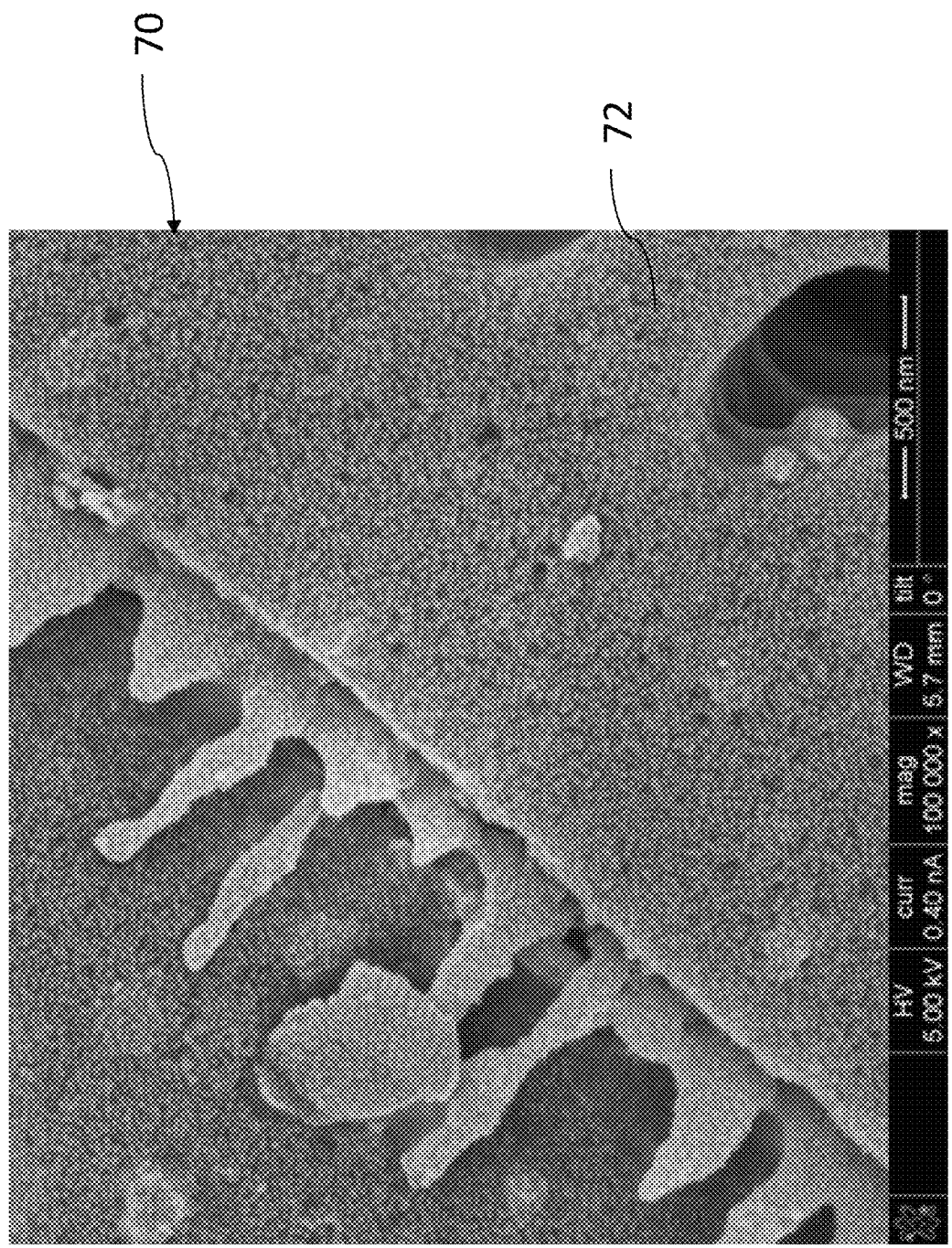
FIG. 5G shows a SEM image, at 100 k× magnification, of a frustule surface seeded with zinc-oxide.
Figure 5H:
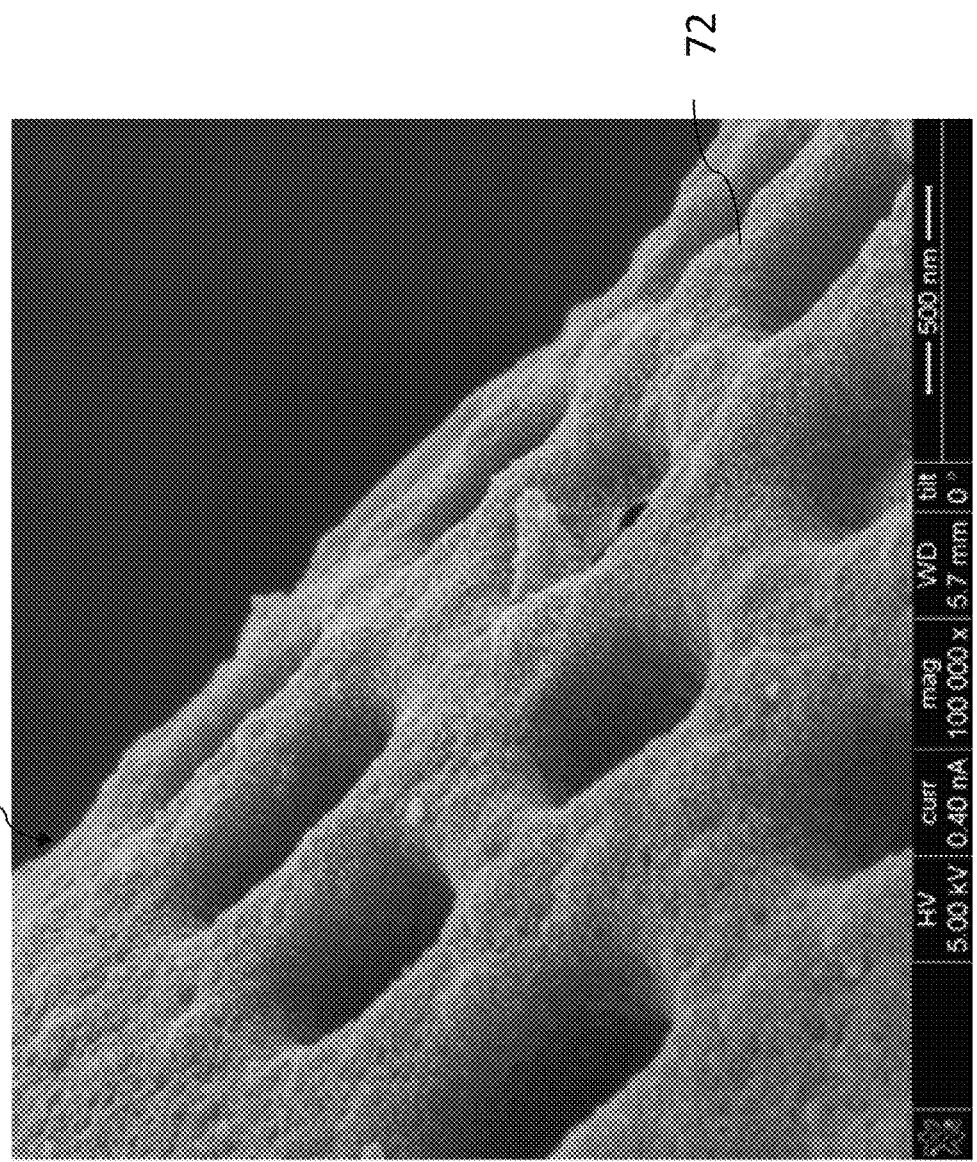
FIG. 5H shows a SEM image, at 100 k× magnification, of a frustule surface seeded with zinc-oxide.
Figure 51:
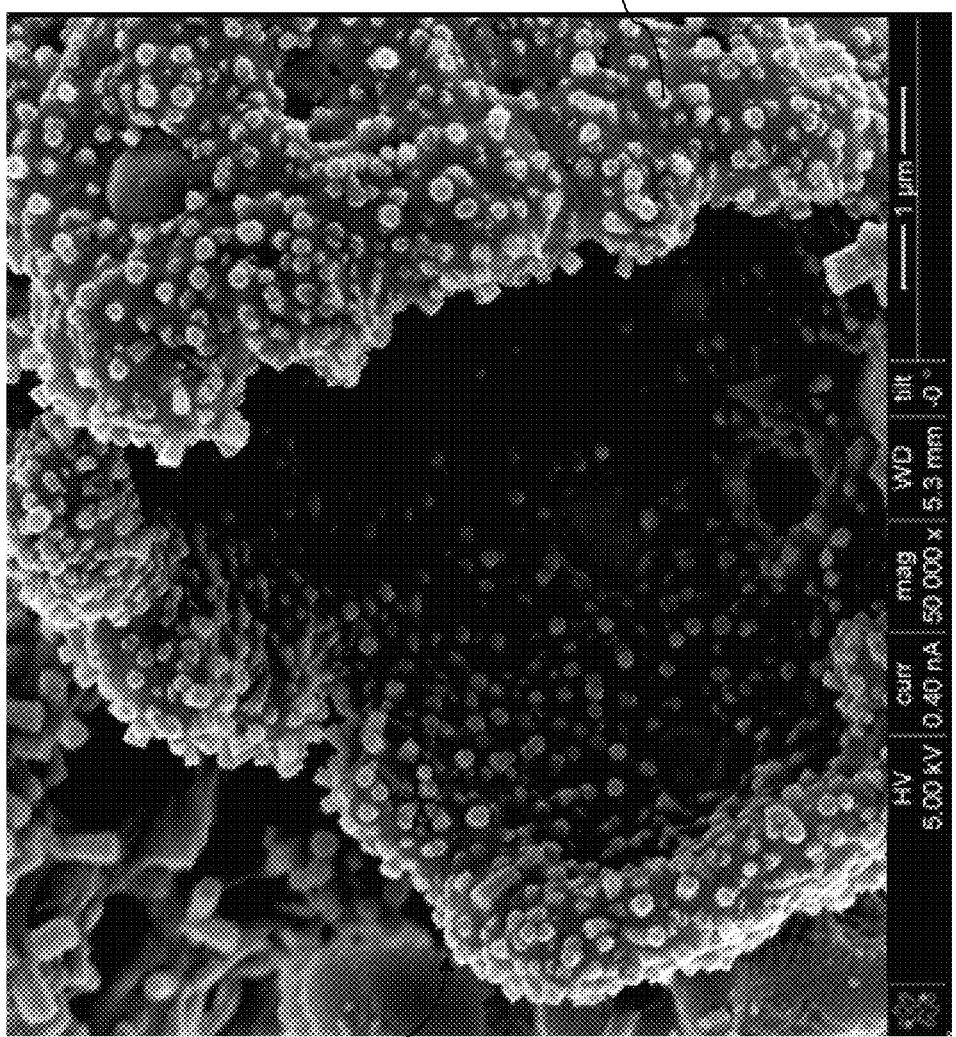
Figure 5J:
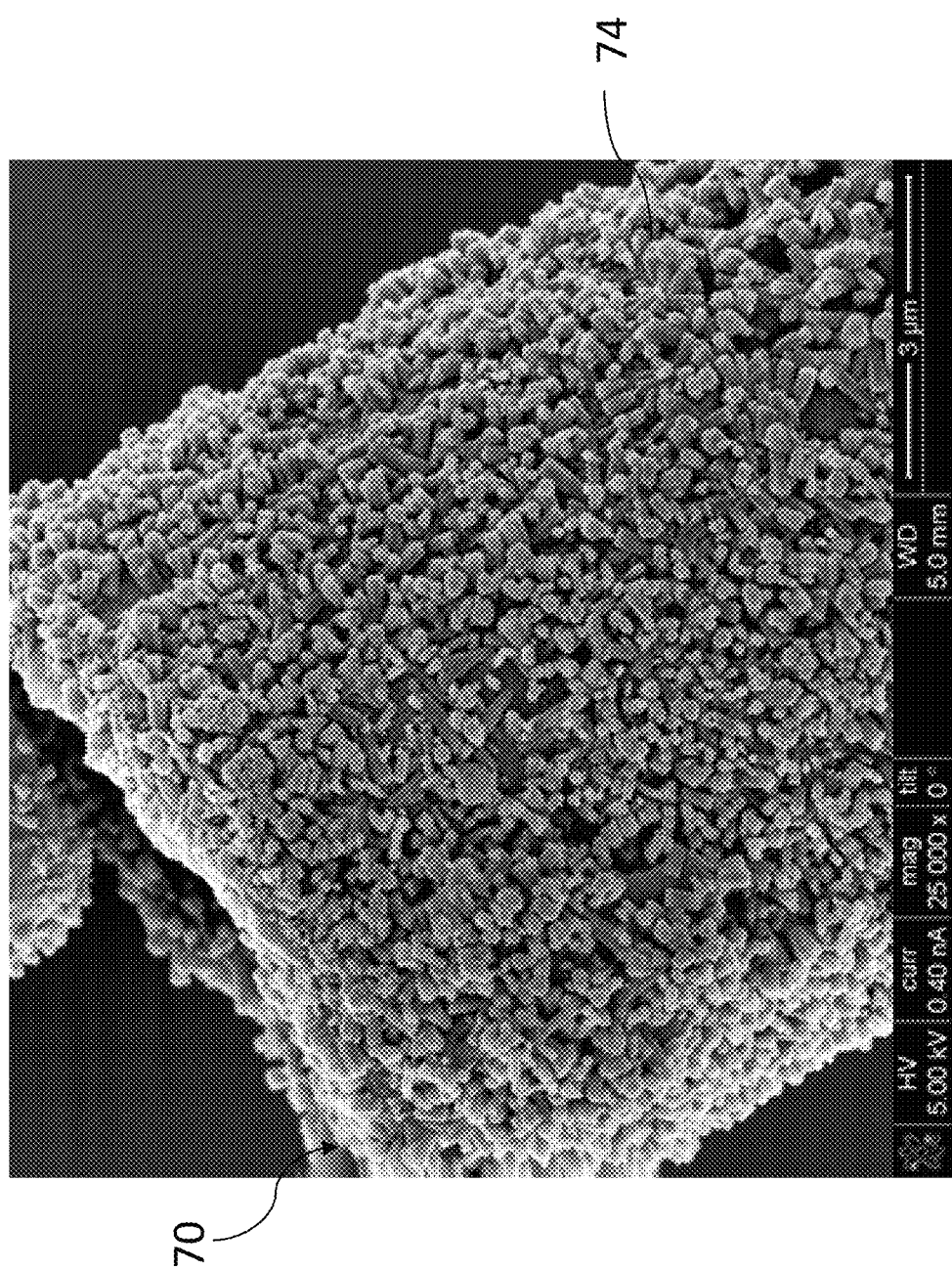
FIG. 5J shows a SEM image, at 25 k× magnification, of a frustule surface having zinc-oxide nanowires formed thereon.
Figure 5K:
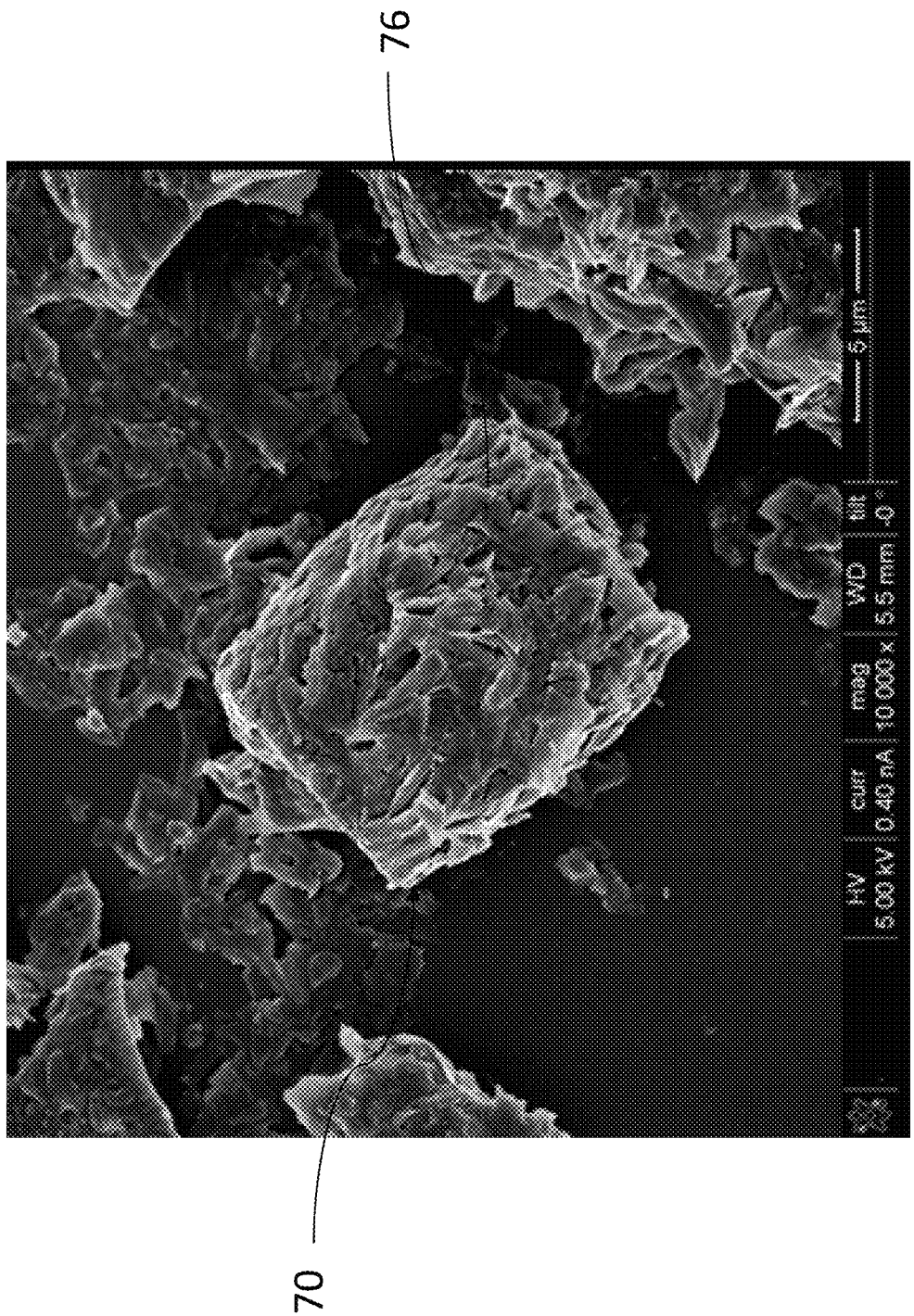
FIG. 5K shows a SEM image, at 10 k× magnification, of a frustule surface having zinc-oxide nanoplates formed thereon.
Figure 5L:
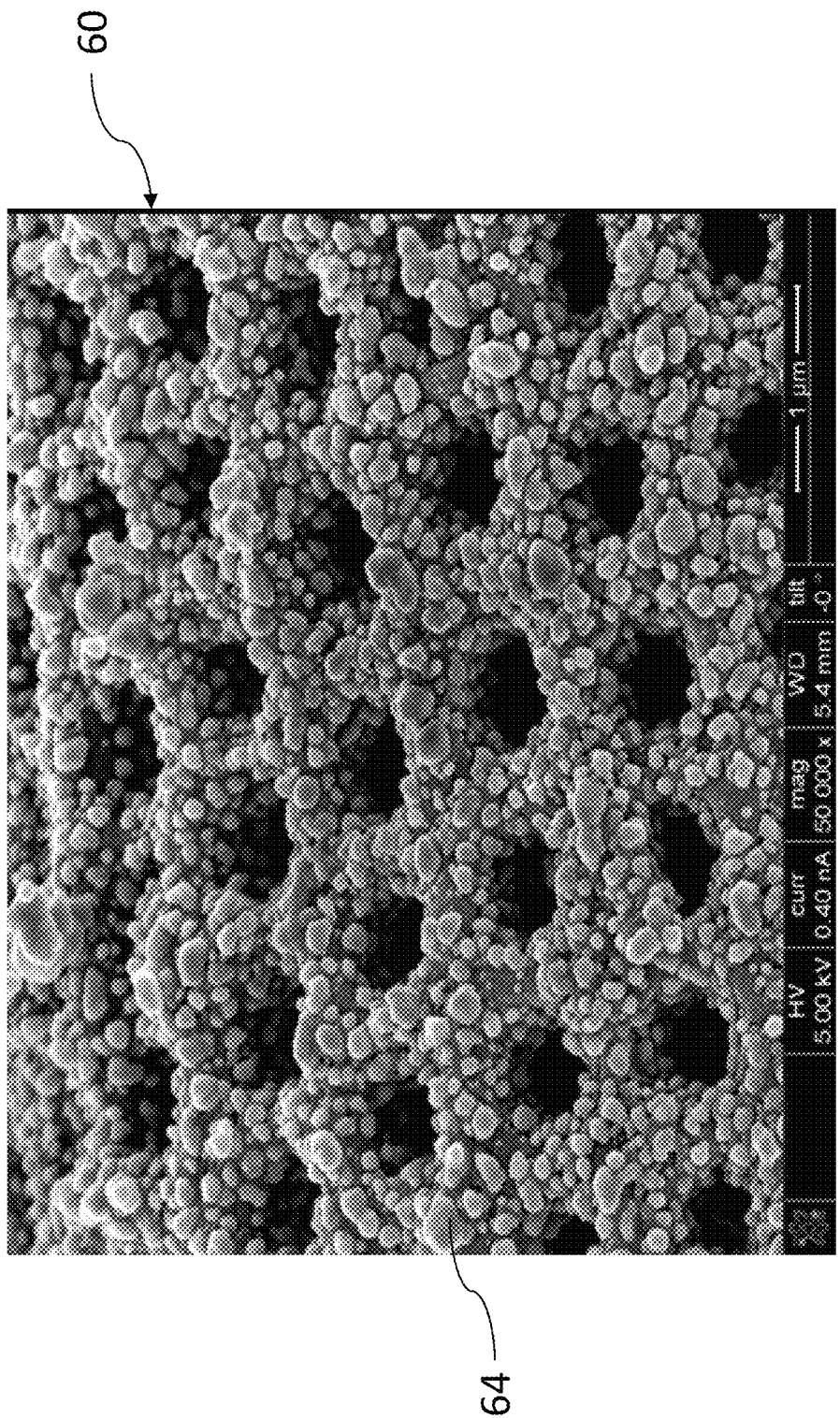
FIG. 5L shows a SEM image, at 50 k× magnification, of a frustule surface having silver nanostructures formed thereon.

FIGS. 5D and 5E show SEM images of an example where silver nanostructures 64 have formed on a surface of diatom frustule 60. FIGS. 5D and 5E show a frustule 60 having a thick nanostructured coating with high surface area. FIG. 5D is a SEM image of the frustule surface at 20 k× magnification, while FIG. 5E shows a SEM image of the frustule surface at 150 k× times magnification. FIG. 5L is another SEM image, at 50 k× magnification, of the diatom frustule 60 having silver nanostructures 64 on a surface. The thick nanostructured coating of diatom frustule 60 can be seen in FIG. 5L.

Examples of suitable reducing agents for Ag growth include common reducing agents used for silver electroless deposition. Some suitable reducing agents for silver electroless deposition include hydrazine, formaldehyde, glucose, sodium tartrate, oxalic acid, formic acid, ascorbic acid, ethylene glycol, combinations thereof, and/or the like.

Examples of suitable $Ag^+$ salts and oxides include silver salts. The most commonly used silver salts are soluble in water (e.g., $AgNO_3$). Suitable silver salts may include an ammonium solution of $AgNO_3$ (e.g., $Ag(NH_3)_2NO_3$). In some embodiments, any silver (I) salt or oxide can be used (e.g., soluble and/or not soluble in water). For example, silver oxide ($Ag_2O$), silver chloride (AgCl), silver cyanide (AgCN), silver tetrafluoroborate, silver hexafluorophosphate, silver ethylsulphate, combinations thereof, and/or the like, may also be suitable.

Suitable solvents may include: water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, dimethyl adipate, proplyene glycol monomethyl ether acetate, dimethyl glutarate, dimethyl succinate, glycerin acetate, carboxylates; carbonates such as propylene carbonate; polyols (or liquid polyols), glycerols and other polymeric polyols or glycols such as glycerin, diol, triol, tetraol, pentaol, ethylene glycols, diethylene glycols, polyethylene glycols, propylene glycols, dipropylene glycols, glycol ethers, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride, combinations thereof, and/or the like.

In some embodiments, a solvent can also act as a reducing agent.

Example Method of Fabricating A Low-Cost UV-Curable Silver-Diatom Conductive Ink Thermally curable silver flake and silver nanoparticle conductive inks are available from a variety of manufacturers such as Henkel Corp., Spraylat Corp., Conductive Compounds, Inc., DuPont, Inc., Creative Materials Corp., et al. A much less common product is a silver conductive ink curable with ultraviolet (UV) light. Only a few suppliers, (e.g., Henkel Corp.) have such inks in their product offerings. UV-curable silver conductive inks often can be very costly because of the high silver loading, and high cost per square meter relative to the conductivity. The conductivities can be as much as 5 to 10 times lower than thermally cured silver conductive inks applied at the same wet film thickness.

There is clearly a need for a low-cost UV-curable silver with at least the same or better conductivity than the currently available UV-curable inks. Some UV-curable silvers may not take full advantage of the volume of silver present in the ink, so there is a need to develop a silver ink using much less silver that has similar or better conductivity and/or curability than current UV-curable silver inks.

A difficulty with developing UV-curable silvers may be due to the UV absorption properties of silver. In thermally-cured silver inks, silver flakes having a high aspect ratio may be used to produce the highest conductivity by maximizing the inter-flake contact area. If this type of silver flake is mixed with a UV-curable resin system appropriate for a conductive ink, applied to a surface using printing or other coating processes, and then exposed to UV light, most of the UV light may be absorbed by the silver before the UV light can scatter through the wet layer of silver ink. UV absorption by silver flakes can impede or prevent UV light-initiated polymerization from occurring in the wet ink film (e.g., impeding or preventing UV light-initiated polymerization of the wet ink beyond a certain depth). Reduced polymerization of the ink film may result in an incompletely cured layer of silver ink that may not adhere to the substrate, for example due to the bottom-most portions of the silver ink layer being uncured and wet. Lower aspect-ratio silver particles may be used in UV-curable silver inks to obtain suitable curing throughout the applied layer of silver ink by increasing the number of possible light scattering paths through the applied layer of silver ink. The low aspect-ratio particles have decreased surface area, which may reduce inter-flake contact area, and in turn may reduce conductivity of the cured film relative to what would be possible if a high aspect-ratio flake was used. If this curing problem could be solved, larger aspect ratio silver flake with higher conductivity could be used in the silver ink, which may improve conductivity of the resulting silver film and/or reduce the amount of silver used to achieve a high conductivity.

In some embodiments, a non-conducting substrate (e.g., a diatom frustule portion, such a diatom frustule flake) can be plated with silver. UV light may pass through the perforations on one or more surfaces of the body of the diatom frustule flake. Using the silver plated diatom flake in the silver ink may facilitate curing of the silver ink, enabling the use of high aspect ratio flakes in the silver ink. In some embodiments, a silver ink comprising silver plated diatom frustules may enable increased conductivity of the cured silver ink while, at the same time, reducing the cost of the ink.

In some embodiments, the portions of diatom frustules (e.g., broken diatom frustules) used in the silver ink can be purified and separated from the intact diatom particles, and one or more surfaces of the portions of diatom frustules may be electrolessly coated with silver, for example according to methods described herein.

A diatom surface may be perforated by a regular pattern of holes or openings (e.g., including holes approximately 300 nm in diameter), even when coated with silver. The openings may be large enough to allow UV wavelengths to scatter through the silver coated diatom particles. Broken diatoms coated with silver may comprise shards in the form of high aspect-ratio perforated flakes. FIG. 5F shows a SEM image of a broken piece of diatom frustule (e.g., a diatom frustule flake 60A) coated with Ag nanostructures (e.g., silver nanostructures 64).

In some embodiments, a silver coated perforated diatom flake can be used for making a UV-silver ink which can be cured when a moderately thickly ink is used (e.g., a silver ink having a thickness of about 5 µm to about 15 µm), even though the conductive particles have high aspect-ratios and therefore large surface areas. Large surface areas of the frustule flake may create excellent inter-flake conductivity by increasing the number of inter-flake electrical contacts, resulting in a highly conductive ink that uses substantially only as much silver as is needed to achieve the desired sheet conductivity, with the rest of the volume taken up by the inexpensive diatom filler material and UV binder resin.

The silver nanostructure may cover substantially all surfaces of the frustules, including the inner surfaces of the frustule perforations, but without blocking the perforations (e.g., one or more surfaces of the perforations and frustule surfaces may be plated with silver nanostructures and/or a silver seed layer). The perforations in the Ag coated diatom flakes may allow UV radiation to pass through the diatom flakes, facilitating curing to a deep depth within the applied silver ink films while allowing current to be conducted directly from one side of the flake to the other through the perforations. A reduction in the length of the conduction pathways through the flake may reduce the overall resistance of the cured film made from the silver ink.

An example UV light-induced polymerizable ink formulation may include components from the following list. In some embodiments, a silver ink having diatom frustule flakes can be fabricated by combining components listed below, including, for example, combining a plurality of frustule portions (e.g., frustule flakes) having silver nanostructures formed on one or more surfaces with one or more other silver ink components listed below. A silver film may be fabricated by curing the silver ink with a UV light source.

1) Diatoms, any of a variety of species, plated (e.g., having nanostructure formed thereon) with between about 10 nm and about 500 nm thick Ag coating. A thickness of the Ag coating may depend on a pore size of the diatom perforations. Ratios in the formulation may be between about 50% and about 80% by weight. An example diatom species whose fragments can be used is Aulacoseira sp. 1.

2) A polar vinyl monomer with good affinity for silver, such as n-vinyl-pyrrolidone or n-vinylcaprolactam.

3) An acrylate oligomer with good elongation properties as a rheology modifier and to improve flexibility in the cured film.

4) One or more difunctional or trifunctional acrylate monomers or oligomers as crosslinking agents to produce a tougher, more solvent resistant cured film through increased cross-linking. These materials may be chosen to function as photoinitiation synergists, which may improve surface curing. Examples may include ethoxylated or propoxylated hexanediol acrylates such as Sartomer CD560®, ethoxylated trimethylpropane triacrylate available, for example from Sartomer under the product code SR454®, or triallyl cyanurate available, for example from Sartomer under the product code SR507A®. Acrylated amine synergists may be an option, and examples may include Sartomer CN371® and Sartomer CN373®.

5) An acrylate-based flow and level agent to reduce bubbling and improve wet ink quality (e.g., suitable flow and level agents may include Modaflow 2100®, Modaflow 9200®). Improved wet ink quality may, in turn, improve cured silver ink film quality.

6) One or more photoinitiators appropriate for pigment loaded ink systems. In some embodiments, at least one of the photoinitatiors is sensitive to wavelengths near to or smaller than the silver plated diatom flake's average pore size so that UV photons may pass through the pore in order to initiate polymerization underneath the flake and/or scatter through a perforation in another silver plated diatom flake to penetrate even deeper into the uncured film to initiate polymerization there. Examples of photoinitiators can include Ciba Irgacure 907® and Isopropyl thioxothanone (ITX, available from Lambson, UK under the tradename Speedcure ITV)).

7) An optional adhesion promoting acrylate (e.g., 2-carboxyethyl acrylate).

8) A optional wetting agent to lower surface tension and improve flake wetting (e.g., DuPont Capstone FS-30® and DuPont Capstone FS-31®).

9) An optional UV stabilizer to suppress premature polymerization triggered by the presence of silver metal (e.g., hydroquinone and methyl ethyl hydroquinone (MEHQ)).

10) An optional low boiling point solvent for lowering viscosity to facilitate the silver ink formulation being used in high speed coating processes, including processes such flexographic printing, gravure printing, combinations thereof, and/or the like.

In some embodiments, a silver ink comprising diatom frustule portions can be thermally cured. In some embodiments, the silver ink can be exposed to a heat source. For example, the silver ink may be heated to facilitate a polymerization reaction between polymer components of the silver ink. In some embodiments, thermal curing of the silver ink can facilitate removal of a solvent component. For example, the silver ink can be exposed to a heat source to raise a temperature of the silver ink above a boiling point of the silver ink solvent component to facilitate removal of the solvent component.

Example Processes of Forming Zinc-Oxide (ZnO) Nanostructures on Surfaces of Diatom Frustules Generally, the ZnO seeds on a substrate can be deposited using spray or spin coating of colloidal ZnO or with thermal decomposition of zinc salts solutions. For example, thermal decomposition of zinc acetate precursor can give vertically well-aligned ZnO nanowires.

Growth of ZnO nanostructures from seeds may be realized by the hydrolysis of Zn salts in a basic solution. The process can be performed at room temperature or at higher temperatures. Microwave heating can significantly accelerate growth of nanostructures. Depending on growth parameters, different nanostructures were observed (e.g., morphology of the nanostructures can depend on one or more growth conditions during forming of the nanostructures on the seed layer, including for example a growth temperature, a pattern of heating, inclusion of a chemical additive during the nanostructure growth, and/or combinations thereof). For example, a chemical additive may be used to achieve a desired morphology of nanostructures. ZnO nanostructures also can be doped to control their semiconducting properties.

Example Processes for Growing ZnO Seeds on Surfaces of Diatom Frustules

1. Building seeds of ZnO can be realized by heating a mixture of 0.1 g of purified diatoms and 10 mL of 0.005 M zinc acetate ($Zn(CH_3COO)_2$) (e.g., a zinc contributing component) in ethanol to about 200° C. (e.g., including from about 175° C. to about 225° C.) until dry. SEM images, each at 100 k× magnification, of a ZnO seeded frustule surface are shown in FIGS. 5G and 5H. FIGS. 5G and 5H show SEM images of seeds 72 comprising ZnO formed on a surface of a frustule 70. FIG. 5G shows a SEM image, at 100 k× magnification, of a frustule surface having seeds 72 comprising zinc-oxide. FIG. 5H shows a SEM image, at 100 k× magnification, of a frustule surface having seeds 72 comprising zinc-oxide.

In some embodiments, a process of seeding frustule surfaces with ZnO comprises forming a mixture comprising the following composition: about 2 weight % to about 5 weight % frustules, about 0.1 weight % to about 0.5 weight % of zinc salt (e.g., $Zn(CH_3COO)_2$), and about 94.5 weight % to about 97.9 weight % of an alcohol (e.g., ethanol). In some embodiments, forming the ZnO seeds on the frustule surfaces comprises heating the mixture. The mixture may be heated to a desired temperature for a period of time to facilitate formation of ZnO seeds on surfaces of the frustules and removal of liquids from the mixture. Heating may be performed using any number of heating apparatuses capable of heating the mixture to the desired temperature for the desired period of time, such as a hot plate. In some embodiments, the mixture can be heated to a temperature of greater than about 80° C. to facilitate formation of ZnO seeds on the frustule surfaces and to dry the ZnO seeded frustules. In some embodiments, the heated mixture may be further heated in a vacuum oven to facilitate further removal of liquids. For example, the mixture may be heated in a vacuum oven at a pressure of about 1 millibar (mbar) and at a temperature of about 50° C. to about 100° C.

In some embodiments, the dried frustules can be subjected to an annealing process. In some embodiments, the annealing process can be configured to facilitate desired formation of ZnO, for example by facilitating decomposition of the zinc salt to form ZnO. In some embodiments, conditions of the annealing process can be configured to achieve further drying of the frustules, such as by evaporation of any remaining liquids from the frustules. In some embodiments, the annealing process can comprise heating the dried frustules in an inert atmosphere at a temperature of about 200° C. to about 500° C. In some embodiments, the annealing process can include heating in an atmosphere comprising argon gas (Ar) and/or nitrogen gas ($N_2$).

Figure 5M:
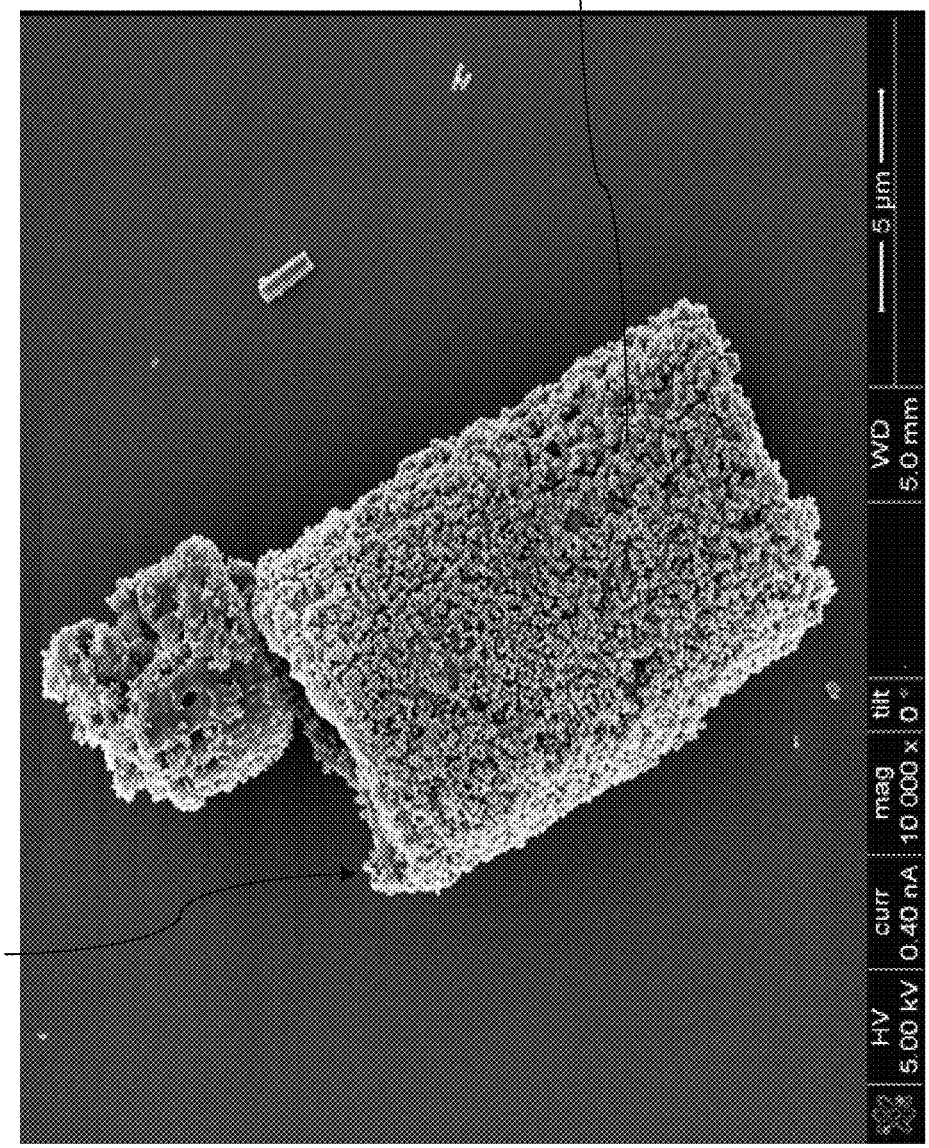
FIG. 5M shows a SEM image, at 10 k× magnification, of a frustule surface having zinc-oxide nanowires formed thereon.
Figure 5N:
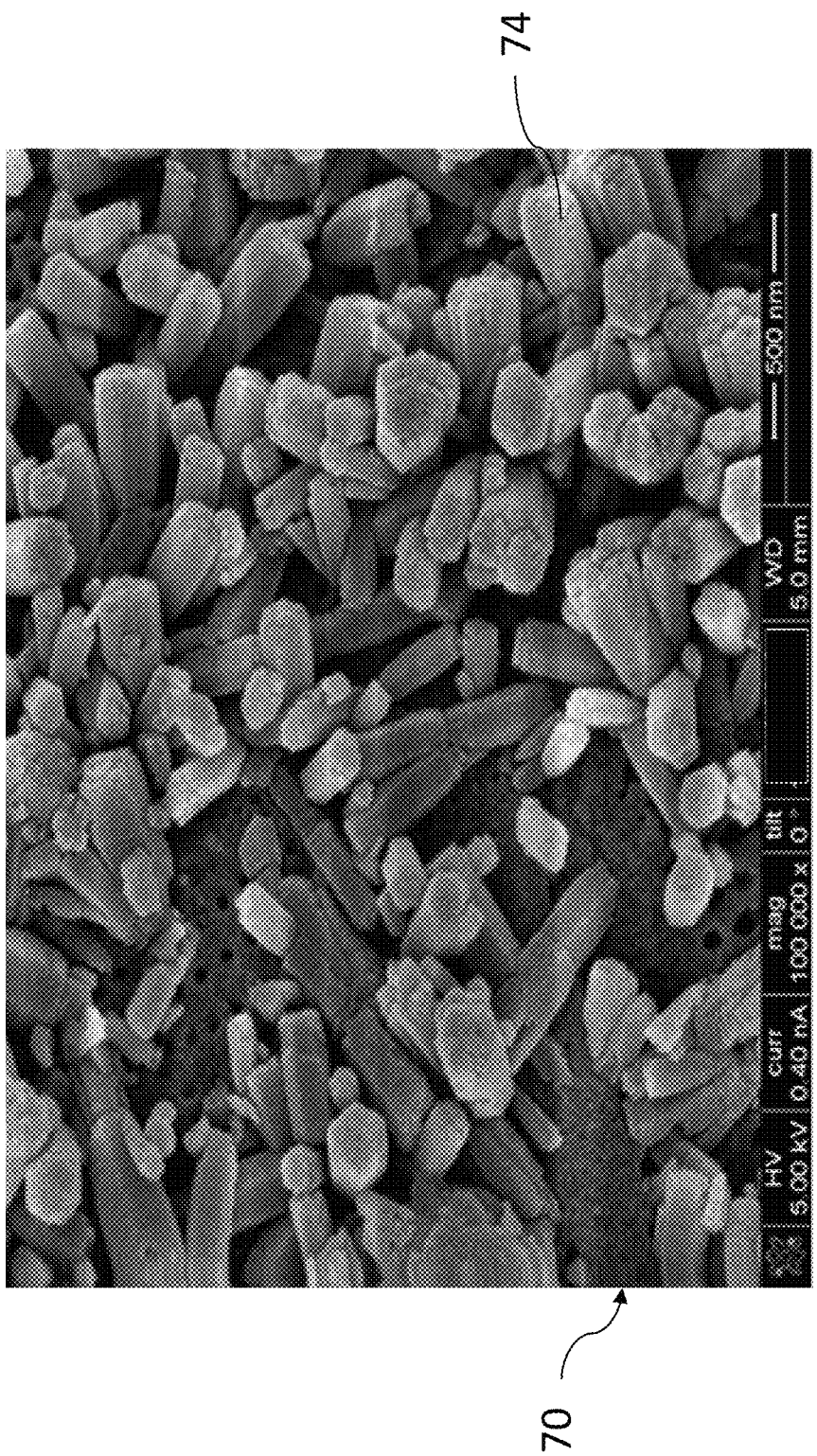
FIG. 5N shows a SEM image, at 100 k× magnification, of a frustule surface having zinc-oxide nanowires formed thereon.
Figure 50:
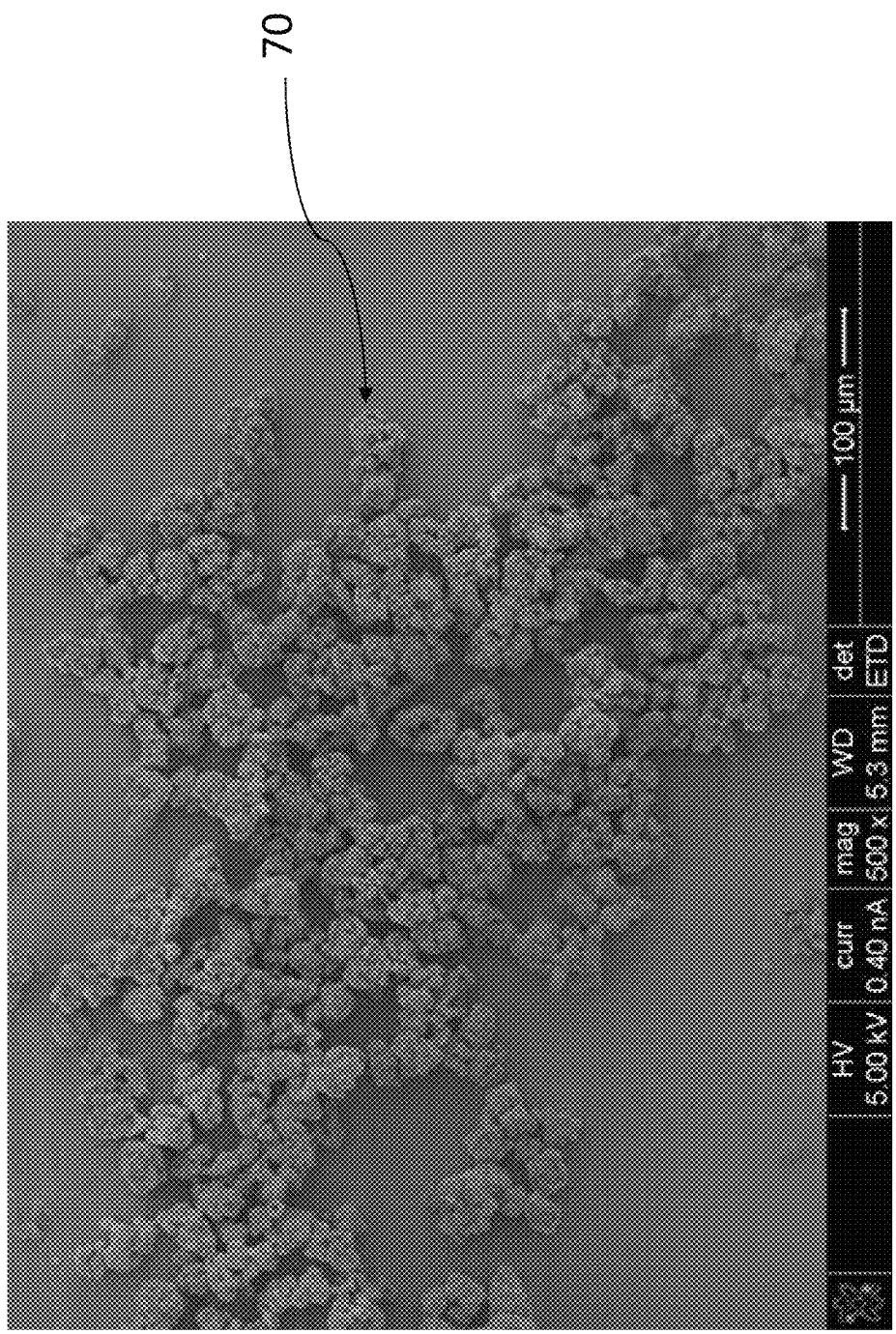

Example Processes for Growing ZnO Nanostructures on ZnO Seeded Surfaces of Diatom Frustules 2. As described herein, ZnO nanostructures can be grown on the ZnO seeds formed on frustule surfaces. In some embodiments, ZnO nanostructure growth can be conducted in mixture of 0.1 g seeded frustules with 10 mL of 0.025 M $ZnNO_3$ (e.g., a zinc contributing component) and 0.025 M hexamethylenetetramine solution (e.g., a basic solution) in water. The mixture can be heated to about 90° C. (e.g., including from about 80° C. to about 100° C.) for about two hours (e.g., including from about one hour to about three hours) on a stir plate, or by using a cyclic heating routine (e.g., microwave heating) for a duration of about 10 min (e.g., including for a duration of about 5 minutes to about 30 minutes) where the sample is heated by about 500 Watt of power (e.g., including from about 480 Watt to about 520 Watt) for about 2 min (e.g., including about 30 seconds to about 5 minutes, about 1 minute to about 5 minutes, about 5 minutes to about 20 minutes) and then heating can be turned off for about 1 min (e.g., including from about 30 seconds to about 5 minutes) before repeating the heating at 500 Watt. The resulting nanowires 74 on the inside and outside surfaces of a frustule 70 using the above-described process are shown in FIGS. 5I and 5J. FIG. 5I shows a SEM image, at 50 k× magnification, of ZnO nanowires 74 formed on both inside surfaces and outside surfaces of a diatom frustule 70. In some embodiments, ZnO nanowires 74 can be formed on a portion of a surface on an interior of a diatom frustule 70. For example, ZnO nanowires 74 may be formed on all or substantially all surfaces on an interior of a diatom frustule 70. ZnO nanowires 74 may be formed on all or substantially all interior and exterior surfaces of a diatom frustule 70. The drawings of this application provide proof that growth of nanostructures (e.g., ZnO nanowires) on diatom frustules is possible, including growth of nanostructures (e.g., ZnO nanowires) on the inside of diatom frustules. Coating all or substantially all sides of the diatom frustules with ZnO nanostructures may provide increased conductivity of a material (e.g., ink or a layer printed therefrom) comprising the ZnO nanostructure-coated diatom frustules (e.g., an increased bulk conductivity and/or sheet conductivity), for example in comparison to materials (e.g., ink or a layer printed therefrom) comprising ZnO nanostructures formed only on the outside of a substrate. FIG. 5J shows a SEM image, at 25 k× magnification, of ZnO nanowires 74 formed on surfaces of a diatom frustule 70. FIGS. 5M and 5N are additional SEM images of diatom frustule 70 having ZnO nanowires 74 on one or more surfaces. FIG. 5M is a SEM image of diatom frustule 70 at 10 k× magnification. FIG. 5N is a SEM image of diatom frustule 70 at 100 k× magnification. The polyhedral, polygonal cross-section, and rod-like structure of the ZnO nanowires 74 and their attachment to the surface of the frustule 70 can be more clearly seen in FIG. 5N. When the heating was performed in a microwave at 100 Watt (e.g., including from about 80 Watt to about 120 Watt; and at about 2 min on, then about 1 min off, and repeated for a total duration of about 10 min), nanoplates 76 can be formed on a surface of the frustules 70 (e.g., as shown in FIG. 5K).

In some embodiments, a process for forming ZnO nanostructures on one or more surfaces of frustules seeded with ZnO comprises forming a mixture comprising the following composition: about 1 weight % to about 5 weight % seeded frustules, about 6 weight % to about 10 weight % zinc salt (e.g., $Zn(NO_3)_2$), about 1 weight % to about 2 weight % of a base (e.g., ammonium hydroxide ($NH_4OH$)), about 1 weight % to about 5 weight % of an additive (e.g., hexamethylenetetramine (HMTA)), and about 78 weight % to about 91 weight % purified water. In some embodiments, forming the ZnO nanostructures comprises heating the mixture. The mixture may be heated using microwave. For example, the mixture may be heated in a microwave device to a temperature of about 100° C. to about 250° C. for about 30 minutes (min) to about 60 min (e.g., in a Monowave 300 for a smaller scale synthesis, such as for a mixture about 10 mL to about 30 mL, or a Masterwave BTR for a larger scale synthesis, such as for about a 1 liter (L) mixture, both commercially available from Anton Paar® GmbH). In some embodiments, the mixture may be stirred while being heated by the microwave. For example, the mixture may be stirred during heating by a magnetic stirrer at about 200 rotations per minute (RPM) to about 1000 RPM. Use of microwave heating may advantageously facilitate reduced duration of heating, providing a more efficient fabrication process.

In some embodiments, a frustule comprising ZnO nanostructures formed thereon comprises about 5 weight % to about 95 weight % of the ZnO, including about 10 weight % to about 95 weight %, about 20 weight % to about 95 weight %, about 30 weight % to about 95 weight %, about 40 weight % to about 95 weight %, or about 50 weight % to about 95 weight %, the remaining mass being the frustule. In some embodiments, a frustule comprising ZnO nanostructures formed thereon comprises about 5 weight % to about 95 weight % of the frustule, the remaining mass being the ZnO. In some embodiments, a frustule comprising ZnO nanostructures formed thereon comprises about 40 weight % to about 50 weight % of the frustule, the remaining mass being the ZnO. In some embodiments, a frustule comprising ZnO nanostructures formed thereon comprises about 50 weight % to about 60 weight % of the ZnO, the remaining mass being the ZnO. In some embodiments, a mass of the ZnO to a mass of the frustule can be about 1:20 to about 20:1, including about 1:15 to about 20:1, about 1:10 to about 20:1, about 1:1 to about 20:1, about 2:1 to about 10:1, or about 2:1 to about 9:1. The ZnO nanostructures preferably have a mass greater than a mass of the frustules prior to coating. In some embodiments, the mass of the ZnO nanostructures to the mass of the frustule can be greater than about 1:1, about 10:1, or about 20:1. In certain such embodiments, an upper limit may be based on, for example, openness of pores of the frustules (e.g., ZnO nanostructures not completely occluding the pores).

In some embodiments, a mass of the ZnO to a mass of the frustule can be about 1:20 to about 100:1, including about 1:1 to about 100:1, about 10:1 to about 100:1, about 20:1 to about 100:1, about 40:1 to about 100:1, about 60:1 to about 100:1, or about 80:1 to about 100:1. In some embodiments, the mass of the ZnO nanostructures to the mass of the frustule can be greater than about 30:1, about 40:1, about 50:1, about 60:1, about 70:1, about 80:1 or about 90:1. In some embodiments, a mass of the ZnO nanostructures to a mass of the frustule can be selected to provide desired device performance.

In some embodiments, pores of the frustules may be occluded by the nanostructures. For example, ZnO nanostructures may be formed on surfaces of the frustules, including surfaces within pores of the frustules, such that the ZnO nanostructures may occlude or substantially occlude some or all of the pores of the frustules.

The mass of the ZnO nanostructures may be determined by weighing the frustules before and after coating with the difference being the mass of the ZnO nanostructures. In some embodiments, the composition of the mixture for forming ZnO nanostructures can be selected such that ZnO covered frustules comprising a desired ZnO weight % can be formed. In some embodiments, the weight % of ZnO on frustule surfaces can be selected based on a desired mass of electrode active material on an opposing energy storage device electrode. For example, the composition of the mixture for forming the ZnO nanostructures can be selected based on the mass of an oxide of manganese in an opposing energy storage electrode, such as the mass of one or more of $MnO$, $Mn_2O_3$, $Mn_3O_4$ and $MnOOH$. For example, based on stoichiometric calculations, a mass of $Mn_2O_3$ in an energy storage device electrode can be at least about 2.5 times that of ZnO in an opposing electrode.

Figure 5P:
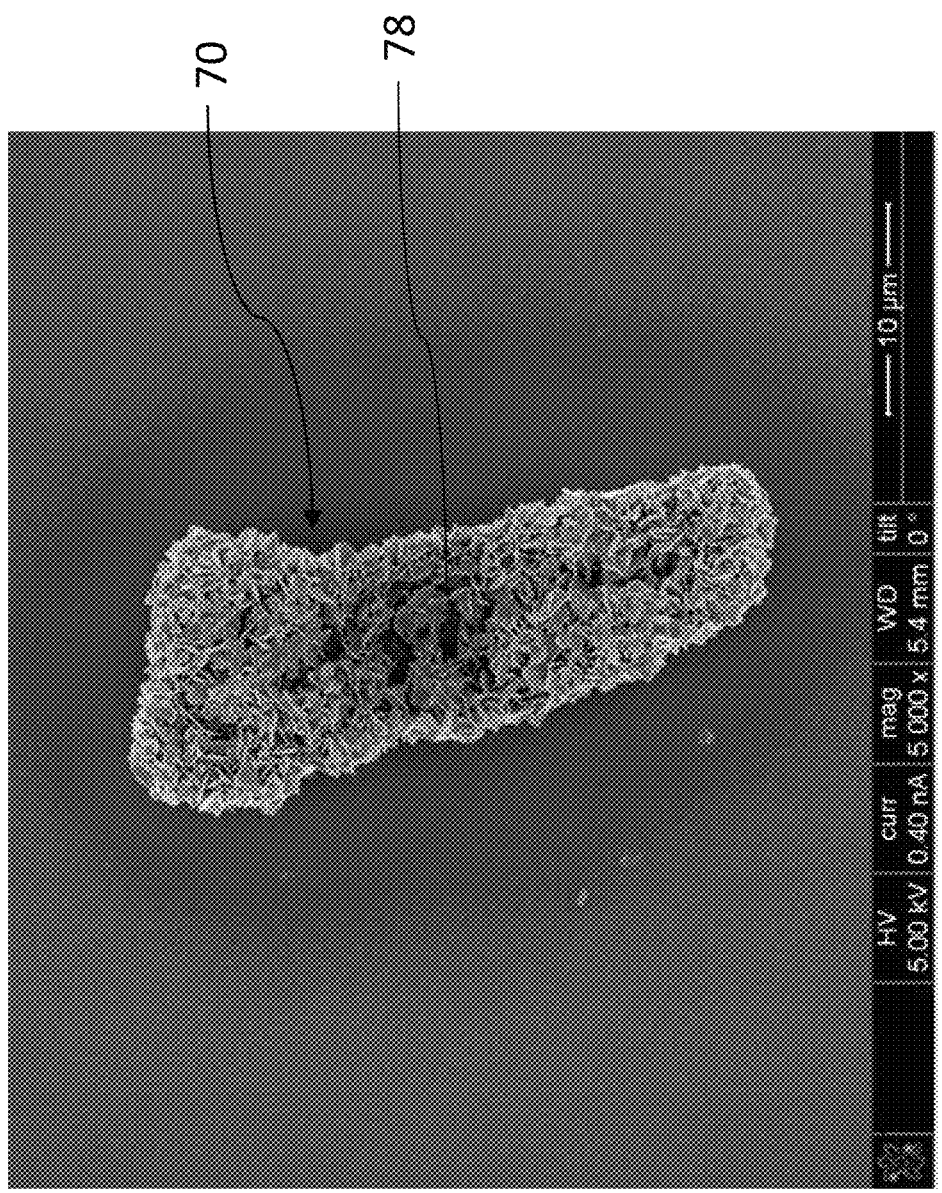
FIG. 5P shows a SEM image, at 5 k× magnification, of a frustule having zinc oxide nanostructures formed thereon.

Referring to FIG. 5O, a SEM image at 500× magnification of a plurality of frustules 70 having ZnO nanostructures formed thereon is shown. The frustules 70 covered with ZnO nanostructures were first seeded with ZnO using a mixture consisting essentially of about 2 weight % to about 5 weight % frustules, about 0.1 weight % to about 0.5 weight % $Zn(CH_3COO)_2$, and about 94.5 weight % to about 97.9 weight % ethanol. The mixture for forming ZnO seeded frustules was heated to a temperature greater than about 80° C. for a duration to form the ZnO seeded frustules and achieve desired drying of the ZnO seeded frustules. Subsequently, ZnO nanostructures were formed on the ZnO seeded frustules using a mixture consisting essentially of about 1 weight % to about 5 weight % ZnO seeded frustules, about 6 weight % to about 10 weight % $Zn(NO_3)_2$, about 1 weight % to about 2 weight % ammonium hydroxide ($NH_4OH$), about 1 weight % to about 5 weight % hexamethylenetetramine (HMTA), and about 78 weight % to about 91 weight % purified water. The mixture was heated using microwave to a temperature of about 100° C. to about 250° C. for about 30 minutes (min) to about 60 min to facilitate formation of the ZnO nanostructures and drying of the frustules. As shown in FIG. 5O, unexpectedly, the plurality of frustules 70 having ZnO nanostructures formed thereon did not or substantially did not agglomerate. Each frustule 70 was individually covered or substantially covered by ZnO nanostructures. Each of the frustules 70 having ZnO nanostructures formed thereon shown in FIG. 5O included about 50% to about 60% by weight of ZnO. FIG. 5P shows a SEM image at 5 k× magnification of an individual frustule 70 having ZnO nanostructures formed thereon. The ZnO nanostructures on the frustule 70 of FIG. 5P were formed using the process described with reference to FIG. 5O. As shown in FIG. 5P, the frustule 70 is covered by ZnO nanoflakes 78. As shown in FIG. 5P, the frustule 70 comprising ZnO nanoflakes 78 formed thereon is porous. For example, the ZnO nanoflakes 78 did not occlude pores of the frustules 70, advantageously facilitating transport of electrolyte through an electrode comprising the frustules 70 having the ZnO nanoflakes 78 formed thereon.

Examples of suitable Zn salts which can be used for both ZnO seeding and nanostructures growth include: zinc acetate hydrate, zinc nitrate hexahydrate, zinc chloride, zinc sulfate, sodium zincate, combinations thereof, and/or the like.

Examples of suitable bases for ZnO nanostructures growth may include: sodium hydroxide, ammonium hydroxide, potassium hydroxide, teramethylammonium hydroxide, lithium hydroxide, hexamethylenetetramine, ammonia solutions, sodium carbonate, ethylenediamine, combinations thereof, and/or the like.

Examples of suitable solvents for formation of ZnO nanostructures include one or more alcohols. Solvents described herein as being suitable for Ag nanostructures growth may also be suitable for ZnO nanostructure formation.

Examples of additives that may be used for nanostructures morphology control may include tributylamine, triethylamine, triethanolamine, diisopropylamine, ammonium phosphate, 1,6-hexadianol, triethyldiethylnol, isopropylamine, cyclohexylamine, n-butylamine, ammonium chloride, hexamethylenetetramine, ethylene glycol, ethanoamine, polyvinylalcohol, polyethylene glycol, sodium dodecyl sulphate, cetyltrimethyl ammonium bromide, carbamide, combinations thereof, and/or the like.

Example Process of Forming Carbon Nanotubes on a Surface of A Diatom Frustule Carbon nanotubes (e.g., multiwall and/or single-wall) can be grown on a diatom surface (e.g., inside and/or outside) by chemical vapor deposition technique and its varieties. In this technique, the diatoms are firstly coated with catalyst seeds and then a mixture of gases is introduced. One of the gases may be a reducing gas and another gas may be a source of carbon. In some embodiments, a mixture of gases may be used. In some embodiments, a neutral gas can be included for the concentration control (e.g., argon). Argon may also be used to carry liquid carbonaceous material (e.g., ethanol). The seeds for forming a carbon nanotube can be deposited as metals by such techniques as spray coating and/or introduced from a liquid, a gas, and/or a solid and reduced later under elevated temperatures by pyrolysis. The reduction of carbonaceous gases may occur at higher temperatures, for example in a range of about 600° C. to about 1100° C.

Both the seed coating process and gas reactions can be realized on frustules surfaces due to nanoporosity. Techniques have been developed for carbon nanotubes "forest" growth on different substrates including silicon, alumina, magnesium oxide, quartz, graphite, silicon carbide, zeolite, metals, and silica.

Examples of suitable metal compounds for growth of catalyst seeds can include nickel, iron, cobalt, cobalt-molibdenium bimetallic particles, copper (Cu), gold (Au), Ag, platinum (Pt), palladium (Pd), manganese (Mn), aluminum (Al), magnesium (Mg), chromium (Cr), antimony (Sn), aluminum-iron-molybdenum (Al/Fe/Mo), Iron pentacarbonyl ($Fe(CO)_5$), iron (III) nitrate hexahydrate ($Fe(NO_3)_3 \cdot 6H_2O$), iron (III) nitrate hexahydrate ($CoCl_2 \cdot 6H_2O$) ammonium molybdate tetrahydrate (($NH_4)_6Mo_7O_{24} \cdot 4H_2O$), ammonium molybdate tetrahydrate (($NH_4)_6Mo_7O_{24} \cdot 4H_2O$) ($MoO_2Cl_2$) alumina nanopowder, mixtures thereof, and/or the like.

Examples of suitable reducing gases may include ammonia, nitrogen, hydrogen, mixtures thereof, and/or the like.

Examples of suitable gases which may serve as a source of carbon (e.g., carbonaceous gases) may include acetylene, ethylene, ethanol, methane, carbon oxide, benzene, mixtures thereof, and/or the like.

Example Processes of Forming Manganese-Containing Nanostructures on Surfaces of Diatom Frustules In some embodiments, manganese-containing nanostructures can be formed on one or more surfaces of a frustule. In some embodiments, an oxide of manganese can be formed on one or more surfaces of a frustule. In some embodiments, nanostructures comprising oxide of manganese having the formula $MnO_xO_y$ where x is about 1 to about 3 and where y is about 1 to about 4, can be formed on one or more surfaces of a frustule. For example, nanostructures comprising manganese dioxide ($MnO_2$), manganese(II, III) oxide ($Mn_3O_4$), manganese(II) oxide (MnO), and/or manganese(III) oxide ($Mn_2O_3$) can be formed on one or more surfaces of a frustule. In some embodiments, nanostructures comprising manganese oxyhydroxide (MnOOH) can be formed on one or more surfaces of a frustule. In some embodiments, a membrane of an energy storage device can include frustules having manganese-containing nanostructures. In some embodiments, a printed energy storage device (e.g., a battery, a capacitor, a supercapacitor, and/or a fuel cell) can include one or more electrodes having a plurality of frustules which comprise manganese-containing nanostructures. In some embodiments, an ink used for printing a film can comprise a solution in which frustules comprising manganese-containing nanostructures are dispersed.

In some embodiments, one or more electrodes of a battery can include frustules comprising manganese-containing nanostructures on one or more surfaces (e.g., an electrode of a zinc-manganese battery). A charged battery can include a first electrode including frustules comprising nanostructures comprising manganese dioxide ($MnO_2$) and a second electrode comprising zinc (e.g., frustules comprising a zinc coating). In some embodiments, the second electrode can comprise other materials. A discharged battery can include a first electrode including frustules comprising nanostructures comprising manganese (II, III) oxide ($Mn_3O_4$), manganese (II) oxide (MnO), manganese(III) oxide ($Mn_2O_3$), and/or manganese oxyhydroxide (MnOOH) and a second electrode including zinc oxide (ZnO) (e.g., frustules comprising nanostructures comprising zinc oxide). In some embodiments, the second electrode of the discharged battery can comprise other materials. In some embodiments, a charged battery can include a first electrode comprising frustules having manganese(II, III) oxide ($Mn_3O_4$), manganese(II) oxide (MnO), manganese(III) oxide ($Mn_2O_3$), and/or manganese oxyhydroxide (MnOOH) nanostructures formed thereon and a second opposing electrode comprising ZnO nanostructures formed thereon. In some embodiments, the battery can be a rechargeable battery.

A method of forming manganese-containing nanostructures on a diatom frustule portion can include adding the frustules to an oxygenated manganese acetate solution, and heating the frustules and the oxygenated manganese acetate solution. An example of a process for forming $Mn_3O_4$ on one or more surfaces of a frustule is provided. For example, pure water (e.g., pure water commercially available from EMD Millipore Corporation, of Billerica, Mass.) can be bubbled with oxygen gas ($O_2$) for a duration of about 10 minutes (min) to about 60 min (e.g., $O_2$ purging) to form oxygenated water. Manganese(II) acetate ($Mn(CH_3COO)_2$) can then be dissolved in the oxygenated water at a concentration of about 0.05 moles/liter (M) to about 1.2 M to form an oxygenated manganese acetate solution.

Frustules can be added to the oxygenated manganese acetate solution. Frustules added to the oxygenated manganese acetate solution may not have any previously formed nanostructures and/or coatings on frustule surfaces. In some embodiments, frustules added to the oxygenated manganese acetate solution can have one or more nanostructures and/or coatings on frustule surfaces. In some embodiments, frustules added to the oxygenated manganese acetate solution can have one or more nanostructures and/or coatings on at least some portions of the frustule surfaces. For example, frustules may have carbon-containing nanostructures on portions of frustule surfaces such that manganese-containing nanostructures formed according to one or more processes as described herein can be interspersed amongst the carbon-containing nanostructures. In some embodiments, carbon-containing nanostructures can include reduced graphene oxide, carbon nanotubes (e.g., single wall and/or multi-wall), and/or carbon nano-onions. Carbon-containing nanostructures can be formed on frustule surfaces according to one or more processes as described herein or other processes.

In some embodiments, frustules can be added to the oxygenated manganese acetate solution such that the solution comprises about 0.01 weight % to about 1 weight % of frustules. In some embodiments, other $Mn^{2+}$ salts can be suitable. In some embodiments, other oxidizing agents (e.g., peroxides) can be suitable.

In some embodiments, growth of manganese-containing nanostructures can be conducted using a thermal technique and/or a microwave technique. In some embodiments, desired growth of nanostructures can involve a longer duration when using a thermal method. For example, a thermal technique may include using thermal heating in the nanostructure growth process. An example of a thermal method of growing nanostructures may include mixing (e.g., by stirring using any number of suitable techniques) frustules in the oxygenated manganese acetate solution for a duration of about 15 hours to about 40 hours (e.g., about 24 hours), while maintaining the mixture at a temperature of about 50 degrees C. (° C.) to about 90° C. (e.g., at about 60° C.). In some embodiments, the temperature of the mixture can be maintained by thermally heating the mixture.

In some embodiments, a microwave method of growing nanostructures can facilitate a shorter nanostructure growth process and/or facilitate a scalable nanostructure growth process. For example, a microwave method of nanostructure growth may include using microwave heating in the nanostructure growth process. An example of a nanostructure growth process using the microwave technique may include adding frustules to the oxygenated manganese acetate solution, and maintaining the mixture at a temperature of about 50° C. to about 150° C. for about 10 minutes (min) to about 120 min. The mixture may be stirred while it is being maintained at the temperature.

In some embodiments, manganese-containing structures having a reddish-brown color (e.g., after washing and drying) can form on one or more surfaces of frustules using one or more processes described herein. In some embodiments, the manganese oxide structures can have a tetrahedral shape. A reddish-brown color may indicate presence of manganese (II, III) oxide ($Mn_3O_4$). In some embodiments, formation of tetrahedral nanocrystals can indicate presence of manganese (II, III) oxide ($Mn_3O_4$).

Figure 5Q:
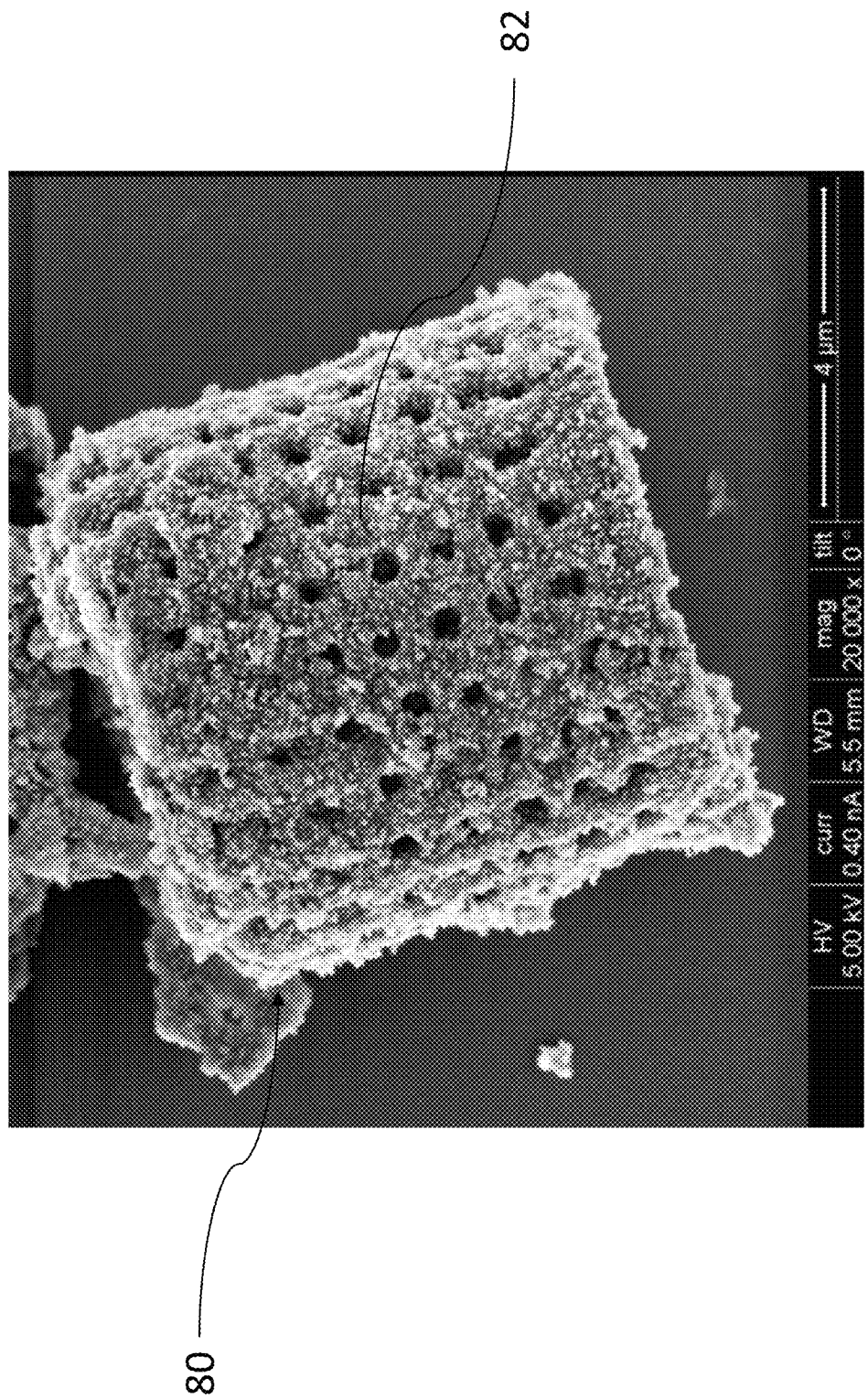
FIG. 5Q shows a SEM image, at 20 k× magnification, of a frustule surface having manganese oxide nanostructures formed thereon.
Figure 5R:
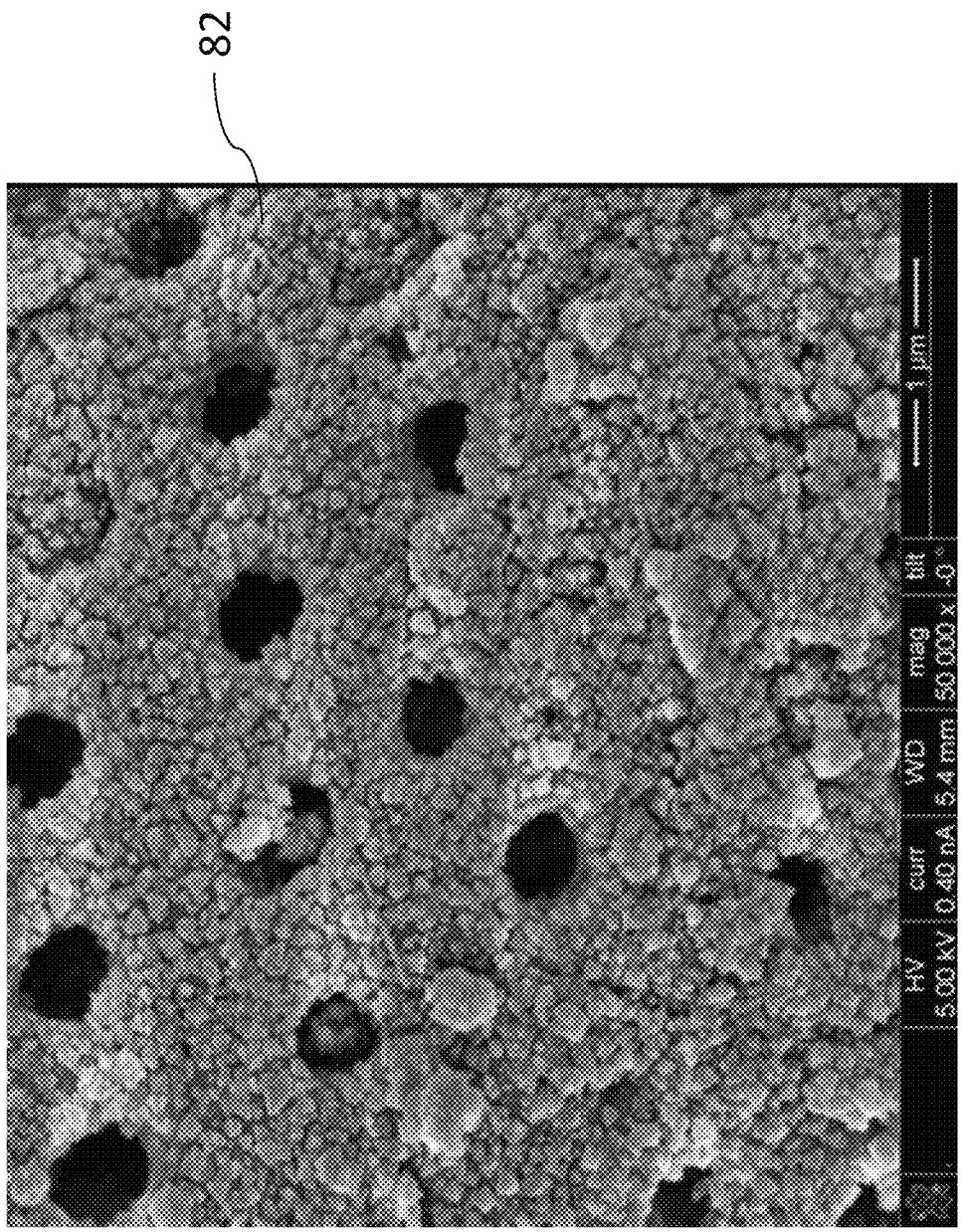
FIG. 5R shows a SEM image, at 50 k× magnification, of a frustule surface having manganese oxide nanostructures formed thereon.

FIG. 5Q is a scanning electron microscope (SEM) image at 20 k× magnification of an example of a frustule 80 having nanostructures comprising manganese(II, III) oxide ($Mn_3O_4$) 82 on or more of its surfaces, where the nanostructures 82 are formed using a microwave method of nanostructure growth. FIG. 5R is a SEM image at 50 k× magnification of the frustule 80 shown in FIG. 5Q. The nanostructures 82 comprising manganese(II, III) oxide ($Mn_3O_4$) shown in FIGS. 5Q and 5R can be formed by using an oxygenated solution having a concentration of about 0.15 M manganese acetate prepared by bubbling oxygen gas ($O_2$) through pure water for a duration of about 30 min. For example, commercial grade oxygen gas (e.g., purity level of greater than 95%, such as at least about 97% pure, or at least about 99% pure) can be used. For example, oxygen gas having a purity of at least about 97% can be bubbled through a glass frit into a vial (e.g., a vial having a volume of about 20 milliliter (mL)) containing about 15 mL of pure water for a duration of about 30 minutes at room temperature (e.g., at about 25° C.). A weight of 0.55 grams (g) of manganese acetate tetrahydrate (e.g., commercially available from Sigma-Aldrich Corp.) can be dissolved in the oxygenated pure water. A weight of 0.005 grams (g) of diatoms can be added to the oxygenated manganese-containing solution. Then the vial containing the mixture comprising the added frustules can be placed in a microwave (e.g., Monowave 300 microwave, commercially available from Anton Paar® GmbH), and the synthesis can be conducted at a desired temperature for a desired period of time. The mixture comprising the solution and frustules can be maintained for about 30 minutes at a temperature of about 60° C., for example under continues stirring (e.g., with a magnetic stir bar, such as at a rotation speed of about 600 rpm). In some embodiments, the mixture can be subsequently diluted with water, and centrifuged (e.g., at about 5000 rpm for about 5 min) such that the supernatant can be discarded. In some embodiments, the precipitate can be diluted with water again, then dispersed (e.g., shaking, and/or vortexing) and again centrifuged such that the supernatant can be discarded. The precipitate can then be dried at about 70° C. to about 80° C. in a vacuum oven.

Referring to FIG. 5R, the nanostructures 82 can have a tetrahedral shape. It was observed that the manganese(II, III) oxide ($Mn_3O_4$) structures surprisingly grow on the surface of the frustules rather than forming in the solution separate from frustules.

Figure 5S:
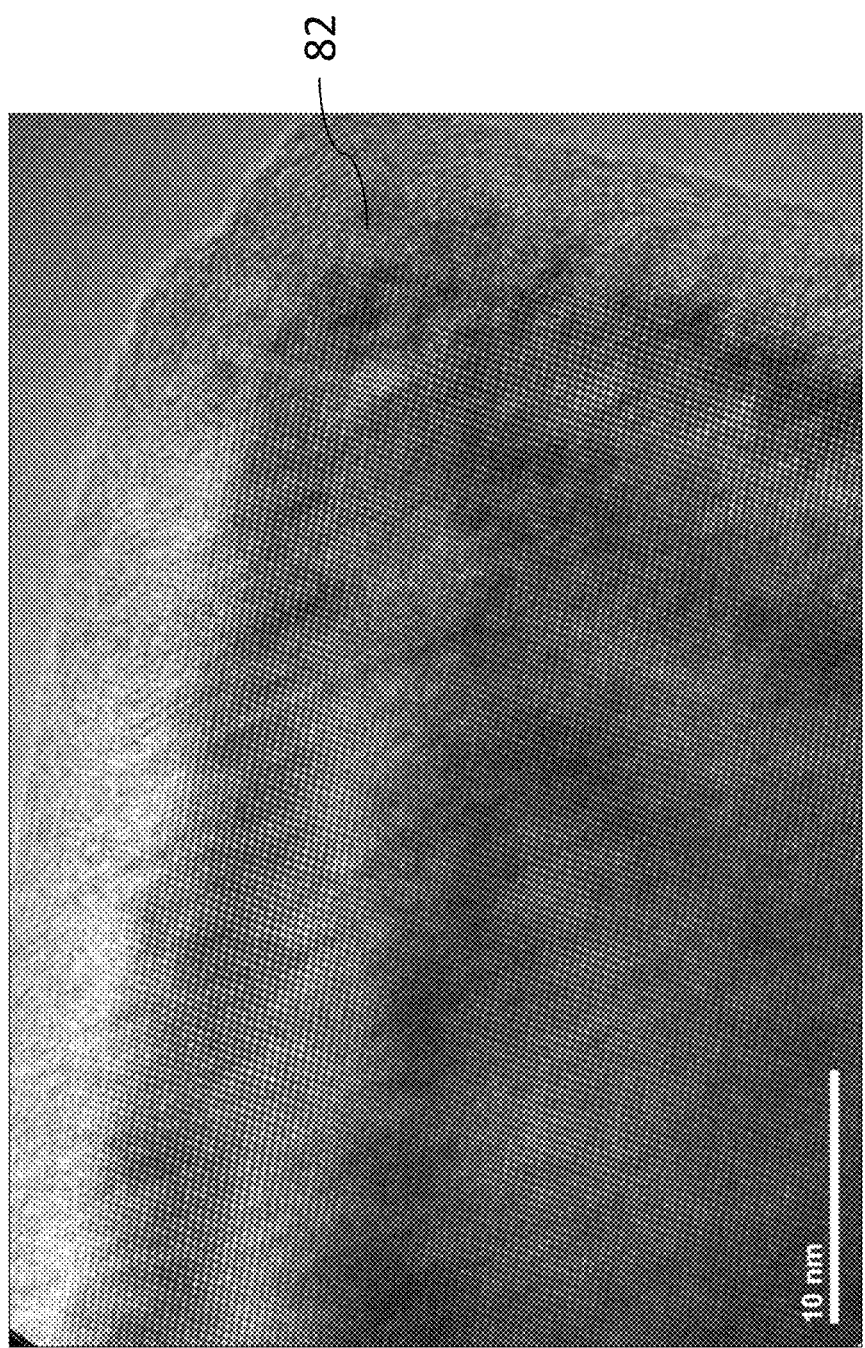
FIG. 5S shows a TEM image of manganese oxide nanocrystals formed on a frustule surface.
Figure 5T:
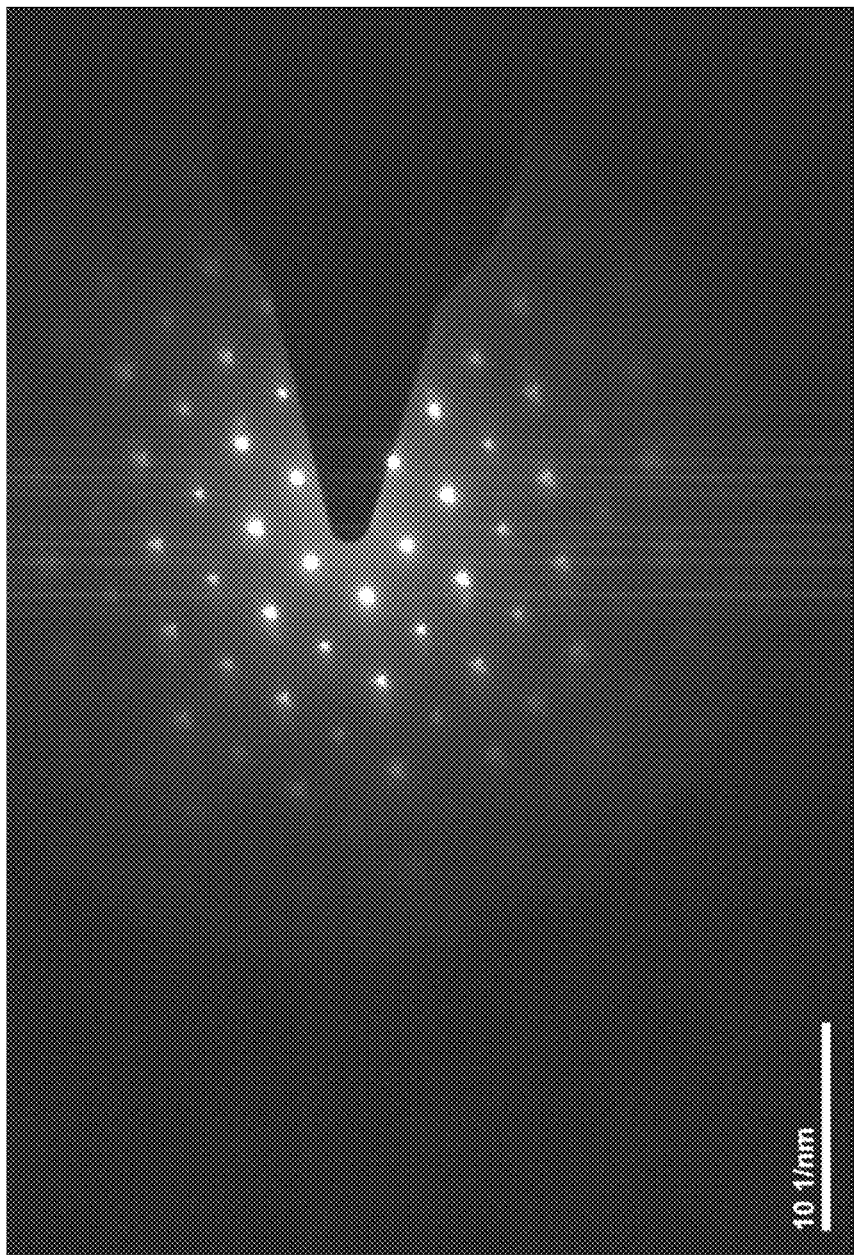
FIG. 5T shows an electron diffraction image of a manganese oxide particle.

FIG. 5S is a transmission electron microscope (TEM) image of nanostructures 82 formed on surfaces of the frustule shown in FIGS. 5Q and 5R. One or more individual atoms of the nanostructures 82 can be seen, and a scale is provided for size comparison. FIG. 5T shows an electron diffraction image of a manganese(II, III) oxide ($Mn_3O_4$) particle.

Figure 5U:
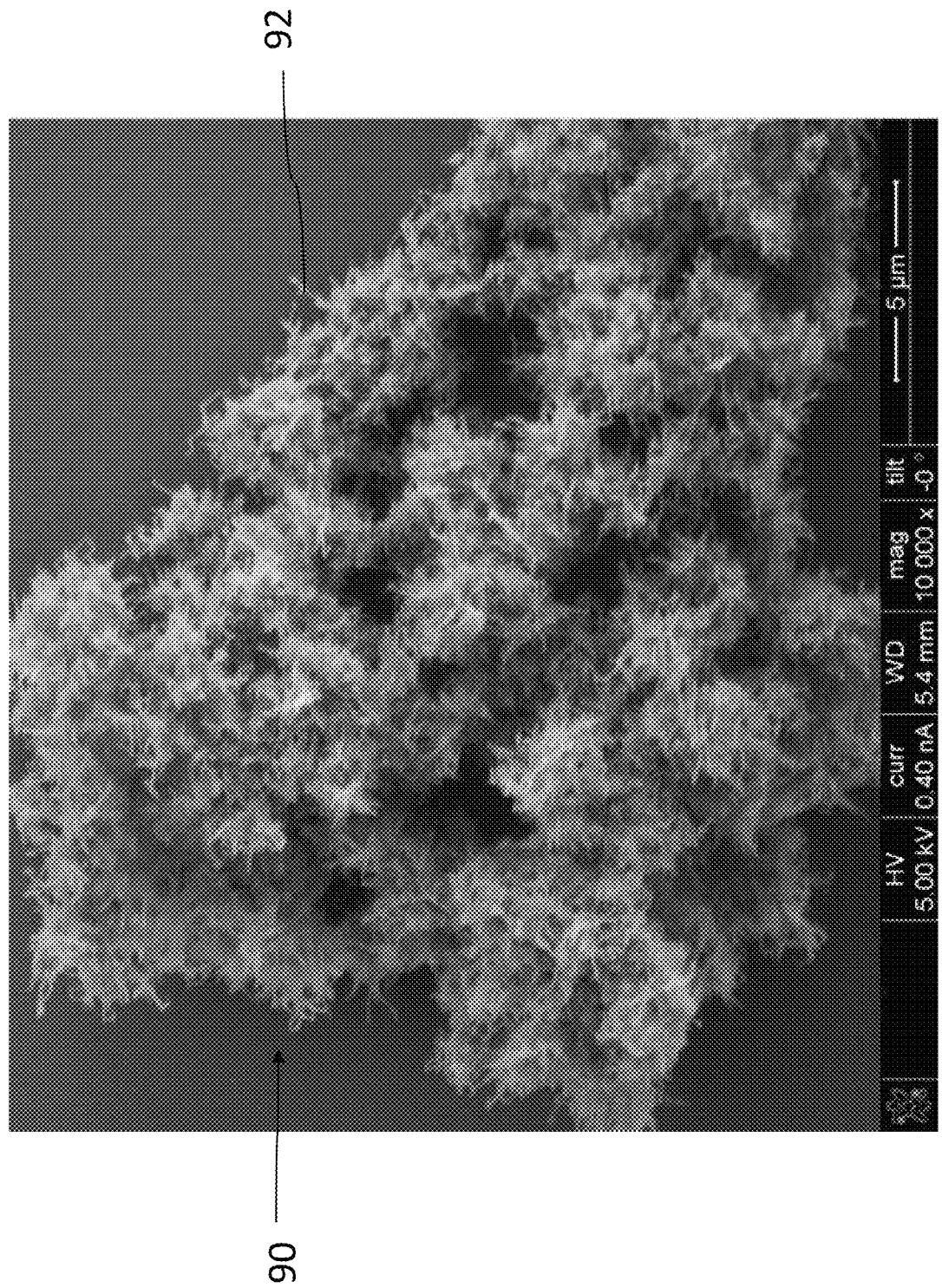
FIG. 5U shows a SEM image, at 10 k× magnification, of a frustule surface having manganese-containing nano-fibers formed thereon.

In some embodiments, a shape and/or dimension of nanostructures formed on a frustule surface can depend on a parameter of the nanostructure formation process. For example, morphology of nanostructures can depend on a solution concentration and/or a level of oxygenation of the solution. FIG. 5U is a SEM image at 10 k× magnification of a frustule 90 comprising manganese-containing nanostructures 92 formed on its surfaces, where the manganese-containing nanostructures 92 were formed using a solution having a higher oxygen concentration (e.g., oxygen purging of water for a duration of about 40 minutes) and higher manganese concentration (e.g., a manganese acetate concentration of about 1 M), as compared to the process used in the formation of nanostructures 82 shown in FIGS. 5Q and 5R. For example, the nanostructures 92 can be formed on frustules 90 according to the process as described with reference to formation of nanostructures 82 (e.g., of FIGS. 5Q and 5R), except with the following differences: oxygen gas bubbling of the pure water can be performed for a duration of about 40 minutes, with the addition of about 0.9 grams (g) of manganese acetate to the oxygenated pure water, and about 0.01 grams (g) of diatoms can be added to the manganese-containing solution, and the mixture comprising the diatoms and manganese-containing solution can be microwaved at a temperature of about 150° C.

As shown in FIG. 5U, the nanostructures 92 can have an elongate fiber-like shape. In some embodiments, the nanostructures 92 can have a thin elongate shape (e.g., thin whisker-like structure). In some embodiments, formation of fiber-like structures can indicate presence of manganese oxyhydroxide (MnOOH).

In some embodiments, forming nanostructures comprising one or more oxides of manganese having the formula $Mn_xO_y$, where x is about 1 to about 3 and where y is about 1 to about 4, on one or more surfaces of a frustule can include combining frustules with a manganese source, such as a manganese salt (e.g., manganese acetate (Mn($CH_3COO$)$_2$)) and a base (e.g., ammonium hydroxide ($NH_4OH$)) in oxygenated water. In some embodiments, forming the $Mn_xO_y$ nanostructures on one or more surfaces of frustules can include forming a mixture comprising the following composition: about 0.5 weight % to about 2 weight % of frustules, about 7 weight % to about 10 weight % of Mn(CH$_3$COO)$_2$, about 5 weight % to about 10 weight % of NH$_4$OH and about 78 weight % to about 87.5 weight % of oxygenated purified water. In some embodiments, oxygenated purified water for the mixture can be prepared by bubbling oxygen through the purified water for about 10 minutes to about 30 minutes. The mixture may be heated using microwave to facilitate formation of the Mn$_x$O$_y$ nanostructures (e.g., in a Monowave 300 for a smaller scale synthesis, such as for a mixture about 10 mL to about 30 mL, or a Masterwave BTR for a larger scale synthesis, such as for about a 1 liter (L) mixture, both commercially available from Anton Paar® GmbH). For example, the mixture may be heated using a microwave to a temperature of about 100° C. to about 250° C. for about 30 minutes to about 60 minutes. In some embodiments, the mixture can be stirred while being heated, for example by a magnetic stirrer at about 200 rotations per minute (RPM) to about 1000 RPM.

In some embodiments, a frustule comprising an oxide of manganese (e.g., an oxide having the formula Mn$_x$O$_y$, where x is about 1 to about 3 and y is about 1 to about 4) nanostructures formed thereon comprises about 5 weight % to about 95 weight % of the oxide of manganese, including about 30 weight % to about 95 weight %, about 40 weight % to about 95 weight %, about 40 weight % to about 85 weight %, about 50 weight % to about 85 weight %, about 55 weight % to about 95 weight %, or about 75 weight % to about 95 weight %, the remaining mass being the frustule. In some embodiments, a frustule comprising an oxide of manganese (e.g., an oxide having the formula Mn$_x$O$_y$, where x is about 1 to about 3 and y is about 1 to about 4) nanostructures formed thereon comprises about 5 weight % to about 50 weight % of the frustule, the remaining mass being the oxide of manganese nanostructures. In some embodiments, a mass of the oxide of manganese nanostructures to a mass of the frustule can be about 1:20 to about 20:1, including about 1:15 to about 20:1, about 1:10 to about 20:1, about 1:1 to about 20:1, about 5:1 to about 20:1, about 1:1 to about 10:1, or about 2:1 to about 9:1. The oxide of manganese nanostructures preferably have a mass greater than a mass of the frustules prior to coating. In some embodiments, a ratio of the mass of the oxide of manganese nanostructures to the mass of the frustule can be greater than about 1:1, about 10:1, or about 20:1. In certain such embodiments, an upper limit may be based on, for example, openness of pores of the frustules (e.g., the oxide of manganese nanostructures not completely occluding the pores).

In some embodiments, pores of the frustules may be occluded by the nanostructures. For example, oxide of manganese nanostructures may be formed on surfaces of the frustules, including surfaces within pores of the frustules, such that the oxide of manganese nanostructures may occlude or substantially occlude some or all of the pores of the frustules.

In some embodiments, a mass of the oxide of manganese nanostructures to a mass of the frustule can be about 1:20 to about 100:1, including about 1:1 to about 100:1, about 10:1 to about 100:1, about 20:1 to about 100:1, about 40:1 to about 100:1, about 60:1 to about 100:1, or about 80:1 to about 100:1. In some embodiments, the mass of the manganese nanostructures to the mass of the frustule can be greater than about 30:1, about 40:1, about 50:1, about 60:1, about 70:1, about 80:1 or about 90:1. In some embodiments, a mass of the manganese nanostructures to a mass of the frustule can be selected to provide desired device performance.

The mass of the oxide of manganese nanostructures may be determined by weighing the frustules before and after coating with the difference being the mass of the oxide of manganese nanostructures. In some embodiments, the composition of the mixture for forming oxide of manganese nanostructures can be selected such that a desired oxide of manganese weight % can be formed. In some embodiments, the weight % of the oxide of manganese on frustule surfaces can be selected based on a desired mass of electrode active material on an opposing energy storage device electrode. For example, the composition of the mixture for forming the oxide of manganese nanostructures can be selected based on the mass of ZnO in an opposing energy storage device electrode. In some embodiment, based on stoichiometric calculations, a mass of Mn$_2$O$_3$ in an energy storage device electrode can be at least about 2.5 times that of ZnO in an opposing electrode.

Figure 5V:
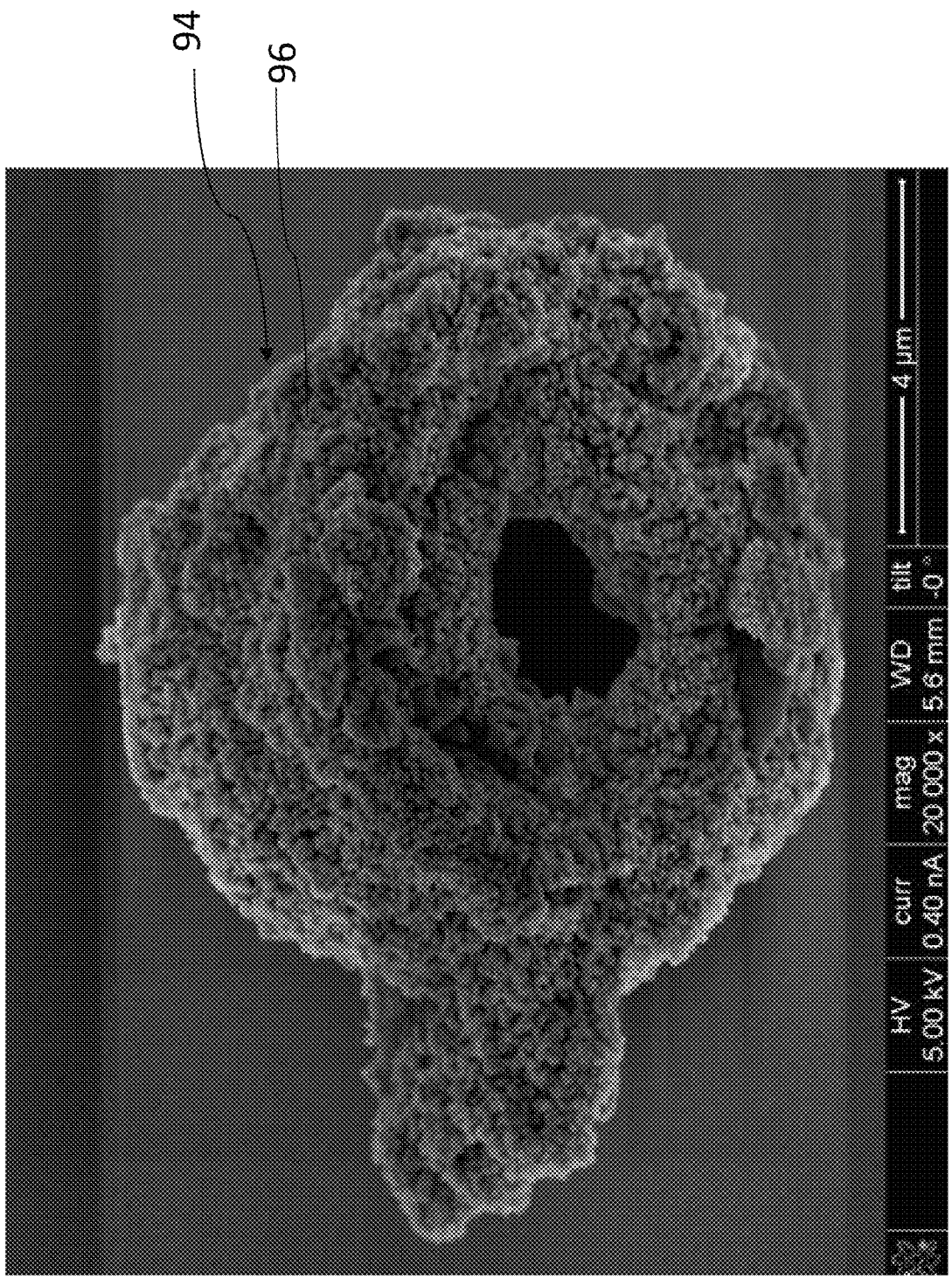
FIG. 5V shows a SEM image, at 20 k× magnification, of a frustule having manganese oxide nanostructures formed thereon.
Figure 5W:
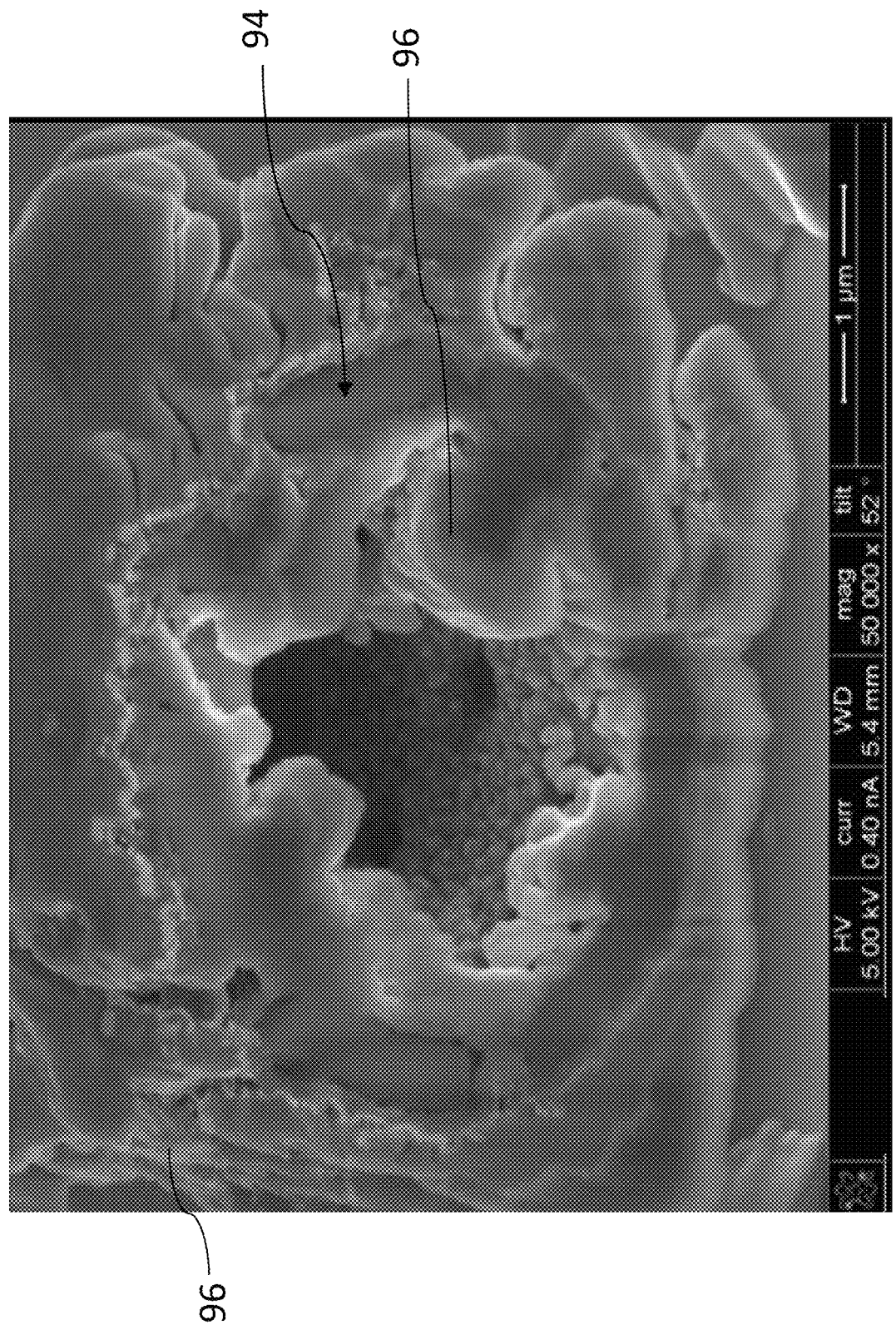
FIG. 5W shows a SEM image, at 50 k× magnification, of a cross-section of an example frustule having manganese oxide nanostructures formed thereon.
Figure 5X:
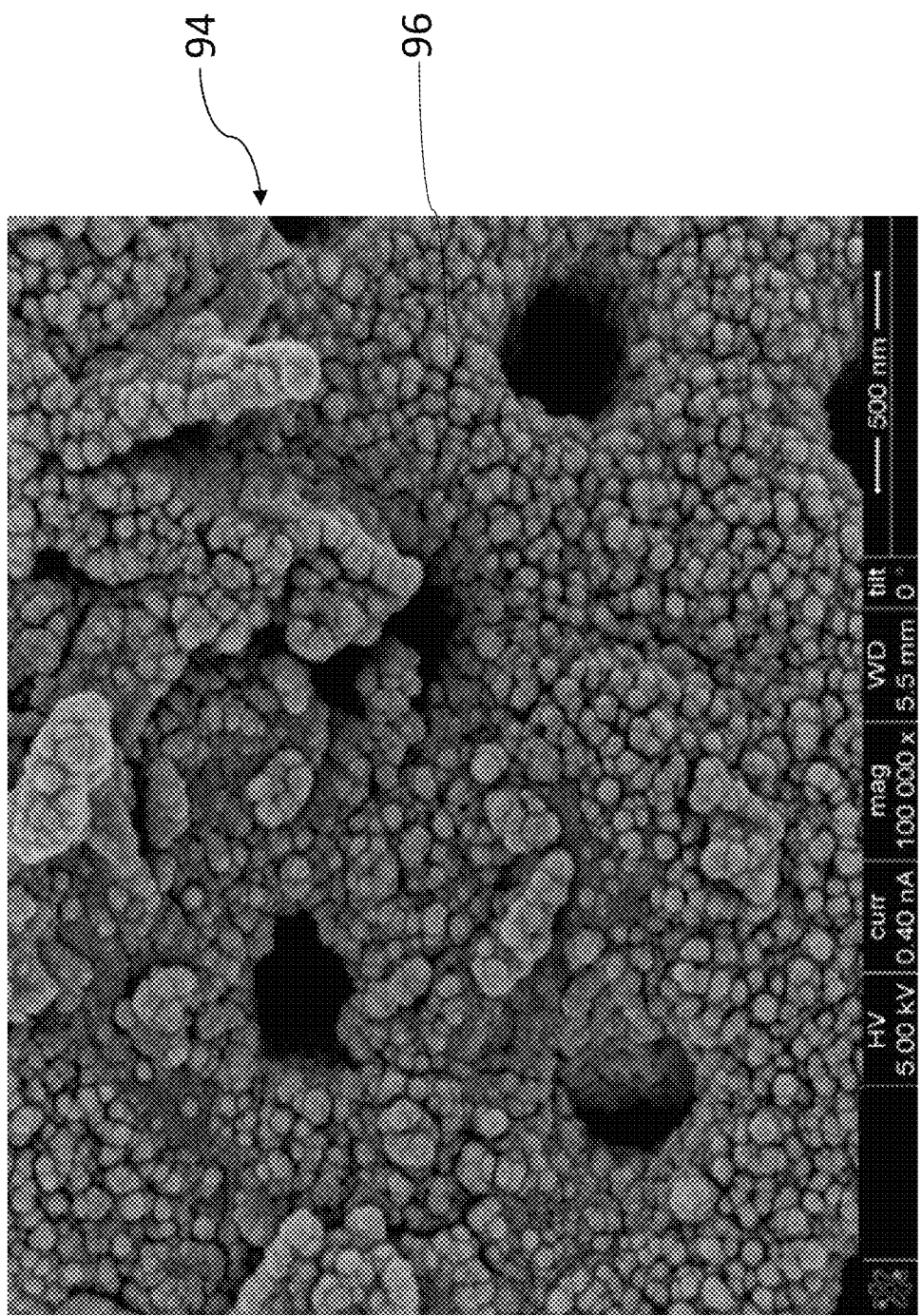
FIG. 5X shows a SEM image, at 100 k× magnification, of a frustule surface having manganese oxide nanostructures formed thereon.

FIG. 5V is a SEM image at 20 k× magnification of a frustule 94 comprising oxides of manganese nanostructures 96 formed thereon. The nanostructures 96 included a mixture of different oxides of manganese, the oxides having the formula Mn$_x$O$_y$, where x is about 1 to about 3 and y is about 1 to about 4. As shown in FIG. 5V, the frustule 94 is thickly covered by the oxide of manganese nanostructures 96. FIG. 5W is a SEM image at 50 k× magnification of a cross-sectional view of a frustule 94 comprising oxides of manganese nanostructures 96 (e.g., oxides having the formula Mn$_x$O$_y$, where x is about 1 to about 3 and y is about 1 to about 4) formed thereon. The frustule 94 was cut using focused ion beam (FIB) technique and a cross-section view of the cut frustule 94 is shown in FIG. 5W. As shown in FIG. 5W, the oxides of manganese nanostructures 96 can be formed on interior and exterior surfaces of the frustule 94, and a volume of the nanostructures 96 can be greater than a volume of the frustule 94. FIG. 5X is a SEM image at 100 k× magnification of a sidewall of a frustule 94 comprising oxides of manganese nanostructures 96 (e.g., oxides having the formula Mn$_x$O$_y$, where x is about 1 to about 3 and y is about 1 to about 4) formed thereon. As shown in FIG. 5X, a sidewall of the frustule 94 can be covered by the oxides of manganese nanostructures 96 while pores on the sidewall are not occluded. A frustule having oxide of manganese nanostructures formed thereon without or substantially without occluding pores of the frustule can advantageously facilitate transport of electrolyte through an electrode comprising the frustule covered by the oxide of manganese nanostructures.

The frustules 94 comprising the oxides of manganese nanostructures 96 formed thereon shown in FIGS. 5V through 5X were formed using a mixture consisting essentially of about 0.5 weight % to about 2 weight % of frustules, about 7 weight % to about 10 weight % of Mn(CH$_3$COO)$_2$, about 5 weight % to about 10 weight % of NH$_4$OH and about 78 weight % to about 87.5 weight % of oxygenated purified water. The mixture was heated using microwave to a temperature of about 100° C. to about 250° C. for about 30 minutes to about 60 minutes. As shown in FIGS. 5V through 5X, the frustules 94 were thickly covered by the oxides of manganese nanostructures 96. For example, about 75 weight % to about 95% of oxides of manganese nanostructure covered frustule was the nanostructures and the remaining mass was the mass of the frustule.

Combination of Coatings

In some embodiments, a combination of coating can also be possible. For example, a surface of a frustule may include both a nickel coating and a coating of carbon nanotubes (e.g., such a frustule can be used for energy storage devices, including supercapacitors).

Figure 6:
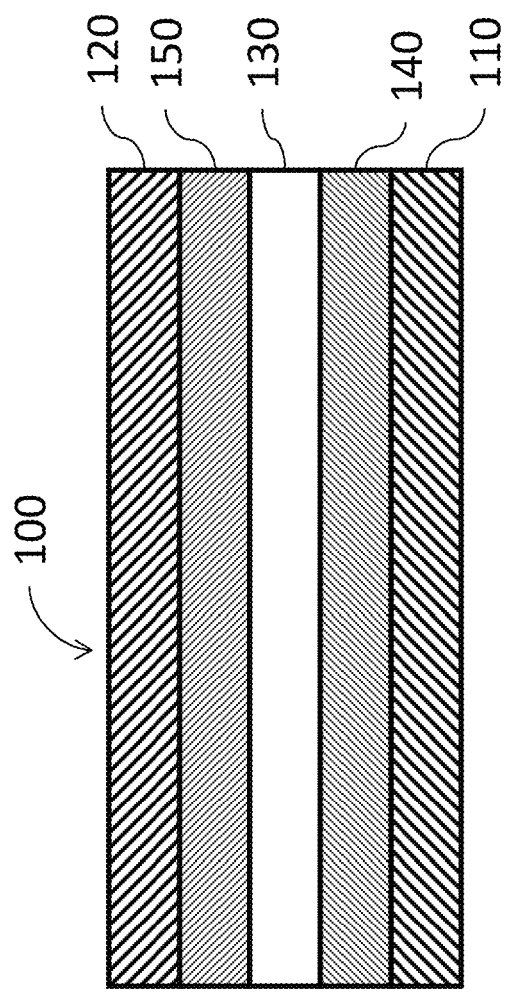
FIG. 6 schematically illustrates an example embodiment of an energy storage device.

FIG. 6 schematically illustrates an example embodiment of an energy storage device 100. FIG. 6 may be a cross-section or elevational view of the energy storage device 100. The energy storage device 100 includes a first electrode 140 and a second electrode 150, for example a cathode and an anode, respectively or irrespectively. The first and second electrodes 140, 150 are separated by a separator 130. The energy storage device 100 may optionally include one or more current collectors 110, 120 electrically coupled to one or both of the electrodes 140, 150.

In some embodiments, the energy storage device 100 comprises a first electrode 140, a second electrode 150, and/or a separator 130, any of which may be a membrane or layer, including a deposited membrane or layer.

A current collector 110, 120 may include any component that provides a path for electrons to external wiring. For example, a current collector 110, 120 may be positioned adjacent to the surface of the first and second electrodes 140, 150 to allow energy flow between the electrodes 140, 150 to be transferred to an electrical device. In the embodiment shown in FIG. 6, a first current collector layer 110 and a second collector layer 120 are adjacent to the surface of the first electrode 140 and to the surface of the second electrode 150, respectively. The current collectors 110, 120 are adjacent to surfaces opposite to surfaces of the electrode 140, 150, respectively, that are adjacent to the separator layer 130.

In some embodiments, the current collector 110, 120 comprises an electrically conductive foil (e.g., graphite, such as graphite paper, graphene, such as graphene paper, aluminum (Al), copper (Cu), stainless steel (SS), carbon foam). In some embodiments, the current collector 110, 120 comprises an electrically conductive material deposited on a substrate. For example, the current collector 110, 120 can comprise an electrically conductive material printed on a substrate. In some embodiments, a suitable substrate can include polyester, polyimide, polycarbonate, cellulose (e.g., cardboard, paper, including coated paper, such as plastic coated paper, and/or fiber paper). In some embodiments, the conductive material can comprise silver (Ag), copper (Cu), carbon (C) (e.g., carbon nanotubes, graphene, and/or graphite), aluminum (Al), nickel (Ni), combinations thereof, and/or the like. Examples of a conductive material comprising nickel suitable for current collectors are provided in PCT Patent Application No. PCT/US2013/078059, entitled "NICKEL INKS AND OXIDATION RESISTANT AND CONDUCTIVE COATINGS," filed Dec. 27, 2013, which is incorporated herein by reference in its entirety.

In some embodiments, an energy storage device 100 includes at least one layer or membrane comprising frustules. For example, an energy storage device 100 may include a layer or membrane comprising a dispersion including frustules. The layer or membrane comprising frustules may include, for example, the first electrode 140, the second electrode 150, the separator 130, the first collector layer 110, the second collector layer 120, combinations thereof, and/or the like. In some embodiments, the energy storage device 100 includes frustules having a uniform or substantially uniform shape, dimension (e.g., diameter, length), material, porosity, a surface modifying material and/or structure, any other suitable feature or attribute, combinations thereof, and/or the like. In embodiments in which a plurality of layers of the energy storage 100 device comprise frustules, the frustules may be the same or substantially the same (e.g., having similar dimensions) or may be different (e.g., insulating in the separator 130 and conductively coated in an electrode 140, 150).

The energy storage device 100 may include one or more layers or membranes comprising frustules having a length in a range from about 0.5 μm to about 50 μm, from about 1 μm to about 50 μm, from about 1 μm to about 40 μm, from about 1 μm to about 30 μm, from about 1 μm to about 20 μm, from about 1 μm to about 10 μm, from about 5 μm to about 50 μm, from about 5 μm to about 40 μm, from about 5 μm to about 30 μm, from about 5 μm to about 20 μm, and from about 5 μm to about 10 μm. In some embodiments, the cylindrically shaped frustules have a length of no more than about 50 μm, no more than about 40 μm, no more than about 30 μm, no more than about 20 μm, no more than about 15 μm, no more than about 10 μm, or no more than about 5 μm. Other frustule lengths are also possible.

The energy storage device 100 may comprise one or more layers or membranes comprising frustules having diameters within a range of from about 0.5 μm to about 50 μm, from about 1 μm to about 50 μm, from about 1 μm to about 40 μm, from about 1 μm to about 30 μm, from about 1 μm to about 20 μm, from about 1 μm to about 10 μm, from about 5 μm to about 50 μm, from about 5 μm to about 40 μm, from about 5 μm to about 30 μm, from about 5 μm to about 20 μm, and from about 5 μm to about 10 μm. In some embodiments, the cylindrically shaped frustules have a diameter of no more than about 50 μm, no more than about 40 μm, no more than about 30 μm, no more than about 20 μm, no more than about 15 μm, no more than about 10 μm, no more than about 5 μm, no more than about 2 μm, or no more than about 1 μm. Other frustule diameters are also possible.

The energy storage device 100 may comprise frustules having a uniform or substantially uniform within-frustule porosity and/or frustule-to-frustule porosity and/or frustules having porosity within a particular range. In some embodiments, the energy storage device 100 comprises one or more layers or membranes including frustules having porosities in a range of from about 10% to about 50%, from about 15% to about 45%, and from about 20% to about 40%. In some embodiments, pores on frustule surfaces can have a size (e.g., a length, width, diameter, and/or longest dimension) of about 1 nanometer (nm) to about 500 nm. For example, pores on a frustule surface can have a size that can facilitate desired energy storage device performance (e.g., diffusion of electrolytic ions of the energy storage device to facilitate a desired electrical performance of the device). Other frustule porosities are also possible.

As described herein, an energy storage device 100 may include one or more layers or membranes including frustules 50 comprising no or substantially no surface modifying material and/or surface modifying structures 52 applied or formed on a surface of the frustules 50 and/or frustules 50 comprising a material and/or structures 52 applied or formed on a surface of the frustules 50 to modify a characteristic or attribute of the frustules 50. For example, the separator 130 may comprise frustules 50 comprising no or substantially no surface modifying material and/or surface modifying structures 52 applied or formed on a surface of the frustules 50, and at least one of the electrodes 140, 150 may comprise frustules 50 comprising a material and/or structures 52 applied or formed on a surface of the frustules 50 to modify a characteristic or attribute of the frustules 50. For another example, the separator 130 may comprise some frustules 50 comprising no or substantially no surface modifying material and/or surface modifying structures 52 applied or formed on a surface of the frustules 50 and some frustules 50 comprising a material and/or structures 52 applied or formed on a surface of the frustules 50 to modify a characteristic or attribute of the frustules 50.

In some embodiments, the energy storage device 100 comprises frustules having a non-uniform or substantially non-uniform shape, dimension, porosity, surface modifying material and/or structure, another suitable attribute, and/or combinations thereof.

In some embodiments, one or more layers or membranes of the energy storage device 100 may be printed. In some embodiments, one or more layers or membranes of the energy storage device 100 can be printed from an ink. In some embodiments, the ink can be printed using various techniques described herein, including stenciling, screen printing, rotary printing, die coating, rotogravure printing, flexo and pad printing, combinations thereof, and/or the like. In some embodiments, a viscosity of the ink can be adjusted based on the printing technique applied (e.g., a desired viscosity may be achieved by adjusting, for example, a quantity of the solvent used for the ink).

In some embodiments, current collectors may be printed using a conductive ink. For example, the current collector can comprise an electrically conductive material printed on a substrate. In some embodiments, a suitable substrate can include polyester, polyimide, polycarbonate, cellulose (e.g., cardboard, paper, including coated paper, such as plastic coated paper, and/or fiber paper). In some embodiments, the conductive ink may comprise aluminum, silver, copper, nickel, bismuth, conductive carbon, carbon nanotubes, graphene, graphite, combinations thereof, and/or the like. In some embodiments, the conductive material can comprise silver (Ag), copper (Cu), carbon (C) (e.g., carbon nanotubes, graphene, and/or graphite), aluminum (Al), nickel (Ni), combinations thereof, and/or the like. Examples of a conductive material comprising nickel suitable for current collectors are provided in PCT Patent Application No. PCT/US2013/078059, entitled "NICKEL INKS AND OXIDATION RESISTANT AND CONDUCTIVE COATINGS," filed Dec. 27, 2013, which is incorporated herein by reference in its entirety.

In some embodiments, an ink can be prepared using a plurality of frustules. The ink comprising the frustules may be printed to form a component of an energy storage device, such as an electrode or a separator of an energy storage device. In some embodiments, the ink may comprise frustules comprising nanostructures formed thereon, including one or more nanostructures described herein. For example, an ink comprising nanostructure covered frustules may be printed to form an electrode of the energy storage device 100. In some embodiments, the ink may comprise frustules having no or substantially no nanostructures formed thereon. For example, an ink comprising frustules having no or substantially no surface modifications may be printed to form the separator 130 of the energy storage device 100.

FIGS. 7A through 7E are schematic diagrams showing cross-sectional views of examples of energy storage devices. In some embodiments, the energy storage devices of FIGS. 7A through 7E are printed energy storage devices. For example, the energy storage devices of FIGS. 7A through 7E may include a first current collector 110, a second current collector 120, a first electrode 140, a second electrode 150 and a separator 130, which are all printed. For example, one or more layers of the printed energy storage devices of FIGS. 7A through 7C can be printed on separate substrates and the separate substrates can be subsequently assembled together to form the energy storage device, while layers of the energy storage devices of FIGS. 7D and 7E can be printed on one substrate.

In some embodiments, FIGS. 7A through 7C are schematic diagrams showing cross-sectional views of examples of partially printed energy storage devices, while FIGS. 7D and 7E are schematic diagrams showing cross-sectional views of fully printed energy storage devices, during various stages of the respective manufacturing processes. The energy storage devices shown in FIGS. 7A through 7C may include current collectors 110, 120, which may be printed (e.g., over separate substrates) and/or not printed (e.g., acting as a substrate on which other layers are printed). FIGS. 7D and 7E show cross-sectional views of energy storage devices which include current collectors 110, 120, which may be printed (e.g., each over a substrate) or not printed (e.g., the first current collector 110 in FIG. 7D acting as a substrate on which other layers are printed, the first and second current collectors 110, 120 acting together as a substrate on which other layers are printed in FIG. 7E).

In some embodiments, the first current collector 110, second current collector 120, first electrode 140, second electrode 150, and/or separator 130 of FIGS. 7A through 7E can have one or more properties and/or be fabricated as described herein. For example, the first current collector 110, second current collector 120, first electrode 140, second electrode 150, and/or separator 130 can be printed using one or more techniques and/or ink compositions as described herein. For example, one of the electrodes 140, 150 may comprise frustules including nanostructures comprising an oxide of manganese (e.g., oxide having the formula $Mn_xO_y$, where x is about 1 to about 3 and y is about 1 to about 4) and the other of the electrodes 140, 150 may comprise frustules including nanostructures comprising zinc (e.g., ZnO), one or both of which may be printed from an ink. For another example, the separator 130 may comprise frustules comprising no or substantially no surface modification, which may be printed from an ink. As described herein, non-printed current collectors may comprise an electrically conductive foil, such as a foil comprising aluminum, copper, nickel, stainless steel, graphite (e.g., graphite paper), graphene (e.g., graphene paper), carbon nanotubes, carbon foam, combinations thereof, and the like. In some embodiments, the conductive foil can be laminated and have a polymer layer on one of its two opposing surfaces.

In FIG. 7A, an energy storage device 200 includes a first structure 202 and a second structure 204. The first structure 202 comprises a first electrode 140 over a first current collector 110 and a separator 130 over the first electrode 140. The second structure 204 comprises a second electrode 150 over a second current collector 120. In some embodiments, the first electrode 140 can be printed over the first current collector 110. For example, the first electrode 140 can be printed directly on and in contact with the first current collector 110. In some embodiments, the separator 130 can be printed over the first electrode 140. For example, the separator 130 may be printed directly on and in contact with the first electrode 140. In some embodiments, the separator 130 can be printed over the first electrode 140 such that the separator 130 and the first current collector 110 encapsulate or substantially encapsulate the first electrode 140. In some embodiments, the second electrode 150 can be printed over the second current collector 120, for example directly on and in contact with the second current collector 120. In some embodiments, a process for fabricating the energy storage device 200 can include assembling together the first structure 202 and the second structure 204. For example, fabricating the energy storage device 200 shown in FIG. 7A can include bringing the second electrode 150 of the second structure 204 into contact with the separator 130 of the first structure 202 such that the separator 130 is between the first electrode 140 and the second electrode 150.

FIG. 7B shows an energy storage device 210 comprising a first structure 212 comprising a first electrode 140 over a first current collector 110 and a first portion of a separator 130 over the first electrode 140. The energy storage device 210 may comprise a second structure 214 comprising a second electrode 150 over a second current collector 120, and a second portion of the separator 130 over the second electrode 150. In some embodiments, the second electrode 150 can be printed over the second current collector 120. For example, the second electrode 150 can be printed on and in direct contact with the second current collector 120. In some embodiments, the second portion of the separator 130 can be printed on and in direct contact with the second electrode 150. For example, the second portion of the separator 130 can be printed on and in direct contact with the second electrode 150. In some embodiments, the first electrode 140 can be printed over the first current collector 110. For example, the first electrode 140 can be printed on and in direct contact with the first current collector 110. In some embodiments, the first portion of the separator 130 can be printed over the first electrode 140. For example, the first portion of the separator 130 can be printed on and in direct contact with the first electrode 140. In some embodiments, the first and second portions of the separator 130 can be printed such that the first portion of the separator 130 and the first current collector 110 encapsulate or substantially encapsulate the first electrode 140, and/or the second portion of the separator 130 and the second current collector 120 encapsulate or substantially encapsulate the second electrode 150. In some embodiments, a process for fabricating the energy storage device 210 can include assembling together (e.g., coupling) the first structure 212 and the second structure 214 to form the energy storage device 210. Assembling the first structure 212 and the second structure 214 may comprise providing the first and second portions of the separator 130 between the first electrode 140 and the second electrode 150. For example, fabricating the energy storage device 210 shown in FIG. 7B can include bringing the second portion of the separator 130 of the second structure 214 into contact with the first portion of the separator 130 of the first structure 212 such that the two portions of the separator 130 are between the first electrode 140 and the second electrode 150.

As shown in FIG. 7C, in some embodiments, an energy storage device 220 may comprise a first structure 222 comprising a first electrode 140 over a first current collector 110, a separator 130 over the first electrode 140, and a second electrode 150 over the separator 130. The energy storage device 220 may comprise a second structure 224 comprising a second current collector 120. In some embodiments, the first electrode 140 can be printed over the first current collector 110. For example, the first electrode 140 can be printed on and in direct contact with the first current collector 110. In some embodiments, the separator 130 can be printed over the first electrode 140. For example, the separator 130 can be printed on and in direct contact with the first electrode 140. In some embodiments, the separator 130 can be printed over the first electrode 140 such that the separator 130 and the first current collector 110 encapsulate or substantially encapsulate the first electrode 140. In some embodiments, the second electrode 150 can be printed over the separator 130. For example, the second electrode 150 can be printed on and in direct contact with the separator 130. In some embodiments, assembling the energy storage device 220 includes coupling the first structure 222 and the second structure 224 to form the energy storage device 220. In some embodiments, coupling the first structure 222 and the second structure 224 can include bringing the second current collector 120 into contact with the second electrode 150 such that the second electrode 150 is between the second current collector 120 and the separator 130.

As described herein, FIGS. 7D and 7E are schematic diagrams of fully printed energy storage devices. FIG. 7D shows an example of a vertically stacked energy storage device 230 comprising printed current collectors 110, 120, electrodes 140, 150 and a separator 130. Referring to FIG. 7D, in some embodiments, a first current collector 110 of the energy storage device 230 can be printed on a substrate. In some embodiments, a first electrode 140 can be printed over the first current collector 110. For example, the first electrode 140 can be printed on and in direct contact with the first current collector 110. In some embodiments, a separator 130 can be printed over the first electrode 140. For example, the separator 130 can be printed on and in direct contact with the first electrode 140. In some embodiments, a second electrode 150 can be printed over the separator 130. For example, the second electrode 150 can be printed on and in direct contact with the separator 130. In some embodiments, a second current collector 120 can be subsequently printed over the second electrode 150. For example, the second current collector 120 can be printed on and in direct contact with the second electrode 150. In some embodiments, the second current collector 120 can be printed over the second electrode 150 such that the second current collector 120 and the separator 130 encapsulate or substantially encapsulate the second electrode 150. In some embodiments, the separator 130 can be printed over the first electrode 140 such that the separator 130 and the first current collector 110 encapsulate or substantially encapsulate the first electrode 140.

Referring to FIG. 7E, an energy storage device 240 having laterally spaced electrodes 140, 150 is shown. The energy storage device 240 can include a first current collector 110 laterally spaced from a second current collector 120, and a first electrode 140 and a second electrode 150 over the first current collector 110 and the second current collector 120, respectively. A separator 130 can be over the first electrode 140 and the second electrode 150. For example, the separator 130 can be formed between the first electrode 140 and the second electrode 150 such that electrodes 140, 150 are electrically insulated from one another. In some embodiments, the separator 130 facilitates electrical insulation between the first current collector 110 and the second current collector 120. In some embodiments, each of the first current collector 110, the second current collector 120, the first electrode 140, the second electrode 150, and the separator 130 can be printed. For example, the first current collector 110 and the second current collector 120 may be printed on a substrate. In some embodiments, the first electrode 140 can be printed on and in direct contact with the first current collector 110. For example, the first electrode 140 can be printed on and in direct contact with the first current collector 110. In some embodiments, the second electrode 150 can be printed over the second current collector 120. For example, the second electrode 150 can be printed on and in direct contact with the second current collector 120. In some embodiments, the separator 130 can be printed over the first electrode 140 and the second electrode 150, such as on and in direct contact with both the first electrode 140 and the second electrode 150. In some embodiments, the separator 130 can be printed over the first electrode 140 and the second electrode 150 such that the separator 130 and the first current collector 110 and the second current collector 120 can encapsulate or substantially encapsulate the first electrode 140 and the second electrode 150, respectively. In some embodiments, first and second structures each similar to the first structure 202 and the second structure 204 of FIG. 7A (e.g., comprising a current collector and an electrode, and optionally a separator) may be formed with different electrode active materials (e.g., one or more oxides of manganese and ZnO) and then laterally coupled.

Figure 8:
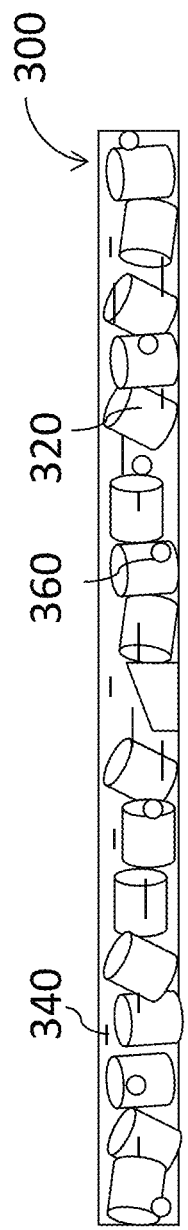
FIG. 8 shows an example embodiment of a separator for an energy storage device incorporating frustules in a separator layer.

FIG. 8 shows an example embodiment of a separator layer or membrane 300 that may form part of an energy storage device (e.g., the separator 130 in any of the energy storage devices described with reference to FIGS. 6 and 7A through 7E). The separator 300 includes frustules 320. In some embodiments, an energy storage device includes a separator layer or membrane 300 comprising frustules 320. For example, an energy storage device may include a separator 300 comprising a dispersion including frustules 320. As described herein, the frustules 320 may be sorted according to a shape, dimensions, material, porosity, combinations thereof, and/or the like, such that the separator 300 comprises frustules 320 having a uniform or substantially uniform shape, dimension (e.g., length, diameter), porosity, material, combinations thereof, and/or the like. For example, the separator 300 may include frustules 320 having a cylindrical or substantially cylindrical shape (e.g., as shown in FIG. 8), a spherical or substantially spherical shape, another shape, and/or combinations thereof. In some embodiments, the separator 300 includes frustules 320 having a material and/or structures applied or formed on a surface of the frustules 320. The separator 300 may comprise frustules 320 comprising no or substantially no surface modifying material and/or surface modifying structures applied or formed on a surface of the frustules 320 (e.g., as illustrated in FIG. 8). The separator 300 may comprise frustules 320 comprising a material and/or structures applied or formed on a surface of the frustules 320 to modify a characteristic or attribute of the frustules 320. The separator 300 may comprise some frustules 320 comprising no or substantially no surface modifying material and/or surface modifying structures applied or formed on a surface of the frustules 320 and some frustules 320 comprising a material and/or structures applied or formed on a surface of the frustules 320 to modify a characteristic or attribute of the frustules 320.

The separator 300 may comprise frustules 320 having a mechanical strength sufficient to enable a stable or substantially stable separation between a first electrode 140 and a second electrode 150 of an energy storage device (e.g., any of the first electrode 140 and second electrode 150 of FIGS. 6 and 7A through 7E). In some embodiments, the separator 300 comprises frustules 320 configured to increase efficiency of an energy storage device, for example by enabling a reduced separation distance between a first electrode 140 and a second electrode 150 and/or by facilitating flow of ionic species between a first electrode 140 and a second electrode 150. For example, frustules 320 may have a uniform or substantially uniform shape, dimension, porosity, surface modifying material and/or structures, combinations thereof, and/or the like, for improved energy storage device efficiency and/or mechanical strength. The separator 300 of an energy storage device may comprise cylindrical or substantially cylindrical frustules 320 including walls having a desired porosity, dimensions, and/or surface modifying material and/or structures.

The separator 300 may comprise one or more layers of frustules 320. The separator 300 comprising frustules 320 may have a uniform or substantially uniform thickness. In some embodiments, thickness of a separator 300 comprising frustules 320 is as thin as possible. In some embodiments, thickness of a separator 300 comprising frustules 320 is from about 1 µm to about 100 µm, including from about 1 µm to about 80 µm, from about 1 µm to about 60 µm, from about 1 µm to about 40 µm, from about 1 µm to about 20 µm, from about 1 µm to about 10 µm, from about 5 µm to about 60 µm, from about 5 µm to about 40 µm, from about 5 µm to about 20 µm, from about 5 µm to about 15 µm, from about 5 µm to about 10 µm, from about 10 µm to about 60 µm, from about 10 µm to about 40 µm, from about 10 µm to about 20 µm, from about 10 µm to about 15 µm, and from about 15 µm to about 30 µm. In some embodiments, a separator comprises a thickness of less than about 100 µm, less than about 90 µm, less than about 80 µm, less than about 70 µm, less than about 60 µm, less than about 50 µm, less than about 40 µm, less than about 30 µm, less than about 20 µm, less than about 15 µm, less than about 10 µm, less than about 5 µm, less than about or 2 µm, less than about or 1 µm, and including ranges bordering and including the foregoing values. Other thicknesses of the separator 300 are also possible. For example, the separator 300 may comprise a single layer of frustules 320 such that the thickness of the separator 300 may depend at least in part on a dimension of the frustules 320 (e.g., a longest axis, a length, or a diameter).

The separator 300 may comprise frustules 320 having a non-uniform or substantially non-uniform shape, dimension, porosity, surface modifying material and/or structure, combinations thereof, and/or the like.

In some embodiments, the separator 300 can include hollow and/or solid microspheres made from non-electrically conducting materials. For example, the separator 300 can include hollow and/or solid microspheres made of glass, alumina, silica, polystyrene, melamine, combinations thereof, and/or the like. In some embodiments, the microspheres can have size to facilitate printing of the separator 300. For example, the separator 300 can include microspheres having a diameter of about 0.1 microns (µm) to about 50 µm. Examples of separators comprising hollow and/or solid microspheres are provided in U.S. patent application Ser. No. 13/223,279, entitled, "PRINTABLE IONIC GEL SEPARATION LAYER FOR ENERGY STORAGE DEVICES," filed Aug. 9, 2012, which is incorporated herein by reference in its entirety.

In some embodiments, the separator 300 comprises a material configured to reduce electrical resistance between a first electrode 140 and a second electrode 150 of an energy storage device. For example, referring again to FIG. 8, in some embodiments, the separator 300 comprises an electrolyte 340. The electrolyte 340 may include any material that facilitates the conductivity of ionic species, including, for example, a material comprising mobile ionic species that can travel between a first electrode 140 and a second electrode 150 of an energy storage device. The electrolyte 340 may comprise any compound that may form ionic species, including but not limited to sodium sulfate ($Na_2SO_4$), lithium chloride (LiCl), and/or potassium sulfate ($K_2SO_4$). In some embodiments, the electrolyte 340 comprises an acid, a base, or a salt. In some embodiments, the electrolyte 340 comprises a strong acid, including but not limited to sulfuric acid ($H_2SO_4$) and/or phosphoric acid ($H_3PO_4$), or a strong base, including but not limited to sodium hydroxide (NaOH) and/or potassium hydroxide (KOH). In some embodiments, the electrolyte 340 comprises a solvent having one or more dissolved ionic species. For example, the electrolyte 340 may comprise an organic solvent. In some embodiments, the electrolyte 340 includes an ionic liquid or an organic liquid salt. The electrolyte 340 may comprise an aqueous solution having an ionic liquid. The electrolyte 340 may comprise a salt solution having an ionic liquid. In some embodiments, the electrolyte 340 comprising an ionic liquid includes propylene glycol and/or acetonitrile. In some embodiments, the electrolyte 340 comprising an ionic liquid includes an acid or base. For example, the electrolyte 340 may comprise an ionic liquid combined with potassium hydroxide (e.g., addition of a 0.1 M solution of KOH).

In some embodiments, the electrolyte 340 can include one or more ionic liquids and/or one or more salts described in U.S. patent application Ser. No. 14/249,316, entitled "PRINTED ENERGY STORAGE DEVICE," filed Apr. 9, 2014, which is incorporated herein by reference in its entirety.

In some embodiments, the separator 300 comprises a polymer 360, such as a polymeric gel. The polymer 360 may be combined with an electrolyte 340. A suitable polymer 360 may exhibit electrical and electrochemical stability, for example maintaining integrity and/or functionality when combined with an electrolyte 340, during electrochemical reactions, and/or subjected to an electric potential (e.g., an electric potential existing between the electrodes 140, 150 of the energy storage device). In some embodiments, the polymer 360 can be an inorganic polymer. In some embodiments, the polymer 360 can be a synthetic polymer. The separator 300 may include a polymer 360 comprising, for example, cellulose (e.g., cellophane), polyamide (e.g., nylon), polypropylene, polyolefin, polyethylene (e.g., radiation-grafted polyethylene), poly(vinylidene fluoride), poly(ethylene oxide), poly(acrylonitrile), poly(vinyl alcohol), poly(methyl methacrylate), poly(vinyl chloride), poly[bis(methoxy ethoxy ethoxyphosphazene)], poly(vinyl sulfone), poly(vinyl pyrrolidone), poly(propylene oxide), copolymers thereof, combinations thereof, and/or the like. In some embodiments, the polymer 360 comprises polytetrafluoroethylene (PTFE), including for example an aqueous solution comprising a dispersion of PTFE in water (e.g., a Teflon® aqueous suspension). In some embodiments, the separator 300 can comprise asbestos, potassium titanate fibers, fibrous sausage casing, borosilicate glass, zirconium oxide, combinations thereof, and/or the like. In some embodiments, the electrolyte 340 is immobilized within or on the polymer 360 to form a solid or semi-solid substance. In some such embodiments, the electrolyte 340 is immobilized on or within a polymeric gel, for example to form an electrolytic gel.

In some embodiments, the separator 300 optionally comprises an adhesive material to enable improved adherence of frustules 320 within the separator 300 and/or between the separator 300 and a first electrode 140 and/or a second electrode 150 of an energy storage device. In some embodiments, the adhesive material comprises a polymer 360. For example, the adhesive material may comprise a polymer 360 that exhibits electrical and electrochemical stability, and provides sufficient adhesion within the separator 300 and/or between the separator 300 and a first electrode 140 and/or a second electrode 150 of an energy storage device.

In some embodiments, an ink for printing a separator of an energy storage device comprises a plurality of frustules having no or substantially no surface modifications, polymer, ionic liquid, electrolyte salt, and/or a solvent. Examples of suitable solvents are provided in U.S. patent application Ser. No. 14/249,316, entitled "PRINTED ENERGY STORAGE DEVICE," filed Apr. 9, 2014, which is incorporated herein by reference in its entirety. In some embodiments, a solvent for an ink used to print a separator can comprise dimethyl formamide (DMF), dimethyl acetamide (DMAC), tetramethyl urea, dimethyl sulfoxide (DMSO), triethyl phosphate, n-methyl-2-pyrrolidone (NMP), combinations thereof, and/or the like. In some embodiments, the ink for printing the separator comprises the following composition: about 5 weight % to about 20 weight % frustules having no surface modifications (e.g., purified frustules), about 3 weight % to about 10 weight % of the polymer component (e.g., polyvinylidene fluoride, for example Kynar® ADX commercially available from Arkema Inc. of King of Prussia, Pa.), about 15 weight % to about 40% ionic liquid (e.g., 1-ethyl-3-ethylimidazolium tetrafluoroborate), about 1 weight % to about 5% salt (e.g., zinc tetrafluoroborate), about 25 weight % to about 76 weight % solvent (e.g., N-Methyl-2-pyrrolidone). In some embodiments, other polymers, ionic liquids, salts (e.g., other zinc salt) and/or solvents may also be suitable.

In some embodiments, a process for preparing the ink for a separator can include dissolving the binder in the solvent. For example, dissolving the binder in the solvent may include heating the mixture comprising the binder and the solvent for about 5 min to about 30 min at a temperature of about 80° C. to about 180° C. In some embodiments, the heating can be performed using a hot plate. In some embodiments, the ionic liquid and electrolyte salt can be added to the mixture, such as while the mixture is warm after being heated. The binder, solvent ionic liquid and electrolyte salt may be stirred to facilitate desired mixing, such as for about 5 min to about 10 min. In some embodiments, the frustules can be subsequently added. Addition of the frustules may be facilitated by mixing, such as by using a planetary centrifugal mixer. Mixing may be performed using the planetary centrifugal mixer for about 1 min to about 15 min.

Figure 9:
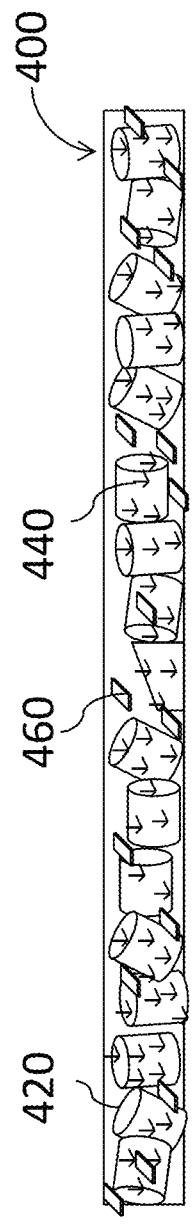
FIG. 9 shows an example embodiment of an electrode for an energy storage device incorporating frustules in an electrode layer.

FIG. 9 shows an example electrode layer or membrane 400 that may form part of an energy storage device (e.g., any of the energy storage devices as described with reference to FIGS. 6 and 7A through 7E). The electrode 400 includes frustules 420. In some embodiments, an energy storage device includes one or more electrode layers or membranes 400 comprising frustules 420 (e.g., the first electrode 140 and/or the second electrode 150 of any of the energy storage devices as described with reference to FIGS. 6 and 7A through 7E). For example, an energy storage device may include an electrode layer or membrane 400 comprising a dispersion including frustules 420. As described herein, the frustules 420 may be sorted according to a shape, dimensions, material, porosity, combinations thereof, and/or the like, such that the electrode 400 comprises frustules 420 having a uniform or substantially uniform shape, dimension (e.g., length, diameter), porosity, material, combinations thereof, and/or the like. For example, the electrode 400 may include frustules 420 having a cylindrical or substantially cylindrical shape (e.g., as shown in FIG. 9), a spherical or substantially spherical shape, another shape, and/or combinations thereof. In some embodiments, the electrode 400 includes frustules 420 having a material and/or structures applied or formed on a surface of the frustules 420. The electrode 400 may comprise frustules 420 comprising no or substantially no surface modifying material, and may be insulating, and/or may have surface modifying structures applied or formed on a surface of the frustules 420. The electrode 400 may comprise frustules 420 comprising a material and/or structures applied or formed on a surface of the frustules 420 to modify a characteristic or attribute of the frustules 420 (e.g., as schematically illustrated in FIG. 9 by the chicken foot-shaped features on the surfaces of the frustules 420). The electrode 400 may comprise some frustules 420 comprising no or substantially no surface modifying material and/or surface modifying structures applied or formed on a surface of the frustules 420 and some frustules 420 comprising a material and/or structures applied or formed on a surface of the frustules 420 to modify a characteristic or attribute of the frustules 420.

The electrode 400 may comprise frustules 420 selected for mechanical strength such that an energy storage device including the electrode 400 may withstand compressive force and/or shape modifying deformation. In some embodiments, the electrode 400 comprises frustules 420 configured to increase efficiency of an energy storage device, for example by facilitating flow of ionic species within the electrode 400 and/or between the electrode 400 and other parts of the energy storage device. For example, frustules 420 may have a uniform or substantially uniform shape, dimension, porosity, surface modifying material and/or structures, combinations thereof, and/or the like, for improved energy storage device efficiency and/or mechanical strength. The electrode 400 of an energy storage device may comprise cylindrical or substantially cylindrical frustules 420 including walls having a desired porosity, dimensions, and/or surface modifying material and/or structures.

The electrode 400 may comprise one or more layers of frustules 420. The electrode 400 comprising frustules 420 may have a uniform or substantially uniform thickness. In some embodiments, thickness of an electrode 400 comprising frustules 420 depends at least in part on resistance, amount of available material, desired energy device thickness, or the like. In some embodiments, thickness of an electrode 400 comprising frustules 420 is from about 1 µm to about 100 µm, including from about 1 µm to about 80 µm, from about 1 µm to about 60 µm, from about 1 µm to about 40 µm, from about 1 µm to about 20 µm, from about 1 µm to about 10 µm, from about 5 µm to about 100 µm, including from about 5 µm to about 80 µm, from about 5 µm to about 60 µm, from about 5 µm to about 40 µm, from about 5 µm to about 20 µm, from about 5 µm to about 10 µm, from about 10 µm to about 60 µm, from about 10 µm to about 40 µm, from about 10 µm to about 20 µm, from about 10 µm to about 15 µm, and from about 15 µm to about 30 µm. In some embodiments, thickness of an electrode 400 comprising frustules 420 is less than about 100 µm, less than about 90 µm, less than about 80 µm, less than about 70 µm, less than about 60 µm, less than about 50 µm, less than about 40 µm, less than about 30 µm, less than about 20 µm, less than about 10 µm, less than about 5 µm, less than about 2 µm, or less than about 1 µm, and including ranges bordering and including the foregoing values. Other thicknesses of the separator 300 are also possible.

The electrode 400 may comprise frustules 420 having a non-uniform or substantially non-uniform shape, dimension, porosity, surface modifying material and/or structure, combinations thereof, and/or the like.

In some embodiments, the electrode 400 optionally comprises a material to enhance the conductivity of electrons within the electrode 400. For example, referring again to FIG. 9, in some embodiments, the electrode 400 comprises electrically conductive filler 460 to improve electrical conductivity within the electrode 400. Electrically conductive filler 460 may comprise a conductive carbon material. For example, electrically conductive filler 460 may comprise graphitic carbon, graphene, carbon nanotubes (e.g., single-wall and/or multi-wall), combinations thereof, and/or the like. In some embodiments, electrically conductive filler 460 can include a metallic material (e.g., silver (Ag), gold (Au), copper (Cu), nickel (Ni), and/or platinum (Pt)). In some embodiments, electrically conductive filler 460 can include a semiconductor material (e.g., silicon (Si), germanium (Ge)), and/or a semiconductor-containing alloy (e.g., an aluminum-silicon (AlSi) alloy). In energy storage devices 100 comprising a plurality of electrodes 400, the electrodes 400 may include different frustules and/or different additives, for example including different ions and/or ion-producing species. In some embodiments, the electrode 400 may comprise an electrolyte, for example the electrolyte 340 described herein with respect to the separator 300 of FIG. 8. In some embodiments, the electrode 400 may comprise a polymer, for example the polymer 360 described herein with respect to the separator 300 of FIG. 8. In some embodiments, the electrode 400 can include one or more active materials (e.g., free active materials, such as active materials in addition to nanostructured active materials on one or more surfaces of diatom frustules).

In some embodiments, the electrode 400 can include a binder. The binder may comprise a polymer. Suitable polymers, polymeric precursors and/or polymerizable precursors, for an electrode binder, can include for example, polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terefphtalatpolyacrylonitryle, polyvinyl butyral, polyvinylcaprolactam, polyvinyl chloride; polyimide polymers and copolymers (e.g., aliphatic, aromatic and/or semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan, their copolymers, combinations thereof, and/or the like.

In some embodiments, the electrode 400 can include a corrosion inhibitor and/or one or more other functional additives. In some embodiments, a corrosion inhibitor can include one or more surface active organic compounds. In some embodiments, a corrosion inhibitor can comprise glycols, silicates, mercury (Hg), cadmium (Cd), lead (Pb), gallium (Ga), indium (In), antimony (Sn), bismuth (Bi), combinations thereof, and/or the like.

In some embodiments, the electrode 400 optionally comprises an adhesive material to enable improved adhesion of frustules 420 within the electrode 400 and/or between the electrode 400 and another component of the energy storage device such as a separator 130 and/or a current collector 110, 120. In some embodiments, the adhesive material in the electrode 400 comprises a polymer, for example the polymer 360 described herein.

In some embodiments, an ink for printing an electrode of an energy storage device can comprise a plurality of frustules comprising nanostructures formed on one or more surfaces, a conductive filler (e.g., carbon nanotubes, graphite), a binder component, electrolyte (e.g., ionic liquid, electrolyte salt), and/or a solvent. For example, the electrolyte may have a composition as described herein. In some embodiments, one or more solvents described with reference to a separator ink may also be suitable for the ink for printing the electrode. In some embodiments, a solvent for an ink used to print an electrode can comprise dimethyl formamide (DMF), dimethyl acetamide (DMAC), tetramethyl urea, dimethyl sulfoxide (DMSO), triethyl phosphate, n-methyl-2-pyrrolidone (NMP), combinations thereof, and/or the like. In some embodiments, the ink for printing the electrode can comprise frustules having an oxide of manganese nanostructures formed on one or more surfaces. In some embodiments, the ink for printing the electrode comprises frustules having ZnO nanostructures formed on one or more surfaces.

In some embodiments, ink for printing an electrode of an energy storage comprising an oxide of manganese can have the following composition: about 10 weight % to about 20 weight % frustules having one or more surfaces covered by the oxide of manganese, about 0.2 weight % to about 2 weight % carbon nanotubes (e.g., multi-wall carbon nanotubes, for example commercially available from SouthWest NanoTechnologies of Norman, Okla.), up to about 10 weight % graphite (e.g., C65 commercially available from Timcal Graphite and Carbon, of Switzerland), about 1 weight % to about 5 weight % binder (e.g., polyvinylidene fluoride, such as HSV 900 Kynar® commercially available from Arkema Inc. of King of Prussia, Pa.), about 2 weight % to about 15 weight % ionic liquid (e.g., 1-ethyl-3-ethylimidazolium tetrafluoroborate), and about 48 weight % to about 86.8 weight % solvent (e.g., N-Methyl-2-pyrrolidone). In some embodiments, the oxide of manganese has the formula $Mn_xO_y$, where x is about 1 to about 3 and y is about 1 to about 4. For example, the ink may be printed to form a cathode of a battery.

In some embodiments, ink for printing an electrode of an energy storage comprising ZnO can have the following composition: about 10 weight % to about 20 weight % frustules comprising ZnO nanostructures formed thereon, about 0.2 weight % to about 2 weight % carbon nanotubes (e.g., multi-wall carbon nanotubes, for example commercially available from SouthWest NanoTechnologies of Norman, Okla.), up to about 10 weight % graphite (e.g., C65 commercially available from Timcal Graphite and Carbon of Switzerland), about 1 weight % to about 5 weight % binder (e.g., polyvinylidene fluoride, such as HSV 900 Kynar® commercially available from Arkema Inc. of King of Prussia, Pa.), about 2 weight % to about 15 weight % ionic liquid (e.g., 1-ethyl-3-ethylimidazolium tetrafluoroborate), about 0.3 weight % to about 1% weight % electrolyte salt (e.g., zinc tetrafluoroborate), and about 47 weight % to about 86.5 weight % solvent (e.g., N-Methyl-2-pyrrolidone). For example, the ink may be printed to form an anode of a battery.

In some embodiments, the carbon nanotubes can comprise multi-wall and/or single wall carbon nanotubes. In some embodiments, other types of graphite, polymer binder, ionic liquid and/or solvent can also be suitable.

In some embodiments, a process for preparing the ink for printing the electrode can be configured to provide desired dispersion of carbon nanotubes in the ink, saturate the frustules with the ionic liquid (e.g., providing ionic liquid within, on interior surfaces, exterior surfaces, and/or within pores, of frustules) and/or thoroughly mix components of the ink. In some embodiments, a process of preparing the ink comprises dispersing the carbon nanotubes in the ionic liquid. In some embodiments, the carbon nanotubes can be dispersed in the ionic liquid using an automated mortar and pestle. In some embodiments, the carbon nanotubes and the ionic liquid may then be dispersed in the solvent. The carbon nanotubes and ionic liquid may be dispersed in the solvent using an ultrasonic tip. In some embodiments, the frustules comprising nanostructures formed thereon (e.g., oxide of manganese or ZnO nanostructures) and graphite may be added to the carbon nanotubes, ionic liquid, and solvent, and stirred using a centrifugal mixer. In some embodiments, the electrolyte salt can also be added to the carbon nanotubes, ionic liquid, and solvent, along with the frustules and graphite, and stirred using a centrifugal mixer. For example, the frustules, graphite, carbon nanotubes, ionic liquid, solvent, and/or electrolyte salt, may be mixed using a planetary centrifugal mixer for about 1 minutes (min) to about 10 min. In some embodiments, a solution comprising the polymer binder in the solvent can be added to the mixture comprising the frustules, graphite, carbon nanotubes, ionic liquid, solvent, and/or electrolyte salt, and heated. The solution comprising the polymer binder and the solvent can have about 10 weight % to about 20 weight % of the polymer binder. The mixture comprising the polymer binder, frustules, graphite, carbon nanotubes, ionic liquid, solvent, and/or electrolyte salt, can be heated to a temperature of about 80° C. to about 180° C. In some embodiments, the heating can be performed for about 10 min to about 30 min. In some embodiments, a hot plate can be used for heating. In some embodiments, stirring can be performed while heating (e.g., with a mixing rod).

Figure 10:
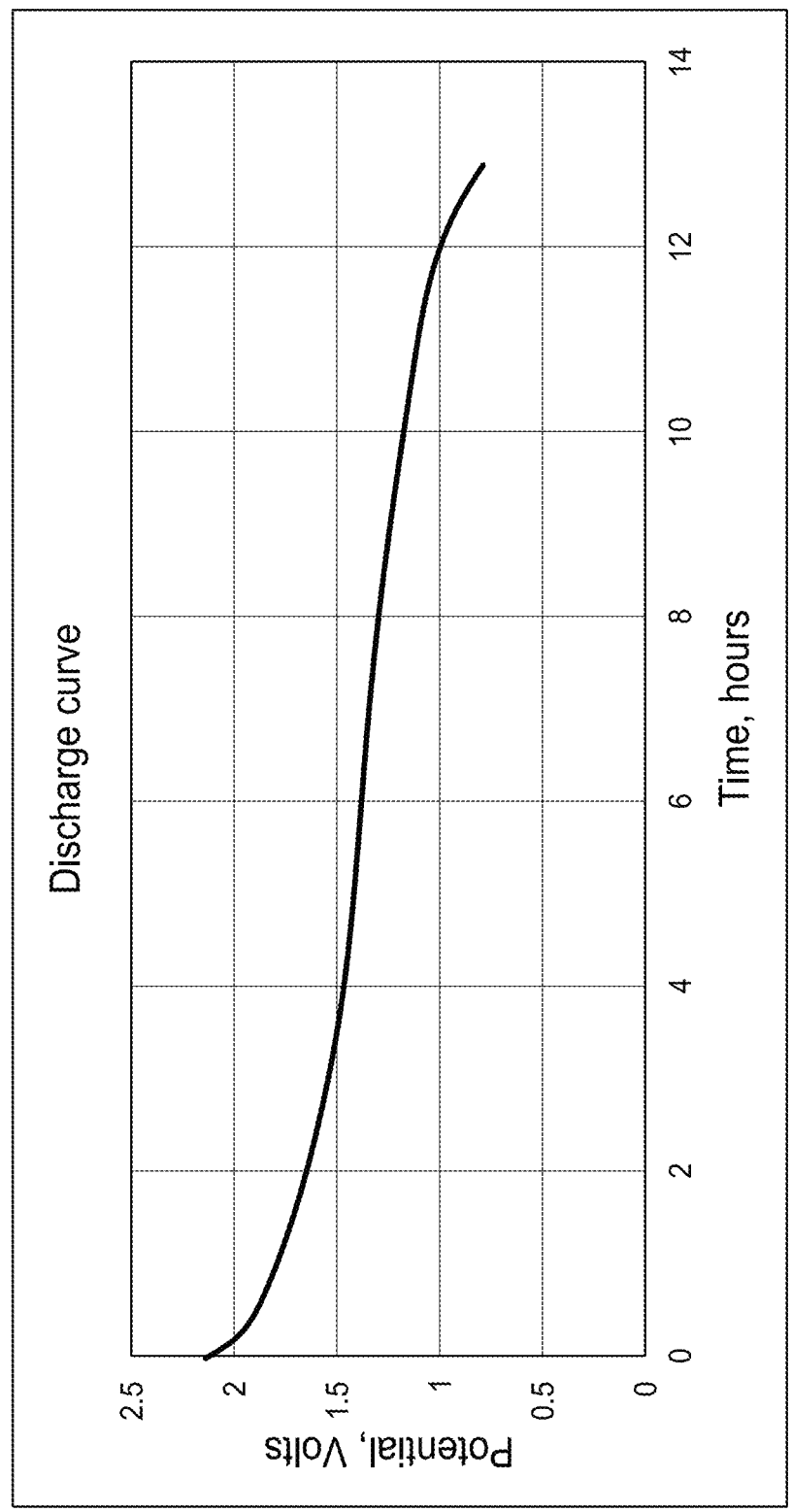
FIG. 10 shows a graph of a discharge curve of an example energy storage device.

FIGS. 10 through 13 show electrical performances of examples of printed batteries comprising oxides of manganese (e.g., oxides having the formula $Mn_xO_y$, where x is about 1 to about 3 and y is about 1 to about 4) cathode and a ZnO anode fabricated using processes described herein. FIG. 10 is a discharge curve graph for a printed $Mn_xO_y$ and ZnO battery, where the cathode included a plurality of frustules comprising oxides of manganese nanostructures formed thereon and the anode included a plurality of frustules comprising ZnO nanostructures formed thereon. The battery potential expressed in Volts (V) on the y-axis and the duration of discharge expressed in hours (hrs) on the x-axis. The battery was a screen printed 1.27 centimeter (cm) by 1.27 cm square (i.e. 0.5 inch (in) by 0.5 inch square). The battery included printed current collectors, anode, cathode, and separator. The anode and cathode each had an average thickness of about 40 microns (μm). The cathode had a total weight of about 0.023 grams (g), and a weight of the oxides of manganese was about 0.01 g. The weight of active material, ZnO, in the anode was in excess.

Figure 11:
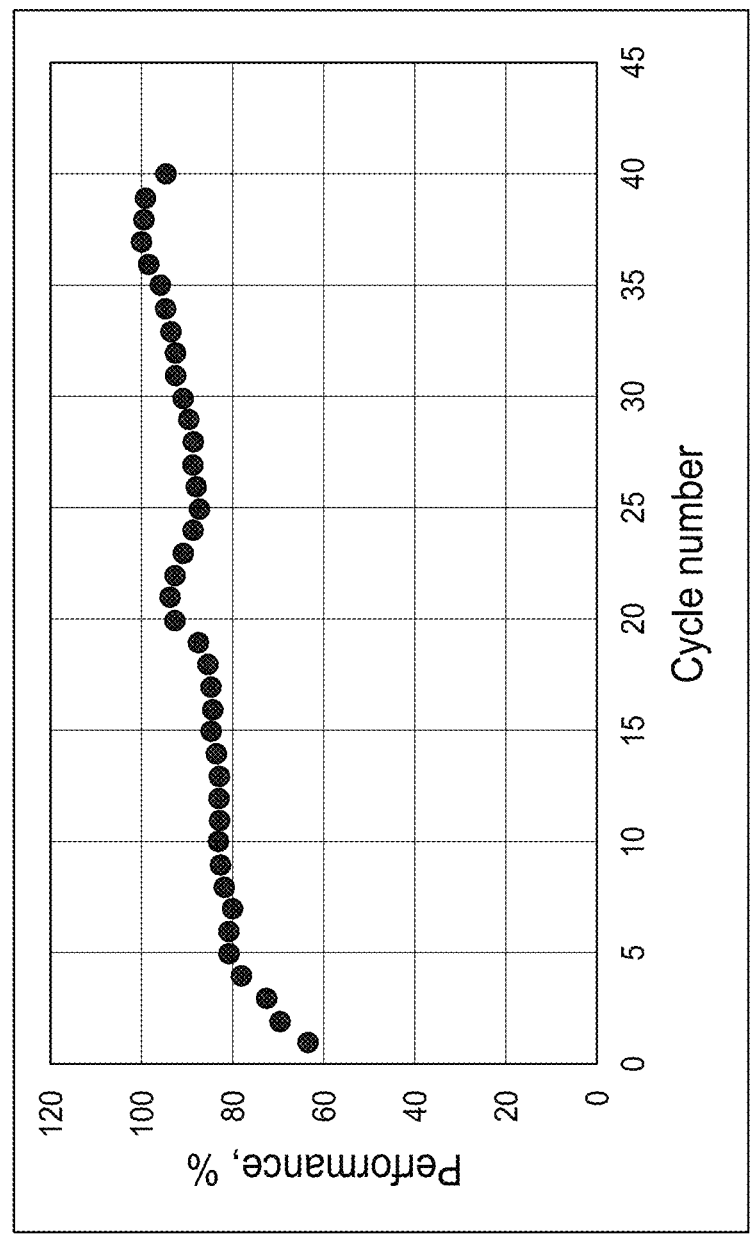
FIG. 11 shows a graph of the cycling performance of the energy storage device of FIG. 10.

In FIG. 10, the battery was discharged from a fully or substantially fully charged state to the cut-off voltage of about 0.8 V. The battery was discharged at about 0.01 amperes/gram (A/g). The battery demonstrated a capacity of about 1.28 milli-ampere hour (mAh), and a capacity of about 128 milli-ampere hour/gram (mAh/g), based on the weight of the cathode active material. FIG. 11 shows the capacitance performance of the printed battery of FIG. 10 after a number charge-discharge cycles. The battery was cycled 40 times and the capacitance performance of each cycle is shown on the y-axis as a % of the initial capacitance. As shown in FIG. 11, the capacitance performance can be improved after a number of charge-discharge cycles.

Figure 12:
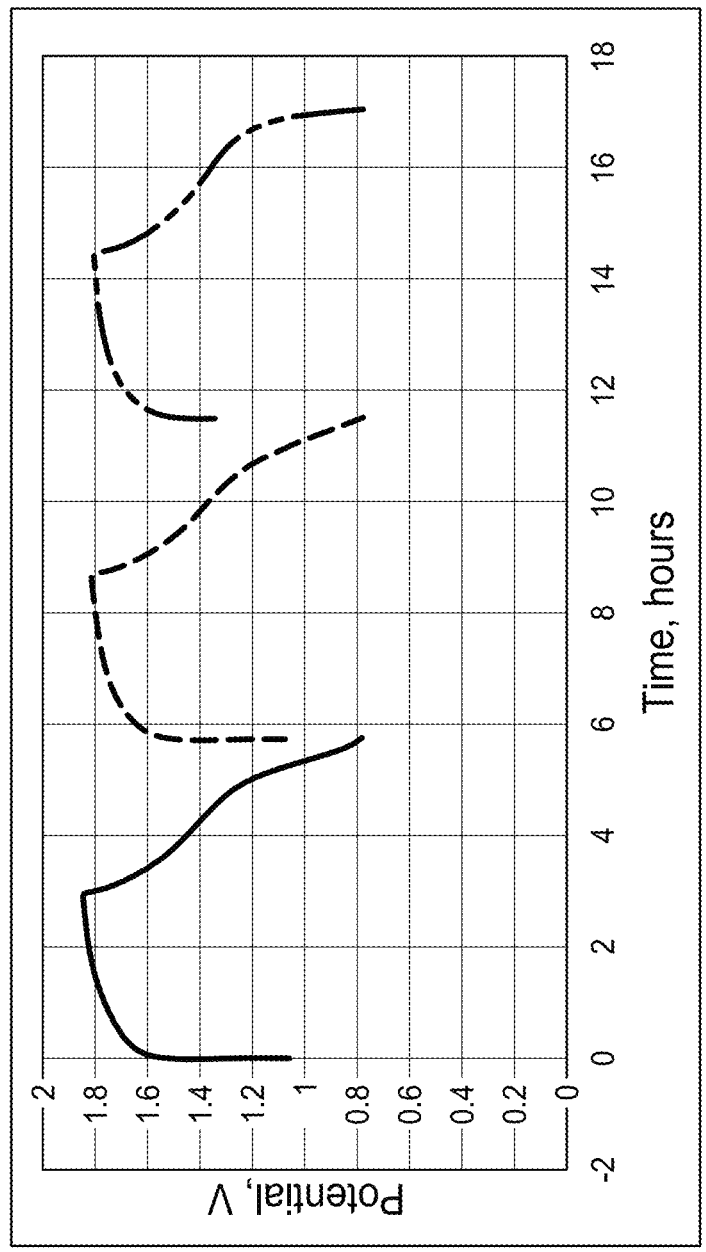
FIG. 12 shows a graph of an example charge-discharge performance of an energy storage device.
Figure 13:
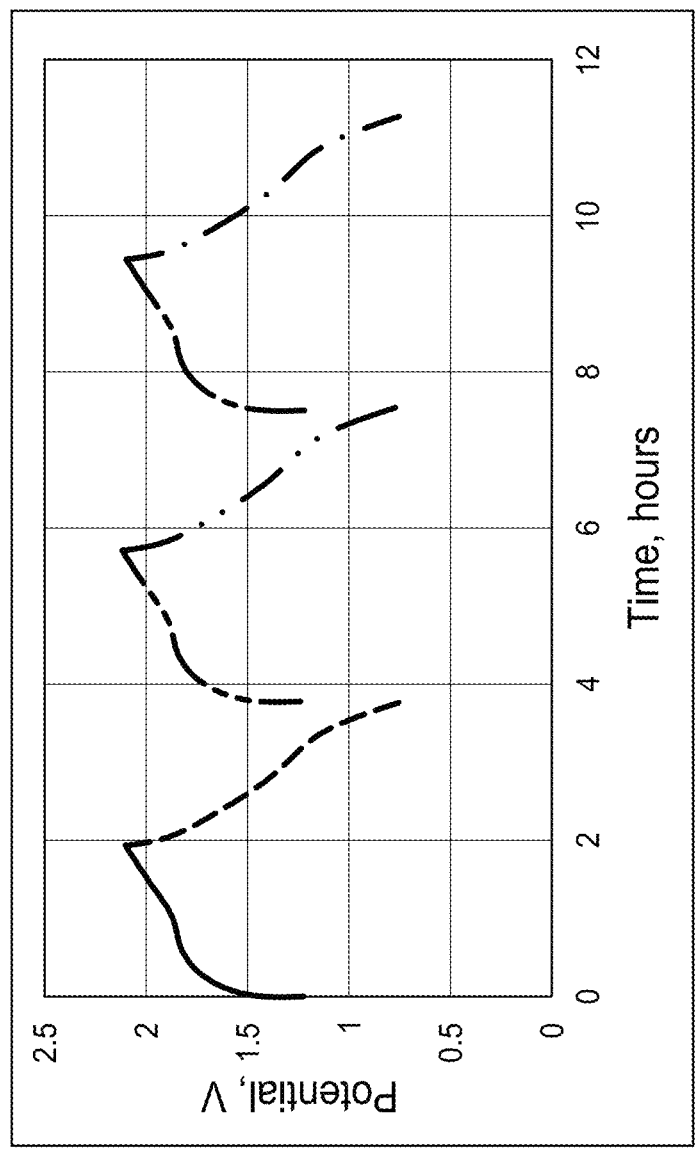
FIG. 13 shows another graph of a charge-discharge performance of the energy storage device of FIG. 12.

FIG. 12 is a charge-discharge curve of another example of a printed $Mn_xO_y$ and ZnO battery, showing the potential performance of each charge-discharge cycle as a function of time during three charge-discharge cycles. The potential is shown on the y-axis in Volts (V), and time is expressed on the x-axis in hours (hrs). The printed battery was a screen printed 1.27 centimeter (cm) by 1.27 cm square (i.e. 0.5 inch (in) by 0.5 inch square). The cathode of the battery included a plurality of frustules comprising oxides of manganese nanostructures formed thereon and the anode included a plurality of frustules comprising ZnO nanostructures formed thereon. The battery included printed current collectors, anode, cathode, and separator. The anode and cathode each had an average thickness of about 40 microns (μm). The cathode had a total weight of about 0.021 grams (g), and the weight of the oxides of manganese was about 0.01 g. The weight of active material (e.g., ZnO) in the anode was in excess. The printed battery of FIG. 12 was charged and discharged at about 0.01 amperes/gram (A/g), based on the weight of active material in the cathode. FIG. 13 is a charge-discharge curve of the printed $Mn_xO_y$ and ZnO battery of FIG. 12, where the charge and discharge was performed at about 0.04 A/g. Both sets of curves show good repeatability for both charge and discharge, indicative that the printed $Mn_xO_y$/ZnO battery can be an effective rechargeable battery.

Example Embodiments

The following example embodiments identify some possible permutations of combinations of features disclosed herein, although other permutations of combinations of features are also possible.

1. A printed energy storage device comprising:
a first electrode;
a second electrode; and
a separator between the first electrode and the second electrode, at least one of the first electrode, the second electrode, and the separator including frustules.

2. The device of Embodiment 1, wherein the separator includes the frustules.

3. The device of Embodiment 1 or 2, wherein the first electrode includes the frustules.

4. The device of any of Embodiments 1-3, wherein the second electrode includes the frustules.

5. The device of any one of Embodiments 1-4, wherein the frustules have a substantially uniform property.

6. The device of Embodiment 5, wherein property comprises shape.

7. The device of Embodiment 6, wherein the shape comprises a cylinder, a sphere, a disc, or a prism.

8. The device of any of Embodiments 5-7, wherein the property comprises a dimension.

9. The device of Embodiment 8, wherein the dimension comprises diameter.

10. The device of Embodiment 9, wherein the diameter is in a range from about 2 μm to about 10 μm.

11. The device of Embodiment 8, wherein the dimension comprises length.

12. The device of Embodiment 9, wherein the length is in a range from about 5 μm to about 20 μm.

13. The device of Embodiment 8, wherein the dimension comprises a longest axis.

14. The device of Embodiment 9, wherein the longest axis is in a range from about 5 μm to about 20 μm.

15. The device of any of Embodiments 5-14, wherein the property comprises porosity.

16. The device of Embodiment 15, wherein the porosity is in a range from about 20% to about 50%.

17. The device of any of Embodiments 5-16, wherein the property comprises mechanical strength.

18. The device of any of Embodiment 1-17, wherein the frustules comprise a surface modifying structure.

19. The device of Embodiment 18, wherein the surface modifying structure includes a conductive material.

20. The device of Embodiment 19, wherein the conductive material includes at least one of silver, aluminum, tantalum, copper, lithium, magnesium, and brass.

21. The device of any of Embodiments 18-20, wherein the surface modifying structure includes zinc oxide (ZnO).

22. The device of any of Embodiments 18-21, wherein the surface modifying structure includes a semiconductor.

23. The device of Embodiment 22, wherein the semiconductor includes at least one of silicon, germanium, silicon germanium, and gallium arsenide.

24. The device of any of Embodiments 18-23, wherein the surface modifying structure comprises at least one of a nanowire, a nanoparticle, and a structure having a rosette shape.

25. The device of any of Embodiments 18-24, wherein the surface modifying structure is on an exterior surface of the frustules.

26. The device of any of Embodiments 18-25, wherein the surface modifying structure is on an interior surface of the frustules.

27. The device of any of Embodiments 1-26, wherein the frustules comprise a surface modifying material.

28. The device of Embodiment 27, wherein the surface modifying material includes a conductive material.

29. The device of Embodiment 28, wherein the conductive material includes at least one of silver, aluminum, tantalum, copper, lithium, magnesium, and brass.

30. The device of any of Embodiments 27-29, wherein the surface modifying material includes zinc oxide (ZnO).

31. The device of any of Embodiments 27-30, wherein the surface modifying material includes a semiconductor.

32. The device of Embodiment 31, wherein the semiconductor includes at least one of silicon, germanium, silicon germanium, and gallium arsenide.

33. The device of any of Embodiments 27-32, wherein the surface modifying material is on an exterior surface of the frustules.

34. The device of any of Embodiments 37-33, wherein the surface modifying material is on an interior surface of the frustules.

35. The device of any of Embodiments 1-34, wherein the first electrode comprises a conductive filler.

36. The device of any of Embodiments 1-35, wherein the second electrode comprises a conductive filler.

37. The device of Embodiment 34 or 35, wherein the conductive filler comprises graphitic carbon.

38. The device of any of Embodiments 35-37, wherein the conductive filler comprises graphene.

39. The device of any of Embodiments 1-38, wherein the first electrode comprises an adherence material.

40. The device of any of Embodiments 1-39, wherein the second electrode comprises an adherence material.

41. The device of any of Embodiments 1-40, wherein the separator comprises an adherence material.

42. The device of any of Embodiments 39-41, wherein the adherence material comprises a polymer.

43. The device of any of Embodiments 1-42, wherein the separator comprises an electrolyte.

44. The device of Embodiment 43, wherein the electrolyte comprises at least one of an ionic liquid, an acid, a base, and a salt.

45. The device of Embodiment 43 or 44, wherein the electrolyte comprises an electrolytic gel.

46. The device of any of Embodiments 1-45, further comprising a first current collector in electrical communication with the first electrode.

47. The device of any of Embodiments 1-46, further comprising a second current collector in electrical communication with the second electrode.

48. The device of any of Embodiments 1-47, wherein the printed energy storage device comprises a capacitor.

49. The device of any of Embodiments 1-47, wherein the printed energy storage device comprises a supercapacitor.

50. The device of any of Embodiments 1-47, wherein the printed energy storage device comprises a battery.

51. A system comprising a plurality of the devices of any of Embodiments 1-50 stacked on top of each other.

52. An electrical device comprising the device of any of Embodiments 1-50 or the system of Embodiment 51.

53. A membrane for a printed energy storage device, the membrane comprising frustules.

54. The membrane of Embodiment 53, wherein the frustules have a substantially uniform property.

55. The membrane of Embodiment 54, wherein the property comprises shape.

56. The membrane of Embodiment 55, wherein the shape comprises a cylinder, a sphere, a disc, or a prism.

57. The membrane of any of Embodiments 54-56, wherein the property comprises a dimension.

58. The membrane of Embodiment 57, wherein the dimension comprises diameter.

59. The membrane of Embodiment 58, wherein the diameter is in a range from about 2 μm to about 10 μm.

60. The membrane of any of Embodiments 54-59, wherein the dimension comprises length.

61. The membrane of Embodiment 60, wherein the length is in a range of about 5 μm to about 20 μm.

62. The membrane of any of Embodiments 54-61, wherein the dimension comprises a longest axis.

63. The membrane of Embodiment 62, wherein the longest axis is in a range of about 5 μm to about 20 μm.

64. The membrane of any of Embodiments 54-63, wherein the property comprises porosity.

65. The membrane of Embodiment 64, wherein the porosity is in a range from about 20% to about 50%.

66. The membrane of any of Embodiments 54-65, wherein the property comprises mechanical strength.

67. The membrane of any of Embodiments 53-66, wherein the frustules comprise a surface modifying structure.

68. The membrane of Embodiment 67, wherein the surface modifying structure includes a conductive material.

69. The membrane of Embodiment 68, wherein the conductive material includes at least one of silver, aluminum, tantalum, copper, lithium, magnesium, and brass.

70. The membrane of any of Embodiments 67-69, wherein the surface modifying structure includes zinc oxide (ZnO).

71. The membrane of any of Embodiments 67-70, wherein the surface modifying structure includes a semiconductor.

72. The membrane of Embodiment 71, wherein the semiconductor includes at least one of silicon, germanium, silicon germanium, and gallium arsenide.

73. The membrane of any of Embodiments 67-72, wherein the surface modifying structure comprises at least one of a nanowire, a nanoparticle, and a structure having a rosette shape.

74. The membrane of any of Embodiments 67-73, wherein the surface modifying structure is on an exterior surface of the frustules.

75. The membrane of any of Embodiments 67-74, wherein the surface modifying structure is on an interior surface of the frustules.

76. The membrane of any of Embodiments 53-75, wherein the frustules comprises a surface modifying material.

77. The membrane of Embodiment 76, wherein surface modifying material includes a conductive material.

78. The membrane of Embodiment 77, wherein the conductive material includes at least one of silver, aluminum, tantalum, copper, lithium, magnesium, and brass.

79. The membrane of any of Embodiments 76-78, wherein the surface modifying material includes zinc oxide (ZnO).

80. The membrane of any of Embodiments 76-79, wherein the surface modifying material includes a semiconductor.

81. The membrane of Embodiment 80, wherein the semiconductor includes at least one of silicon, germanium, silicon germanium, and gallium arsenide.

82. The membrane of any of Embodiments 76-81, wherein the surface modifying material is on an exterior surface of the frustules.

83. The membrane of any of Embodiments 76-82, wherein the surface modifying material is on an interior surface of the frustules.

84. The membrane of any of Embodiments 83-83, further comprising a conductive filler.

85. The membrane of Embodiment 84, wherein the conductive filler comprises graphitic carbon.

86. The membrane of Embodiment 84 or 85, wherein the conductive filler comprises graphene.

87. The membrane of any of Embodiments 53-86, further comprising an adherence material.

88. The membrane of Embodiment 87, wherein the adherence material comprises a polymer.

89. The membrane of any of Embodiments 53-88, further comprising an electrolyte.

90. The membrane of Embodiment 89, wherein the electrolyte comprises at least one of an ionic liquid, an acid, a base, and a salt.

91. The membrane of Embodiment 89 or 90, wherein the electrolyte comprises an electrolytic gel.

92. An energy storage device comprising the membrane of any of Embodiments 53-91.

93. The device of Embodiment 92, wherein the printed energy storage device comprises a capacitor.

94. The device of Embodiment 92, wherein the printed energy storage device comprises a supercapacitor.

95. The device of Embodiment 92, wherein the printed energy storage device comprises a battery.

96. A system comprising a plurality of the devices of any of Embodiments 92-95 stacked on top of each other.

97. An electrical device comprising the device of any of Embodiments 92-95 or the system of Embodiment 96.

98. A method of manufacturing a printed energy storage device, the method comprising:
forming a first electrode;
forming a second electrode; and
forming a separator between the first electrode and the second electrode, at least one of the first electrode, the second electrode, and the separator including frustules.

99. The method of Embodiment 98, wherein the separator includes the frustules.

100. The method of Embodiment 99, wherein forming the separator includes forming a dispersion including the frustules.

101. The method of Embodiment 99 or 100, wherein forming the separator includes screen printing the separator.

102. The method of Embodiment 99, wherein forming the separator includes forming a membrane including the frustules.

103. The method of Embodiment 102, wherein forming the separator includes roll-to-roll printing the membrane including the separator.

104. The method of any of Embodiments 98-103, wherein the first electrode includes the frustules.

105. The method of Embodiment 104, wherein forming the first electrode includes forming a dispersion including the frustules.

106. The method of Embodiment 104 or 105, wherein forming the first electrode includes screen printing the first electrode.

107. The method of Embodiment 104, wherein forming the first electrode includes forming a membrane including the frustules.

108. The method of Embodiment 107, wherein forming the first electrode includes roll-to-roll printing the membrane including the first electrode.

109. The method of any of Embodiments 98-108, wherein the second electrode includes the frustules.

110. The method of Embodiment 109, wherein forming the second electrode includes forming a dispersion including the frustules.

111. The method of Embodiment 109 or 110, wherein forming the second electrode includes screen printing the second electrode.

112. The method of Embodiment 109, wherein forming the second electrode includes forming a membrane including the frustules.

113. The method of Embodiment 112, wherein forming the second electrode includes roll-to-roll printing the membrane including the second electrode.

114. The method of any of Embodiments 98-113, further comprising sorting the frustules according to a property.

115. The method of Embodiment 114, wherein the property comprises at least one of shape, dimension, material, and porosity.

116. An ink comprising:
a solution; and
frustules dispersed in the solution.

117. The ink of Embodiment 116, wherein the frustules have a substantially uniform property.

118. The ink of Embodiment 117, wherein the property comprises shape.

119. The ink of Embodiment 118, wherein the shape comprises a cylinder, a sphere, a disc, or a prism.

120. The ink of any of Embodiments 117-119, wherein the property comprises a dimension.

121. The ink of Embodiment 120, wherein the dimension comprises diameter.

122. The ink of Embodiment 121, wherein the diameter is in a range from about 2 µm to about 10 µm.

123. The ink of any of Embodiments 117-122, wherein the dimension comprises length.

124. The ink of Embodiment 123, wherein the length is in a range of about 5 µm to about 20 µm.

125. The ink of any of Embodiments 117-124, wherein the dimension comprises a longest axis.

126. The ink of Embodiment 125, wherein the longest axis is in a range of about 5 µm to about 20 µm.

127. The ink of any of Embodiments 117-126, wherein the property comprises porosity.

128. The ink of Embodiment 127, wherein the porosity is in a range from about 20% to about 50%.

129. The ink of any of Embodiments 117-128, wherein the property comprises mechanical strength.

130. The ink of any of Embodiments 116-129, wherein the frustules comprise a surface modifying structure.

131. The ink of Embodiment 130, wherein the surface modifying structure includes a conductive material.

132. The ink of Embodiment 131, wherein the conductive material includes at least one of silver, aluminum, tantalum, copper, lithium, magnesium, and brass.

133. The ink of any of Embodiments 130-132, wherein the surface modifying structure includes zinc oxide (ZnO).

134. The ink of any of Embodiments 130-133, wherein the surface modifying structure includes a semiconductor.

135. The ink of Embodiment 134, wherein the semiconductor includes at least one of silicon, germanium, silicon germanium, and gallium arsenide.

136. The ink of any of Embodiments 130-135, wherein the surface modifying structure comprises at least one of a nanowire, a nanoparticle, and a structure having a rosette shape.

137. The ink of any of Embodiments 130-136, wherein the surface modifying structure is on an exterior surface of the frustules.

138. The ink of any of Embodiments 130-137, wherein the surface modifying structure is on an interior surface of the frustules.

139. The ink of any of Embodiments 116-138, wherein the frustules comprises a surface modifying material.

140. The ink of Embodiment 139, wherein surface modifying material includes a conductive material.

141. The ink of Embodiment 140, wherein the conductive material includes at least one of silver, aluminum, tantalum, copper, lithium, magnesium, and brass.

142. The ink of any of Embodiments 139-141, wherein the surface modifying material includes zinc oxide (ZnO).

143. The ink of any of Embodiments 139-142, wherein the surface modifying material includes a semiconductor.

144. The ink of Embodiment 143, wherein the semiconductor includes at least one of silicon, germanium, silicon germanium, and gallium arsenide.

145. The ink of any of Embodiments 139-144, wherein the surface modifying material is on an exterior surface of the frustules.

146. The ink of any of Embodiments 139-145, wherein the surface modifying material is on an interior surface of the frustules.

147. The ink of any of Embodiments 116-146, further comprising a conductive filler.

148. The ink of Embodiment 147, wherein the conductive filler comprises graphitic carbon.

149. The ink of Embodiment 147 or 148, wherein the conductive filler comprises graphene.

150. The ink of any of Embodiments 116-149, further comprising an adherence material.

151. The ink of Embodiment 150, wherein the adherence material comprises a polymer.

152. The ink of any of Embodiments 116-151, further comprising an electrolyte.

153. The ink of Embodiment 152, wherein the electrolyte comprises at least one of an ionic liquid, an acid, a base, and a salt.

154. The ink of Embodiment 152 or 153, wherein the electrolyte comprises an electrolytic gel.

155. A device comprising the ink of any of Embodiments 116-154.

156. The device of Embodiment 155, wherein the device comprises a printed energy storage device.

157. The device of Embodiment 156, wherein the printed energy storage device comprises a capacitor.

158. The device of Embodiment 156, wherein the printed energy storage device comprises a supercapacitor.

159. The device of Embodiment 156, wherein the printed energy storage device comprises a battery.

160. A method of extracting a diatom frustule portion, the method comprising:
dispersing a plurality of diatom frustule portions in a dispersing solvent;
removing at least one of an organic contaminant and an inorganic contaminant;
dispersing the plurality of diatom frustule portions in a surfactant, the surfactant reducing an agglomeration of the plurality of diatom frustule portions; and
extracting a plurality of diatom frustule portions having at least one common characteristic using a disc stack centrifuge.

161. The method of embodiment 160, wherein the at least one common characteristic comprises at least one of a dimension, a shape, a material, and a degree of brokenness.

162. The method of embodiment 161, wherein the dimension comprises at least one of a length and a diameter.

163. The method of any one of embodiments 160 to 162, wherein a solid mixture comprises the plurality of diatom frustule portions.

164. The method of embodiment 163, further comprising reducing a particle dimension of the solid mixture.

165. The method of embodiment 164, wherein reducing the particle dimension of the solid mixture is before dispersing the plurality of diatom frustule portions in the dispersing solvent.

166. The method of embodiment 164 or 165, wherein reducing the particle dimension comprises grinding the solid mixture.

167. The method of embodiment 166, wherein grinding the solid mixture comprises applying to the solid mixture at least one of a mortar and a pestle, a jar mill, and a rock crusher.

168. The method of any one of embodiments 163 to 167, further comprising extracting a component of the solid mixture having a longest component dimension that is greater than a longest frustule portion dimension of the plurality of diatom frustule portions.

169. The method of embodiment 168, wherein extracting the component of the solid mixture comprises sieving the solid mixture.

170. The method of embodiment 169, wherein sieving the solid mixture comprises processing the solid mixture with a sieve having a mesh size from about 15 microns to about 25 microns.

171. The method of embodiment 169, wherein sieving the solid mixture comprises processing the solid mixture with a sieve having a mesh size from about 10 microns to about 25 microns.

172. The method of any one of embodiments 160 to 171, further comprising sorting the plurality of diatom frustule portions to separate a first diatom frustule portion from a second diatom frustule portion, the first diatom frustule portion having a greater longest dimension.

173. The method of embodiment 172, wherein the first diatom frustule portion comprises a plurality of unbroken diatom frustule portions.

174. The method of embodiment 172 or 173, wherein the second diatom frustule portion comprises a plurality of broken diatom frustule portions.

175. The method of any one of embodiments 172 to 174, wherein sorting comprises filtering the plurality of diatom frustule portions.

176. The method of embodiment 175, wherein filtering comprises disturbing agglomeration of the plurality of diatom frustule portions.

177. The method of embodiment 176, wherein disturbing agglomeration of the plurality of diatom frustule portions comprises stirring.

178. The method of embodiment 176 or 177, wherein disturbing agglomeration of the plurality of diatom frustule portions comprises shaking.

179. The method of any one of embodiments 176 to 178, wherein disturbing agglomeration of the plurality of diatom frustule portions comprises bubbling.

180. The method of any one of embodiments 175 to 179, wherein filtering comprises applying a sieve to the plurality of diatom frustule portions.

181. The method of embodiment 180, wherein the sieve has a mesh size from about 5 microns to about 10 microns.

182. The method of embodiment 180, wherein the sieve has a mesh size of about 7 microns.

183. The method of any one of embodiments 160 to 182, further comprising obtaining a washed diatom frustule portion.

184. The method of embodiment 183, wherein obtaining the washed diatom frustule portion comprises washing the plurality of diatom frustule portions with a cleaning solvent after removing the at least one of the organic contaminant and the inorganic contaminant.

185. The method of embodiment 183 or 184, wherein obtaining the washed diatom frustule portion comprises washing the diatom frustule portion having the at least one common characteristic with a cleaning solvent.

186. The method of embodiment 184 or 185, further comprising removing the cleaning solvent.

187. The method of embodiment 186, wherein removing the cleaning solvent comprises sedimenting the plurality of diatom frustule portions after removing at least one of the organic contaminant and the inorganic contaminant.

188. The method of embodiment 186 or 187, wherein removing the cleaning solvent comprises sedimenting the plurality of diatom frustule portions having the at least one common characteristic.

189. The method of embodiment 187 or 188, wherein sedimenting comprises centrifuging.

190. The method of embodiment 189, wherein centrifuging comprises applying a centrifuge suitable for large scale processing.

191. The method of embodiment 190, wherein centrifuging comprises applying at least one of a disc stack centrifuge, a decanter centrifuge, and a tubular bowl centrifuge.

192. The method of any one of embodiments 184 to 191, wherein at least one of the dispersing solvent and the cleaning solvent comprises water.

193. The method of any one of embodiments 160 to 192, wherein at least one of dispersing the plurality of diatom frustule portions in the dispersing solvent and dispersing the plurality of diatom frustule portions in the surfactant comprises sonicating the plurality of diatom frustules.

194. The method of any one of embodiments 160 to 193, wherein the surfactant comprises a cationic surfactant.

195. The method of embodiment 194, wherein the cationic surfactant comprises at least one of a benzalkonium chloride, a cetrimonium bromide, a lauryl methyl gluceth-10 hydroxypropyl dimonium chloride, a benzethonium chloride, a benzethonium chloride, a bronidox, a dmethyldioctadecylammonium chloride, and a tetramethylammonium hydroxide.

196. The method of any one of embodiments 160 to 195, wherein the surfactant comprises a non-ionic surfactant.

197. The method of embodiment 196, wherein the non-ionic surfactant comprises at least one of a cetyl alcohol, a stearyl alcohol, a cetostearyl alcohol, an oleyl alcohol, a polyoxyethylene glycol alkyl ether, an octaethylene glycol monododecyl ether, a glucoside alkyl ethers, a decyl glucoside, a polyoxyethylene glycol octylphenol ethers, an octylphenol ethoxylate (Triton X-100™), a nonoxynol-9, a glyceryl laurate, a polysorbate, and a poloxamer.

198. The method of any one of embodiments 160 to 197, further comprising dispersing the plurality of diatom frustules in an additive component.

199. The method of embodiment 198, wherein dispersing the plurality of diatom frustules in an additive component is before dispersing the plurality of diatom frustules in the surfactant.

200. The method of embodiment 198, wherein dispersing the plurality of diatom frustules in an additive component is after dispersing the plurality of diatom frustules in the surfactant.

201. The method of embodiment 198, wherein dispersing the plurality of diatom frustules in an additive component is at least partially simultaneous with dispersing the plurality of diatom frustules in the surfactant.

202. The method of any one of embodiments 198 to 201, wherein the additive component comprises at least one of a potassium chloride, an ammonium chloride, an ammonium hydroxide, and a sodium hydroxide.

203. The method of any one of embodiments 160 to 202, wherein dispersing the plurality of diatom frustule portions comprises obtaining a dispersion comprising about 1 weight percent to about 5 weight percent of the plurality of diatom frustule portions.

204. The method of any one of embodiments 160 to 203, wherein removing the organic contaminant comprises heating the plurality of diatom frustule portions in the presence of a bleach.

205. The method of embodiment 204, wherein the bleach comprises at least one of a hydrogen peroxide and a nitric acid.

206. The method of embodiment 205, wherein heating comprises heating the plurality of diatom frustule portions in a solution comprising an amount of hydrogen peroxide in a range from about 10 volume percent to about 20 volume percent.

207. The method of any one of embodiments 204 to 206, wherein heating comprises heating the plurality of diatom frustule portions for a duration of about 5 minutes to about 15 minutes.

208. The method of any one of embodiments 160 to 207, wherein removing the organic contaminant comprises annealing the plurality of diatom frustule portions.

209. The method of any one of embodiments 160 to 208, wherein removing the inorganic contaminant comprises combining the plurality of diatom frustule portions with at least one of a hydrochloric acid and a sulfuric acid.

210. The method of embodiment 209, wherein the combining comprises mixing the plurality of diatom frustule portions in a solution comprising about 15 volume percent to about 25 volume percent of hydrochloric acid.

211. The method of embodiment 210, wherein the mixing is for a duration of about 20 minutes to about 40 minutes.

212. A method of extracting a diatom frustule portion, the method comprising:
extracting a plurality of diatom frustule portions having at least one common characteristic using a disc stack centrifuge.

213. The method of embodiment 212, further comprising dispersing the plurality of diatom frustule portions in a dispersing solvent.

214. The method of embodiment 212 or 213, further comprising removing at least one of an organic contaminant and an inorganic contaminant.

215. The method of any one of embodiments 212 to 214, further comprising dispersing the plurality of diatom frustule portions in a surfactant, the surfactant reducing an agglomeration of the plurality of diatom frustule portions.

216. The method of any one of embodiments 212 to 215, wherein the at least one common characteristic comprises at least one of a dimension, a shape, a material, and a degree of brokenness.

217. The method of embodiment 216, wherein the dimension comprises at least one of a length and a diameter.

218. The method of any one of embodiments 212 to 217, wherein a solid mixture comprises the plurality of diatom frustule portions.

219. The method of embodiment 218, further comprising reducing a particle dimension of the solid mixture.

220. The method of embodiment 219, wherein reducing the particle dimension of the solid mixture is before dispersing the plurality of diatom frustule portions in the dispersing solvent.

221. The method of embodiment 219 or 220, wherein reducing the particle dimension comprises grinding the solid mixture.

222. The method of embodiment 221, wherein grinding the solid mixture comprises applying to the solid mixture at least one of a mortar and a pestle, a jar mill, and a rock crusher.

223. The method of any one of embodiments 219 to 222, further comprising extracting a component of the solid mixture having a longest component dimension that is greater than a longest frustule portion dimension of the plurality of diatom frustule portions.

224. The method of embodiment 223, wherein extracting the component of the solid mixture comprises sieving the solid mixture.

225. The method of embodiment 224, wherein sieving the solid mixture comprises processing the solid mixture with a sieve having a mesh size from about 15 microns to about 25 microns.

226. The method of embodiment 224, wherein sieving the solid mixture comprises processing the solid mixture with a sieve having a mesh size from about 10 microns to about 25 microns.

227. The method of any one of embodiments 212 to 226, further comprising sorting the plurality of diatom frustule portions to separate a first diatom frustule portion from a second diatom frustule portion, the first diatom frustule portion having a greater longest dimension.

228. The method of embodiment 227, wherein the first diatom frustule portion comprises a plurality of unbroken diatom frustule portions.

229. The method of embodiment 227 or 228, wherein the second diatom frustule portion comprises a plurality of broken diatom frustule portions.

230. The method of any one of embodiments 227 to 229, wherein sorting comprises filtering the plurality of diatom frustule portions.

231. The method of embodiment 230, wherein filtering comprises disturbing agglomeration of the plurality of diatom frustule portions.

232. The method of embodiment 231, wherein disturbing agglomeration of the plurality of diatom frustule portions comprises stirring.

233. The method of embodiment 231 or 282, wherein disturbing agglomeration of the plurality of diatom frustule portions comprises shaking.

234. The method of any one of embodiments 231 to 233, wherein disturbing agglomeration of the plurality of diatom frustule portions comprises bubbling.

235. The method of any one of embodiments 230 to 234, wherein filtering comprises applying a sieve to the plurality of diatom frustule portions.

236. The method of embodiment 235, wherein the sieve has a mesh size from about 5 microns to about 10 microns.

237. The method of embodiment 235, wherein the sieve has a mesh size of about 7 microns.

238. The method of any one of embodiments 212 to 237, further comprising obtaining a washed diatom frustule portion.

239. The method of embodiment 238, wherein obtaining the washed diatom frustule portion comprises washing the plurality of diatom frustule portions with a cleaning solvent after removing at least one of the organic contaminant and the inorganic contaminant.

240. The method of embodiment 238 or 239, wherein obtaining the washed diatom frustule portion comprises washing the diatom frustule portion having the at least one common characteristic with a cleaning solvent.

241. The method of embodiment 239 or 240, further comprising removing the cleaning solvent.

242. The method of embodiment 241, wherein removing the cleaning solvent comprises sedimenting the plurality of diatom frustule portions after removing the at least one of the organic contaminant and the inorganic contaminant.

243. The method of embodiment 241 or 242, wherein removing the cleaning solvent comprises sedimenting the plurality of diatom frustule portions having the at least one common characteristic.

244. The method of embodiment 242 or 243, wherein sedimenting comprises centrifuging.

245. The method of embodiment 244, wherein centrifuging comprises applying a centrifuge suitable for large scale processing.

246. The method of embodiment 245, wherein centrifuging comprises applying at least one of a disc stack centrifuge, a decanter centrifuge, and a tubular bowl centrifuge.

247. The method of any one of embodiments 240 to 246, wherein at least one of the dispersing solvent and the cleaning solvent comprises water.

248. The method of any one of embodiments 215 to 247, wherein at least one of dispersing the plurality of diatom frustule portions in the dispersing solvent and dispersing the plurality of diatom frustule portions in the surfactant comprises sonicating the plurality of diatom frustules.

249. The method of any one of embodiments 215 to 248, wherein the surfactant comprises a cationic surfactant.

250. The method of embodiment 249, wherein the cationic surfactant comprises at least one of a benzalkonium chloride, a cetrimonium bromide, a lauryl methyl gluceth-10 hydroxypropyl dimonium chloride, a benzethonium chloride, a benzethonium chloride, a bronidox, a dmethyldioctadecylammonium chloride, and a tetramethylammonium hydroxide.

251. The method of any one of embodiments 212 to 250, wherein the surfactant comprises a non-ionic surfactant.

252. The method of embodiment 251, wherein the non-ionic surfactant comprises at least one of a cetyl alcohol, a stearyl alcohol, a cetostearyl alcohol, an oleyl alcohol, a polyoxyethylene glycol alkyl ether, an octaethylene glycol monododecyl ether, a glucoside alkyl ethers, a decyl glucoside, a polyoxyethylene glycol octylphenol ethers, an octylphenol ethoxylate (Triton X-100™), a nonoxynol-9, a glyceryl laurate, a polysorbate, and a poloxamer.

253. The method of any one of embodiments 212 to 252, further comprising dispersing the plurality of diatom frustules in an additive component.

254. The method of embodiment 253, wherein dispersing the plurality of diatom frustules in an additive component is before dispersing the plurality of diatom frustules in the surfactant.

255. The method of embodiment 253, wherein dispersing the plurality of diatom frustules in an additive component is after dispersing the plurality of diatom frustules in the surfactant.

256. The method of embodiment 253, wherein dispersing the plurality of diatom frustules in an additive component is at least partially simultaneous with dispersing the plurality of diatom frustules in the surfactant.

257. The method of any one of embodiments 253 to 256, wherein the additive component comprises at least one of a potassium chloride, an ammonium chloride, an ammonium hydroxide, and a sodium hydroxide.

258. The method of any one of embodiments 213 to 257, wherein dispersing the plurality of diatom frustule portions in the dispersing solvent comprises obtaining a dispersion comprising about 1 weight percent to about 5 weight percent of the plurality of diatom frustule portions.

259. The method of any one of embodiments 214 to 258, wherein removing the organic contaminant comprises heating the plurality of diatom frustule portions in the presence of a bleach.

260. The method of embodiment 259, wherein the bleach comprises at least one of a hydrogen peroxide, and a nitric acid.

261. The method of embodiment 260, wherein heating comprises heating the plurality of diatom frustule portions in a solution comprising an amount of hydrogen peroxide in a range from about 10 volume percent to about 20 volume percent.

262. The method of any one of embodiments 259 to 261, wherein heating comprises heating the plurality of diatom frustule portions for a duration of about 5 minutes to about 15 minutes.

263. The method of any one of embodiments 214 to 262, wherein removing the organic contaminant comprises annealing the plurality of diatom frustule portions.

264. The method of any one of embodiments 214 to 263, wherein removing the inorganic contaminant comprises combining the plurality of diatom frustule portions with at least one of a hydrochloric acid and a sulfuric acid.

265. The method of embodiment 264, wherein combining comprises mixing the plurality of diatom frustule portions in a solution comprising about 15 volume percent to about 25 volume percent of hydrochloric acid.

266. The method of embodiment 265, wherein the mixing is for a duration of about 20 minutes to about 40 minutes.

267. A method of extracting a diatom frustule portion, the method comprising:
dispersing a plurality of diatom frustule portions with a surfactant, the surfactant reducing an agglomeration of the plurality of diatom frustule portions.

268. The method of embodiment 267, further comprising extracting a plurality of diatom frustule portions having at least one common characteristic using a disc stack centrifuge.

269. The method of embodiment 267 or 268, further comprising dispersing the plurality of diatom frustule portions in a dispersing solvent.

270. The method of any one of embodiments 267 to 269, further comprising removing at least one of an organic contaminant and an inorganic contaminant.

271. The method of any one of embodiments 267 to 270, wherein the at least one common characteristic comprises at least one of a dimension, a shape, a material, and a degree of brokenness.

272. The method of embodiment 271, wherein the dimension comprises at least one of a length and a diameter.

273. The method of any one of embodiments 267 to 272, wherein a solid mixture comprises the plurality of diatom frustule portions.

274. The method of embodiment 273, further comprising reducing a particle dimension of the solid mixture.

275. The method of embodiment 274, wherein reducing the particle dimension of the solid mixture is before dispersing the plurality of diatom frustule portions in the dispersing solvent.

276. The method of embodiment 274 or 275, wherein reducing the particle dimension comprises grinding the solid mixture.

277. The method of embodiment 276, wherein grinding the solid mixture comprises applying to the solid mixture at least one of a mortar and a pestle, a jar mill, and a rock crusher.

278. The method of any one of embodiments 273 to 277, further comprising extracting a component of the solid mixture having a longest component dimension that is greater than a longest frustule portion dimension of the plurality of diatom frustule portions.

279. The method of embodiment 278, wherein extracting the component of the solid mixture comprises sieving the solid mixture.

280. The method of embodiment 279, wherein sieving the solid mixture comprises processing the solid mixture with a sieve having a mesh size from about 15 microns to about 25 microns.

281. The method of embodiment 279, wherein sieving the solid mixture comprises processing the solid mixture with a sieve having a mesh size from about 10 microns to about 25 microns.

282. The method of any one of embodiments 267 to 281, further comprising sorting the plurality of diatom frustule portions to separate a first diatom frustule portion from a second diatom frustule portion, the first diatom frustule portion having a greater longest dimension.

283. The method of embodiment 282, wherein the first diatom frustule portion comprises a plurality of unbroken diatom frustule portions.

284. The method of embodiment 282 or 283, wherein the second diatom frustule portion comprises a plurality of broken diatom frustule portions.

285. The method of any one of embodiments 282 to 284, wherein sorting comprises filtering the plurality of diatom frustule portions.

286. The method of embodiment 285, wherein filtering comprises disturbing agglomeration of the plurality of diatom frustule portions.

287. The method of embodiment 286, wherein disturbing agglomeration of the plurality of diatom frustule portions comprises stirring.

288. The method of embodiment 286 or 287, wherein disturbing agglomeration of the plurality of diatom frustule portions comprises shaking.

289. The method of any one of embodiments 286 to 288, wherein disturbing agglomeration of the plurality of diatom frustule portions comprises bubbling.

290. The method of any one of embodiments 285 to 289, wherein filtering comprises applying a sieve to the plurality of diatom frustule portions.

291. The method of embodiment 290, wherein the sieve has a mesh size from about 5 microns to about 10 microns.

292. The method of embodiment 290, wherein the sieve has a mesh size of about 7 microns.

293. The method of any one of embodiments 267 to 292, further comprising obtaining a washed diatom frustule portion.

294. The method of embodiment 293, wherein obtaining the washed diatom frustule portion comprises washing the plurality of diatom frustule portions with a cleaning solvent after removing the at least one of the organic contaminant and the inorganic contaminant.

295. The method of embodiment 293 or 294 wherein obtaining the washed diatom frustule portion comprises washing the diatom frustule portion having the at least one common characteristic with a cleaning solvent.

296. The method of embodiment 294 or 295, further comprising removing the cleaning solvent.

297. The method of embodiment 296, wherein removing the cleaning solvent comprises sedimenting the plurality of diatom frustule portions after removing the at least one of the organic contaminant and the inorganic contaminant.

298. The method of embodiment 296 or 297, wherein removing the cleaning solvent comprises sedimenting the plurality of diatom frustule portions having the at least one common characteristic.

299. The method of embodiment 297 or 298, wherein sedimenting comprises centrifuging.

300. The method of embodiment 299, wherein centrifuging comprises applying a centrifuge suitable for large scale processing.

301. The method of embodiment 300, wherein centrifuging comprises applying at least one of a disc stack centrifuge, a decanter centrifuge, and a tubular bowl centrifuge.

302. The method of any one of embodiments 295 to 301, wherein at least one of the dispersing solvent and the cleaning solvent comprises water.

303. The method of any one of embodiments 269 to 302, wherein at least one of dispersing the plurality of diatom frustule portions in the dispersing solvent and dispersing the plurality of diatom frustule portions in the surfactant comprises sonicating the plurality of diatom frustules.

304. The method of any one of embodiments 267 to 303, wherein the surfactant comprises a cationic surfactant.

305. The method of embodiment 304, wherein the cationic surfactant comprises at least one of a benzalkonium chloride, a cetrimonium bromide, a lauryl methyl gluceth-10 hydroxypropyl dimonium chloride, a benzethonium chloride, a benzethonium chloride, a bronidox, a dmethyldioctadecylammonium chloride, and a tetramethylammonium hydroxide.

306. The method of any one of embodiments 267 to 305, wherein the surfactant comprises a non-ionic surfactant.

307. The method of embodiment 306, wherein the non-ionic surfactant comprises at least one of a cetyl alcohol, a stearyl alcohol, a cetostearyl alcohol, an oleyl alcohol, a polyoxyethylene glycol alkyl ether, an octaethylene glycol monododecyl ether, a glucoside alkyl ethers, a decyl glucoside, a polyoxyethylene glycol octylphenol ethers, an octylphenol ethoxylate (Triton X-100™), a nonoxynol-9, a glyceryl laurate, a polysorbate, and a poloxamer.

308. The method of any one of embodiments 267 to 307, further comprising dispersing the plurality of diatom frustules in an additive component.

309. The method of embodiment 308, wherein dispersing the plurality of diatom frustules in an additive component is before dispersing the plurality of diatom frustules in the surfactant.

310. The method of embodiment 308, wherein dispersing the plurality of diatom frustules in an additive component is after dispersing the plurality of diatom frustules in the surfactant.

311. The method of embodiment 308, wherein dispersing the plurality of diatom frustules in an additive component is at least partially simultaneous with dispersing the plurality of diatom frustules in the surfactant.

312. The method of any one of embodiments 308 to 311, wherein the additive component comprises at least one of a potassium chloride, an ammonium chloride, an ammonium hydroxide, and a sodium hydroxide.

313. The method of any one of embodiments 269 to 312, wherein dispersing the plurality of diatom frustule portions in the dispersing solvent comprises obtaining a dispersion comprising about 1 weight percent to about 5 weight percent of the plurality of diatom frustule portions.

314. The method of any one of embodiments 270 to 313, wherein removing the organic contaminant comprises heating the plurality of diatom frustule portions in the presence of a bleach.

315. The method of embodiment 314, wherein the bleach comprises at least one of a hydrogen peroxide, and a nitric acid.

316. The method of embodiment 315, wherein heating comprises heating the plurality of diatom frustule portions in a solution comprising an amount of hydrogen peroxide in a range from about 10 volume percent to about 20 volume percent.

317. The method of any one of embodiments 314 to 316, wherein heating comprises heating the plurality of diatom frustule portions for a duration of about 5 minutes to about 15 minutes.

318. The method of any one of embodiments 270 to 317, wherein removing the organic contaminant comprises annealing the plurality of diatom frustule portions.

319. The method of any one of embodiments 270 to 218, wherein removing the inorganic contaminant comprises combining the plurality of diatom frustule portions with at least one of a hydrochloric acid and a sulfuric acid.

320. The method of embodiment 319, wherein combining comprises mixing the plurality of diatom frustule portions in a solution comprising about 15 volume percent to about 25 volume percent of hydrochloric acid.

321. The method of embodiment 320, wherein the mixing is for a duration of about 20 minutes to about 40 minutes.

322. A method of forming silver nanostructures on a diatom frustule portion, the method comprising:
    forming a silver seed layer on a surface of the diatom frustule portion; and
    forming a nanostructure on the seed layer.

323. The method of embodiment 322, wherein the nanostructures comprises at least one of a coating, a nanowire, a nanoplate, a dense array of nanoparticles, a nanobelt, and a nanodisk.

324. The method of embodiment 322 or 323, wherein the nanostructures comprises silver.

325. The method of any one of embodiment 322 to 324, wherein forming the silver seed layer comprises applying a cyclic heating regimen to a first silver contributing component and the diatom frustule portion.

326. The method of embodiment 325, wherein applying the cyclic heating regimen comprises applying a cyclic microwave power.

327. The method of embodiment 326, wherein applying the cyclic microwave power comprises alternating a microwave power between about 100 Watt and 500 Watt.

328. The method of embodiment 327, wherein alternating comprises alternating the microwave power every minute.

329. The method of embodiment 327 or 328, wherein alternating comprises alternating the microwave power for a duration of about 30 minutes.

330. The method of embodiment 327 or 328, wherein alternating comprises alternating the microwave power for a duration of about 20 minutes to about 40 minutes.

331. The method of any one of embodiments 322 to 330, wherein forming the silver seed layer comprises combining the diatom frustule portion with a seed layer solution.

332. The method of embodiment 331, wherein the seed layer solution comprises the first silver contributing component and a seed layer reducing agent.

333. The method of embodiment 332, wherein the seed layer reducing agent is a seed layer solvent.

334. The method of embodiment 333, wherein the seed layer reducing agent and the seed layer solvent comprises a polyethylene glycol.

335. The method of embodiment 331, wherein the seed layer solution comprises the first silver contributing component, a seed layer reducing agent and a seed layer solvent.

336. The method of any one of embodiments 331 to 335, wherein forming the silver seed layer further comprises mixing the diatom frustule portion with the seed layer solution.

337. The method of embodiment 336, wherein mixing comprises ultrasonicating.

338. The method of embodiment 337, wherein the seed layer reducing agent comprises a N,N-Dimethylformamide, the first silver contributing component comprises a silver nitrate, and the seed layer solvent comprises at least one of a water and a polyvinylpyrrolidone.

339. The method of any one of embodiments 322 to 338, wherein forming the nanostructure comprises combining the diatom frustule portion with a nanostructure forming reducing agent.

340. The method of embodiment 339, wherein forming the nanostructure further comprises heating the diatom frustule portion after combining the diatom frustule portion with the nanostructure forming reducing agent.

341. The method of embodiment 340, wherein heating comprises heating to a temperature of about 120° C. to about 160° C.

342. The method of embodiment 340 or 341, wherein forming the nanostructure further comprises titrating the diatom frustule portion with a titration solution comprising a nanostructure forming solvent and a second silver contributing component.

343. The method of embodiment 342, wherein forming the nanostructure further comprises mixing after titrating the diatom frustule portion with the titration solution.

344. The method of any one of embodiments 339 to 343, wherein at least one of the seed layer reducing agent and the nanostructure forming reducing agent comprises at least one of a hydrazine, a formaldehyde, a glucose, sodium tartrate, an oxalic acid, a formic acid, an ascorbic acid, and an ethylene glycol.

345. The method of any one of embodiments 342 to 344, wherein at least one of the first silver contributing component and the second silver contributing component comprises at least one of a silver salt and a silver oxide.

346. The method of embodiment 345, wherein the silver salt comprises at least one of a silver nitrate and an ammoniacal silver nitrate, a silver chloride (AgCl), a silver cyanide (AgCN), a silver tetrafluoroborate, a silver hexafluorophosphate, and a silver ethylsulphate.

347. The method of any one of embodiments 322 to 346, wherein forming the nanostructure is in an ambient to reduce oxide formation.

348. The method of embodiment 347, wherein the ambient comprises an argon atmosphere.

349. The method of any one of embodiments 342 to 348, wherein at least one of the seed layer solvent and the nanostructure forming solvent comprises at least one of a proplyene glycol, a water, a methanol, an ethanol, a 1-propanol, a 2-propanol a 1-methoxy-2-propanol, a 1-butanol, a 2-butanol a 1-pentanol, a 2-pentanol, a 3-pentanol, a 1-hexanol, a 2-hexanol, a 3-hexanol, an octanol, a 1-octanol, a 2-octanol, a 3-octanol, a tetrahydrofurfuryl alcohol (THFA), a cyclohexanol, a cyclopentanol, a terpineol, a butyl lactone; a methyl ethyl ether, a diethyl ether, an ethyl propyl ether, a polyethers, a diketones, a cyclohexanone, a cyclopentanone, a cycloheptanone, a cyclooctanone, an acetone, a benzophenone, an acetylacetone, an acetophenone, a cyclopropanone, an isophorone, a methyl ethyl ketone, an ethyl acetate, a dimethyl adipate, a proplyene glycol monomethyl ether acetate, a dimethyl glutarate, a dimethyl succinate, a glycerin acetate, a carboxylates, a propylene carbonate, a glycerin, a diol, a triol, a tetraol, a pentaol, an ethylene glycol, a diethylene glycol, a polyethylene glycol, a propylene glycol, a dipropylene glycol, a glycol ether, a glycol ether acetate, a 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, a 2-methyl-2,4-pentanediol, a tetramethyl urea, a n-methylpyrrolidone, an acetonitrile, a tetrahydrofuran (THF), a dimethyl formamide (DMF), a N-methyl formamide (NMF), a dimethyl sulfoxide (DMSO), a thionyl chloride and a sulfuryl chloride.

350. The method of any one of embodiments 322 to 349, wherein the diatom frustule portion comprises a broken diatom frustule portion.

351. The method of any one of embodiments 322 to 349, wherein the diatom frustule portion comprises an unbroken diatom frustule portion.

352. The method of any one of embodiments 322 to 351, wherein the diatom frustule portion is obtained through a diatom frustule portion separation process.

353. The method of embodiment 352, wherein the process comprises at least one of using a surfactant to reduce an agglomeration of a plurality of diatom frustule portions and using a disc stack centrifuge.

354. A method of forming zinc-oxide nanostructures on a diatom frustule portion, the method comprising:
forming a zinc-oxide seed layer on a surface of the diatom frustule portion; and
forming a nanostructure on the zinc-oxide seed layer.

355. The method of embodiment 354, wherein the nanostructure comprises at least one of a nanowire, a nanoplate, a dense array of nanoparticles, a nanobelt, and a nanodisk.

356. The method of embodiment 354 or 355, wherein the nanostructures comprises zinc-oxide.

357. The method of any one of embodiments 354 to 356, wherein forming the zinc-oxide seed layer comprises heating a first zinc contributing component and the diatom frustule portion.

358. The method of embodiment 357, wherein heating the first zinc contributing component and the diatom frustule portion comprises heating to a temperature in a range from about 175° C. to about 225° C.

359. The method of any one of embodiments 354 to 358, wherein forming the nanostructure comprises applying a heating regimen to the diatom frustule portion having the zinc-oxide seed layer in the presence of a nanostructure forming solution comprising a second zinc contributing component.

360. The method of embodiment 359, wherein the heating regimen comprises heating to a nanostructure forming temperature.

361. The method of embodiment 360, wherein the nanostructure forming temperature is from about 80° C. to about 100° C.

362. The method of embodiment 360 or 361, wherein the heating is for a duration of about one to about three hours.

363. The method of any one of embodiments 359 to 362, wherein the heating regimen comprises applying a cyclic heating routine.

364. The method of embodiment 363, wherein the cyclic heating routine comprises applying a microwave heating to the diatom frustule portion having the zinc-oxide seed layer for a heating duration and then turning the microwaving heating off for a cooling duration, for a total cyclic heating duration.

365. The method of embodiment 364, wherein the heating duration is about 1 minute to about 5 minutes.

366. The method of embodiment 364 or 365, wherein the cooling duration is about 30 seconds to about 5 minutes.

367. The method of any one of embodiments 364 to 366, wherein the total cyclic heating duration is about 5 minutes to about 20 minutes.

368. The method of any one of embodiments 364 to 367, wherein applying the microwave heating comprises applying about 480 Watt to about 520 Watt of microwave power.

369. The method of any one of embodiments 364 to 367, wherein applying the microwave heating comprises applying about 80 Watt to about 120 Watt of microwave power.

370. The method of any one of embodiments 359 to 369, wherein at least one of the first zinc contributing component and the second zinc contributing component comprise at least one of a zinc acetate, a zinc acetate hydrate, a zinc nitrate, a zinc nitrate hexahydrate, a zinc chloride, a zinc sulfate, and a sodium zincate.

371. The method of any one of embodiments 359 to 370, wherein the nanostructure forming solution comprises a base.

372. The method of embodiment 371, wherein the base comprises at least one of a sodium hydroxide, an ammonium hydroxide, potassium hydroxide, a teramethylammonium hydroxide, a lithium hydroxide, a hexamethylenetetramine, an ammonia solution, a sodium carbonate, and a ethylenediamine.

373. The method of any one of embodiments 354 to 372, wherein forming the nanostructure further comprises adding an additive component.

374. The method of embodiment 373, wherein the additive component comprises at least one of a tributylamine, a triethylamine, a triethanolamine, a diisopropylamine, an ammonium phosphate, a 1,6-hexadianol, a triethyldiethylnol, an isopropylamine, a cyclohexylamine, a n-butylamine, an ammonium chloride, a hexamethylenetetramine, an ethylene glycol, an ethanoamine, a polyvinylalcohol, a polyethylene glycol, a sodium dodecyl sulphate, a cetyltrimethyl ammonium bromide, and a carbamide.

375. The method of any one of embodiments 359 to 374, wherein at least one of the nanostructure forming solution and a zinc-oxide seed layer forming solution comprises a solvent, the solvent comprising at least one of a proplyene glycol, a water, a methanol, an ethanol, a 1-propanol, a 2-propanol a 1-methoxy-2-propanol, a 1-butanol, a 2-butanol a 1-pentanol, a 2-pentanol, a 3-pentanol, a 1-hexanol, a 2-hexanol, a 3-hexanol, an octanol, a 1-octanol, a 2-octanol, a 3-octanol, a tetrahydrofurfuryl alcohol (THFA), a cyclohexanol, a cyclopentanol, a terpineol, a butyl lactone; a methyl ethyl ether, a diethyl ether, an ethyl propyl ether, a polyethers, a diketones, a cyclohexanone, a cyclopentanone, a cycloheptanone, a cyclooctanone, an acetone, a benzophenone, an acetylacetone, an acetophenone, a cyclopropanone, an isophorone, a methyl ethyl ketone, an ethyl acetate, a dimethyl adipate, a proplyene glycol monomethyl ether acetate, a dimethyl glutarate, a dimethyl succinate, a glycerin acetate, a carboxylates, a propylene carbonate, a glycerin, a diol, a triol, a tetraol, a pentaol, an ethylene glycol, a diethylene glycol, a polyethylene glycol, a propylene glycol, a dipropylene glycol, a glycol ether, a glycol ether acetate, a 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, a 2-methyl-2,4-pentanediol, a tetramethyl urea, a n-methylpyrrolidone, an acetonitrile, a tetrahydrofuran (THF), a dimethyl formamide (DMF), a N-methyl formamide (NMF), a dimethyl sulfoxide (DMSO), a thionyl chloride and a sulfuryl chloride.

376. The method of any one of embodiments 354 to 375, wherein the diatom frustule portion comprises a broken diatom frustule portion.

377. The method of any one of embodiments 354 to 375, wherein the diatom frustule portion comprises an unbroken diatom frustule portion.

378. The method of any one of embodiments 354 to 375, wherein the diatom frustule portion is obtained through a diatom frustule portion separation process.

379. The method of embodiment 378, wherein the process comprises at least one of using a surfactant to reduce an agglomeration of a plurality of diatom frustule portions and using a disc stack centrifuge.

380. A method of forming carbon nanostructures on a diatom frustule portion, the method comprising:
forming a metal seed layer on a surface of the diatom frustule portion; and
forming a carbon nanostructure on the seed layer.

381. The method of embodiment 380, wherein the carbon nanostructure comprises a carbon nanotube.

382. The method of embodiment 381, wherein the carbon nanotube comprise at least one of a single-walled carbon nanotube and a multi-walled carbon nanotube.

383. The method of any one of embodiments 380 to 382, wherein forming the metal seed layer comprises spray coating the surface of the diatom frustule portion.

384. The method of any one of embodiments 380 to 383, wherein forming the metal seed layer comprises introducing the surface of the diatom frustule portion to at least one of a liquid comprising the metal, a gas comprising the metal and the solid comprising a metal.

385. The method of any one of embodiments 380 to 384, wherein forming the carbon nanostructure comprises using chemical vapor deposition (CVD).

386. The method of any one of embodiments 380 to 385, wherein forming the carbon nanostructure comprises exposing the diatom frustule portion to a nanostructure forming reducing gas after exposing the diatom frustule portion to a nanostructure forming carbon gas.

387. The method of any one of embodiments 380 to 385, wherein forming the carbon nanostructure comprises exposing the diatom frustule portion to a nanostructure forming reducing gas before exposing the diatom frustule portion to a nanostructure forming carbon gas.

388. The method of any one of embodiments 380 to 385, wherein forming the carbon nanostructure comprises exposing the diatom frustule portion to a nanostructure forming gas mixture comprising a nanostructure forming reducing gas and a nanostructure forming carbon gas.

389. The method of embodiment 388, wherein the nanostructure forming gas mixture further comprises a neutral gas.

390. The method of embodiment 389, wherein the neutral gas comprises argon.

391. The method of any one of embodiments 380 to 390, wherein the metal comprises at least one of a nickel, an iron, a cobalt, a cobalt-molibdenium bimetallic, a copper, a gold, a silver, a platinum, a palladium, a manganese, an aluminum, a magnesium, a chromium, an antimony, an aluminum-iron-molybdenum (Al/Fe/Mo), an iron pentacarbonyl (Fe(CO)$_5$)), an iron (III) nitrate hexahydrate ((Fe(NO$_3$)$_3$.6H$_2$O), a colbalt (II) chloride hexahydrate (CoCl$_2$.6H$_2$O), an ammonium molybdate tetrahydrate ((NH$_4$)$_6$Mo$_7$O$_{24}$.4H$_2$O), a molybdenum (VI) dichloride dioxide MoO$_2$Cl$_2$, and an alumina nanopowder.

392. The method of any one of embodiments 286 to 391, wherein the nanostructure forming reducing gas comprises at least one of an ammonia, a nitrogen, and a hydrogen.

393. The method of any one of embodiments 286 to 392, wherein the nanostructure forming carbon gas comprises at least one of an acetylene, an ethylene, an ethanol, a methane, a carbon oxide, and a benzene.

394. The method of any one of embodiments 380 to 393, wherein forming the metal seed layer comprises forming a silver seed layer.

395. The method of embodiment 394, wherein forming the silver seed layer comprises forming a silver nanostructure on the surface of the diatom frustule portion.

396. The method of any one of embodiments 380 to 395, wherein the diatom frustule portion comprises a broken diatom frustule portion.

397. The method of any one of embodiments 380 to 395, wherein the diatom frustule portion comprises an unbroken diatom frustule portion.

398. The method of any one of embodiments 380 to 397, wherein the diatom frustule portion is obtained through a diatom frustule portion separation process.

399. The method of embodiment 398, wherein the process comprises at least one of using a surfactant to reduce an agglomeration of a plurality of diatom frustule portions and using a disc stack centrifuge.

400. A method of fabricating a silver ink, the method comprising:
combining an ultraviolet light sensitive component and a plurality of diatom frustule portions having a silver nanostructure on a surface of the plurality of diatom frustule portions, the surface comprising a plurality of perforations.

401. The method of embodiment 400, further comprising forming a silver seed layer on the surface of the plurality of diatom frustule portions.

402. The method of embodiment 400 or 401, further comprising forming the silver nanostructure on the seed layer.

403. The method of any one of embodiments 400 to 402, wherein the plurality of diatom frustule portions comprises a plurality of broken diatom frustule portions.

404. The method of any one of embodiments 400 to 403, wherein the plurality of diatom frustule portions comprises a plurality of diatom frustule flakes.

405. The method of any one of embodiments 400 to 404, wherein the silver ink is depositable in a layer having a thickness of about 5 microns to about 15 microns after curing.

406. The method of any one of embodiments 400 to 405, wherein at least one of the plurality of perforations comprises a diameter of about 250 nanometers to about 350 nanometers.

407. The method of any one of embodiments 400 to 406, wherein the silver nanostructure comprises a thickness of about 10 nanometers to about 500 nanometers.

408. The method of any one of embodiments 400 to 407, wherein the silver ink comprises an amount of diatom frustules within a range of about 50 weight percent to about 80 weight percent.

409. The method of any one of embodiments 401 to 408, wherein forming the silver seed layer comprises forming the silver seed layer on a surface within the plurality of perforations to form a plurality of silver seed plated perforations.

410. The method of any one of embodiments 401 to 409, wherein forming the silver seed layer comprises forming the silver seed layer on substantially all surfaces of the plurality of diatom frustule portions.

411. The method of any one of embodiments 402 to 410, wherein forming the silver nanostructure comprises forming the silver nanostructure on a surface within the plurality of perforations to form a plurality of silver nanostructure plated perforations.

412. The method of any one of embodiments 402 to 411, wherein forming the silver nanostructure comprises forming the silver nanostructure on substantially all surfaces of the plurality of diatom frustule portions.

413. The method of any one of embodiments 400 to 412, wherein the ultraviolet light sensitive component is sensitive to an optical radiation having a wavelength shorter than a dimension of the plurality of perforations.

414. The method of any one of embodiments 411 to 413, wherein the ultraviolet light sensitive component is sensitive to an optical radiation having a wavelength shorter than a dimension of at least one of the plurality of silver seed plated perforations and the plurality of silver nanostructure plated perforations.

415. The method of any one of embodiments 400 to 414, wherein combining the plurality of diatom frustule portions with the ultraviolet light sensitive component comprises combining the plurality of diatom frustule portions with a photoinitiation synergist agent.

416. The method of embodiment 415, wherein the photoinitiation synergist agent comprises at least one of an ethoxylated hexanediol acrylate, a propoxylated hexanediol acrylate, an ethoxylated trimethylpropane triacrylate, a triallyl cyanurate and an acrylated amine.

417. The method of any one of embodiments 400 to 416, wherein combining the plurality of diatom frustule portions with the ultraviolet light sensitive component comprises combining the plurality of diatom frustule portions with a photoinitiator agent.

418. The method of embodiment 417, wherein the photoinitiator agent comprises at least one of a 2-methyl-1-(4-methylthio)phenyl-2-morpholinyl-1-propanon and an isopropyl thioxothanone.

419. The method of any one of embodiments 400 to 418, wherein combining the plurality of diatom frustule portions with the ultraviolet light sensitive component comprises combining the plurality of diatom frustule portions with a polar vinyl monomer.

420. The method of embodiment 419, wherein the polar vinyl monomer comprises at least one of a n-vinyl-pyrrolidone and a n-vinylcaprolactam.

421. The method of any one of embodiments 400 to 420, further comprising combining the plurality of diatom frustule portions with a rheology modifying agent.

422. The method of any one of embodiments 400 to 421, further comprising combining the plurality of diatom frustule portions with a crosslinking agent.

423. The method of any one of embodiments 400 to 422, further comprising combining the plurality of diatom frustule portions with a flow and level agent.

424. The method of any one of embodiments 400 to 423, further comprising combining the plurality of diatom frustule portions with at least one of an adhesion promoting agent, a wetting agent, and a viscosity reducing agent.

425. The method of any one of embodiments 400 to 424, wherein the silver nanostructure comprises at least one of a coating, a nanowire, a nanoplate, a dense array of nanoparticles, a nanobelt, and a nanodisk.

426. The method of any one of embodiment 401 to 425, wherein forming the silver seed layer comprises applying a cyclic heating regimen to a first silver contributing component and the plurality of diatom frustule portions.

427. The method of any one of embodiments 401 to 426, wherein forming the silver seed layer comprises combining the diatom frustule portion with a seed layer solution.

428. The method of embodiment 427, wherein the seed layer solution comprises the first silver contributing component and a seed layer reducing agent.

429. The method of any one of embodiments 402 to 428, wherein forming the silver nanostructure comprises combining the diatom frustule portion with a nanostructure forming reducing agent.

430. The method of embodiment 429, wherein forming the silver nanostructure further comprises heating the diatom frustule portion after combining the diatom frustule portion with the nanostructure forming reducing agent.

431. The method of any one of embodiments 402 to 430, wherein forming the silver nanostructure further comprises titrating the diatom frustule portion with a titration solution comprising a nanostructure forming solvent and a second silver contributing component.

432. The method of any one of embodiments 400 to 431, wherein the plurality of diatom frustule portions are obtained through a diatom frustule portion separation process.

433. The method of embodiment 432, wherein the process comprises at least one of using a surfactant to reduce an agglomeration of a plurality of diatom frustule portions and using a disc stack centrifuge.

434. A conductive silver ink comprising:
an ultraviolet light sensitive component; and
a plurality of diatom frustule portions having a silver nanostructure on a surface of the plurality of diatom frustule portions, the surface comprising a plurality of perforations.

435. The conductive silver ink of embodiment 434, wherein the plurality of diatom frustule portions comprises a plurality of broken diatom frustule portion.

436. The conductive silver ink of embodiment 434 or 435, wherein the plurality of diatom frustule portions comprises a plurality of diatom frustule flakes.

437. The conductive silver ink of any one of embodiments 434 to 436, wherein the silver ink is depositable in a layer having a thickness of about 5 microns to about 15 microns after curing.

438. The conductive silver ink of any one of embodiments 434 to 437, wherein at least one of the plurality of perforations comprises a diameter of about 250 nanometers to about 350 nanometers.

439. The conductive silver ink of any one of embodiments 434 to 438, wherein the silver nanostructure comprises a thickness of about 10 nanometers to about 500 nanometers.

440. The conductive silver ink of any one of embodiments 434 to 439, wherein the silver ink comprises an amount of diatom frustules within a range of about 50 weight percent to about 80 weight percent.

441. The conductive silver ink of any one of embodiments 434 to 440, wherein at least one of the plurality of perforations comprises a surface having a silver nanostructure.

442. The conductive silver ink of any one of embodiments 434 to 441, wherein at least one of the plurality of perforations comprises a surface having a silver seed layer.

443. The conductive silver ink of any one of embodiments 434 to 442, wherein substantially all surfaces of the plurality of diatom frustule portions comprises a silver nanostructure.

444. The conductive silver ink of any one of embodiments 434 to 443, wherein the ultraviolet light sensitive component is sensitive to an optical radiation having a wavelength shorter than a dimension of the plurality of perforations.

445. The conductive silver ink of any one of embodiments 434 to 444, wherein the conductive silver ink is curable by an ultraviolet radiation.

446. The conductive silver ink of embodiment 445, wherein the conductive silver ink is curable when deposited in a layer having a thickness of about 5 microns to about 15 microns after curing.

447. The conductive silver ink of embodiment 445 or 446, wherein the plurality of perforations has a dimension configured to allow the ultraviolet radiation to pass through the plurality of diatom frustule portions.

448. The conductive silver ink of any one of embodiments 434 to 447, wherein the conductive silver ink is thermally curable.

449. The conductive silver ink of any one of embodiments 434 to 448, wherein the ultraviolet light sensitive component comprises a photoinitiation synergist agent.

450. The conductive silver ink of embodiment 449, wherein the photoinitiation synergist agent comprises at least one of an ethoxylated hexanediol acrylate, a propoxylated hexanediol acrylate, an ethoxylated trimethylpropane triacrylate, a triallyl cyanurate and an acrylated amine.

451. The conductive silver ink of any one of embodiments 434 to 450, wherein the ultraviolet light sensitive component comprises a photoinitiator agent.

452. The conductive silver ink of embodiment 451, wherein the photoinitiator agent comprises at least one of a 2-methyl-1-(4-methylthio)phenyl-2-morpholinyl-1-propanon and an isopropyl thioxothanone.

453. The conductive silver ink of any one of embodiments 434 to 452, wherein the ultraviolet light sensitive component comprises a polar vinyl monomer.

454. The conductive silver ink of embodiment 453, wherein the polar vinyl monomer comprises at least one of a n-vinyl-pyrrolidone and a n-vinylcaprolactam.

455. The conductive silver ink of any one of embodiments 434 to 454, further comprising at least one of a rheology modifying agent, a crosslinking agent, a flow and level agent, an adhesion promoting agent, a wetting agent, and a viscosity reducing agent.

456. The conductive silver ink of any one of embodiments 434 to 455, wherein the silver nanostructure comprises at least one of a coating, a nanowire, a nanoplate, a dense array of nanoparticles, a nanobelt, and a nanodisk.

457. A method of fabricating a silver film, the method comprising:
curing a mixture comprising an ultraviolet light sensitive component and a plurality of diatom frustule portions having a silver nanostructure on a surface of the plurality of diatom frustule portions, the surface comprising a plurality of perforations.

458. The method of embodiment 457, further comprising forming a silver seed layer on the surface of the plurality of diatom frustule portions.

459. The method of embodiment 457 or 458, further comprising forming the silver nanostructure on the seed layer.

460. The method of any one of embodiments 457 to 459, further comprising combining the plurality of diatom frustule portions with the ultraviolet light sensitive component to form a silver ink.

461. The method of any one of embodiments 457 to 460, wherein the plurality of diatom frustule portions comprises a plurality of broken diatom frustule portions.

462. The method of any one of embodiments 457 to 461, wherein the plurality of diatom frustule portions comprises a plurality of diatom frustule flakes.

463. The method of any one of embodiments 460 to 462, wherein the silver ink is depositable in a layer having a thickness of about 5 microns to about 15 microns after curing.

464. The method of any one of embodiments 457 to 463, wherein at least one of the plurality of perforations comprises a diameter of about 250 nanometers to about 350 nanometers.

465. The method of any one of embodiments 457 to 464, wherein the silver nanostructure comprises a thickness of about 10 nanometers to about 500 nanometers.

466. The method of any one of embodiments 460 to 465, wherein the silver ink comprises an amount of diatom frustules within a range of about 50 weight percent to about 80 weight percent.

467. The method of any one of embodiments 458 to 466, wherein forming the silver seed layer comprises forming the silver seed layer on a surface within the plurality of perforations to form a plurality of silver seed plated perforations.

468. The method of any one of embodiments 458 to 467, wherein forming the silver seed layer comprises forming the silver seed layer on substantially all surfaces of the plurality of diatom frustule portions.

469. The method of any one of embodiments 459 to 468, wherein forming the silver nanostructure comprises forming the silver nanostructure on a surface within the plurality of perforations to form a plurality of silver nanostructure plated perforations.

470. The method of any one of embodiments 459 to 469, wherein forming the silver nanostructure comprises forming the silver nanostructure on substantially all surfaces of the plurality of diatom frustule portions.

471. The method of any one of embodiments 457 to 470, wherein curing the mixture comprises exposing the mixture to an ultraviolet light having a wavelength shorter than a dimension of the plurality of perforations.

472. The method of any one of embodiments 469 to 471, wherein curing the mixture comprises exposing the mixture to an ultraviolet light having a wavelength shorter than a dimension of at least one of the plurality of silver seed plated perforations and the plurality of silver nano structure plated perforations.

473. The method of any one of embodiments 457 to 472, wherein curing the mixture comprises thermally curing the mixture.

474. The method of any one of embodiments 457 to 473, wherein the ultraviolet light sensitive component is sensitive to an optical radiation having a wavelength shorter than a dimension of the plurality of perforations.

475. The method of any one of embodiments 469 to 474, wherein the ultraviolet light sensitive component is sensitive to an optical radiation having a wavelength shorter than a dimension of at least one of the plurality of silver seed plated perforations and the plurality of silver nanostructure plated perforations.

476. The method of any one of embodiments 460 to 475, wherein combining the plurality of diatom frustule portions with the ultraviolet light sensitive component comprises combining the plurality of diatom frustule portions with a photoinitiation synergist agent.

477. The method of embodiment 476, wherein the photoinitiation synergist agent comprises at least one of an ethoxylated hexanediol acrylate, a propoxylated hexanediol acrylate, an ethoxylated trimethylpropane triacrylate, a triallyl cyanurate and an acrylated amine.

478. The method of any one of embodiments 460 to 477, wherein combining the plurality of diatom frustule portions with the ultraviolet light sensitive component comprises combining the plurality of diatom frustule portions with a photoinitiator agent.

479. The method of embodiment 478, wherein the photoinitiator agent comprises at least one of a 2-methyl-1-(4-methylthio)phenyl-2-morpholinyl-1-propanon and an isopropyl thioxothanone.

480. The method of any one of embodiments 460 to 479, wherein combining the plurality of diatom frustule portions with the ultraviolet light sensitive component comprises combining the plurality of diatom frustule portions with a polar vinyl monomer.

481. The method of embodiment 480, wherein the polar vinyl monomer comprises at least one of a n-vinyl-pyrrolidone and a n-vinylcaprolactam.

482. The method of any one of embodiments 457 to 481, further comprising combining the plurality of diatom frustule portions with a rheology modifying agent.

483. The method of any one of embodiments 457 to 482, further comprising combining the plurality of diatom frustule portions with a crosslinking agent.

484. The method of any one of embodiments 457 to 483, further comprising combining the plurality of diatom frustule portions with a flow and level agent.

485. The method of any one of embodiments 457 to 484, further comprising combining the plurality of diatom frustule portions with at least one of an adhesion promoting agent, a wetting agent, and a viscosity reducing agent.

486. The method of any one of embodiments 457 to 485, wherein the silver nanoplate comprises at least one of a coating, a nanowire, a nanoplate, a dense array of nanoparticles, a nanobelt, and a nanodisk.

487. The method of any one of embodiment 458 to 486, wherein forming the silver seed layer comprises applying a cyclic heating regimen to a first silver contributing component and the plurality of diatom frustule portions.

488. The method of any one of embodiments 458 to 487, wherein forming the silver seed layer comprises combining the diatom frustule portion with a seed layer solution.

489. The method of embodiment 488, wherein the seed layer solution comprises the first silver contributing component and a seed layer reducing agent.

490. The method of any one of embodiments 459 to 489, wherein forming the silver nanostructure comprises combining the diatom frustule portion with a nanostructure forming reducing agent.

491. The method of embodiment 490, wherein forming the silver nanostructure further comprises heating the diatom frustule portion after combining the diatom frustule portion with the nanostructure forming reducing agent.

492. The method of any one of embodiments 459 to 491, wherein forming the silver nanostructure further comprises titrating the diatom frustule portion with a titration solution comprising a nanostructure forming solvent and a second silver contributing component.

493. The method of any one of embodiments 457 to 492, wherein the plurality of diatom frustule portions are obtained through a diatom frustule portion separation process.

494. The method of embodiment 493, wherein the process comprises at least one of using a surfactant to reduce an agglomeration of a plurality of diatom frustule portions and using a disc stack centrifuge.

495. A conductive silver film comprising:
a plurality of diatom frustule portions having a silver nanostructure on a surface of each of the plurality of diatom frustule portions, the surface comprising a plurality of perforations.

496. The conductive silver film of embodiment 495, wherein the plurality of diatom frustule portions comprises a plurality of broken diatom frustule portion.

497. The conductive silver film of embodiment 495 or 496, wherein the plurality of diatom frustule portions comprises a plurality of diatom frustule flakes.

498. The conductive silver film of any one of embodiments 495 to 497, wherein at least one of the plurality of perforations comprises a diameter of about 250 nanometers to about 350 nanometers.

499. The conductive silver film of any one of embodiments 495 to 498, wherein the silver nanostructure comprises a thickness of about 10 nanometers to about 500 nanometers.

500. The conductive silver film of any one of embodiments 495 to 499, wherein at least one of the plurality of perforations comprises a surface having a silver nanostructure.

501. The conductive silver film of any one of embodiments 495 to 500, wherein at least one of the plurality of perforations comprises a surface having a silver seed layer.

502. The conductive silver film of any one of embodiments 495 to 501, wherein substantially all surfaces of the plurality of diatom frustule portions comprises a silver nanostructure.

503. The conductive silver film of any one of embodiments 495 to 502, wherein the silver nanostructure comprises at least one of a coating, a nanowire, a nanoplate, a dense array of nanoparticles, a nanobelt, and a nanodisk.

504. The conductive silver film of any one of embodiments 495 to 503, further comprising a binder resin.

505. A printed energy storage device comprising:
a first electrode;
a second electrode; and
a separator between the first electrode and the second electrode, at least one of the first electrode and the second electrode including a plurality of frustules comprising manganese-containing nanostructures.

506. The device of embodiment 505, wherein the frustules have a substantially uniform property, the substantially uniform property including at least one of a frustule shape, a frustule dimension, a frustule porosity, a frustule mechanical strength, a frustule material, and a degree of brokenness of a frustule.

507. The device of embodiment 505 or 506, wherein the manganese-containing nanostructures comprise an oxide of manganese.

508. The device of embodiment 507, wherein the oxide of manganese comprises manganese(II,III) oxide.

509. The device of embodiment 507 or 508, wherein the oxide of manganese comprises manganese oxyhydroxide.

510. The device of any one of embodiments 505-509, wherein at least one of the first electrode and the second electrode comprises frustules comprising zinc-oxide nanostructures.

511. The device of embodiment 510, wherein the zinc-oxide nanostructures comprise at least one of a nano-wire and a nano-plate.

512. The device of any one of embodiments 505-511, wherein the manganese-containing nanostructures cover substantially all surfaces of the frustules.

513. A membrane of an energy storage device, the membrane comprising frustules comprising manganese-containing nanostructures.

514. The membrane of embodiment 513, wherein the manganese-containing nanostructures comprise an oxide of manganese.

515. The membrane of embodiment 514, wherein the oxide of manganese comprises manganese(II,III) oxide.

516. The membrane of embodiment 514 or 515, wherein the oxide of manganese comprises manganese oxyhydroxide.

517. The membrane of any one of embodiments 513-516, wherein at least some of the manganese-containing nanostructures comprise a nano-fiber.

518. The membrane of any one of embodiments 513-517, wherein at least some of the manganese-containing nanostructures have a tetrahedral shape.

519. The membrane of any one of embodiments 513-518, wherein the energy storage device comprises a zinc-manganese battery.

520. An ink for a printed film, the ink comprising:
a solution; and
frustules comprising manganese-containing nanostructures dispersed in the solution.

521. The ink of embodiment 520, wherein the manganese-containing nanostructures comprise an oxide of manganese.

522. The ink of embodiment 520 or 521, wherein the manganese-containing nanostructures comprises at least one of $MnO_2$, $MnO$, $Mn_2O_3$, $MnOOH$, and $Mn_3O_4$.

523. The ink of any one of embodiments 520-522, wherein at least some of the manganese-containing nanostructures comprise a nano-fiber.

524. The ink of any one of embodiments 520-523, wherein at least some of the manganese-containing nanostructures have a tetrahedral shape.

525. A method of forming manganese-containing nanostructures on a diatom frustule portion, the method comprising:
adding the frustules to an oxygenated manganese acetate solution; and
heating the frustules and the oxygenated manganese acetate solution.

526. The method of embodiment 525, further comprising forming the oxygenated manganese acetate solution, wherein forming oxygenated manganese acetate solution comprises dissolving manganese(II) acetate in oxygenated water.

527. The method of embodiment 526, wherein concentration of the manganese(II) acetate in the oxygenated manganese acetate solution is between about 0.05 M and about 1.2 M.

528. The method of any one of embodiments 525-527, further comprising forming the oxygenated manganese acetate solution, wherein forming oxygenated manganese acetate solution comprises dissolving a manganese salt in oxygenated water.

529. The method of embodiment 528, further comprising adding an oxidizing agent to the oxygenated manganese acetate solution.

530. The method of embodiment 529, wherein the oxidizing agent comprises peroxide.

531. The method of any one of embodiments 526-530, further comprising forming the oxygenated water, wherein forming oxygenated water comprises bubbling oxygen gas into water.

532. The method of embodiment 531, wherein bubbling the oxygen gas into the water so for a duration of about 10 minutes to about 60 minutes.

533. The method of any one of embodiments 525-532, wherein a weight percentage of the frustules in the oxygenated manganese acetate solution is between about 0.01 wt % and about 1 wt %.

534. The method of any one of embodiments 525-533, further comprising thermally treating the frustules and the oxygenated manganese acetate solution.

535. The method of embodiment 534, wherein thermally treating the frustules and the oxygenated manganese acetate solution comprises using a thermal technique.

536. The method of embodiment 535, wherein using the thermal technique comprises maintaining the frustules and the oxygenated manganese acetate solution at a temperature for between about 15 hours and about 40 hours.

537. The method of embodiment 536, wherein the temperature is between about 50° C. and about 90° C.

538. The method of embodiment 535, wherein using the thermal technique comprises maintaining the frustules and the oxygenated manganese acetate solution at a temperature between about 50° C. and about 90° C.

539. The method of any one of embodiments 534-538, wherein thermally treating the frustules and the oxygenated manganese acetate solution comprises using a microwave technique.

540. The method of embodiment 539, wherein using the thermal technique comprises maintaining the frustules and the oxygenated manganese acetate solution at a temperature for between about 10 minutes and about 120 minutes.

541. The method of embodiment 540, wherein the temperature is between about 50° C. and about 150° C.

542. The method of embodiment 539, wherein using the thermal technique comprises maintaining the frustules and the oxygenated manganese acetate solution at a temperature between about 50° C. and about 150° C.

543. The method of any one of embodiments 525-542, wherein carbon-containing nanostructures cover some surfaces of the frustules.

544. The method of embodiment 543, wherein the carbon-containing nanostructures comprise carbon nanotubes.

545. The method of embodiment 543 or 544, wherein the carbon-containing nanostructures comprise carbon nano-onions.

546. The method of any one of embodiments 543-545, wherein the carbon-containing nanostructures comprise reduced graphene oxide.

547. The device of any one of embodiments 505-512, wherein the manganese-containing nanostructures cover some surfaces of the frustules and carbon-containing nanostructures cover other surfaces of the frustules, the manganese-containing nanostructures interspersed with the carbon-containing nanostructures.

548. The device of embodiment 547, wherein the carbon-containing nanostructures comprise carbon nanotubes.

549. The device of embodiment 547 or 548, wherein the carbon-containing nanostructures comprise carbon nano-onions.

550. The device of any one of embodiments 547-549, wherein the carbon-containing nanostructures comprise reduced graphene oxide.

551. The membrane of any one of embodiments 513-519, wherein the manganese-containing nanostructures cover some surfaces of the frustules and carbon-containing nanostructures cover other surfaces of the frustules, the manganese-containing nanostructures interspersed with the carbon-containing nanostructures.

552. The membrane of embodiment 551, wherein the carbon-containing nanostructures comprise carbon nanotubes.

553. The membrane of embodiment 551 or 552, wherein the carbon-containing nanostructures comprise carbon nano-onions.

554. The membrane of any one of embodiments 551-554, wherein the carbon-containing nanostructures comprise reduced graphene oxide.

555. The ink of any one of embodiments 520-524, wherein the manganese-containing nanostructures cover some surfaces of the frustules and carbon-containing nanostructures cover other surfaces of the frustules, the manganese-containing nanostructures interspersed with the carbon-containing nanostructures 556. The ink of embodiment 555, wherein the carbon-containing nanostructures comprise carbon nanotubes.

557. The ink of embodiment 555 or 556, wherein the carbon-containing nanostructures comprise carbon nano-onions.

558. The ink of any one of embodiments 555-557, wherein the carbon-containing nanostructures comprise reduced graphene oxide.

559. An energy storage device, comprising:
a cathode comprising a first plurality of frustules, wherein the first plurality of frustules comprises nanostructures comprising an oxide of manganese; and
an anode comprising a second plurality of frustules, wherein the second plurality of frustules comprises nanostructures comprising zinc oxide.

560. The energy storage device of embodiment 559, wherein the oxide of manganese comprises MnO.

561. The energy storage device of embodiment 559 or 560, wherein the oxide of manganese comprises $Mn_3O_4$.

562. The energy storage device of any one of embodiments 559 to 561, wherein the oxide of manganese comprises at least one of $Mn_2O_3$, and MnOOH.

563. The energy storage device of any one of embodiments 559 to 562, wherein at least one of the first plurality of frustules comprises about 5 weight % to about 95 weight % of the oxide of manganese.

564. The energy storage device of embodiment 563, wherein the at least one of the first plurality of frustules comprises about 75 weight % to about 95 weight % of the oxide of manganese.

565. The energy storage device of any one of embodiments 559 to 564, wherein at least one of the second plurality of frustules comprises about 5 weight % to about 95 weight % of the zinc oxide.

566. The energy storage device of embodiment 565, wherein the at least one of the second plurality of frustules comprises about 50 weight % to about 60 weight % of the zinc oxide.

567. The energy storage device of any one of embodiments 559 to 566, wherein the anode further comprises an electrolyte salt.

568. The energy storage device of embodiment 567, wherein the electrolyte salt comprises a zinc salt.

569. The energy storage device of any one of embodiments 559 to 568, wherein at least one of the cathode and the anode further comprises carbon nanotubes.

570. The energy storage device of any one of embodiments 559 to 569, wherein at least one of the cathode and the anode further comprises a conductive filler.

571. The energy storage device of embodiment 570, wherein the conductive filler comprises graphite.

572. The energy storage device of any one of embodiments 559 to 571, wherein at least one of the cathode and the anode further comprises an ionic liquid.

573. The energy storage device of any one of embodiments 559 to 572, wherein at least one of the cathode and the anode further comprises a binder.

574. The energy storage device of any one of embodiments 559 to 573, further comprising a separator between the cathode and the anode.

575. The energy storage device of embodiment 574, wherein the separator further comprises a third plurality of frustules.

576. The energy storage device of embodiment 575, wherein the third plurality of frustules comprises substantially no surface modifications.

577. The energy storage device of any one of embodiments 574 to 576, wherein the separator further comprises an electrolyte.

578. The energy storage device of embodiment 577, wherein the electrolyte comprises the ionic liquid.

579. The energy storage device of embodiment 577 or 578, wherein the electrolyte comprises the electrolyte salt.

580. The energy storage device of any one of embodiments 574 to 579, wherein the separator further comprises a polymer.

581. The energy storage device of any one of embodiments 559 to 580, further comprising a first current collector coupled to the cathode and a second current collector coupled to the anode.

582. The energy storage device of embodiment 581, wherein at least one of the first current collector and the second current collector comprises a conductive foil.

583. The energy storage device of embodiment 582, wherein the conductive foil comprises at least one of aluminum, copper, nickel, stainless steel, graphite, graphene and carbon nanotubes.

584. The energy storage device of embodiment 582 or 583, wherein at least one of the first current collector and the second current collector comprises a printed current collector.

585. The energy storage device of embodiment 584, wherein the printed current collector comprises at least one of aluminum, copper, nickel, silver, bismuth, conductive carbon, carbon nanotubes, graphene and graphite.

586. A frustule comprising a plurality of nanostructures on at least one surface, wherein the plurality of nanostructures comprises zinc oxide.

587. The frustule of embodiment 586, wherein the frustule comprises about 5 weight % to about 95 weight % of the plurality of nanostructures comprising zinc oxide.

588. The frustule of embodiment 587, wherein the frustule comprises about 50 weight % to about 60 weight % of the nanostructures comprising zinc oxide.

589. The frustule of any one of embodiments 586 to 588, wherein the plurality of nanostructures comprises at least one of nanowires, nanoplates, dense nanoparticles, nanobelts, and nanodisks.

590. A frustule comprising a plurality of nanostructures on at least one surface, wherein the plurality of nanostructures comprises an oxide of manganese.

591. The frustule of embodiment 590, wherein the frustule comprises about 5 weight % to about 95 weight % of the plurality of nanostructures comprising the oxide of manganese.

592. The frustule of embodiment 591, wherein the frustule comprises about 75 weight % to about 95 weight % of the plurality of nanostructures comprising the oxide of manganese.

593. The frustule of any one of embodiments 590 to 592, wherein the oxide of manganese comprises MnO.

594. The frustule of any one of embodiments 590 to 593, wherein the oxide of manganese comprises $Mn_3O_4$.

595. The frustule of any one of embodiments 590 to 594, wherein the oxide of manganese comprises at least one of $Mn_2O_3$ and MnOOH.

596. The frustule of any one of embodiments 590 to 595, wherein the plurality of nanostructures comprises at least one of nanowires, nanoplates, dense nanoparticles, nanobelts, and nanodisks.

597. The frustule of any one of embodiments 590 to 596, wherein the plurality of nanostructures comprises at least one of nano-fibers and tetrahedral-shaped nanocrystals.

598. An electrode of an energy storage device, comprising:
a plurality of frustules, wherein each of the plurality of frustules comprises a plurality of nanostructures formed on at least one surface.

599. The electrode of embodiment 598, wherein the electrode is an anode of the energy storage device.

600. The electrode of embodiment 599, wherein the anode further comprises an electrolyte salt.

601. The electrode of embodiment 600, wherein the electrolyte salt comprises a zinc salt.

602. The electrode of any one of embodiments 599 to 601, wherein the plurality of nanostructures comprises zinc oxide.

603. The electrode of any one of embodiments 599 to 602, wherein the plurality of nanostructures comprises at least one of nanowires, nanoplates, dense nanoparticles, nanobelts, and nanodisks.

604. The electrode of any one of embodiments 599 to 603, wherein at least one of the plurality of frustules comprises about 5 weight % to about 95 weight % of the plurality of nano structures.

605. The electrode of embodiment 604, wherein the at least one of the plurality of frustules comprises about 50 weight % to about 60 weight % of the plurality of nano structures.

606. The electrode of embodiment 598, wherein the electrode is a cathode of the energy storage device.

607. The electrode of embodiment 606, wherein the plurality of nanostructures comprises an oxide of manganese.

608. The electrode of embodiment 607, wherein the oxide of manganese comprises MnO.

609. The electrode of embodiment 607 or 608, wherein the oxide of manganese comprises $Mn_3O_4$.

610. The electrode of any one of embodiments 607 to 609, wherein the oxide of manganese comprises at least one of $Mn_2O_3$ and MnOOH.

611. The electrode of any one of embodiments 606 to 610, wherein the plurality of nanostructures comprises at least one of nanowires, nanoplates, dense nanoparticles, nanobelts, and nanodisks.

612. The electrode of any one of embodiments 606 to 611, wherein the plurality of nanostructures comprises at least one of nano-fibers and tetrahedral-shaped nanocrystals.

613. The electrode of any one of embodiments 606 to 611, wherein at least one of the plurality of frustules comprises about 5 weight % to about 95 weight % of the plurality of nano structures.

614. The electrode of embodiment 613, wherein the at least one of the plurality of frustules comprises about 75 weight % to about 95 weight % of the plurality of nano structures.

615. The electrode of any one of embodiments 598 to 614, wherein the electrode further comprises carbon nanotubes.

616. The electrode of any one of embodiments 598 to 615, wherein the electrode further comprises a conductive filler.

617. The electrode of embodiment 616, wherein the conductive filler comprises graphite.

618. The electrode of any one of embodiments 598 to 617, wherein the electrode further comprises an ionic liquid.

619. The electrode of any one of embodiments 598 to 618, wherein the electrode further comprises a binder.

620. A method of forming zinc oxide nanostructures on a plurality of frustules, comprising:
providing the plurality of frustules;
forming a seed layer comprising zinc oxide on the plurality of frustules to provide a plurality of zinc oxide seeded frustules; and
forming nanostructures comprising zinc oxide on the seed layer of the plurality of zinc oxide seeded frustules.

621. The method of embodiment 620, wherein forming the seed layer comprises providing a seed layer solution comprising about 2 weight % to about 5 weight % of the plurality of frustules.

622. The method of embodiment 621, wherein the seed layer solution comprises about 0.1 weight % to about 0.5 weight % zinc salt.

623. The method of embodiment 622, wherein the zinc salt comprises $Zn(CH_3COO)_2$.

624. The method of any one of embodiments 621 to 623, wherein the seed layer solution comprises about 94.5 weight % to about 97.9 weight % of an alcohol.

625. The method of embodiment 624, wherein the alcohol comprises ethanol.

626. The method of any one of embodiments 621 to 625, further comprising heating the seed layer solution.

627. The method of embodiment 626, wherein heating the seed layer solution comprises heating the seed layer solution to a temperature greater than about 80° C.

628. The method of embodiment 626 or 627, wherein heating the seed layer solution comprises heating the seed layer solution in a vacuum oven.

629. The method of embodiment 628, wherein heating the seed layer solution in a vacuum oven comprises heating at a pressure of about 1 millibar.

630. The method of any one of embodiments 621 to 629, further comprising annealing the plurality of frustules.

631. The method of embodiment 631, wherein annealing comprises annealing at a temperature of about 200° C. to about 500° C.

632. The method of any one of embodiments 620 to 631, wherein forming the zinc oxide nanostructures comprises forming a nanostructure solution comprising about 1 weight % to about 5 weight % of the plurality of zinc oxide seeded frustules.

633. The method of embodiment 632, wherein the nanostructure solution comprises about 6 weight % to about 10 weight % of a zinc salt.

634. The method of embodiment 633, wherein the zinc salt comprises $Zn(NO_3)_2$.

635. The method of any one of embodiments 632 to 634, wherein the nanostructure solution comprises about 1 weight % to about 2 weight % of a base.

636. The method of embodiment 635, wherein the base comprises ammonium hydroxide ($NH_4OH$).

637. The method of any one of embodiments 632 to 636, wherein the nanostructure solution comprises about 1 weight % to about 5 weight % of an additive.

638. The method of embodiment 637, wherein the additive comprises hexamethylenetetramine (HMTA).

639. The method of any one of embodiments 632 to 638, wherein the nanostructure solution comprises about 78 weight % to about 91 weight % purified water.

640. The method of any one of embodiments 632 to 638, wherein forming the zinc oxide nanostructures comprises heating the nanostructure solution.

641. The method of embodiment 640, wherein heating comprises heating with a microwave.

642. The method of embodiment 640 or 641, wherein heating comprises heating to a temperature of about 100° C. to about 250° C.

643. The method of any one of embodiments 640 to 642, further comprising stirring during heating.

644. The method of any one of embodiments 620 to 643, wherein at least one of the plurality of frustules comprises about 5 weight % to about 95 weight % of the zinc oxide.

645. A method of forming nanostructures comprising an oxide of manganese on a plurality of frustules, comprising:
providing the plurality of frustules; and
forming the nanostructures comprising the oxide of manganese on the plurality of frustules, wherein forming the nanostructures comprises providing a solution comprising a manganese source for forming the nanostructures comprising the oxide of manganese.

646. The method of embodiment 645, wherein the manganese source comprises a manganese salt, and wherein the solution comprises about 7 weight % to about 10 weight % of the manganese salt.

647. The method of embodiment 646, wherein the manganese salt comprises manganese acetate ($Mn(CH_3COO)_2$).

648. The method of any one of embodiments 645 to 647, wherein the solution comprises about 0.5 weight % to about 2 weight % of the plurality of frustules.

649. The method of any one of embodiments 645 to 648, wherein the solution comprises about 5 weight % to about 10 weight % of a base.

650. The method of embodiment 649, wherein the base comprises ammonium hydroxide ($NH_4OH$).

651. The method of any one of embodiments 645 to 650, wherein the solution comprises about 78 weight % to about 87.5 weight % of oxygenated purified water.

652. The method of any one of embodiments 645 to 651, further comprising heating the solution.

653. The method of embodiment 652, wherein heating comprises heating with microwave.

654. The method of embodiment 652 or 653, wherein heating the solution comprises heating to a temperature of about 100° C. to about 250° C.

655. The method of any one of embodiments 652 to 654, further comprising stirring while heating.

656. An ink for an electrode of an energy storage device, comprising:
a plurality of frustules, wherein each of the plurality of frustules comprises a plurality of nanostructures formed on a surface; and
a polymer binder.

657. The ink of embodiment 656, wherein the electrode is an anode of the energy storage device.

658. The ink of embodiment 657, wherein the plurality of nanostructures comprises zinc oxide.

659. The ink of embodiment 657 or 658, wherein at least one of the plurality of frustules comprises about 5 weight % to about 95 weight % of the nanostructures.

660. The ink of any one of embodiments 657 to 659, further comprising an electrolyte salt.

661. The ink of embodiment 660, wherein the electrolyte salt comprises a zinc salt.

662. The ink of embodiment 661, wherein the zinc salt comprises zinc tetrafluoroborate.

663. The ink of embodiment 656, wherein the electrode is a cathode of the energy storage device.

664. The ink of embodiment 663, wherein the plurality of nanostructures comprises an oxide of manganese.

665. The ink of embodiment 664, wherein the oxide of manganese comprises MnO.

666. The ink of embodiment 664 or 665, wherein the oxide of manganese comprises $Mn_3O_4$.

667. The ink of any one of embodiments 663 to 666, wherein the oxide of manganese comprises at least one of $Mn_2O_3$ and MnOOH.

668. The ink of any one of embodiments 663 to 667, wherein at least one of the plurality of frustules comprises about 5 weight % to about 95 weight % of the nanostructures.

669. The ink of any one of embodiments of 656 to 668, further comprising about 10 weight % to about 20 weight % of the plurality of frustules.

670. The ink of any one of embodiments 656 to 669, further comprising an ionic liquid.

671. The ink of embodiment 670, wherein the ink comprises about 2 weight % to about 15 weight % of the ionic liquid.

672. The ink of embodiment 670 or 671, wherein the ionic liquid comprises 1-ethyl-3-ethylimidazolium tetrafluoroborate.

673. The ink of any one of embodiments of 656 to 672, further comprising a conductive filler.

674. The ink of embodiment 673, further comprising up to about 10 weight % of the conductive filler.

675. The ink of embodiment 673 or 674, wherein the conductive filler comprises graphite.

676. The ink of any one of embodiments of 656 to 675, further comprising carbon nanotubes.

677. The ink of embodiment 676, further comprising about 0.2 weight % to about 20 weight % of the carbon nanotubes.

678. The ink of embodiment 676 or 677, wherein the carbon nanotubes comprises multi-wall carbon nanotubes.

679. The ink of any one of embodiments of 656 to 678, wherein the ink comprises about 1 weight % to about 5 weight % of the polymer binder.

680. The ink of embodiment 679, wherein the polymer binder comprises polyvinylidene fluoride.

681. The ink of any one of embodiments of 656 to 680, further comprising a solvent.

682. The ink of embodiment 681, wherein the ink comprises about 47 weight % to about 86.8 weight % of the solvent.

683. The ink of embodiment 681 or 682, wherein the solvent comprises N-Methyl 2-pyrrolidone.

684. A method of preparing an ink for an electrode of an energy storage device, the method comprising:
providing an ionic liquid;
dispersing a plurality of carbon nanotubes in the ionic liquid to form a first dispersion comprising the plurality of carbon nanotubes and the ionic liquid; and
adding a plurality of frustules, wherein each of the plurality of frustules comprises a plurality of nanostructures on a surface.

685. The method of embodiment 684, wherein the plurality of nanostructures comprises zinc oxide.

686. The method of embodiment 684, wherein the plurality of nanostructures comprises an oxide of manganese.

687. The method of embodiment 686, wherein the oxide of manganese comprises MnO.

688. The method of embodiment 686 or 687, wherein the oxide of manganese comprises $Mn_3O_4$.

689. The method of any one of embodiments 686 to 688, wherein the oxide of manganese comprises at least one of $Mn_2O_3$ and MnOOH.

690. The method of any one of embodiments 684 to 689, further comprising forming a second dispersion comprising the plurality of carbon nanotubes, the ionic liquid and a solvent.

691. The method of embodiment 690, wherein the solvent comprises N-Methyl-2-pyrrolidone.

692. The method of embodiment 690 or 691, wherein adding the plurality of frustules comprises adding the plurality of frustules to the second dispersion to form a first mixture.

693. The method of embodiment 692, further comprising adding a conductive filler to the second dispersion to form the first mixture.

694. The method of embodiment 693, wherein the conductive filler comprises graphite.

695. The method of embodiment 692 or 693, further comprising adding an electrolyte salt to the first mixture to form a second mixture.

696. The method of embodiment 695, wherein the electrolyte salt comprises a zinc salt.

697. The method of embodiment 696, wherein the zinc salt comprises zinc tetrafluoroborate.

698. The method of any one of embodiments 695 to 697, wherein at least one of adding the plurality of frustules, the conductive filler and the electrolyte salt comprises stirring.

699. The method of embodiment 698, wherein stirring comprises applying a centrifugal mixer.

700. The method of any one of embodiments 695 to 699, further comprising adding a solution to the second mixture to form a third mixture, wherein the solution comprises the solvent and a polymer binder.

701. The method of embodiment 700, wherein the polymer binder is about 10 weight % to about 20 weight % of the solution.

702. The method of embodiment 700 or 701, wherein the polymer binder comprises polyvinylidene fluoride.

703. The method of any one of embodiments 700 to 702, further comprising heating the third mixture.

704. The method of embodiment 703, wherein the heating comprises heating to a temperature of about 80° C. to about 180° C.

705. The method of embodiment 703 or 704, further comprising stirring during the heating.

706. A method of printing an energy storage device, comprising:
printing a first electrode comprising a first plurality of frustules, wherein each of the plurality of frustules comprises a first plurality of nanostructures on a surface; and
printing a separator over the first electrode.

707. The method of embodiment 706, further comprising providing a first current collector, and wherein printing the first electrode comprises printing the first electrode over the first current collector.

708. The method of embodiment 707, wherein providing the first current collector comprises providing a first conductive foil.

709. The method of any one of embodiments 706 to 708, further comprising providing a second current collector.

710. The method of embodiment 709, wherein providing the second current collector comprises providing a second conductive foil.

711. The method of embodiment 710, further comprising printing a second electrode, wherein the second electrode comprises a second plurality of frustules, wherein each of the second plurality of frustules comprises a second plurality of nanostructures on a surface.

712. The method of embodiment 711, wherein printing the second electrode comprises printing the second electrode over the separator.

713. The method of embodiment 711, wherein printing the second electrode comprises printing the second electrode over the second current collector.

714. The method embodiment 713, further comprising printing the separator over the second electrode.

715. The method of embodiment 707, wherein providing the first current collector comprises printing the first current collector.

716. The method of embodiment 715, further comprising printing a second electrode over the separator, wherein the second electrode comprises a second plurality of frustules, wherein each of the second plurality of frustules comprises a second plurality of nanostructures on a surface.

717. The method of embodiment 716, further comprising printing a second current collector over the second electrode.

718. The method of embodiment 715, wherein further comprising printing a second current collector at a lateral distance from the first current collector.

719. The method of embodiment 718, further comprising printing a second electrode over the second current collector at the lateral distance from the first current collector, wherein the second electrode comprises a second plurality of frustules, wherein each of the second plurality of frustules comprises a second plurality of nanostructures on a surface.

720. The method of embodiment 719, wherein printing the separator comprises printing the separator over the first electrode and the second electrode.

721. A method of fabricating an energy storage device, comprising:
 forming a first structure, wherein forming the first structure comprises:
  printing a first electrode over a first current collector, and
  printing a separator over the first electrode;
 forming a second structure, wherein forming the second structure comprises:
  printing a second electrode over a second current collector; and
 coupling the first structure to the second structure to form the energy storage device,
 wherein coupling comprises providing the separator between the first electrode and the second electrode.

722. A method of fabricating an energy storage device, comprising:
 forming a first structure, wherein forming the first structure comprises:
  printing a first electrode over a first current collector, and
  printing a first portion of a separator over the first electrode;
 forming a second structure, wherein forming the second structure comprises:
  printing a second electrode over a second current collector, and
  printing a second portion of the separator over the second electrode; and
 coupling the first structure to the second structure to form the energy storage device,
 wherein coupling comprises providing the first portion of the separator and the second portion of the separator between the first electrode and the second electrode.

723. A method of fabricating an energy storage device, comprising:
 forming a first structure, wherein forming the first structure comprises:
  printing a first electrode over a first current collector,
  printing a separator over the first electrode, and
  printing a second electrode on the separator;
 forming a second structure, wherein forming the second structure comprises providing a second current collector; and
 coupling the first structure to the second structure to form the energy storage device,
 wherein coupling comprises providing the second electrode between the second current collector and the separator.

724. The method of any one of Embodiments 721-723, wherein the first current collector comprises a conductive foil.

725. The method of any one of Embodiments 721-723, further comprising forming the first current collector on a substrate.

726. The method of Embodiment 725, wherein forming the first current collector comprises printing the first current collector over the substrate.

727. The method of any one of Embodiments 721-726, wherein the second current collector comprises a conductive foil.

728. The method of any one of Embodiments 721-726, further comprising forming the second current collector on a second substrate.

729. The method of Embodiment 728, wherein forming the first current collector comprises printing the first current collector over the second substrate.

730. A method of fabricating an energy storage device, comprising:
 printing a first current collector;
 printing a first electrode over the first current collector;
 printing a separator over the first electrode;
 printing a second electrode over the separator; and
 printing a second current collector over the second electrode.

731. A method of fabricating an energy storage device, comprising:
 printing a first current collector;
 printing a second current collector at a lateral distance from the first current collector;
 printing a first electrode over the first current collector;
 printing a second electrode over the second current collector; and
 printing a separator over the first electrode and the second electrode and between the first electrode and the second electrode.

732. The method of any one of embodiments 721 to 731, wherein the first electrode comprises a first plurality of frustules, wherein each of the first plurality of frustules comprises nanostructures formed on at least one surface.

733. The method of embodiment 732, wherein the nanostructures comprise an oxide of manganese 734. The method of embodiment 733, wherein the oxide of manganese comprises MnO.

735. The method of embodiment 733 or 734, wherein the oxide of manganese comprises $Mn_3O_4$.

736. The method of any one of embodiments 733 to 735, wherein the oxide of manganese comprises at least one of $Mn_2O_3$ and MnOOH.

737. The method of any one of embodiments 721 to 736, wherein the second electrode comprises a second plurality of frustules, wherein each of the second plurality of frustules comprises nanostructures.

738. The method of embodiment 737, wherein the nanostructures comprise zinc oxide.

739. The method of any one of embodiments 721 to 738, wherein the separator comprises a third plurality of frustules, wherein each of the third plurality of frustules comprises substantially no surface modifications.

740. An energy storage device comprising:
a cathode comprising a first plurality of frustules, the first plurality of frustules comprises nanostructures comprising an oxide of manganese; and
an anode comprising a second plurality of frustules, the second plurality of frustules comprises nanostructures comprising zinc oxide.

741. The energy storage device of embodiment 740, wherein the oxide of manganese comprises MnO.

742. The energy storage device of embodiment 740 or 741, wherein the oxide of manganese comprises at least one of $Mn_3O_4$, $Mn_2O_3$, and MnOOH.

743. The energy storage device of any one of embodiments 740 to 742, wherein at least one of the first plurality of frustules comprises a ratio of a mass of the oxide of manganese to a mass of the at least one frustule of about 1:20 to about 20:1.

744. The energy storage device of any one of embodiments 740 to 743, wherein at least one of the second plurality of frustules comprises a ratio of a mass of the zinc oxide to a mass of the at least one frustule of about 1:20 to about 20:1.

745. The energy storage device of any one of embodiments 740 to 744, wherein the anode further comprises an electrolyte salt.

746. The energy storage device of embodiment 745, wherein the electrolyte salt comprises a zinc salt.

747. The energy storage device of any one of embodiments 740 to 746, wherein at least one of the cathode and the anode further comprises carbon nanotubes.

748. The energy storage device of any one of embodiments 740 to 747, wherein at least one of the cathode and the anode further comprises a conductive filler.

749. The energy storage device of embodiment 748, wherein the conductive filler comprises graphite.

750. The energy storage device of any one of embodiments 740 to 749, further comprising a separator between the cathode and the anode, wherein the separator comprises a third plurality of frustules.

751. The energy storage device of embodiment 750, wherein the third plurality of frustules comprises substantially no surface modifications.

752. The energy storage device of embodiment 750 or 751, wherein at least one of the cathode, the anode, and the separator comprises an ionic liquid.

753. The energy storage device of any one of embodiments 740 to 752, wherein the device is a rechargeable battery.

754. The energy storage device of any one of embodiments 740 to 753, wherein the first plurality of frustules comprises a first plurality of pores substantially not occluded by the nanostructures comprising the oxide of manganese, and wherein the second plurality of frustules comprises a second plurality of pores substantially not occluded by the nanostructures comprising the zinc oxide.

755. A frustule comprising a plurality of nanostructures on at least one surface, wherein the plurality of nanostructures comprises zinc oxide, wherein a ratio of a mass of the plurality of nanostructures to a mass of the frustule is about 1:1 to about 20:1.

756. The frustule of embodiment 755, wherein the plurality of nanostructures comprises at least one of nanowires, nanoplates, dense nanoparticles, nanobelts, and nanodisks.

757. The frustule of embodiment 755 or 756, wherein the frustule comprises a plurality of pores substantially not occluded by the plurality of nanostructures.

758. A frustule comprising a plurality of nanostructures on at least one surface, wherein the plurality of nanostructures comprises an oxide of manganese, wherein a ratio of a mass of the plurality of nanostructures to a mass of the frustule is about 1:1 to about 20:1.

759. The frustule of embodiment 758, wherein the oxide of manganese comprises MnO.

760. The frustule of embodiment 758 or 759, wherein the oxide of manganese comprises $Mn_3O_4$.

761. The frustule of any one of embodiments 758 to 760, wherein the oxide of manganese comprises at least one of $Mn_2O_3$ and MnOOH.

762. The frustule of any one of embodiments 758 to 761, wherein the plurality of nanostructures comprises at least one of nanowires, nanoplates, dense nanoparticles, nanobelts, and nanodisks.

763. The frustule of any one of embodiments 758 to 762, wherein the frustule comprises a plurality of pores substantially not occluded by the plurality of nanostructures.

764. An electrode of an energy storage device, the electrode comprising:
a plurality of frustules, wherein each of the plurality of frustules comprises a plurality of nanostructures formed on at least one surface, wherein at least one of the plurality of frustules comprises a ratio of a mass of the plurality of nanostructures to a mass of the at least one frustule of 1:20 to 20:1.

765. The electrode of embodiment 764, wherein the electrode is an anode of the energy storage device.

766. The electrode of embodiment 765, wherein the anode further comprises an electrolyte salt.

767. The electrode of embodiment 766, wherein the electrolyte salt comprises a zinc salt.

768. The electrode of any one of embodiments 765 to 767, wherein the plurality of nanostructures comprises zinc oxide.

769. The electrode of any one of embodiments 764 to 768, wherein the plurality of nanostructures comprises at least one of nanowires, nanoplates, dense nanoparticles, nanobelts, and nanodisks.

770. The electrode of embodiment 764 or 769, wherein the electrode is a cathode of the energy storage device.

771. The electrode of embodiment 770, wherein the plurality of nanostructures comprises an oxide of manganese.

772. The electrode of embodiment 771, wherein the oxide of manganese comprises MnO.

773. The electrode of embodiment 771 or 772, wherein the oxide of manganese comprises at least one of $Mn_3O_4$, $Mn_2O_3$ and MnOOH.

774. The electrode of any one of embodiments 764 to 773, further comprising carbon nanotubes.

775. The electrode of any one of embodiments 764 to 774, further comprising a conductive filler.

776. The electrode of embodiment 775, wherein the conductive filler comprises graphite.

777. The electrode of any one of embodiments 764 to 776, further comprising an ionic liquid.

778. The electrode of any one of embodiments 764 to 777, wherein each of the plurality of frustules comprises a plurality of pores substantially not occluded by the plurality of nano structures.

779. The energy storage device of any one of embodiments 559 to 562 and 565 to 585, wherein a mass of the nanostructures comprising the oxide of manganese of at least one frustule of the first plurality of frustules to a mass of the at least one frustule is about 1:20 to about 100:1.

780. The energy storage device of embodiment 779, wherein the mass of the nanostructures comprising the oxide of manganese of at least one frustule of the first plurality of frustules to the mass of the at least one frustule is about 1:1 to about 100:1.

781. The energy storage device of embodiment 779, wherein the mass of the nanostructures comprising the oxide of manganese of at least one frustule of the first plurality of frustules to the mass of the at least one frustule is about 1:20 to about 100:1.

782. The energy storage device of any one of embodiments 559 to 564, 567 to 585 and 779 to 781, wherein a mass of the ZnO of at least one frustule of the second plurality of frustules to a mass of the at least one frustule of the second plurality of frustules is about 1:20 to about 100:1.

783. The energy storage device embodiment 782, wherein the mass of the ZnO of at least one frustule of the second plurality of frustules to the mass of the at least one frustule of the second plurality of frustules is about 1:1 to about 100:1.

784. The energy storage device embodiment 782, wherein the mass of the ZnO of at least one frustule of the second plurality of frustules to the mass of the at least one frustule of the second plurality of frustules is about 20:1 to about 100:1.

785. The frustule of any one of embodiments 586 and 589, wherein a mass of the ZnO to a mass of the frustule is about 1:20 to about 100:1.

786. The frustule of embodiment 785, wherein the mass of the ZnO to the mass of the frustule is about 1:1 to about 100:1.

787. The frustule of embodiment 785, wherein the mass of the ZnO to the mass of the frustule is about 20:1 to about 100:1.

788. The frustule of any one of embodiments 590 and 593 to 597, wherein a mass of the plurality of nanostructures comprising the oxide of manganese to a mass of the frustule is about 1:20 to about 100:1.

789. The frustule of embodiment 788, wherein the mass of the plurality of nanostructures comprising the oxide of manganese to the mass of the frustule is about 1:1 to about 100:1.

790. The frustule of embodiment 788, wherein the mass of the plurality of nanostructures comprising the oxide of manganese to the mass of the frustule is about 20:1 to about 100:1.

791. The electrode of any one of embodiments 598 to 603 and 606 to 612, 615 to 619, wherein a mass of the plurality of nanostructures to a mass of at least one frustule of the plurality of frustules is about 1:20 to about 100:1.

792. The electrode of embodiment 791, wherein the mass of the plurality of nanostructures to the mass of the at least one frustule is about 1:1 to about 100:1.

793. The electrode of embodiment 791, wherein the mass of the plurality of nanostructures to the mass of the at least one frustule is about 20:1 to about 100:1.

794. The method of any one of embodiments 620 to 643, wherein a mass of the zinc oxide to a mass of at least one frustule of the plurality of frustules is about 1:20 to about 100:1.

795. The method of embodiment 794, wherein the mass of the zinc oxide to the mass of the at least one frustule is about 1:1 to about 100:1.

796. The method of embodiment 794, wherein the mass of the zinc oxide to the mass of the at least one frustule is about 20:1 to about 100:1.

797. The method of any one of embodiments 645 to 655, wherein a mass of the nanostructures comprising the oxide of manganese to a mass of at least one frustule of the plurality of frustules is about 1:20 to about 100:1.

798. The method of embodiment 797, wherein the mass of the nanostructures comprising the oxide of manganese to the mass of the at least one frustule is about 1:1 to about 100:1.

799. The method of embodiment 797, wherein the mass of the nanostructures comprising the oxide of manganese to the mass of the at least one frustule is about 20:1 to about 100:1.

800. The ink of any one of embodiments 656 to 658, 660 to 667 and 669 to 683, wherein a mass of the plurality of nanostructures to a mass of at least one frustule of the plurality of frustules is about 1:20 to about 100:1.

801. The ink of embodiment 800, wherein the mass of the plurality of nanostructures to the mass of the at least one frustule is about 1:1 to about 100:1.

802. The ink of embodiment 800, wherein a mass of the plurality of nanostructures to the mass of the at least one frustule is about 20:1 to about 100:1.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Further, the disclosure herein of any particular feature, aspect, method, property, characteristic, quality, attribute, element, or the like in connection with an implementation or embodiment can be used in all other implementations or embodiments set forth herein.

Any methods disclosed herein need not be performed in the order recited. The methods disclosed herein may include certain actions taken by a practitioner; however, the methods can also include any third-party instruction of those actions, either expressly or by implication. For example, actions such as "adding the frustules to an oxygenated manganese acetate solution" include "instructing the adding of the frustules to an oxygenated manganese acetate solution."

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant."

The headings provided herein, if any, are for convenience only and do not necessarily affect the scope or meaning of the devices and methods disclosed herein.

What is claimed is:

1. An energy storage device, comprising:
a first current collector layer and a second current collector layer that are laterally adjacent to each other and are substantially flat layers extending laterally along a major surface of a substrate;
a first electrode layer of a first type over the first current collector layer, wherein the first electrode layer is a printed layer comprising frustules having formed thereon nanostructures comprising an oxide of manganese;
a second electrode layer of a second type over the second current collector layer, the first type different than the second type; and
a separator between the first electrode layer and the second electrode layer.

2. The energy storage device of claim 1, wherein the separator is interposed laterally between a side surface of the first electrode layer and a side surface of the second electrode layer facing the side surface of the first electrode layer.

3. The energy storage device of claim 1, wherein the separator encapsulates top and side surfaces of each of the first electrode layer and the second electrode layer.

4. The energy storage device of claim 1, wherein the oxide of manganese comprises one of MnO, $Mn_3O_4$, $Mn_2O_3$, MnOOH or a combination thereof.

5. The energy storage device of claim 1, wherein at least one of the frustules comprises a ratio of a mass of the oxide of manganese to a mass of the at least one frustule of 1:20 to 20:1.

6. The energy storage device of claim 1, wherein the second electrode layer is a printed layer comprising frustules having formed thereon nanostructures comprising zinc oxide.

7. The energy storage device of claim 6, wherein at least one of the frustules comprises a ratio of a mass of the zinc oxide to a mass of the at least one frustule of 1:20 to 20:1.

8. The energy storage device of claim 1, wherein the separator is a printed layer comprising frustules.

9. The energy storage device of claim 1, wherein one or more of the first electrode layer, the second electrode layer and the separator comprises an ionic liquid.

10. An energy storage device, comprising:
a first electrode layer of a first type over a first current collector layer, wherein the first electrode layer is a printed layer comprising frustules having formed thereon nanostructures comprising an oxide of manganese;
a second electrode layer of a second type over a second current collector layer, the first type different than the second type; and
a separator encapsulating top and side surfaces of one or both of the first electrode layer and the second electrode layer,
wherein the first current collector layer and the second current collector layer are laterally adjacent to each other and are substantially flat layers extending laterally along a major surface of a substrate.

11. The energy storage device of claim 10, wherein the first current collector layer and the second current collector layer are adjacently disposed in a lateral direction over a substrate.

12. The energy storage device of claim 10, wherein the separator encapsulates top and side surfaces of both of the first electrode layer and the second electrode layer.

13. The energy storage device of claim 10, wherein the separator is vertically interposed between major surfaces of the first electrode layer and the second electrode layer.

14. The energy storage device of claim 13, wherein the separator encapsulates top and side surfaces of one but not the other of the first electrode layer and the second electrode layer.

15. The energy storage device of claim 13, wherein the second current collector encapsulates top and side surfaces of the second electrode layer.

16. The energy storage device of claim 10, wherein the oxide of manganese comprises one of MnO, $Mn_3O_4$, $Mn_2O_3$, MnOOH or a combination thereof.

17. The energy storage device of claim 10, wherein the second electrode layer is a printed layer comprising frustules having formed thereon nanostructures comprising zinc oxide.

18. The energy storage device of claim 10, wherein the separator is a printed layer comprising frustules.

* * * * *

UNITED STATES PATENT AND TRADEMARK OFFICE
CERTIFICATE OF CORRECTION

| | |
|---|---|
| PATENT NO. | : 10,770,733 B2 |
| APPLICATION NO. | : 16/165171 |
| DATED | : September 8, 2020 |
| INVENTOR(S) | : Vera N. Lockett et al. |

It is certified that error appears in the above-identified patent and that said Letters Patent is hereby corrected as shown below:

On the Title Page

On Page 3, Column 2, Item (56), Line 4, under Other Publications, delete "dimentional" and insert --dimensional--.

On Page 3, Column 2, Item (56), Line 15, under Other Publications, delete "nanostrcutured" and insert --nanostructured--.

On Page 3, Column 2, Item (56), Line 16, under Other Publications, delete "micro-asseblies" and insert --micro-assemblies--.

On Page 3, Column 2, Item (56), Line 45, under Other Publications, delete "performancce" and insert --performance--.

On Page 3, Column 2, Item (56), Line 64, under Other Publications, delete "Enviromental" and insert --Environmental--.

On Page 4, Column 1, Item (56), Line 7, under Other Publications, delete "Organophosphorous" and insert --Organophosphorus--.

On Page 4, Column 1, Item (56), Line 8, under Other Publications, delete "Flourine" and insert --Fluorine--.

On Page 4, Column 1, Item (56), Line 18, under Other Publications, delete "Diatomeceous," and insert --Diatomaceous,--.

On Page 4, Column 1, Item (56), Line 20, under Other Publications, delete "Fiatoms" and insert --Diatoms--.

On Page 4, Column 1, Item (56), Line 22, under Other Publications, delete "micromashinning:" and Signed and Sealed this
Tenth Day of November, 2020

Andrei Iancu
*Director of the United States Patent and Trademark Office* insert --micromachining:--.

On Page 4, Column 1, Item (56), Line 24, under Other Publications, delete "Biolofical" and insert --Biological--.

On Page 4, Column 1, Item (56), Line 62, under Other Publications, delete "poltungstate" and insert --polytungstate--.

On Page 4, Column 2, Item (56), Line 26, under Other Publications, delete "dimentional" and insert --dimensional--.

On Page 4, Column 2, Item (56), Line 34, under Other Publications, delete "dimentional" and insert --dimensional--.

In the Specification

In Column 8, Line 1, delete "dmethyldioctadecylammonium" and insert --dimethyldioctadecylammonium--.

In Column 10, Line 17, delete "dmethyldioctadecylammonium" and insert --dimethyldioctadecylammonium--.

In Column 12, Line 29, delete "dmethyldioctadecylammonium" and insert --dimethyldioctadecylammonium--.

In Column 14, Line 19, delete "proplyene" and insert --propylene--.

In Column 14, Line 31, delete "proplyene" and insert --propylene--.

In Column 14, Line 34, delete "pentaol," and insert --pentanol,--.

In Column 15, Line 31, delete "teramethylammonium" and insert --tetramethylammonium--.

In Column 15, Line 42, delete "ethanoamine" and insert --ethanolamine--.

In Column 15, Line 48, delete "proplyene" and insert --propylene--.

In Column 15, Line 59, delete "proplyene" and insert --propylene--.

In Column 15, Line 63, delete "pentaol," and insert --pentanol,--.

In Column 16, Line 46, delete "molibdenium" and insert --molybdenum--.

In Column 16, Line 51, delete "colbalt" and insert --cobalt--.

In Column 17, Line 62, delete "propanon" and insert --propanone--.

CERTIFICATE OF CORRECTION (continued)
U.S. Pat. No. 10,770,733 B2

In Column 17, Lines 62-63, delete "thioxothanone." and insert --thioxanthone.--.

In Column 19, Line 23, delete "propanon" and insert --propanone--.

In Column 19, Line 23, delete "thioxothanone." and insert --thioxanthone.--.

In Column 20, Line 40, delete "propanon" and insert --propanone--.

In Column 20, Lines 40-41, delete "thioxothanone." and insert --thioxanthone.--.

In Column 22, Line 37, delete "nano structures." and insert --nanostructures.--.

In Column 34, Lines 58-59, delete "dmethyldioctadecylammonium" and insert --dimethyldioctadecylammonium--.

In Column 38, Line 13, delete "oxohydroxide" and insert --oxahydroxide--.

In Column 41, Lines 44-45, delete "proplyene" and insert --propylene--.

In Column 41, Line 49, delete "pentaol," and insert --pentanol,--.

In Column 43, Line 61, delete "hexandiol" and insert --hexanediol--.

In Column 44, Line 8, delete "photoinitatiors" and insert --photoinitiators--.

In Column 44, Line 16, delete "thioxothanone." and insert --thioxanthone.--.

In Column 44, Line 17, delete "ITV))." and insert --ITX®).--.

In Column 48, Line 50, delete "teramethylammonium" and insert --tetramethylammonium--.

In Column 48, Line 64, delete "ethanoamine" and insert --ethanolamine--.

In Column 49, Lines 27-28, delete "molibdenium" and insert --molybdenum--.

In Column 66, Line 25, delete "precurors," and insert --precursors,--.

In Column 66, Line 28, delete "polyvynylidene" and insert --polyvinylidene--.

In Column 66, Line 29, delete "polyethelene," and insert --polyethylene,--.

In Column 66, Line 32, delete "terefphtalatpolyacrylonitryle," and insert --terephthalatepolyacrylonitrile,--.

In Column 77, Lines 15-16, delete "dmethyldioctadecylammonium" and insert --dimethyldioctadecylammonium--.

In Column 80, Lines 12-13, delete "dmethyldioctadecylammonium" and insert --dimethyldioctadecylammonium--.

In Column 83, Lines 9-10, delete "dmethyldioctadecylammonium" and insert --dimethyldioctadecylammonium--.

In Column 85, Line 39, delete "proplyene" and insert --propylene--.

In Column 85, Line 50, delete "proplyene" and insert --propylene--.

In Column 85, Line 53, delete "pentaol," and insert --pentanol,--.

In Column 87, Line 9, delete "teramethylammonium" and insert --tetramethylammonium--.

In Column 87, Line 22, delete "ethanoamine" and insert --ethanolamine--.

In Column 87, Line 28, delete "proplyene" and insert --propylene--.

In Column 87, Line 40, delete "proplyene" and insert --propylene--.

In Column 87, Line 43, delete "pentaol" and insert --pentanol--.

In Column 88, Line 46, delete "molibdenium" and insert --molybdenum--.

In Column 88, Line 51, delete "colbalt" and insert --cobalt--.

In Column 90, Line 27, delete "propanon" and insert --propanone--.

In Column 90, Line 28, delete "thioxothanone." and insert --thioxanthone.--.

In Column 92, Lines 20-21, delete "propanon" and insert --propanone--.

In Column 92, Line 21, delete "thioxothanone." and insert --thioxanthone.--.

In Column 93, Line 66, delete "propanon" and insert --propanone--.

In Column 93, Line 67, delete "thioxothanone." and insert --thioxanthone.--.

In Column 95, Lines 49-50, delete "nano structures." and insert --nanostructures.--.

In Column 98, Line 3, delete "nanostructures" and insert --nanostructures.--.

In Column 100, Line 26, delete "nano structures." and insert --nanostructures.--.

In Column 100, Lines 29-30, delete "nano structures." and insert --nanostructures.--.

CERTIFICATE OF CORRECTION (continued)
U.S. Pat. No. 10,770,733 B2

In Column 100, Line 53, delete "nano structures." and insert --nanostructures.--.

In Column 100, Lines 56-57, delete "nano structures." and insert --nanostructures.--.

In Column 103, Line 47, delete "Methyl 2" and insert --Methyl-2--.

In Column 106, Line 56, delete "manganese" and insert --manganese.--.

In Column 109, Line 4, delete "nano structures " and insert --nanostructures.--.